Jan. 24, 1967   M. L. DOELZ ETAL   3,300,764
DATA PROCESSOR
Filed Aug. 26, 1963   115 Sheets-Sheet 6

INVENTORS
MELVIN L. DOELZ
GEORGE F. GRONDIN
BY Moody and Phillips
ATTORNEYS

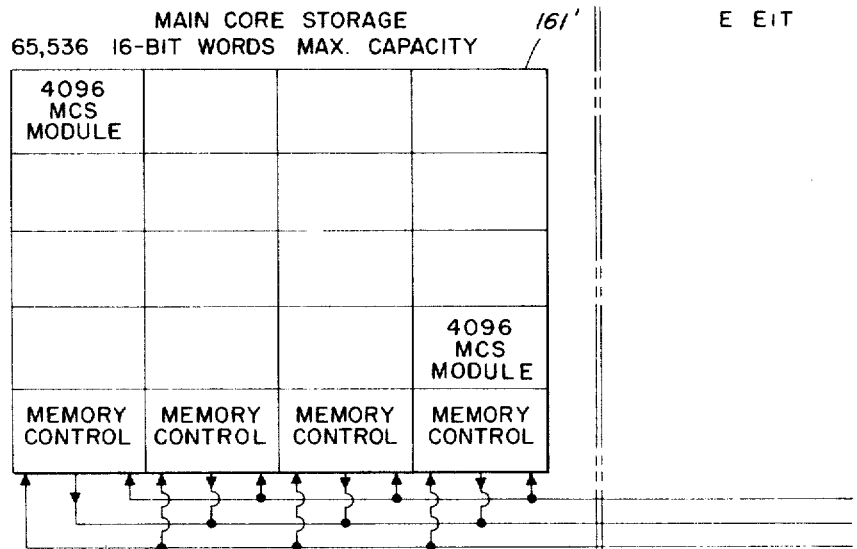
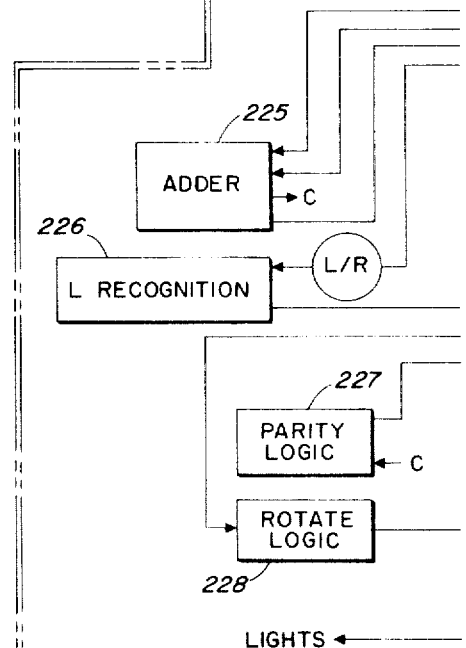
FIG 10
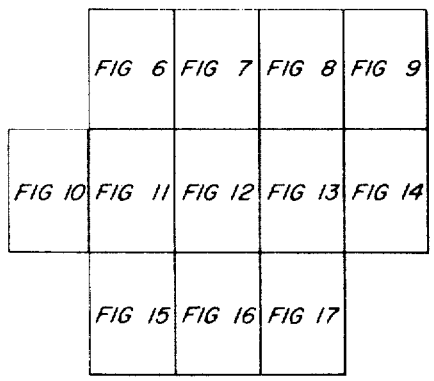
FIG 18

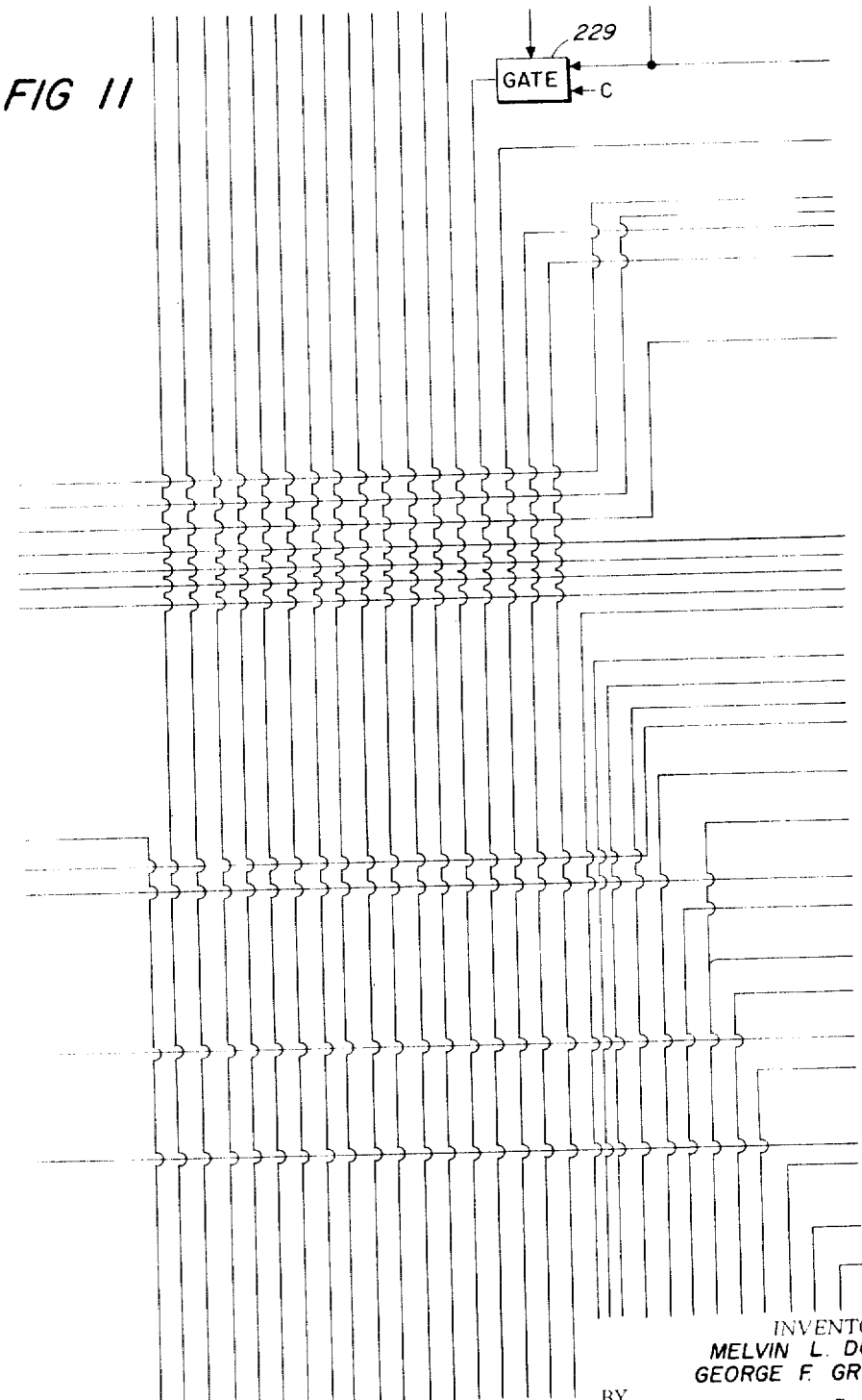

Jan. 24, 1967   M. L. DOELZ ETAL   3,300,764
DATA PROCESSOR
Filed Aug. 26, 1963   115 Sheets-Sheet 16

INVENTORS
MELVIN L. DOELZ
GEORGE F. GRONDIN
BY
ATTORNEYS

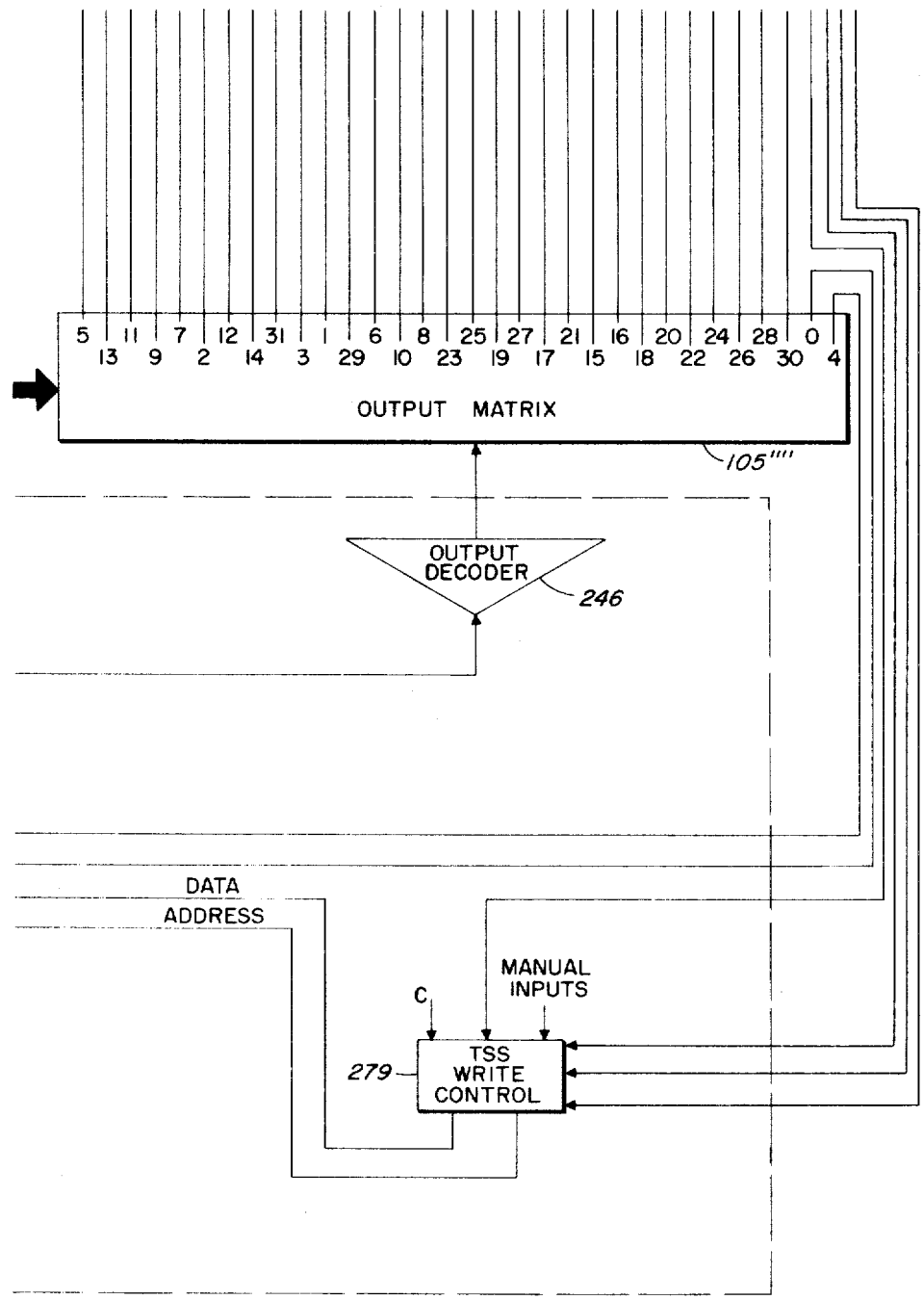

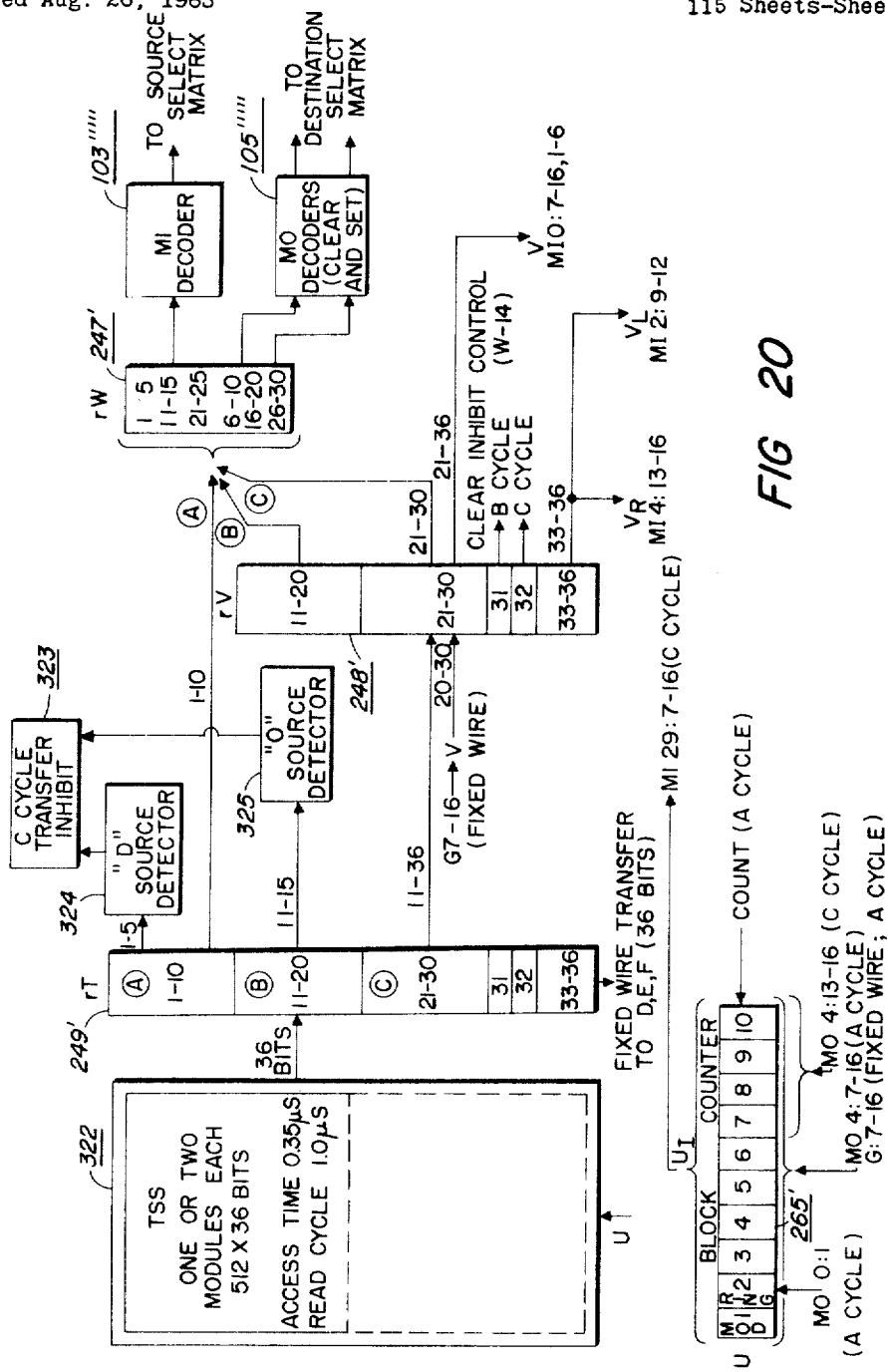

Jan. 24, 1967     M. L. DOELZ ETAL     3,300,764

DATA PROCESSOR

Filed Aug. 26, 1963     115 Sheets-Sheet 20

FIG 21

TRANSFER SEQUENCE REGISTER CONNECTIONS (U)

| | | MODULE | RING | BLOCK | COUNT | MC=MANUAL CONTROL<br>K=COUNTER INPUT | COUNTER | |
|---|---|---|---|---|---|---|---|---|
| FALSE OUTPUTS | | -19 | -20,-21,-22,-23 | -24,-25,-26,-27 | | | | |
| | MS | | K-1,K-2,K-3,K-4 | | | U-7,U-8,U-9,U-10 | | |
| | RO-1 | RO-2 | RO-3,RO-4,RO-5,RO-6 | RO-7,RO-8,RO-9,RO-10 | | READOUT INDICATOR LIGHTS | | |
| TRUE OUTPUTS | -10 | -11,-12,-13,-14 | -15,-16,-17,-18 | | | | | |
| | -1 | -2,-3,-4,-5 | -6,-7,-8,-9 | | | | | |
| | MS | | K-1,K-2,K-3,K-4 | | | U-7,U-8,U-9,U-10 | | |
| | 29-7 | 29-8 | 29-9,29-10,29-11,29-12 | | GATED BY SOURCE SELECT "29" AND C-CYCLE | 29-13,29-14,29-15,29-16 | GATED BY SWITCH SELECT "29" AND C-CYCLE |
| REGISTER POSITIONS | U-1 | U-2 | U-3,U-4,U-5,U-6 | U-7,U-8,U-9,U-10 | | K-1,K-2,K-3,K-4 | | |
| | MC | MC | MC,MC,MC,MC | MC,MC,MC,MC | GATED BY "STEP" MODE AND "MASTER CLEAR" | MC,MC,MC,MC | GATED BY "STEP" MODE AND "MASTER CLEAR" SWITCH |
| RESET INPUTS | | | | K-1,K-2,K-3,K-4 | GATED BY DEST. SELECT NOT "4" AND A-CYCLE | | |
| | D3-7 | D3-8 | D3-9,D3-10,D3-11,D3-12 | D3-13,D3-14,D3-15,D3-16 | GATED BY C-21 TRUE AND A-CYCLE | U-7T,U-8T,U-9T,U-10T | GATED BY B-CYCLE AND ALL RIGHT POSITIONS TRUE |
| | | G-17 | | | GATED BY DEST. SELECT "0" AND SELECT | U-7F,U-8F,U-9F,U-10F | GATED BY B-CYCLE AND ANY RIGHT POSITION FALSE |
| | 4-17 | 4-17 | 4-17,4-17,4-17,4-17 | 4-17,4-17,4-17,4-17 | GATED BY DEST. CLEAR "4" AND A-CYCLE | 4-17,4-17,4-17,4-17 | GATED BY DEST. SELECT "4" AND C-CYCLE |
| SET INPUTS | | | | K-1,K-2,K-3,K-4 | GATED BY DEST. SELECT NOT "4" AND A-CYCLE | | |
| | D3-7 | D3-8 | D3-9,D3-10,D3-11,D3-12 | D3-13,D3-14,D3-15,D3-16 | GATED BY C-21 TRUE AND A-CYCLE | U-7F,U-8F,U-9F,U-10F | GATED BY B-CYCLE AND ANY RIGHT POSITION FALSE |
| | | O-1 | | | GATED BY DEST. SELECT "0" AND A-CYCLE | U-7T,U-8T,U-9T,U-10T | GATED BY B-CYCLE AND ALL RIGHT POSITION TRUE |
| | 4-7 | 4-8 | 4-9,4-10,4-11,4-12 | 4-13,4-14,4-15,4-16 | GATED BY DEST. SELECT "4" AND A-CYCLE | 4-13,4-14,4-15,4-16 | GATED BY DEST. SELECT "4" AND C-CYCLE |

INVENTORS
MELVIN L. DOELZ
GEORGE F. GRONDIN

BY *Moody and Phillips*

ATTORNEYS

Jan. 24, 1967    M. L. DOELZ ETAL    3,300,764
DATA PROCESSOR
Filed Aug. 26, 1963    115 Sheets-Sheet 21

FIG 22

TRANSFER SEQUENCE REGISTER CONNECTIONS (T REGISTER)

| SET INPUTS | RESET | INPUTS | | REGISTER POSITIONS | TRUE OUTPUTS | | FALSE OUTPUTS | |
|---|---|---|---|---|---|---|---|---|
| TSS-1 | TSS-37 | SW-1 | MC | A-CYCLE TRANSFER COMMAND | T-1 | F-3 | W-1 | F-3 |
| -2 | -37 | SW-2 | MC | | T-2 | F-4 | W-2 | F-4 |
| -3 | -37 | SW-3 | MC | | T-3 | F-5 | W-3 | F-5 |
| -4 | -37 | SW-4 | MC | | T-4 | F-6 | W-4 | F-6 |
| -5 | -37 | SW-5 | MC | | T-5 | F-7 | W-5 | F-7 |
| TSS-6 | TSS-37 | SW-6 | MC | | T-6 | F-8 | W-6 | F-8 |
| -7 | -37 | SW-7 | MC | | T-7 | F-11 | W-7 | F-11 |
| -8 | -37 | SW-8 | MC | | T-8 | F-12 | W-8 | F-12 |
| -9 | -37 | SW-9 | MC | | T-9 | F-13 | W-9 | F-13 |
| -10 | -37 | SW-10 | MC | | T-10 | F-14 | W-10 | F-14 |
| TSS-11 | TSS-37 | SW-11 | MC | B-CYCLE TRANSFER COMMAND | T-11 | F-15 W-12 | V-11 | W-11 |
| -12 | -37 | SW-12 | MC | | T-12 | F-16 W-13 | V-12 | W-12 |
| -13 | -37 | SW-13 | MC | | T-13 | E-3 W-14 | V-13 | W-13 |
| -14 | -37 | SW-14 | MC | | T-14 | E-4 W-15 | V-14 | W-14 |
| -15 | -37 | SW-15 | MC | | T-15 | E-5 | V-15 | W-15 |
| TSS-16 | TSS-37 | SW-16 | MC | | T-16 | E-6 | V-16 | E-6 |
| -17 | -37 | SW-17 | MC | | T-17 | E-7 | V-17 | E-7 |
| -18 | -37 | SW-18 | MC | | T-18 | E-8 | V-18 | E-8 |
| -19 | -37 | SW-19 | MC | | T-19 | E-11 | V-19 | E-11 |
| -20 | -37 | SW-20 | MC | | T-20 | E-12 | V-20 | E-12 |
| TSS-21 | TSS-37 | SW-21 | MC | C-CYCLE TRANSFER COMMAND | T-21 | E-13 | V-21 | E-13 |
| -22 | -37 | SW-22 | MC | | T-22 | E-14 | V-22 | E-14 |
| -23 | -37 | SW-23 | MC | | T-23 | E-15 | V-23 | E-15 |
| -24 | -37 | SW-24 | MC | | T-24 | E-16 | V-24 | E-16 |
| -25 | -37 | SW-25 | MC | | T-25 | D-3 | V-25 | D-3 |
| TSS-26 | TSS-37 | SW-26 | MC | | T-26 | D-4 | V-26 | D-4 |
| -27 | -37 | SW-27 | MC | | T-27 | D-5 | V-27 | D-5 |
| -28 | -37 | SW-28 | MC | | T-28 | D-6 | V-28 | D-6 |
| -29 | -37 | SW-29 | MC | | T-29 | D-7 | V-29 | D-7 |
| -30 | -37 | SW-30 | MC | | T-30 | D-8 | V-30 | D-8 |
| TSS-31 | TSS-37 | SW-31 | MC | B-CYCLE CLEAR CON. | T-31 | D-11 | V-31 | D-11 |
| TSS-32 | TSS-37 | SW-32 | MC | C-CYCLE CLEAR CON. | T-32 | D-12 | V-32 | D-12 |
| TSS-33 | TSS-37 | SW-33 | MC | D-CONSTANT | T-33 | D-13 | V-33 | D-13 |
| -34 | -37 | SW-34 | MC | | T-34 | D-14 | V-34 | D-14 |
| -35 | -37 | SW-35 | MC | | T-35 | D-15 | V-35 | D-15 |
| -36 | -37 | SW-36 | MC | | T-36 | D-16 | V-36 | D-16 |
| *1 | *3 | *4 | *5 | | | | | *6 |

*1 & 3—GATED BY TSS CONTROL
*2 & 4—PANEL SWITCHES, GATED BY "STEP" MODE & "SWITCH T" TRUE
*5 —GATED BY "STEP" MODE AND "MASTER CLEAR" SWITCH TIME
*6 —SOURCE V (MI-0) DETECTOR TO INHIBIT C-CYCLE TRANSFER

INVENTORS
MELVIN L. DOELZ
GEORGE F. GRONDIN
BY *Moody and Phillion*
ATTORNEYS

FIG 23

TRANSFER SEQUENCE REGISTER CONNECTIONS (V)

| SET INPUTS | RESET INPUTS | REGISTER POSITIONS | TRUE OUTPUTS | | | | | |
|---|---|---|---|---|---|---|---|---|
| T-11<br>T-12<br>T-13<br>T-14<br>T-15<br>T-16<br>T-17<br>T-18<br>T-19<br>T-20 | T-11<br>T-12<br>T-13<br>T-14<br>T-15<br>T-16<br>T-17<br>T-18<br>T-19<br>T-20 | V-11<br>V-12<br>V-13<br>V-14<br>V-15<br>V-16<br>V-17<br>V-18<br>V-19<br>V-20 | B-CYCLE TRANSFER COMMAND | W-1<br>W-2<br>W-3<br>W-4<br>W-5<br>W-6<br>W-7<br>W-8<br>W-9<br>W-10 | | W-11<br>W-12<br>W-13<br>W-14<br>W-15 | | |
| G-7<br>G-8<br>G-9<br>G-10<br>G-11<br>G-12<br>G-13<br>G-14<br>G-15<br>G-16 | T-21<br>T-22<br>T-23<br>T-24<br>T-25<br>T-26<br>T-27<br>T-28<br>T-29<br>T-30 | V-21<br>V-22<br>V-23<br>V-24<br>V-25<br>V-26<br>V-27<br>V-28<br>V-29<br>V-30 | C-CYCLE TRANSFER COMMAND | W-1<br>W-2<br>W-3<br>W-4<br>W-5<br>W-6<br>W-7<br>W-8<br>W-9<br>W-10 | 0-7<br>0-8<br>0-9<br>0-10<br>0-11<br>0-12<br>0-13<br>0-14<br>0-15<br>0-16 | W-11<br>W-12<br>W-13<br>W-14<br>W-15 | | |
| | T-31<br>T-32 | V-31<br>V-32 | B-CYCLE CLEAR CON.<br>C-CYCLE CLEAR CON. | W-16<br>W-16 | 0-1<br>0-2 | | | |
| T-33<br>T-34<br>T-35<br>T-36 | T-33<br>T-34<br>T-35<br>T-36 | V-33<br>V-34<br>V-35<br>V-36 | D-COMMAND | | 0-3<br>0-4<br>0-5<br>0-6 | | 2-9<br>2-10<br>2-11<br>2-12 | 4-13<br>4-14<br>4-15<br>4-16 |

Column headers (right side, TRUE OUTPUTS continued):
- 21-36 GATED BY SOURCE SELECT "0"
- 33-36 GATED BY SOURCE SELECT "2"
- 33-36 GATED BY SOURCE SELECT "4"

FALSE OUTPUTS

| | | |
|---|---|---|
| W-1<br>W-2<br>W-3<br>W-4<br>W-5<br>W-6<br>W-7<br>W-8<br>W-9<br>W-10 | | W-11<br>W-12<br>W-13<br>W-14<br>W-15 |
| W-1<br>W-2<br>W-3<br>W-4<br>W-5<br>W-6<br>W-7<br>W-8<br>W-9<br>W-10 | W-16<br>W-16 | W-11<br>W-12<br>W-13<br>W-14<br>W-15 |

Gating notes:
- SET INPUTS rows: GATED BY B-CYCLE AND C-20 TRUE; GATED BY A-CYCLE
- RESET INPUTS rows: GATED BY B-CYCLE AND C-20 TRUE; GATED BY A-CYCLE

FIG 24

| TRANSFER SEQUENCE REGISTER CONNECTIONS (W) | | | | | | |
|---|---|---|---|---|---|---|
| FALSE OUTPUTS | SD-26<br>SD-27<br>SD-28<br>SD-29<br>SD-30 | DD-26<br>DD-27<br>DD-28<br>DD-29<br>DD-30 | DD-56<br>DD-57<br>DD-58<br>DD-59<br>DD-60 | | | |
| | SD-21<br>SD-22<br>SD-23<br>SD-24<br>SD-25 | DD-21<br>DD-22<br>DD-23<br>DD-24<br>DD-25 | DD-51<br>DD-52<br>DD-53<br>DD-54<br>DD-55 | | | |
| | SD-16<br>SD-17<br>SD-18<br>SD-19<br>SD-20 | DD-16<br>DD-17<br>DD-18<br>DD-19<br>DD-20 | DD-46<br>DD-47<br>DD-48<br>DD-49<br>DD-50 | CC-2 | | |
| | D3-1<br>D3-2<br>D3-3<br>D3-4<br>D3-5 | D3-6<br>D3-7<br>D3-8<br>D3-9<br>D3-10 | D3-11<br>D3-12<br>D3-13<br>D3-14<br>D3-15 | | GATED BY "STEP" MODE AND PANEL SWITCH "WD3" TRUE | |
| TRUE OUTPUTS | SD-11<br>SD-12<br>SD-13<br>SD-14<br>SD-15 | DD-11<br>DD-12<br>DD-13<br>DD-14<br>DD-15 | DD-41<br>DD-42<br>DD-43<br>DD-44<br>DD-45 | | | |
| | SD-6<br>SD-7<br>SD-8<br>SD-9<br>SD-10 | DD-6<br>DD-7<br>DD-8<br>DD-9<br>DD-10 | DD-36<br>DD-37<br>DD-38<br>DD-39<br>DD-40 | | | |
| | SD-1<br>SD-2<br>SD-3<br>SD-4<br>SD-5 | DD-1<br>DD-2<br>DD-3<br>DD-4<br>DD-5 | DD-31<br>DD-32<br>DD-33<br>DD-34<br>DD-35 | CC-1 | | |
| | D3-1<br>D3-2<br>D3-3<br>D3-4<br>D3-5 | D3-6<br>D3-7<br>D3-8<br>D3-9<br>D3-10 | D3-11<br>D3-12<br>D3-13<br>D3-14<br>D3-15 | | GATED BY "STEP" MODE AND PANEL SWITCH "WD3" TRUE | |
| REGISTER POSITIONS | W-1<br>W-2<br>W-3<br>W-4<br>W-5 | W-6<br>W-7<br>W-8<br>W-9<br>W-10 | W-11<br>W-12<br>W-13<br>W-14<br>W-15 | W-16 | | |
| | SOURCE DECODE (A) (SD) | DESTINATION DECODE (A) (DD) | DESTINATION DECODE (B) (DD) | CLEAR CONTROL (CC) | | |
| RESET INPUTS | V-21<br>V-22<br>V-23<br>V-24<br>V-25 | V-26<br>V-27<br>V-28<br>V-29<br>V-30 | V-26<br>V-27<br>V-28<br>V-29<br>V-30 | V-32 | GATED BY C-CYCLE & NOT ZEROS IN T-1 TO T-5 OR T-11 TO T-15 | |
| | V-11<br>V-12<br>V-13<br>V-14<br>V-15 | V-16<br>V-17<br>V-18<br>V-19<br>V-20 | V-16<br>V-17<br>V-18<br>V-19<br>V-20 | V-31 | GATED BY B-CYCLE | |
| | T-1<br>T-2<br>T-3<br>T-4<br>T-5 | T-6<br>T-7<br>T-8<br>T-9<br>T-10 | T-6<br>T-7<br>T-8<br>T-9<br>T-10 | ONE | GATED BY A-CYCLE | |
| SET INPUTS | V-21<br>V-22<br>V-23<br>V-24<br>V-25 | V-26<br>V-27<br>V-28<br>V-29<br>V-30 | V-26<br>V-27<br>V-28<br>V-29<br>V-30 | V-32 | GATED BY C-CYCLE & NOT ZEROS IN T-1 TO T-5 OR T-11 TO T-15 | |
| | V-11<br>V-12<br>V-13<br>V-14<br>V-15 | V-16<br>V-17<br>V-18<br>V-19<br>V-20 | V-16<br>V-17<br>V-18<br>V-19<br>V-20 | V-31 | GATED BY B-CYCLE | |
| | T-1<br>T-2<br>T-3<br>T-4<br>T-5 | T-6<br>T-7<br>T-8<br>T-9<br>T-10 | T-6<br>T-7<br>T-8<br>T-9<br>T-10 | ZERO | GATED BY A-CYCLE | |

INVENTORS
MELVIN L. DOELZ
GEORGE F. GRONDIN
BY
*Moody and Phillips*
ATTORNEYS

| ROW | TSS CYCLE 1μS | Transfer Cycles 1/3μS | | | | | | | | | | | | | |
|---|---|---|---|---|---|---|---|---|---|---|---|---|---|---|---|
| | 1 | | | 2 | | | 3 | | | 4 | | | 5 | | |
| | | A | B | C | A | B | C | A | B | C | A | B | C | A | B | C |
| 2 | | | | | | | | | | | | | | | | | TSS ACCESS |
| 3 | | 3 | | | 4 | | | 5 | | | (1) | | | (2) | | | U → COUNTER |
| 4 | 2 | | 3 | | | 4 | | | 5 | | | (1) | | | (1) | | COUNTER → U |
| 5 | | 2 | | | 3 | | | 4 | | | 5 | | | (1) | | | TSS → T |
| 6 | | | 2 | | | 3 | | | 4 | | | 5 | | | (1) | | $T_A$→W; T→V; T→"V" SOURCE DETECTORS |
| 7 | 1 | | | 2 | | | 3 | | | 4 | | | 5 | | | | $V_B$→W |
| 8 | | 1 | | | 2 | | | 3 | | | 4 | | | 5 | | | $V_C$→W OR NOP→W |
| 9 | | | 3 | | | 2 | | | 4 | | | 5 | | | (1) | | MATRIX TRANSFER TO COUNTER (M0-4) |
| 10 | 2 | | | 3 | | | 3 | | | 4 | | | 5 | | | (2) | MATRIX TRANSFER TO U(M0;M0-4);G-U |
| 11 | | A | B | C | A | B | C | A | B | C | A | B | C | A | B | C | MATRIX TRANSFER CLEAR DESTINATION |
| 12 | | A | B | C | A | B | C | A | B | C | A | B | C | A | B | C | TRANFER DATA |
| 13 | | | | | | | | | | | | | | | | | MCS ACCESS |
| 14 | | S | | | | | | | | | | | | | | | ADDRESS → S (TRIGGERS ACCESS) |
| 15 | | | R | R | R | R | | | | | | | | | | | MCS → Z (MEMORY READ) |
| 16 | | | | | | | | Z | Z | Z | Z | Z | | Z | Z | | TRANSFER FROM Z PERMITTED |
| 17 | | | | | | | | | | | W | W | W | W | W | W | Z → MCS (MEMORY WRITE) |
| 18 | X | | X | X | X | | E | E | E | E | | | | | | | ENTRY INTO Z PERMITTED |
| 19 | | | Y | | | | | | | | | | | | | | SPECIAL FUNCTIONS (START ANY CYCLE) OPERAND → Y (BINARY ADD) |
| 20 | | | | O | | | | | | | | | | | | | X,Y,A,L OCCUPIED |
| 21 | | | | | + | | | | | | | | | | | | (X+Y) AVAILABLE IN A |
| 22 | | | X | | | | | | | | | | | | | | OPERAND → X (MODULE 2 ADD) |
| 23 | | | | ⊕ | | | | | | | | | | | | | (X⊕Y) AVAILABLE IN A |
| 24 | | | D | | | | | | | | | | | | | | TRANSFER TO D |
| 25 | | | | | P | | | | | | | | | | | | PARITY AVAILABLE IN C |
| 26 | | | R | | | | | | | | | | | | | | ROTATE COMMAND TO C |
| 27 | | | | O | | | | | | | | | | | | | B AND $R_2$ OCCUPIED |
| 28 | | | | | $R_2$ | | | | | | | | | | | | ROTATED WORD AVAILABLE IN $R_2$ |

MCS CYCLE (5μS)

FIG 25

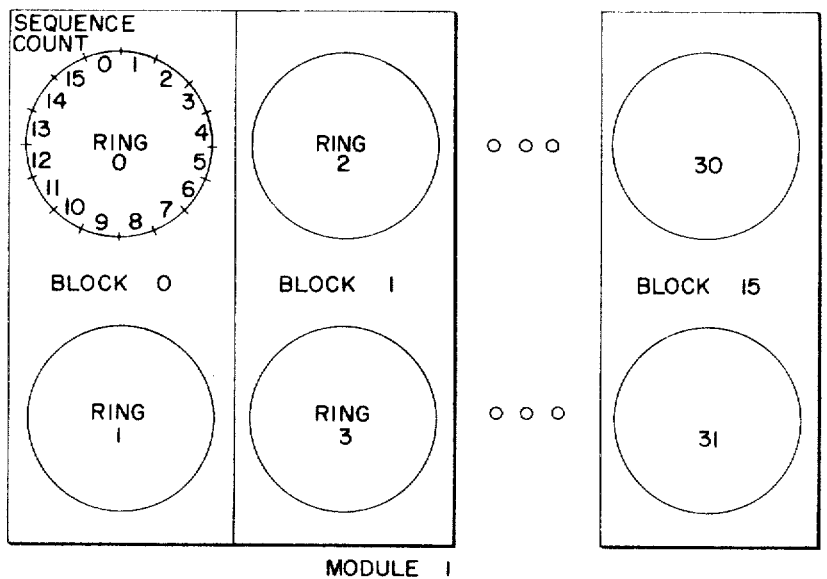
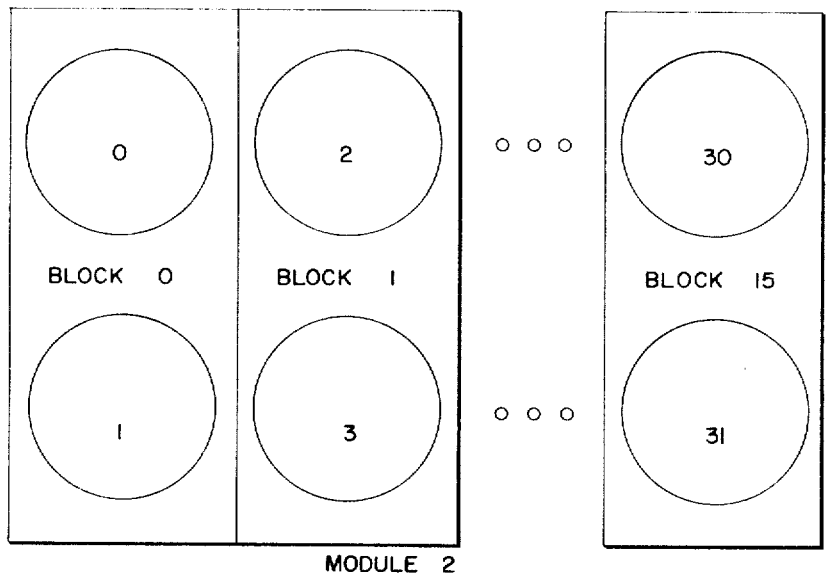
FIG 26

C REGISTER CONNECTIONS

| SET INPUTS OCT ADD | DEC BIT | RESET INPUTS OCT ADD | DEC BIT | FUNCTION | BIT POSITION | OUTPUTS OCT ADD | DEC BIT |
|---|---|---|---|---|---|---|---|
| 14-04A | | 16-04A | | DECIMAL ADD | C-01 | | |
| 14-03A | | 16-03A | | MEMORY CONTROL | C-02 | FW, 14-04 | |
| 14-03B | | FW | | D3 TO U | C-03 | FW | |
| 16-03B | | FW | | TTY SHIFT | C-04 | FW | |
| 14-05 | | 16-05 | | INDICATOR K | C-05 | 14-05 | |
| 14-06 | | 16-06 | | " L | C-06 | 14-06 | |
| 14-07 | | 16-07 | | " M | C-07 | 14-07 | |
| 14-08 | | 16-08 | | " N | C-08 | 14-08 | |
| 14-09 | | 16-09 | | " O | C-09 | 14-09 | |
| 14-10 | | 16-10 | | " P | C-10 | 14-10 | |
| 14-11 | | 16-11 | | " Q | C-11 | 14-11 | |
| 14-12 | | 16-12 | | " R | C-12 | 14-12 | |
| 14-13 | | 14-CLEAR | | CHARACTER LEFT INHIBIT | C-13 | 14-13, FW | |
| 14-14 | | 14-CLEAR | | CHARACTER RIGHT INHIBIT | C-14 | 14-14, FW | |
| 14-15 | | FW | | ROTATE 8 LEFT | C-15 | FW | |
| 14-16 | | FW | | 1 LEFT | C-16 | FW | |
| 16-13 | | FW | | 4 LEFT | C-17 | FW | |
| 16-16A,C | | FW | | D3 TO V | C-18 | FW | |
| 14-04B | | FW | | T TO D1, D2, R2 | C-19 | FW | |
| FW | | 16-15 | | TIME | C-20 | 14-17 | |
| 02-CLEAR | | FW | | PARITY | C-21 | 14-02, 6-17 | |
| FW | | 16-14 | | OVERFLOW | C-22 | 14-03 | |
| 14-03C | | 16-03C | | TTY COMMUTATION | C-23 | 14-01, FW | |
| 14-02 | | 16-02 | | AC BUS RECEIVE | C-24 | 14-15 | |
| 14-01 | | 16-01 | | AC BUS XMIT | C-25 | 14-16 | |
| 16-04B | | FW | | TSSU LOAD CONT. | C-26 | FW | |
| 14-04C | | 16-04C | | SPARE | C-27 | | |

FIG 27

| | | | | |
|---|---|---|---|---|
| 1A | | Z | | |
| 1B | S | | | |
| 1C | | Z | | |
| 2A | | Z | | |
| 2B | | Z | | |
| 2C | | Z | | |
| 3A | | | Zm | |
| 3B | | | Zm | |
| 3C | | | Zm | |
| 3A | | | Zm | |
| 4B | | | | Zx |
| 4C | | | | Zx |
| 5A | | | | Zx |
| 5B | | | | Zx |
| 5C | | | | Zx |

S = MEMORY ACCESS
Z = UTILITY REG
Zm = MCS EXCHANGE
Zx = EXIT ONLY

| C | B | A | NOT RESTRICTED | C | B | A | NOT RESTRICTED | CYCLE |
|---|---|---|---|---|---|---|---|---|
| 14 | 14 | 14 | 14 | 12 | 12 | 12 | 12 | ADDRESS |
| CN | CN | CN | CN | C | C | C | C | DESTINATION |
|  |  |  | CN-25 |  |  |  | C-25 | 01 |
|  |  |  | CN-24 |  |  |  | C-24 | 02 |
| CN 23 | C-04 | CN 02 |  | C-23 | C-03 | C-02 |  | 03 |
| CN 27 | C-26 | CN 01 |  | C-27 | C-19 | C-01 |  | 04 |
|  |  |  | CN 05 |  |  |  | C-05 | 05 |
|  |  |  | CN 06 |  |  |  | C-06 | 06 |
|  |  |  | CN 07 |  |  |  | C-07 | 07 |
|  |  |  | CN 08 |  |  |  | C-08 | 08 |
|  |  |  | CN 09 |  |  |  | C-09 | 09 |
|  |  |  | CN 10 |  |  |  | C-10 | 10 |
|  |  |  | CN 11 |  |  |  | C-11 | 11 |
|  |  |  | CN 12 |  |  |  | C-12 | 12 |
|  |  |  | C-17 |  |  |  | C-13* | 13 |
|  |  |  | CN 22 |  |  |  | C-14* | 14 |
|  |  |  | CN 20 |  |  |  | C-15 | 15 |
|  |  |  | C-18 |  |  |  | C-16 | 16 |

\* THE ADDRESS 12 CLEAR DECODER IS CONNECTED TO C-13, C-14

FIG 28

INVENTORS
MELVIN L. DOELZ
GEORGE F. GRONDIN
BY Moody and Phillips
ATTORNEYS

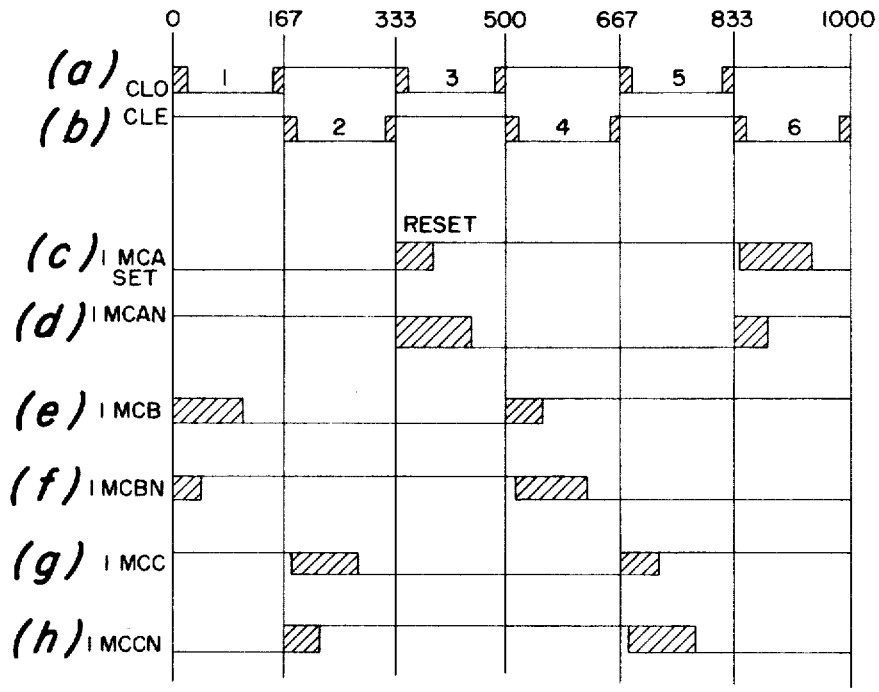
FIG 32    1 MEGACYCLE TIMING
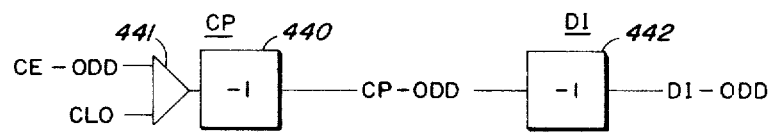
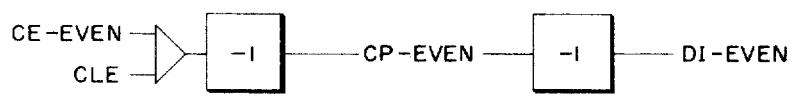
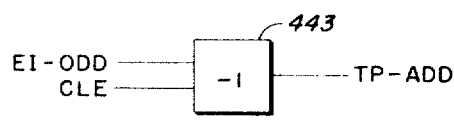
TIMING SIGNAL GENERATION
FIG 33

GENERAL TIMING SIGNALS

FIG 35  GENERAL TIMING SIGNALS

GENERAL TIMING SIGNALS

Jan. 24, 1967    M. L. DOELZ ETAL    3,300,764
DATA PROCESSOR
Filed Aug. 26, 1963    115 Sheets-Sheet 36

INVENTORS
MELVIN L. DOELZ
GEORGE F. GRONDIN
BY
Moody and Phillion
ATTORNEYS

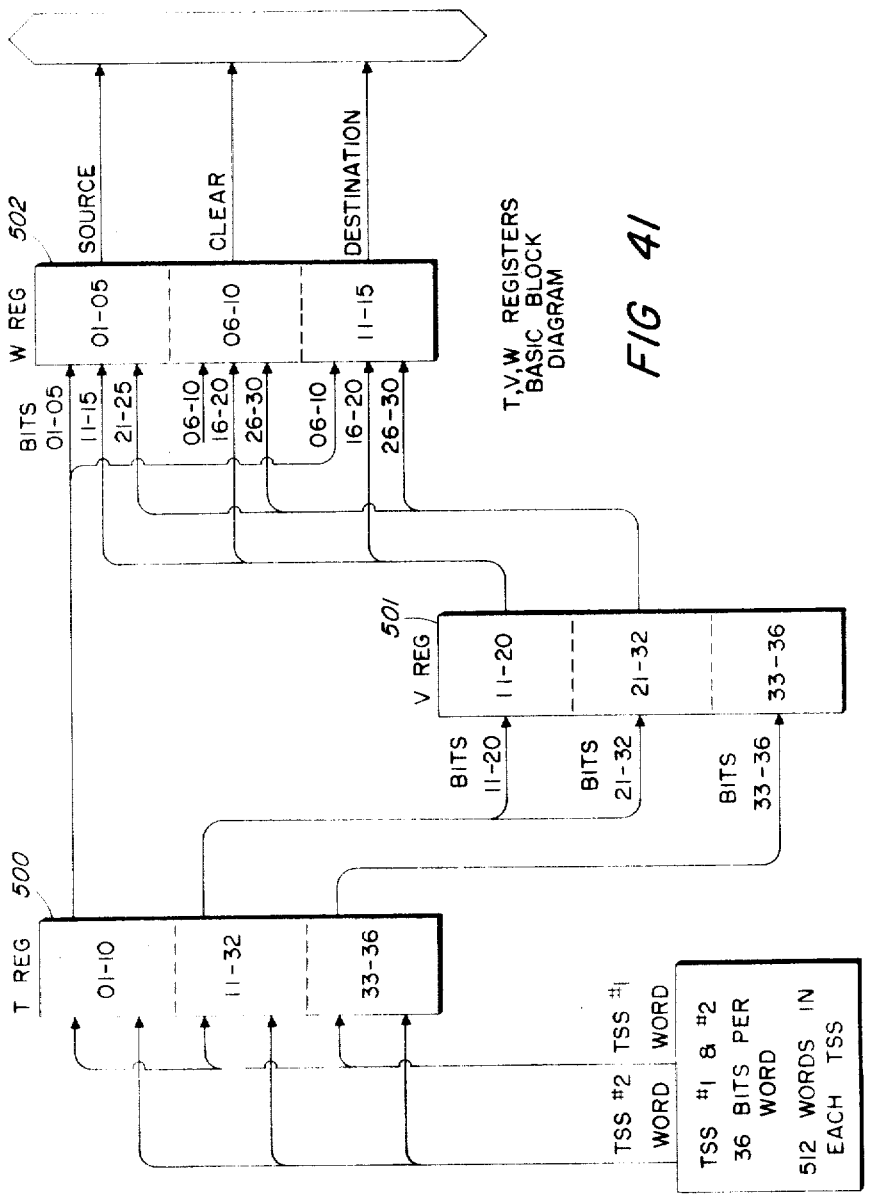

| PERMISSIBLE PROGRAM CYCLE | MATRIX ADDRESS | SOURCE REGISTER | TRANSFER LINK BIT POSITION ||||||||||||||||  |
|---|---|---|---|---|---|---|---|---|---|---|---|---|---|---|---|---|---|---|
|  |  |  | 01 | 02 | 03 | 04 | 05 | 06 | 07 | 08 | 09 | 10 | 11 | 12 | 13 | 14 | 15 | 16 | 17 |
| A OR B | 00 | V | 31 | 32 | 33 | 34 | 35 | 36 | 21 | 22 | 23 | 24 | 25 | 26 | 27 | 28 | 29 | 30 | ZERO |
| A, B, OR C | 02 | VL |  |  |  |  |  |  |  |  | 33 | 34 | 35 | 36 |  |  |  |  | α |
| A, B, OR C | 04 | VR |  |  |  |  |  |  |  |  |  |  |  |  | 33 | 34 | 35 | 36 | β |

V REGISTER TRANSFER LINK CONNECTION

FIG 42

| SOURCE REGISTER & TIMING CONTROL ||| DESTINATION ||
|---|---|---|---|---|
| T AND DI-1 | T AND DI-2 | D3 | V REGISTER BIT POSITION | ASSIGNED FUNCTION |
| T-11 |  |  | V-11 |  |
| T-12 |  |  | V-12 |  |
| T-13 |  |  | V-13 |  |
| T-14 |  |  | V-14 |  |
| T-15 |  |  | V-15 | B CYCLE |
| T-16 |  |  | V-16 | TRANSFER |
| T-17 |  |  | V-17 | COMMAND |
| T-18 |  |  | V-18 |  |
| T-19 |  |  | V-19 |  |
| T-20 |  |  | V-20 |  |
| T-21 |  | D3-01 | V-21 |  |
| T-22 |  | D3-02 | V-22 |  |
| T-23 |  | D3-03 | V-23 |  |
| T-24 |  | D3-04 | V-24 |  |
| T-25 |  | D3-05 | V-25 | C CYCLE |
| T-26 |  | D3-06 | V-26 | TRANSFER |
| T-27 |  | D3-07 | V-27 | COMMAND |
| T-28 |  | D3-08 | V-28 |  |
| T-29 |  | D3-09 | V-29 |  |
| T-30 |  | D3-10 | V-30 |  |
| T-31 |  |  | V-31 CLEAR CONTROL A CYCLE ||
| T-32 |  |  | V-32 CLEAR CONTROL B CYCLE ||
|  | T-33 |  | V-33 |  |
|  | T-34 |  | V-34 |  |
|  | T-35 |  | V-35 | CONSTANT |
|  | T-36 |  | V-36 |  |

FIG 43

V REGISTER INPUT DATA

T,V,W INPUT CONNECTIONS

| SOURCE | NO. OF LINES | DESTINATION |
|---|---|---|
| TSS 1 | 36 | T REGISTER (SET) |
| TSS 2 | 36 | T REGISTER (SET) |
| MANUAL SWITCHES | 36 | T REGISTER (SET) |
| MANUAL SWITCHES | 36 | T REGISTER (RESET) |
| SWITCH TO T | 1 | T REGISTER INVERTERS |
| C REGISTER | 3 | T REGISTER (CLEAR) |
| G CLR SWITCH | 1 | T REGISTER (CLEAR) |
| 3 MC OSC | 1 | T REGISTER (CLEAR) |
| D3 REGISTER | 10 | V REGISTER (SET) |
| D3 REGISTER | 10 | V REGISTER (RESET) |
| C REGISTER | 1 | V REGISTER INVERTERS |
| 3 MC OSC | 1 | V REGISTER INVERTERS |
| MAIN TIMING | 1 | V REGISTER INVERTERS |
| 3 MC OSC | 2 | TVW TIMING CIRCUITS |
| MAIN TIMING | 2 | TVW TIMING CIRCUITS |

*FIG 44*

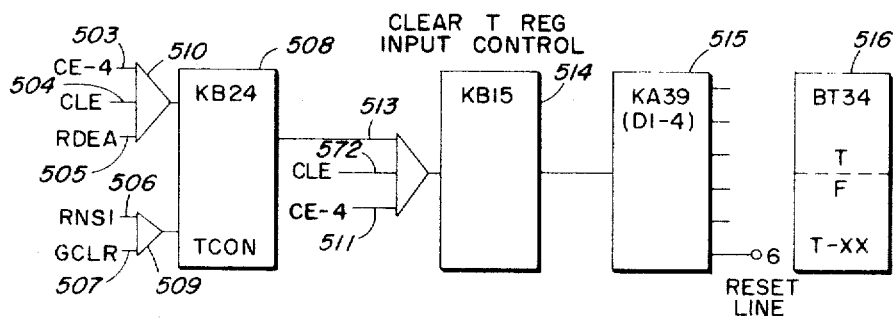

*FIG 45*

V REGISTER STAGE
INPUT CONFIGURATION

T AND V REGISTERS BIT ASSIGNMENT

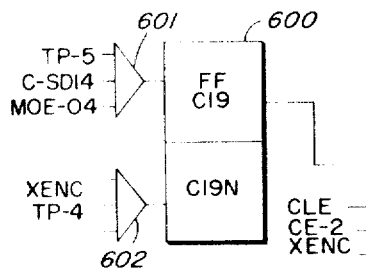
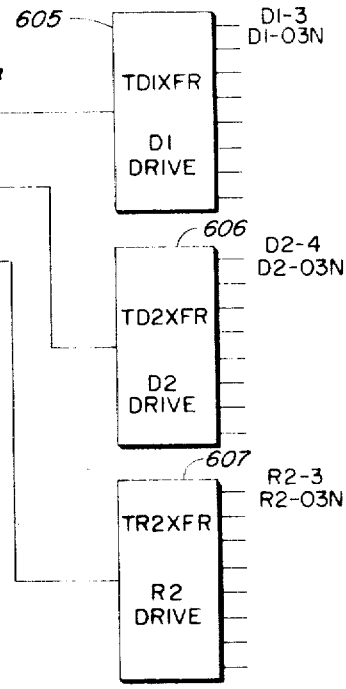
FIG 50
T-D1, D2, R2, TRANSFER
IMPLEMENTATION
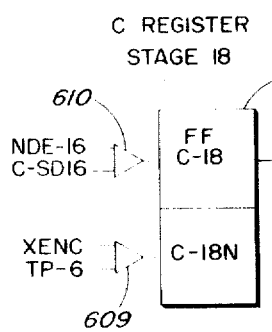
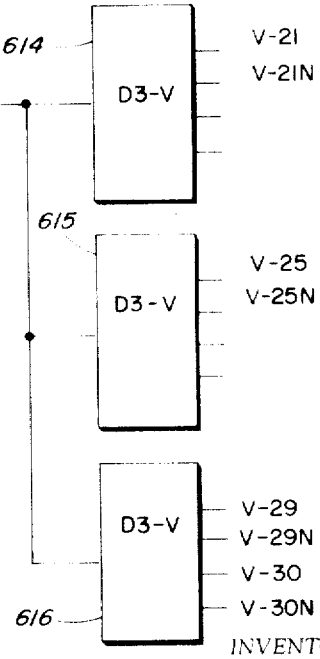
D3-V TRANSFER IMPLEMENTATION
FIG 51
INVENTORS
MELVIN L. DOELZ
GEORGE F. GRONDIN
BY Moody and Phillips
ATTORNEYS

U REGISTERS STAGE 2 IMPLEMENTATION

Jan. 24, 1967  M. L. DOELZ ET AL  3,300,764
DATA PROCESSOR
Filed Aug. 26, 1963  115 Sheets-Sheet 51

U REGISTERS, STAGES 3-6 CONFIGURATION

INVENTORS
MELVIN L. DOELZ
GEORGE F. GRONDIN
BY
*Moody and Phillips*
ATTORNEYS

FIG 58 — U REGISTERS, STAGES 7-10 CONFIGURATION

MNEMONICS DEFINITIONS

| | | |
|---|---|---|
| BENX | — | BIAX ENABLE, X=1,2 |
| 2BENX | — | BIAX ENABLE AT TP-2 TIME |
| B-XX | — | TSS LOADER ADDRESS XX, XX=1-9 |
| CA-01 | — | CARRY BIT-01 |
| CA-01N | — | NOT CARRY BIT 1 |
| C-XX | — | C REGISTER STAGE, XX=1-27 |
| CDXXX | — | CLEAR DECODER, XXX=DESTINATION ADDRESS |
| CLE | — | CLOCK PULSE, EVEN |
| CLO | — | CLOCK PULSE, ODD |
| CLODI | — | CLO, DELAY INVERTED |
| CLR-U | — | CLEAR CONTROL, U REGISTERS |
| CP-X | — | CLOCK PULSES, X=1-6 |
| C-SDXX | — | "C" REGISTER, SET DECODER, ADDRESS XX |
| D3-XX | — | D3 REGISTER STAGES, XX=0-16 |
| D3-U | — | TRANSFER D3-U |
| DU1-2N | — | NOT D3 TO U1 BIT-02 |
| DU1-2 | — | D3 TO U1 BIT-2 |
| DU2-2N | — | NOT D3 TO U2, BIT-02 |
| DU2-2 | — | D3 TO U2 BIT-02 |
| EICDXX | — | REGISTER E1 CLEAR DECODER ADDRESS XX |
| E1-N | — | CLOCK ENABLE PULSES, INVERTED |
| ERDET | — | ERROR DETECTOR |
| FAZDET | — | PHASE DETECTOR |
| FAZER | — | PHASE ERROR |
| GCLR | — | GENERAL CLEAR-FROM GCLR SWITCH |
| GCLRN | — | NOT GENERAL CLEAR |
| GI-02 | — | G REGISTER INPUT BIT-02 |
| GO-02 | — | G REGISTER OUTPUT BIT-02 |
| ICLE | — | INVERTED CLOCK PULSE, EVEN |
| ICLO | — | INVERTED CLOCK PULSE, ODD |
| 5KOSCN | — | 5 KC OSCILLATOR, NOT (INVERTED) |
| INLKUP | — | INITIAL LOCKUP |
| ITST | — | INDICATOR TEST-S,T,U |
| LDX | — | LOADER TO UX TRANSFER, X=1,2 |
| MIX-XX | — | MATRIX INPUT REGISTER X, BIT XX |
| MMAEF | — | MAIN MEMORY ADDRESS ENABLE FAN-OUT |
| MMAEN | — | MAIN MEMORY ADDRESS ENABLE NOT |
| MMIN | — | NOT MAIN MEMORY INHIBIT |
| MMREAD | — | MAIN MEMORY READ |
| MMRI | — | MAIN MEMORY READ INHIBIT |
| MMRIN | — | MAIN MEMORY READ INHIBIT NOT |
| MMRIC | — | MAIN MEMORY READ INHIBIT CONTROL |
| MMZ | — | MAIN MEMORY TO Z REGISTER |
| MOX-XX | — | MATRIX OUTPUT, REGISTER X, BIT XX |
| M-XX | — | SAME AS MOX-XX |
| ----N | — | NOT, i.e., INVERTED STATE OF LOGIC |
| NREWD3 | — | NOT RUN, ENABLE W TO D3 TRANSFER |
| (P)₁ | — | TWISTED PAIR FROM PERIPHERAL EQUIPMENT |
| PCHKE | — | PARITY CHECK ENABLE |
| PCHKEN | — | PARITY CHECK ENABLE NOT |
| PCHKP | — | PARITY CHECK PULSE |
| RCLR | — | ROTATE CLEAR |
| RCLRN | — | NOT ROTATE CLEAR |
| RDEA | — | READ ENABLE |
| 2RDEA | — | READ ENABLE AT TP-2 TIME |
| RDEAN | — | READ ENABLE NOT |
| RFBUF | — | R-F BUFFER |

FIG 60

MNEMONICS DEFINITIONS

| | | |
|---|---|---|
| RFO-01 | — | R-F OUTPUT BIT-01 |
| RFO-02 | — | R-F OUTPUT BIT-02 |
| RFOSC | — | R-F OSCILLATOR |
| R1IDO3 | — | R1 SOURCE DECODER OCTAL ADDRESS 3 |
| R2IDO | — | R2 SOURCE DECODER OCTAL ADDRESS 11 |
| RNSI | — | RUN SWITCH |
| RVOLT | — | REFERENCE VOLTAGE |
| RWD3N | — | TRANSFER W TO D3 |
| SCLE | — | RAW (SINE WAVE) CLOCK PULSE, EVEN |
| SCLO | — | RAW (SINE WAVE) CLOCK PULSE, ODD |
| SD-OOX | — | FIRST STAGE SET DECODER O & L SIGNIFICANT |
| SD-OXO | — | FIRST STAGE SET DECODER O M & L SIGNIFICANT |
| STCPN | — | NOT STOP 200 KC PULSE |
| SYCD | — | SYNC CHANGE DISPLAY |
| SYCLP | — | SYNC CHANGE LAMP |
| SYDRF | — | SYNC DISPLAY RESET FAN-OUT |
| SYDR | — | SYNC DISPLAY RESET |
| SYFD | — | SYNC FAILURE DISPLAY |
| SYFLP | — | SYNC FAILURE LAMP |
| ISYC1 | — | IMC MASTER SYNC INVERTED |
| ISYNCD | — | IMC MASTER SYNC DELAYED |
| TCON | — | T CONTROL |
| TDXFRN | — | NOT T TO D TRANSFER |
| TD1XFR | — | T TO D1 TRANSFER |
| TD2XFR | — | T TO D2 TRANSFER |
| TP4R | — | TIMING PULSE-4 AND RDEA |
| TP5R | — | TIMING PULSE-5 AND RDEA |
| TP-X | — | TIMING PULSE X, X=1-6 |
| TTYR | — | TELETYPE ROTATE |
| TTYRN | — | TELETYPE ROTATE NOT |
| UAACN | — | NOT U ADDRESS ON A CYCLE |
| UCDXX | — | U REGISTER CLEAR DECODER ELEMENT |
| UCLR | — | U REGISTER CLEAR |
| UI-GCN | — | NOT GENERAL CLEAR TO UI |
| 5US (A,B,OR C) | — | $5\mu$ SECOND PULSE, CYCLE A, B, OR C |
| 5US (A,B,OR C)N | — | $5\mu$ SECOND PULSE NOT, CYCLE A, B, OR C |
| USD-XX | — | U REGISTER SET DECODER ELEMENT |
| UX-XX | — | U REGISTER X STAGE, X=1 OR 2, XX=1-10 |
| UX-STX | — | U REGISTER X STOP LOGIC, $X_1$=1,2 |
| VARIND | — | VARIABLE INDUCTANCE |
| XENC | — | TRANSFER LINK ENABLE CLEAR |
| XENS | — | TRANSFER LINK ENABLE SET |
| XENSN | — | NOT TRANSFER LINK ENABLE SET |
| XFR | — | TRANFER |
| XINC | — | TRANSFER LINK INHIBIT CLEAR |
| YLX000 | — | LINE DRIVER, X-AXIS LINE SELECTOR S REGISTER 11N-10N |
| YLX001 | — | LINE DRIVER, X-AXIS LINE SELECTOR S REGISTER 11N-10N |
| YLY000 | — | LINE DRIVER, Y-AXIS LINE SELECTOR S REGISTER 5N-4N |
| YLY001 | — | LINE DRIVER, Y-AXIS LINE SELECTOR S REGISTER 4N-5 |
| ZCLR | — | Z CLEAR |
| ZCLRN | — | NOT Z CLEAR |
| ZCON | — | Z REGISTER SET CONTROL |
| ZCONTN | — | NOT Z REGISTER CONTROL |

FIG 60a

CIRCUIT MNEMONICS DEFINITIONS

| | | |
|---|---|---|
| BA-18 | — | 3 MC BUFFER AMPLIFIER |
| BO-24 | — | 70 MC BUFFER DRIVER |
| BT-34 | — | SPECIAL FLIP FLOP CIRCUIT |
| CD-15 | — | 3 MC CLOCK DRIVER |
| CP-12(A) | — | 3 MC CLOCK OSCILLATOR |
| DA-22 | — | DIFFERENTIAL AMPLIFIER |
| EI-50 | — | ERROR DETECTION CIRCUIT |
| FD-32 | — | PHASE DETECTOR |
| KA-18, 28, 38, 39, 48, 57, 75 | — | INVERTER CIRCUITS |
| KB 15, 24, 42, 43 | — | INVERTER CIRCUITS |
| KZ-48 | — | VOLTAGE CONVERTER |
| LD-33 | — | LINE DRIVER |
| LO-12 | — | LOCK-ON GENERATOR |
| LT-23 | — | LINE TERMINATOR |
| OG-02 | — | 70 MC OSCILLATOR |
| OK-03 | — | 5 KC OSCILLATOR |
| RF-12 | — | RELAY FILTER |
| RI-10 | — | REGISTER INDICATOR |
| RS-11, 15, 22, 24, 33 | — | FLIP FLOP CIRCUITS |
| SB-11 | — | PUSH BUTTON SWITCH |
| SD-14 | — | SIGNAL DRIVER |
| SI-34 | — | SWITCH INDICATOR (LAMP DRIVER, INDICATOR LAMP & TOGGLE SWITCH) |
| ST-33 | — | SIGNAL TERMINATOR |
| TA-04 | — | RESISTER BOARD |
| TD-21 | — | SIGNALLING DETECTOR |
| TG-52 | — | SIGNALLING RF GATE |
| TI-22 | — | SIGNALLING GATE DRIVER |
| VL-12 | — | VARIABLE INDUCTOR |

FIG 60b

U STOP LOGIC

INVENTORS
MELVIN L. DOELZ
GEORGE F. GRONDIN

ATTORNEYS

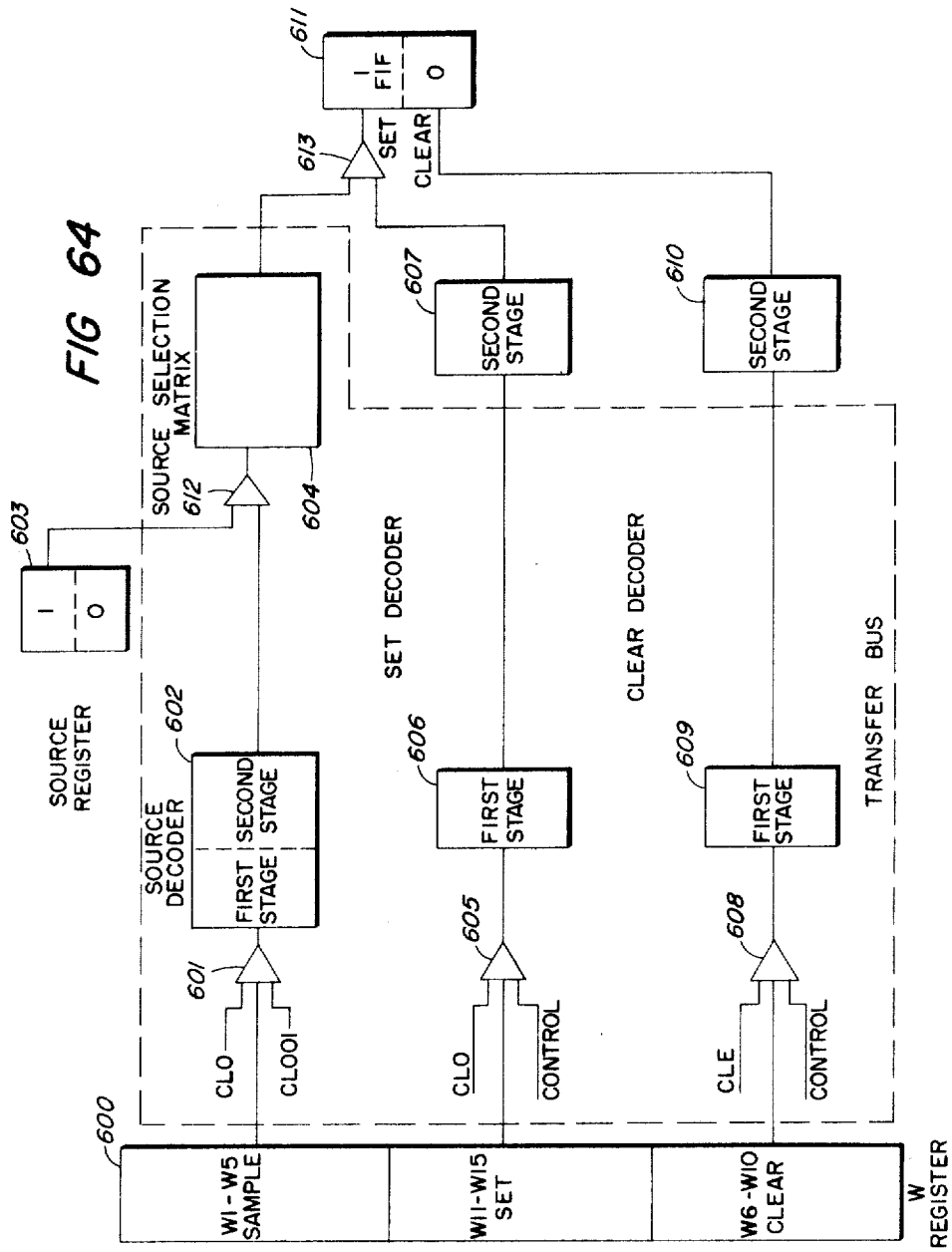

FIG 65

C-8401 TRANSFER LINK CONNECTIONS
SOURCE

| GATING SIGNAL | ADDRESS | REGISTER | 01 | 02 | 03 | 04 | 05 | 06 | 07 | 08 | 09 | 10 | 11 | 12 | 13 | 14 | 15 | 16 | 17 |
|---|---|---|---|---|---|---|---|---|---|---|---|---|---|---|---|---|---|---|---|
| | 00 | V | 31 | 32 | 33 | 34 | 35 | 36 | 21 | 22 | 23 | 24 | 25 | 26 | 27 | 28 | 29 | 30 | |
| | 01 | RIN | | | | | | | | | | | | | | | | | δ |
| | 02 | V | | | | | | | | | 33 | 34 | 35 | 36 | | | | | α |
| | 03 | RI | | | | | | | | | | | | | | | | | γ |
| | 04 | V | | | | | | | | | | | | | 33 | 34 | 35 | 36 | β |
| | 05 | DI | | | | | | | | | | | | | | | | | 01 |
| | 06 | D2N | | | | | | | | | | | | | | | | | C-21 |
| | 07 | D2 | | | | | | | | | | | | | | | | | 01 |
| | 08 | Z | | | | | | | | | | | | | | | | | 01 |
| | 09 | R2 | | | | | | | | | | | | | | | | | 01 |
| SN16 | 10 | Z | | | | | | | | | 01 | 02 | 03 | 04 | 05 | 06 | 07 | 08 | 01 |
| S-16 | 10 | Z | | | | | | | | | 09 | 10 | 11 | 12 | 13 | 14 | 15 | 16 | 09 |
| | 11 | D3 | | | | | | | | | | | | | | | | | 01 |
| | 12 | C | 23 | 21 | 22 | 02 | 05 | 06 | 07 | 08 | 09 | 10 | 11 | 12 | 13 | 14 | 24 | 25 | 20 |
| | 13 | D4 | | | | | | | | | | | | | | | | | 01 |
| | 14 | D5 | | | | | | | | | | | | | | | | | RI-01 |
| | 15 | P4 | | | | | | | | | | | | | | | | | RI-07 |
| C-23 | 16 | P5A | | | | | | | | | | | | | | | | | RI-16 |
| CN23 | 16 | P5B | | | | | | | | | | | | | | | | | RI-16 |
| | 17 | P2 | | | | | | | | | | | | | | | | | RI-11 |
| C-23 | 18 | P6A | | | | | | | | | | | | | | | | | RI-10 |
| CN23 | 18 | P6B | | | | | | | | | | | | | | | | | RI-10 |
| | 19 | PO | | | | | | | | | | | | | | | | | RI-04 |
| C-23 | 20 | P7A | | | | | | | | | | | | | | | | | RI-15 |
| CN23 | 20 | P7B | | | | | | | | | | | | | | | | | RI-15 |
| | 21 | P3 | | | | | | | | | | | | | | | | | RI-05 |
| C-23 | 22 | P8A | | | | | | | | | | | | | | | | | RI-14 |
| CN23 | 22 | P8B | | | | | | | | | | | | | | | | | RI-14 |
| | 23 | E2 | | | | | | | | | | | | | | | | | RI-03 |
| C-23 | 24 | P9A | | | | | | | | | | | | | | | | | RI-13 |
| CN23 | 24 | P9B | | | | | | | | | | | | | | | | | RI-13 |
| C-24 | 25 | G | | | | | | | | | | | | | | | | | RI-02 |
| CN24 | 25 | E1 | | | | | | | | | | | | | | | | | RI-02 |
| C-23 | 26 | P10A | | | | | | | | | | | | | | | | | RI-12 |
| CN23 | 26 | P10B | | | | | | | | | | | | | | | | | RI-12 |
| | 27 | PI | | | | | | | | | | | | | | | | | RI-06 |
| C-23 | 28 | P11A | | | | | | | | | | | | | | | | | RI-09 |
| CN23 | 28 | P11B | | | | | | | | | | | | | | | | | RI-09 |
| | 29 | AI | | | | | | | | | | | | | | | | | 01 |
| C-23 | 30 | P12A | | | | | | | | | | | | | | | | | RI-08 |
| CN23 | 30 | P12B | | | | | | | | | | | | | | | | | RI-08 |
| | 31 | | 1 | | | | | | | | | | | | | | | | L-1 |

CROSS HATCHED REGISTERS HAVE NORMAL CONNECTION (01-16 OF REGISTER TO 01-16 OF TRANSFER LINK.)

$\alpha = RI-11 \cdot RI-12$    $\beta = RI-13 \cdot \overline{RI-14} \cdot RI-15 \cdot \overline{RI-16}$
$\delta = RI-11 \cdot \overline{RI-12}$    $\gamma = RI-13 \cdot \overline{RI-14} \cdot \overline{RI-15}$ L-1 IS THE ALL ZEROS CHECK ON A-1
BIT 01 IS ALWAYS TRUE AT ADDRESS 31
N INDICATES THE FALSE SIDE OF THE REGISTER
G = AC DATA BUS

C-8401 TRANSFER LINK CONNECTIONS
DESTINATION

| GATING SIGNAL | ADDRESS | REGISTER | 01 | 02 | 03 | 04 | 05 | 06 | 07 | 08 | 09 | 10 | 11 | 12 | 13 | 14 | 15 | 16 | 17 |
|---|---|---|---|---|---|---|---|---|---|---|---|---|---|---|---|---|---|---|---|
| | | | \multicolumn{17}{c}{TRANSFER LINK BIT NUMBER} |
| A | 00 | U1 | | | | | | | 01 | 02 | 03 | 04 | 05 | 06 | 07 | 08 | 09 | 10 | |
| A | 00 | U2 | | | | | | | | 02 | 03 | 04 | 05 | 06 | 07 | 08 | 09 | 10 | |
| A,C | 00 | UC | | | | | | | | | | | | | 07 | 08 | 09 | 10 | |
| | 01 | A3 | | | | | | | | | | | | | | | | | |
| | 02 | D1 | | | | | | | | | | | | | | | | | |
| | 03 | R1 | | | | | | | | | | | | | | | | | |
| A | 04 | U1 | | | | | | | | | | | | | | | | | 02 |
| C | 04 | U1 | | | | | | | | | 01 | | | | | | | | |
| A | 04 | U2 | | | | | | | | | | | | | | | | | 02 |
| | 05 | D5 | | | | | | | | | | | | | | | | | |
| | 06 | S | 01 | 02 | 03 | 04 | 05 | 06 | 07 | 08 | 09 | 10 | 11 | 12 | 13 | 14 | 15 | | |
| C-02 | 06 | S | | | | | | | | | | | | | | | | 00 | |
| CN02 | 06 | S | | | | | | | | | | | | | | | | 16 | |
| | 07 | D2 | | | | | | | | | | | | | | | | | |
| | 08 | Z | | | | | | | | | | | | | | | | | |
| | 09 | R2 | | | | | | | | | | | | | | | | | |
| SN16 | 10 | Z | | | | | | | | | 01 | 02 | 03 | 04 | 05 | 06 | 07 | 08 | |
| S-16 | 10 | Z | | | | | | | | | 09 | 10 | 11 | 12 | 13 | 14 | 15 | 16 | |
| | 11 | D3 | | | | | | | | | | | | | | | | | |
| | 12 | C | \multicolumn{16}{c}{SEE C REGISTER TABULATION FIG 27} | |
| | 13 | D4 | | | | | | | | | | | | | | | | | |
| | 14 | C | \multicolumn{16}{c}{SEE C REGISTER TABULATION FIG 27} | |
| | 15 | P4 | | | | | | | | | | | | | | | | | |
| C-23 | 16 | P5A | | | | | | | | | | | | | | | | | |
| CN23 | 16 | P5B | | | | | | | | | | | | | | | | | |
| | 17 | P2 | | | | | | | | | | | | | | | | | |
| C-23 | 18 | P6A | | | | | | | | | | | | | | | | | |
| CN23 | 18 | P6B | | | | | | | | | | | | | | | | | |
| | 19 | P0 | | | | | | | | | | | | | | | | | |
| C-23 | 20 | P7A | | | | | | | | | | | | | | | | | |
| CN23 | 20 | P7B | | | | | | | | | | | | | | | | | |
| | 21 | P3 | | | | | | | | | | | | | | | | | |
| C-23 | 22 | P8A | | | | | | | | | | | | | | | | | |
| CN23 | 22 | P8B | | | | | | | | | | | | | | | | | |
| | 23 | E2 | | | | | | | | | | | | | | | | | |
| C-23 | 24 | P9A | | | | | | | | | | | | | | | | | |
| CN23 | 24 | P9B | | | | | | | | | | | | | | | | | |
| | 25 | E1 | | | | | | | | | | | | | | | | | |
| C-23 | 26 | P10A | | | | | | | | | | | | | | | | | |
| CN23 | 26 | P10B | | | | | | | | | | | | | | | | | |
| | 27 | P1 | | | | | | | | | | | | | | | | | |
| C-23 | 28 | P11A | | | | | | | | | | | | | | | | | |
| CN23 | 28 | P11B | | | | | | | | | | | | | | | | | |
| | 29 | A2 | | | | | | | | | | | | | | | | | |
| C-23 | 30 | P12A | | | | | | | | | | | | | | | | | |
| CN23 | 30 | P12B | | | | | | | | | | | | | | | | | |
| | 31 | R1N | | | | | | | | | | | | | | | | | |

CROSS HATCHED REGISTERS HAVE NORMAL CONNECTION (01-16 OF TRANSFER LINK 01-16 OF REGISTERS)
BIT 01 OF U1 IS NOT CLEARED ON ADDRESS 00
N INDICATES RESET SIDE OF REGISTER

FIG 66

FIG 68 — SOURCE DECODER ELEMENT AND REGISTER ADDRESS MATRIX

FIRST STAGE SOURCE DECODER

| C23 W1 W2 | W3,W4,W5 | 000 | 001 | 010 | 011 | 100 | 101 | 110 | 111 |
|---|---|---|---|---|---|---|---|---|---|
| | ELEMENT(S) | N053/107 | N053/151 N054/107 | N054/108 | N055/107 | N055/108 | N056/107 | N056/108 | N056/108 |
| 0 0 — — 1 1 | N001 | V | | VL | R1 | VR | | D2 | |
| 0 0 0 — | N002 | Z | | | | | ZH | | D5 |
| | N003 | | | | | | C | | |
| | N004 | | E1 | | | | | | |
| 0 — — — | N051 | | | | | | | | |

| W3,W4,W5 | 000 | 001 | 010 | 011 | 100 | 101 | 110 | 111 |
|---|---|---|---|---|---|---|---|---|
| ELEMENT | N057 | N058 | N101 | N102 | N103 | N104 | N105 | N106 |
| N001 | | R̄1 | | R1 | | D1 | | D2 |
| N002 | | R2 | P6A | D3 | P7A | D4 | P8A | P4 |
| N003 | P5A | P2 | P6B | P0 | P7B | P3 | P8B | E2 |
| N004 | P5B | | P10A | | P11A | | P12A | |
| 0 0 — — — 0 0 — — — | N005 | P9A | | | | | | | |
| 0 0 0 0 — | N006 | | | | | | | | |
| N007 | | | | | | | | |
| N008 | | | | | | | | |
| N051 | P9B | E1 | P10B | P1 | P11B | A1 | P12B | L |
| 0 — 0 0 — | N052 | | | | | | | | |

FIG 69

FIRST STAGE SET DECODER

| C23 | W11 W12 | ELEMENT | W13,W14,W15 000 N251 | 001 N252 | 010 N253 | 011 N254 | 100 N255 | 101 N256 | 110 N257 | 111 N258 |
|---|---|---|---|---|---|---|---|---|---|---|
| 0 | 0 0 | N201 | | A3 | | R1 | | D5 | C̄ | D2 |
|   | 0 1 | N202 | | R2 | | D3 | | D4 | P8A | P4 |
|   | 1 0 | N203 | P5A | | P6A | | P7A | | | |
| 0 | 0 0 | N204 | | P2 | | P0 | | P3 | | E2 |
|   | 0 1 | N205 | P5B | | P6B | | P7B | | P8B | |
|   | 1 0 | N206 | P9A | | P10A | | P11A | | P12A | |
| 0 | 0 1 | N207 | | E1 | | P1 | | A2 | | R1 |
|   | 1 1 | N208 | P9B | | P10B | | P11B | | P12B | |

| W13,W14 | W11,W12,W15 | ELEMENT | 00 N303 | 01 N304 | 10 N305 | 11 N306 |
|---|---|---|---|---|---|---|
| 0 0 | 0 0 | N301 | U | D1 | UM | S |
|     | 0 1 | N302 | N | ZH | C | C |

SET DECODER ELEMENT AND
REGISTER ADDRESS MATRIX

INVENTORS
MELVIN L. DOELZ
GEORGE F. GRONDIN
BY Moody and Phillips
ATTORNEYS

FIRST STAGE CLEAR DECODERS

W8, W9, W10 CODES

| C23 | W6, W7 | W8,W9,W10 ELEMENT | 000 N451 | 001 N452 | 010 N453 | 011 N454 | 100 N455 | 101 N456 | 110 N457 | 111 N458 |
|---|---|---|---|---|---|---|---|---|---|---|
| 0 | 0 0 | N401 | P5A | A3<br>R2 | P6A | R1<br>D3 | P7A | D5<br>D4 | P8A | D2<br>P4 |
| 0 | 0 1 | N402 | | | | | | | | |
| 0 | 1 0 | N403 | | P2 | P6B<br>P10A | P0 | P7B<br>P11A | P3 | P8B<br>P12A | E2 |
| 0 | 0 0 | N404 | P5B<br>P9A | | | | | | | |
| 1 | — — | N405 | | | | | | | | |
| 1 | — — | N406 | P9B | E1 | P10B | P1 | P11B | A2 | P12B | R1̄ |
| 1 | — — | N407 | | | | | | | | |
| 1 | — — | N408 | | | | | | | | |

W8, W9 CODES

| W6,W7,W10 | W8,W9 ELEMENT | 00 N503 | 01 N504 | 10 N505 | 11 N506 |
|---|---|---|---|---|---|
| 0 0 | N501 | U<br>N | D1<br>ZH | UM<br>C | S<br>C |
| 0 1 | N502 | | | | |
| 1 0 | | | | | |
| 0 1 | | | | | |

CLEAR DECODER ELEMENT AND
REGISTER ADDRESS MATRIX

FIG 70

TRANSFER LINK CONNECTIONS

| REGISTER | REGISTER BITS | TRANSFER LINK BITS | SOURCE ADDRESS (OCTAL) | DESTINATION ADDRESS (OCTAL) |
|---|---|---|---|---|
| D1 | 01-16 | 01-16 | 05 | 02 |
| D1 | 01 | 17 | 05 | — |
| D2 | 01-16 | 01-16 | 07 | 07 |
| D2 | 01 | 17 | 07 | — |
| D2N | 01-16 | 01-16 | 06 | — |
| D3 | 01-16 | 01-16 | 13 | 13 |
| D3 | 01 | 17 | 13 | — |
| D4 | 01-16 | 01-16 | 15 | 15 |
| D4 | 01 | 17 | 15 | — |
| D5 | 01-16 | 01-16 | 16 | 05 |
| C (D3 TO U) | 03 | 03(B CYCLE)- |  | 14 |
| C (CHLI) | 13 | 13 | 14 | 14 |
| C | 13N | (CLEAR) | — | 14 |
| C (CHRI) | 14 | 14 | 14 | 14 |
| C | 14N | (CLEAR) | — | 14 |
| C (D3 TO V) | 18 | 16(A,C CYCLE)- |  | 16 |
| C (T TO R, D2 & D1) | 19 | 04(B CYCLE)- |  | 14 |
| C | 21 | (CLEAR) | — | 02 |
| C | 21 | 02 | 14 | — |
| C (PARITY) | 21 | 17 | 06 | — |

*FIG 73*

Jan. 24, 1967     M. L. DOELZ ETAL     3,300,764
DATA PROCESSOR

Filed Aug. 26, 1963     115 Sheets-Sheet 69

GATES REGISTERS
D1,D2 & R2; BIT POSITIONS
(3-8) AND (9-16)

*T-D1, D2, R2 TRANSFER*

FIG 74

TYPICAL D1 BIT

TYPICAL D2 BIT

INVENTORS
MELVIN L. DOELZ
GEORGE F. GRONDIN
BY
*Moody and Phillips*
ATTORNEYS

PARITY CHECK IMPLEMENTATION

ROTATE 4 LEFT AND TTY ROTATE
FLOW DIAGRAMS

LOGIC EQUATIONS
FOR COMBINED ROTATE COMMANDS

R2 REGISTER CONTENTS AT TIME n+1

| R2 BIT POSITION | C-15 = C-16 = 1<br>R08L + R01L | C-04 = C-17 = 1<br>TTYR + R04L |
|---|---|---|
| R2-01 | R1-09 + R1-02 | R2-01n + R1-05 |
| R2-02 | R1-10 + R1-03 | R2-02n + R1-06 |
| R2-03 | R1-11 + R1-04 | R2-03n + R1-07 |
| R2-04 | R1-12 + R1-05 | R2-04n + R1-08 |
| R2-05 | R1-13 + R1-06 | R2-05n + R1-09 |
| R2-06 | R1-14 + R1-07 | R2-06n + R1-10 |
| R2-07 | R1-15 + R1-08 | R1-02 + R1-11 |
| R2-08 | R1-16 + R1-09 | R1-03 + R1-12 |
| R2-09 | R1-01 + R1-10 | R1-04 + R1-13 |
| R2-10 | R1-02 + R1-11 | R1-05 + R1-14 |
| R2-11 | R1-03 + R1-12 | R1-06 + R1-15 |
| R2-12 | R1-04 + R1-13 | R1-07 + R1-16 |
| R2-13 | R1-05 + R1-14 | R1-08 + R1-01 |
| R2-14 | R1-06 + R1-15 | R1-09 + R1-02 |
| R2-15 | R1-07 + R1-16 | R1-10 + R1-03 |
| R2-16 | R1-08 + R1-01 | R1-11 + R1-04 |

*FIG 81*

TRANSFER LINK INPUTS
BIT 17

| REGISTER OUTPUTS | SOURCE ADDRESS (OCTAL) | REGISTER OUTPUTS | SOURCE ADDRESS (OCTAL) |
|---|---|---|---|
| RI-01 | 16 | $\alpha$ | 02 |
| RI-02 | 31 | $\beta$ | 04 |
| RI-03 | 27 | $\gamma$ | 03 |
| RI-04 | 23 | $\delta$ | 01 |
| RI-05 | 25 | R2-01 | 11 |
| RI-06 | 33 | A1-01 | 35 |
| RI-07 | 17 | C-20 | 14 |
| RI-08 | 36 | C-21 | 06 |
| RI-09 | 34 | D1-01 | 05 |
| RI-10 | 22 | D2-01 | 07 |
| RI-11 | 21 | D3-01 | 13 |
| RI-12 | 32 | D4-01 | 15 |
| RI-13 | 30 | L-01 | 37 |
| RI-14 | 26 | Z-01 | 12 (S-16-0) |
| RI-15 | 24 | Z-09 | 12 (S-16-1) |
| RI-16 | 20 | Z-01 | 10 |

$\alpha$ = RI-11 · RI-12
$\beta$ = RI-13 · RI-14N · RI-15 · RI-16N
$\gamma$ = RI-13 · RI-14N · RI-15N
$\delta$ = RI-11 · RI-12N

*FIG 82*

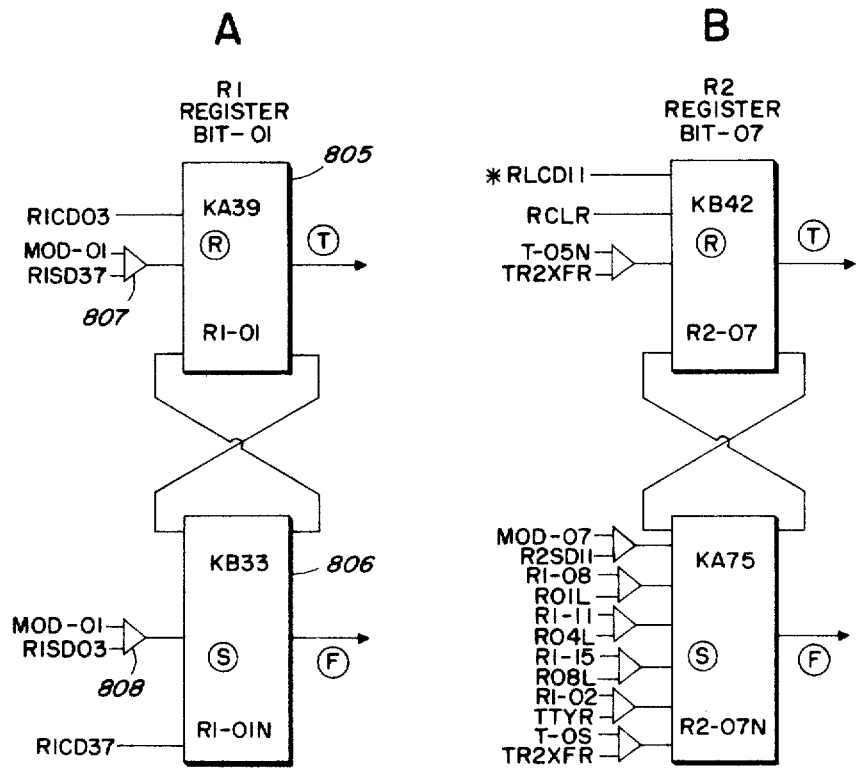
FIG 83     FIG 84
R1 AND R2 REGISTER IMPLEMENTATION
*RCLR IS INHIBITED FOR BITS R2-01
THRU R2-06 DURING TTY ROTATE
BY TTRIC; i.e. THE RESET IS RCLR TTYIC

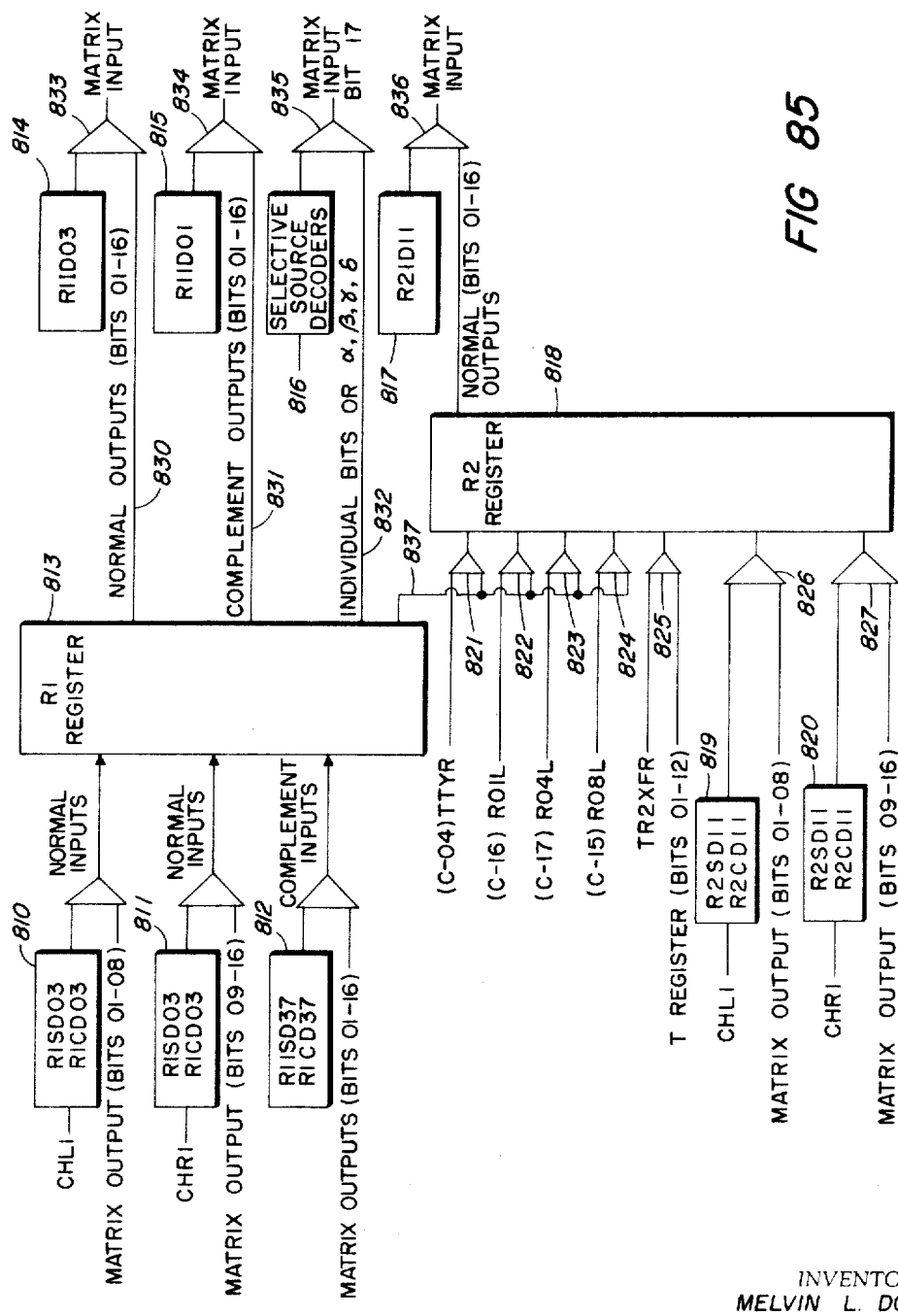

ARITHMETRIC TIMING DIAGRAM

Jan. 24, 1967     M. L. DOELZ ETAL     3,300,764
DATA PROCESSOR
Filed Aug. 26, 1963     115 Sheets-Sheet 85

ILLUSTRATION OF THE ARITHMETIC OPERATION
(SHOWN FOR 5-BIT NUMBER)

BIT NO.
12345

OPERAND (a) = 00011 (+3)

OPERAND (b) = 00101 (+5)

A1 = ACCUMULATOR REGISTER

A2 = ADDEND REGISTER

A3 = AUGEND REGISTER

| FULL ADDITION | | MODULO 2 SUM | |
|---|---|---|---|
| REGISTER CONTENTS BEFORE TRANSFER OF (A) TO A2 | A2 (NOT SIGNIFICANT) A3 (NOT SIGNIFICANT) A1 (HOLDS PREVIOUS RESULTS) | REGISTER CONTENTS BEFORE TRANSFER OF (a) TO A3 | A2 (NOT SIGNIFICANT) A3 (NOT SIGNIFICANT) A1 (HOLDS PREVIOUS RESULTS) |
| AFTER TRANSFER OF (a) TO A2 | A2 (O COIL) A3 (NOT SIGNIFICANT) A1 (NOT SIGNIFICANT) | AFTER TRANSFER OF (a) TO A3 | A2 (NOT SIGNIFICANT) A3 (O COIL) A1 (NOT SIGNIFICANT) |
| T1 TIME AFTER TRANSFER OF (b) TO A3 REGISTER | A2 (0 0011) A3 (0 0101) A1 (0 1000) | T1 TRANSFER AFTER TRANSFER OF (b) TO A2 REGISTER | A2 (0 0101) A3 (0 0011) A1 (0 0110) |
| T2 TIME AFTER TRANSFER OF (b) TO A3 REGISTER | A2 (0 0011) A3 (0 0101) 0 0110 CARRY IN A1 (0 1000+8) | | |

FIG 91

INVENTORS
MELVIN L. DOELZ
GEORGE F. GRONDIN
BY Moody and Phillips
ATTORNEYS

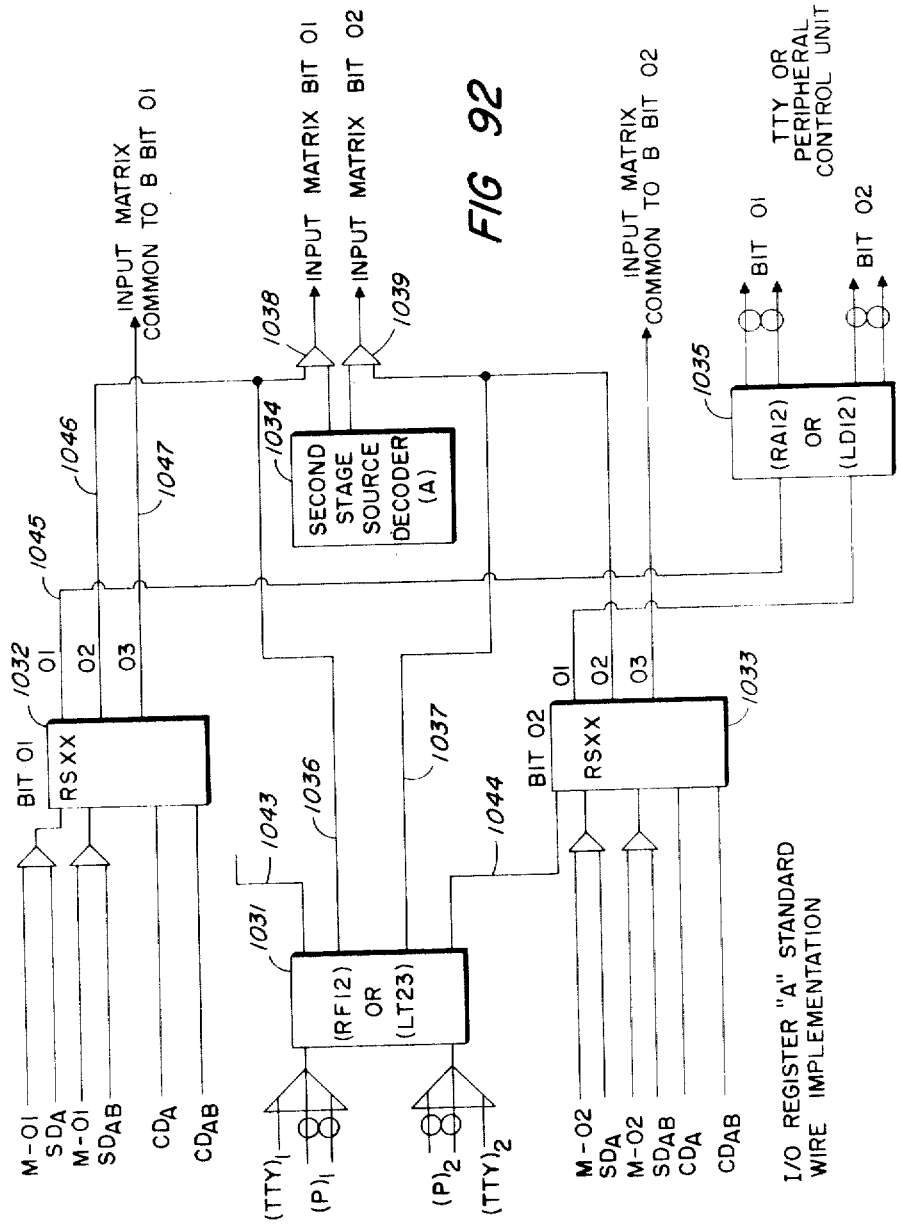

CIRCUITS USED

| OPTION NUMBER | I/O REG | ASSIGNED FUNCTION | DECODE | | INPUT | | STORAGE | | DECODE | OUTPUT | |
|---|---|---|---|---|---|---|---|---|---|---|---|
| | | | 1 | 7 | 2 | 6 | 4 | 8 | 3 | 5 | 9 |
| I | A | PERIPHERAL | 4-KA28 | | 8-LT23 | | 16-RS22 | | | 8-LD13 | |
| | B | PERIPHERAL | 4-KA28 | | 8-LT23 | | 16-RS22 | | | 8-LD13 | |
| II | A | TTY | 4-KA28 | | 8-RF12 | | 16-RS11 | | | 8-RA12 | |
| | B | TTY | 4-KA28 | | 8-RF12 | | 16-RS11 | | | 8-RA12 | |
| III | A | PERIPHERAL | 4-KA28 | | 8-LT23 | | 16-RS22 | | | 8-LD13 | |
| | B | TTY | 4-KA28 | | 8-RF12 | | 16-RS11 | | | 8-RA12 | |
| IV | A | PERIPHERAL | 4-KA28 | | 8-LT23 | | 16-RS33 | | 4-KA28 | 8-LD13 | |
| | B | NONE | | | | | | | | | |

INVENTORS
MELVIN L. DOELZ
GEORGE F. GRONDIN
BY Moody and Phillips
ATTORNEYS

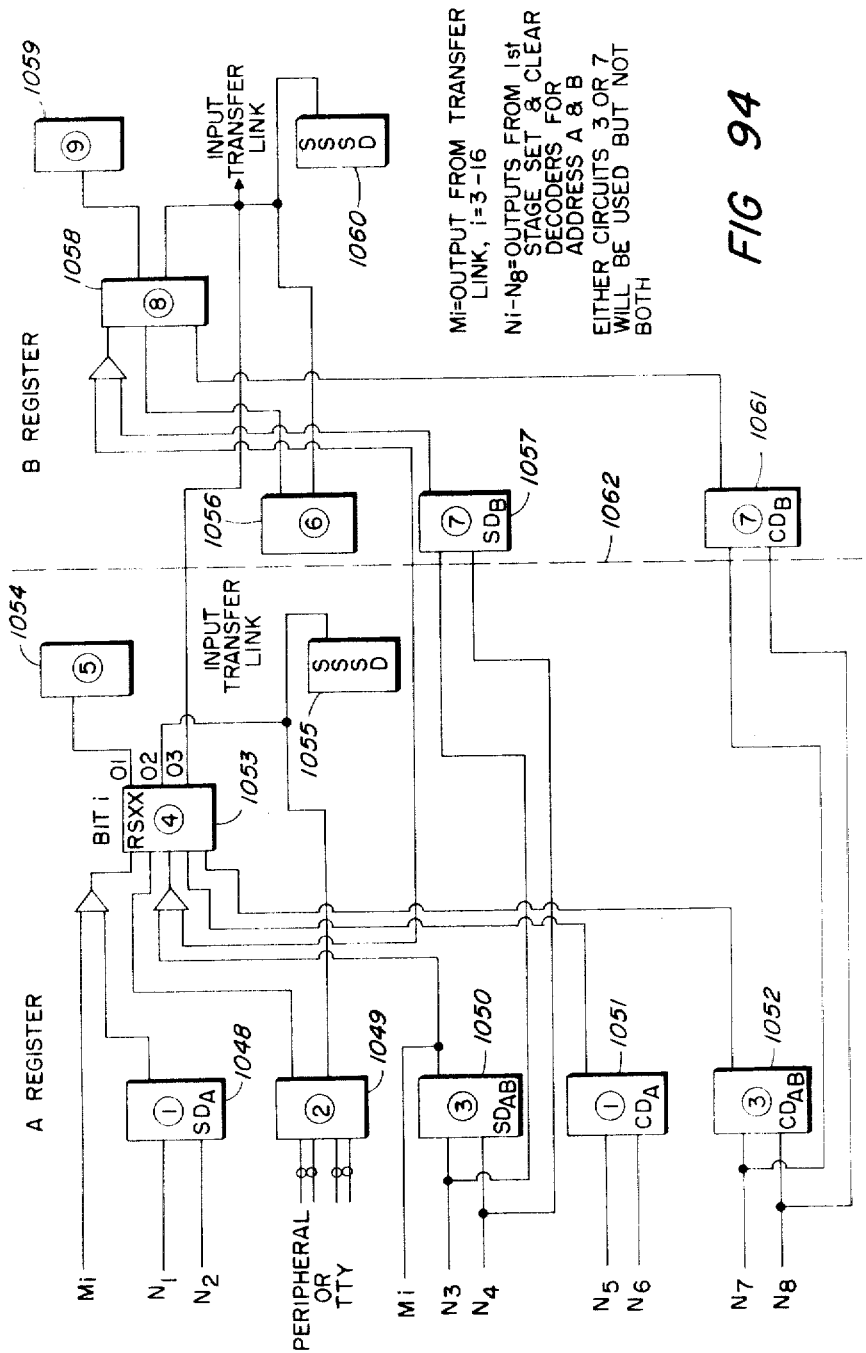

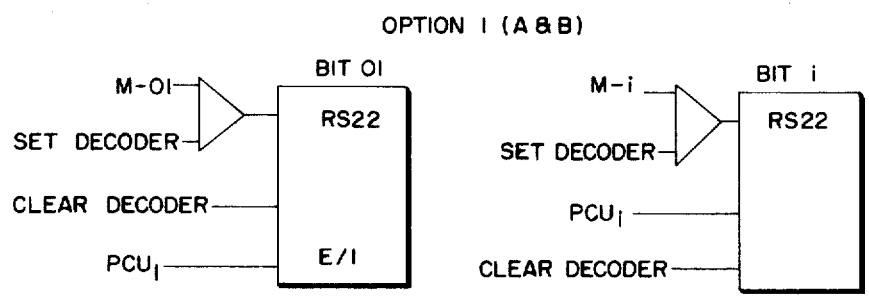
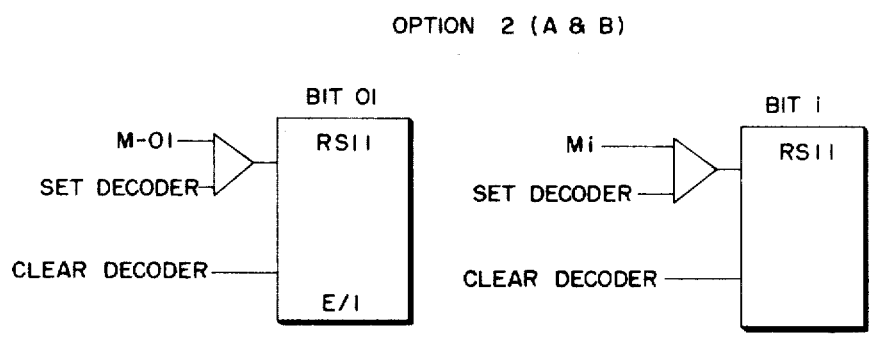
FIG 97
$i = 2 \rightarrow 16$

Jan. 24, 1967    M. L. DOELZ ETAL    3,300,764
DATA PROCESSOR
Filed Aug. 26, 1963    115 Sheets-Sheet 91
OPTION 3 (A ONLY)
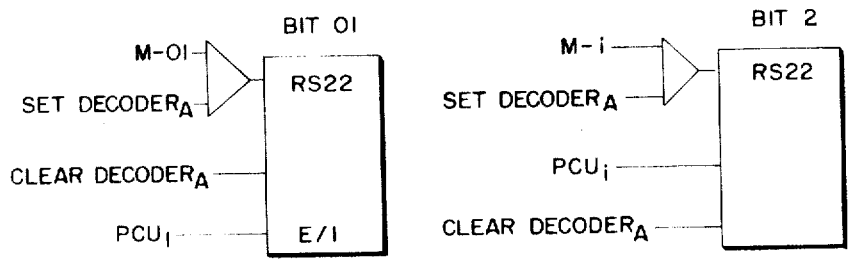
OPTION 3 (B ONLY)
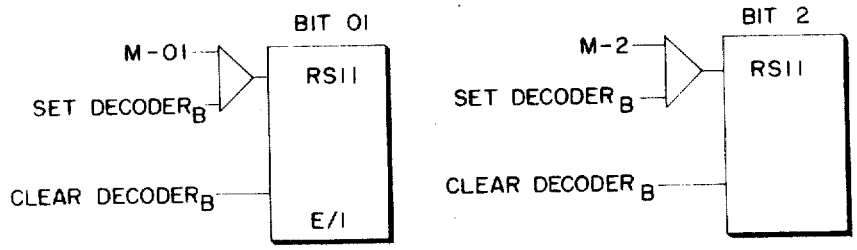
OPTION 4
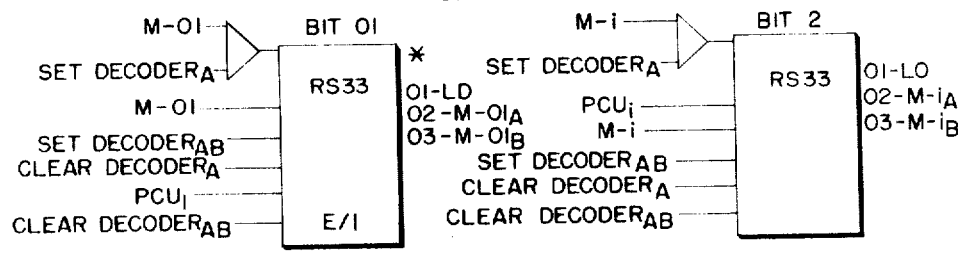
\* O1-LD = LINE DRIVER TO PERIPHERAL EQUIPMENT
O2-M-O1$_A$ = MATRIX INPUT BIT 01 OF I/O REGISTER A
O3-M-O1$_B$ = MATRIX INPUT BIT 01 OF I/O REGISTER B
FIG 98
INVENTORS
MELVIN L. DOELZ
GEORGE F. GRONDIN
BY Moody and Phillips
ATTORNEYS Jan. 24, 1967  M. L. DOELZ ETAL  3,300,764
DATA PROCESSOR Filed Aug. 26, 1963  115 Sheets-Sheet 93

INPUT IMPLEMENTATION
FOR REGISTER EI

INVENTORS
MELVIN L. DOELZ
GEORGE F. GRONDIN
BY *Moody and Phillips*
ATTORNEYS

INPUT IMPLEMENTATION FOR REGISTER E2

GENERALIZED MAIN MEMORY ACCESS DIAGRAM

Jan. 24, 1967   M. L. DOELZ ETAL   3,300,764
DATA PROCESSOR

Filed Aug. 26, 1963   115 Sheets-Sheet 96

INVENTORS
MELVIN L. DOELZ
GEORGE F. GRONDIN
BY *Moody and Phillips*
ATTORNEYS

Z REGISTER BLOCK DIAGRAM

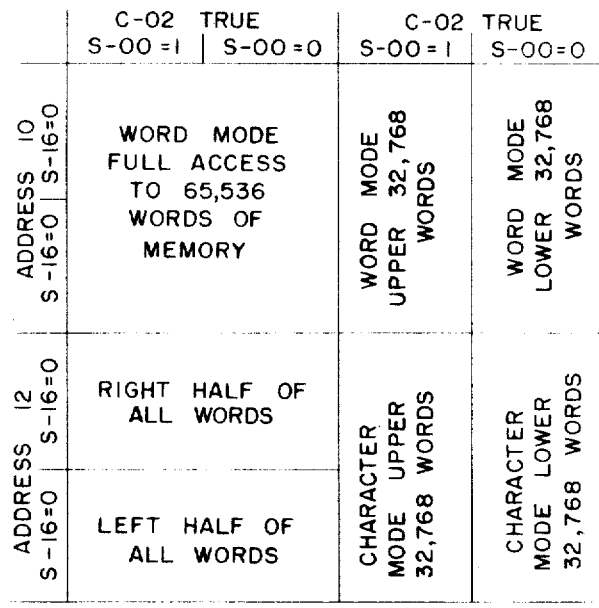
FIG 105    MODES OF OPERATION WITH MAIN MEMORY
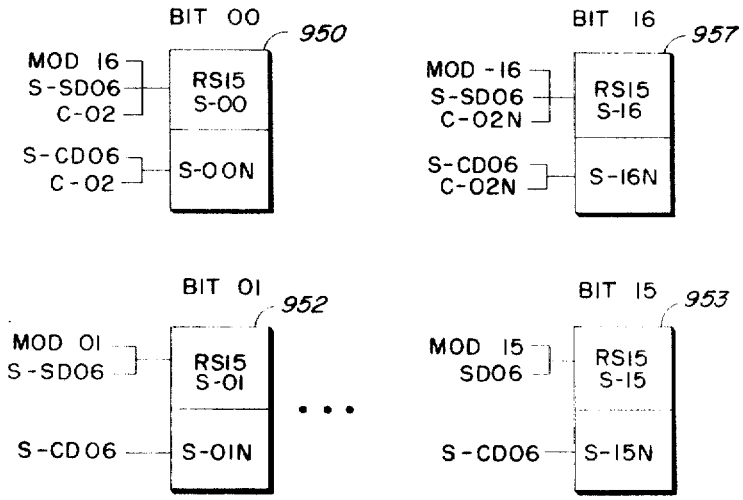
FIG 106
S REGISTER IMPLEMENTATION

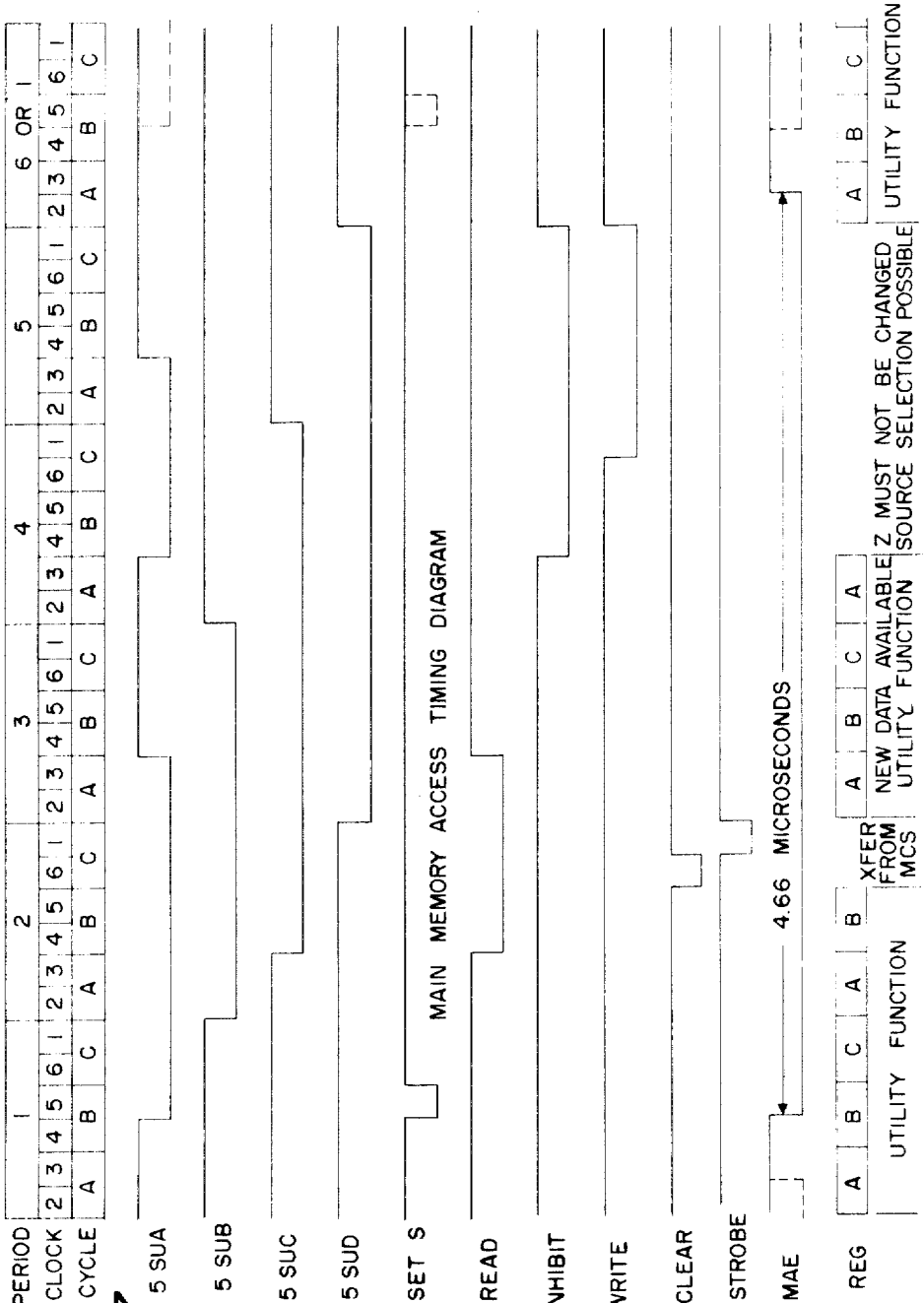

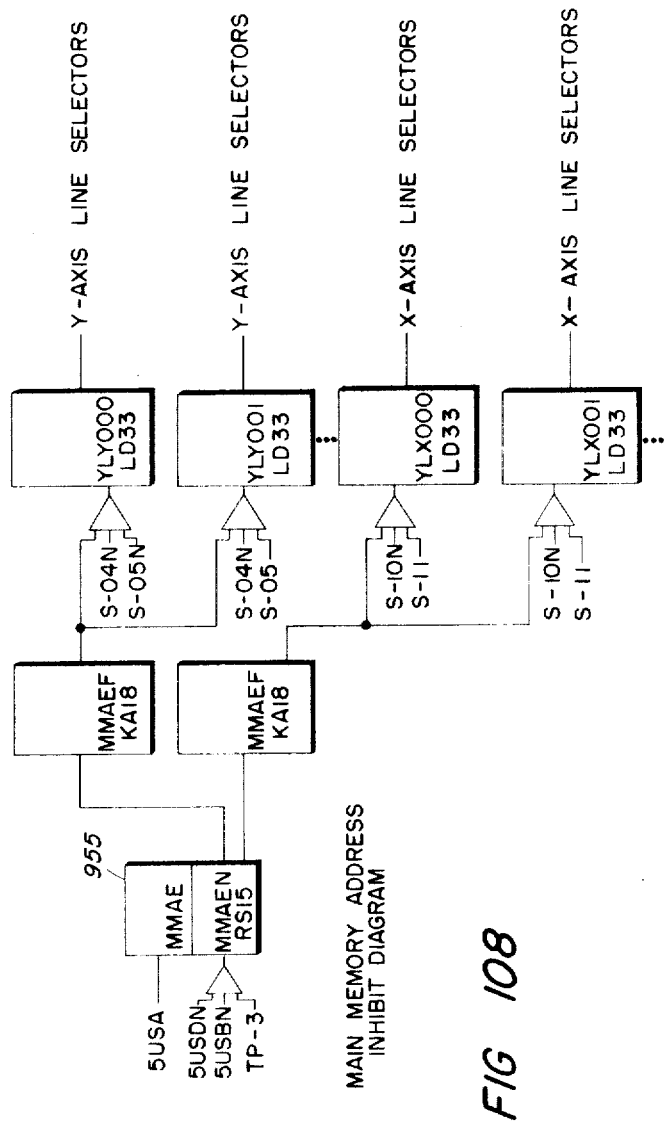

OCTAL GROUPING FOR READING MCS LOCATION

NOTE: ADDRESS READ IS TWICE
ACTUAL MCS LOCATION SINCE
BIT 16 IS NOT PART OF MCS
ADDRESS

OCTAL GROUPING FOR READING INCOMING DATA
FROM THE TRANSFER LINK

NOTE: THE 6th OCTAL DIGIT
IS DEPENDENT ON STATE OF
C-02 DURING TRANSFER TO
S REGISTER

Z REGISTER IMPLEMENTATION

C REGISTER IMPLEMENTATION

| SET INPUTS | RESET INPUTS | MNEMONIC |
|---|---|---|
| MOE-04·C-SD14·TP-3 | | C-01 |
| | (MOE-04·C-SD16·TP-3) | C-01N |
| MOE-03·C-SD14·TP-3 | | C-02 |
| | (MOE-03·C-SD16·TP-3) | C-02N |
| MOE-03·C-SD14·TP-3 | | C-03 |
| | (XENC·TP-4) | C-03N |
| MOE-03·C-SD16·TP-3 | | C-04 |
| | TTYR·ICLE | C-04N |
| MOE-05·C-SD14 | | C-05 |
| | (MOE-05·C-SD16) | C-05N |
| MOE-06·C-SD14 | | C-06 |
| | (MOE-06·C-SD16) | C-06N |
| MOE-07·C-SD14 | | C-07 |
| | (MOE-07·C-SD16) | C-07N |
| MOE-08·C-SD14 | | C-08 |
| | (MOE-08·C-SD16) | C-08N |
| MOE-09·C-SD14 | | C-09 |
| | (MOE-09·C-SD16) | C-09N |
| MOE-10·C-SD14 | | C-10 |
| | (MOE-10·C-SD16) | C-10N |
| MOE-11·C-SD14 | | C-11 |
| | (MOE-11·C-SD16) | C-11N |
| MOE-12·C-SD14 | | C-12 |
| | (MOE-12·C-SD16) | C-12N |
| MOE-13·C-SD14 | | C-13 |
| | C-CD14 | C-13N |
| MOE-14·C-SD14 | | C-14 |
| | C-CD14 | C-14N |
| MOE-15·C-SD14 | | C-15 |
| | RO8L·ICLE | C-15N |
| MOE-16·C-SD14 | | C-16 |
| | RO1L·ICLE | C-16N |
| MOE-13·C-SD16 | | C-17 |
| | RO4L·ICLE | C-17N |
| MOE-16·C-SD16 | | C-18 |
| | (XENC·TP-6) | C-18N |
| MOE-04·C-SD14·TP-5 | | C-19 |
| | (XENC·TP-4) | C-19N |
| 5KOSC·NCLOK·TP-6 | | C-20 |
| | MOE-15·C-SD16 | C-20N |
| DICDO2 | | C-21 |
| | (DIPCHK·PCHKP·ICLE) | C-21N |
| A2-01N·A3-01N·CA-01·T2 +A2-01·A3-01·ICA01N·T2 | (MOE-14·C-SD16) | C-22 C-22N |
| MOE-03·C-SD14·TP-1 | | C-23 |
| | MOE-03·C-SD16·TP-1 | C-23N |
| MOE-02·C-SD14 | | C-24 |
| | (MOE-02·C-SD16) | C-24N |
| MOE-01·C-SD14 | | C-25 |
| | (MOE-01·C-SD16) | C-25N |
| MOE-04·C-SD16·TP 5 | | C-26 |
| | CRST | C-26N |
| MOE-04·C-SD14·TP 5 | | C-27 |
| | (MOE-04·C-SD16·TP-1) | C-27N |

FIG 111

BLOCK DIAGRAM OF C-8501 COMPLEX SHOWING
THE INTERCOMPUTER DATA TRANFER LINK

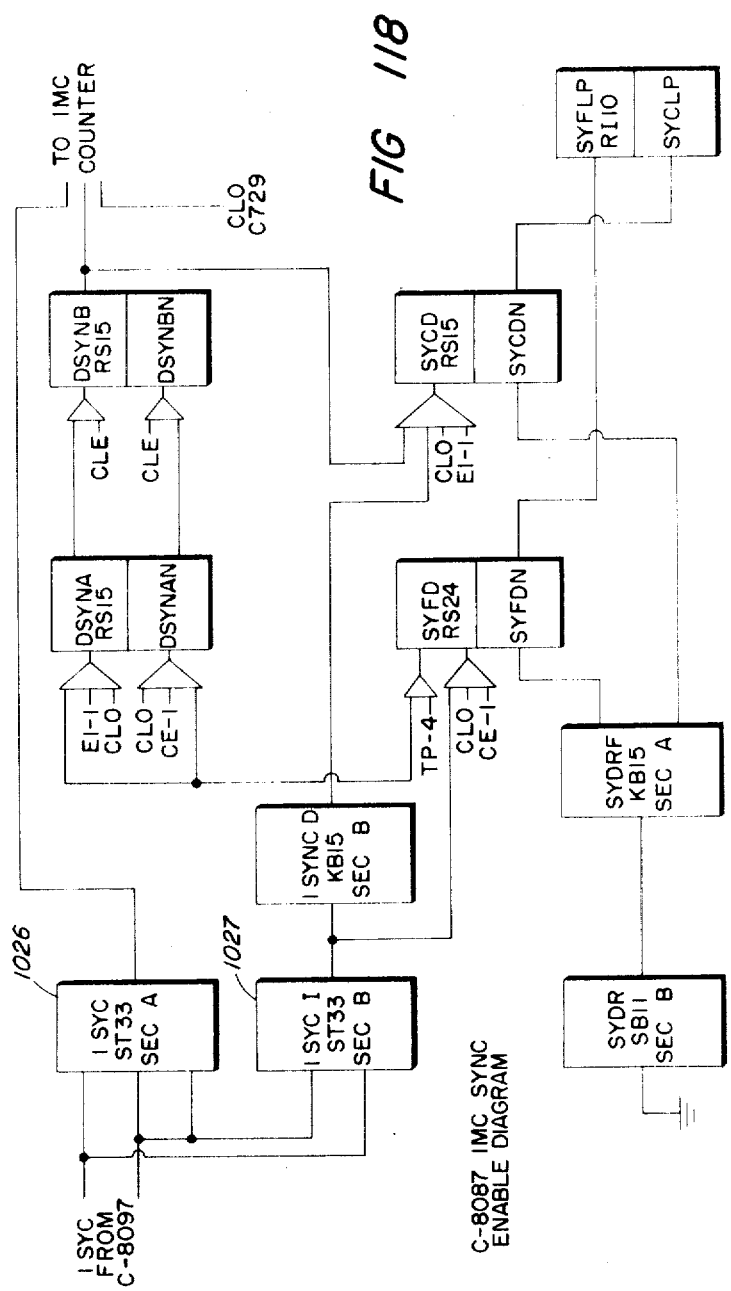

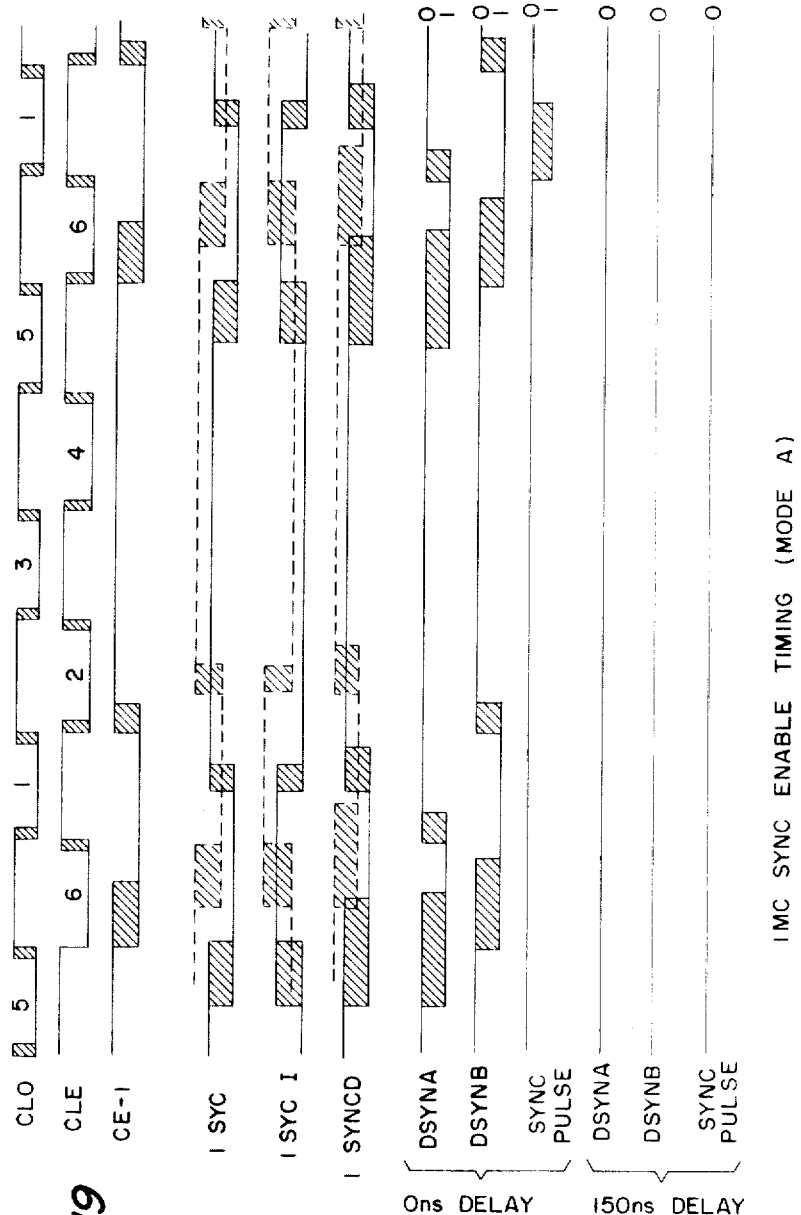

FIG 120

| CYCLE ORIGINATING BEFORE SYNC | | | | | | | SYNC | CYCLE ORIGINATING AFTER SYNC | | | | | | |
|---|---|---|---|---|---|---|---|---|---|---|---|---|---|---|
| CLOCK TIME | CE-N 6 | 5 | 4 | 3 | 2 | 1 | | 6 | 5 | 4 | 3 | 2 | 1 | CLOCK TIME |
| CLO 1 | 0 | 0 | 0 | 0 | 1 | 1 | I MODE A | | | | | | | CLO 1 |
| CLE 2 | 0 | 0 | 0 | 1 | 1 | 0 | | | | | | | | CLE 2 |
| CLO 3 | 0 | 0 | 1 | 1 | 0 | 0 | | | | | | | | CLO 3 |
| CLE 4 | 0 | 1 | 1 | 0 | 0 | 0 | | | | | | | | CLE 4 |
| CLO 5 | 1 | 1 | 0 | 0 | 0 | 0 | | | | | | | | CLO 5 |
| CLE 6 | 1 | 0 | 0 | 0 | 0 | 0 | | | | | | | | CLE 6 |
| | | | | | | | | 0 | 0 | 0 | 0 | 0 | 1 | CLO 1 |
| | | | | | | | | 0 | 0 | 0 | 0 | 1 | 1 | CLE 2 |
| | | | | | | | | 0 | 0 | 0 | 1 | 1 | 0 | CLO 3 |
| | | | | | | | | 0 | 1 | 1 | 0 | 0 | 0 | CLE 4 |
| | | | | | | | | 1 | 1 | 0 | 0 | 0 | 0 | CLO 5 |
| | | | | | | | | 1 | 0 | 0 | 0 | 0 | 1 | CLE 6 |
| CLO 1 | 0 | 0 | 0 | 0 | 1 | 1 | I MODE B | | | | | | | |
| CLE 2 | 0 | 0 | 0 | 1 | 1 | 0 | | | | | | | | |
| CLO 3 | 0 | 0 | 1 | 1 | 0 | 0 | | | | | | | | CLO 1 |
| CLE 4 | 0 | 1 | 1 | 0 | 0 | 0 | | | | | | | | CLE 2 |
| CLO 5 | 1 | 1 | 0 | 0 | 0 | 0 | | | | | | | | CLO 3 |
| CLE 6 | 1 | 0 | 0 | 0 | 0 | 0 | | | | | | | | CLE 4 |
| CLO 1 | 0 | 0 | 0 | 0 | 0 | 0 | | | | | | | | CLO 5 |
| | | | | | | | | 0 | 0 | 0 | 0 | 0 | 1 | CLE 6 |
| | | | | | | | | 0 | 0 | 0 | 0 | 1 | 1 | CLO 1 |
| | | | | | | | | 0 | 0 | 0 | 1 | 1 | 0 | CLE 2 |
| | | | | | | | | 0 | 0 | 1 | 1 | 0 | 0 | CLO 3 |
| | | | | | | | | 0 | 1 | 1 | 0 | 0 | 0 | CLE 4 |
| | | | | | | | | 1 | 1 | 0 | 0 | 0 | 0 | CLO 5 |
| | | | | | | | | 1 | 0 | 0 | 0 | 0 | 1 | CLE 6 |
| CLO 1 | 0 | 0 | 0 | 0 | 1 | 1 | I MODE C | | | | | | | |
| CLE 2 | 0 | 0 | 0 | 1 | 1 | 0 | | | | | | | | |
| CLO 3 | 0 | 0 | 1 | 1 | 0 | 0 | | | | | | | | |
| CLE 4 | 0 | 1 | 1 | 0 | 0 | 0 | | | | | | | | |
| CLO 5 | 1 | 1 | 0 | 0 | 0 | 0 | | | | | | | | CLO 1 |
| CLE 6 | 1 | 0 | 0 | 0 | 0 | 0 | | | | | | | | CLE 2 |
| CLO 1 | 0 | 0 | 0 | 0 | 0 | 0 | | | | | | | | CLO 3 |
| CLE 2 | 0 | 0 | 0 | 0 | 0 | 0 | | | | | | | | CLE 4 |
| CLO 3 | 0 | 0 | 0 | 0 | 0 | 0 | | | | | | | | CLO 5 |
| | | | | | | | | 0 | 0 | 0 | 0 | 0 | 1 | CLE 6 |
| | | | | | | | | 0 | 0 | 0 | 0 | 1 | 1 | CLO 1 |
| | | | | | | | | 0 | 0 | 0 | 1 | 1 | 0 | CLE 2 |
| | | | | | | | | 0 | 0 | 1 | 1 | 0 | 0 | CLE 3 |
| | | | | | | | | 0 | 1 | 1 | 0 | 0 | 0 | CLE 4 |
| | | | | | | | | 1 | 1 | 0 | 0 | 0 | 0 | CLO 5 |
| | | | | | | | | 1 | 0 | 0 | 0 | 0 | 1 | CLE 6 |

C-8401 MAIN TIMING CHAIN OUTPUTS AS A FUNCTION OF THE IMC COUNTER SYNC TIME

INVENTORS
MELVIN L. DOELZ
GEORGE F. GRONDIN
BY Moody and Phillips
ATTORNEYS

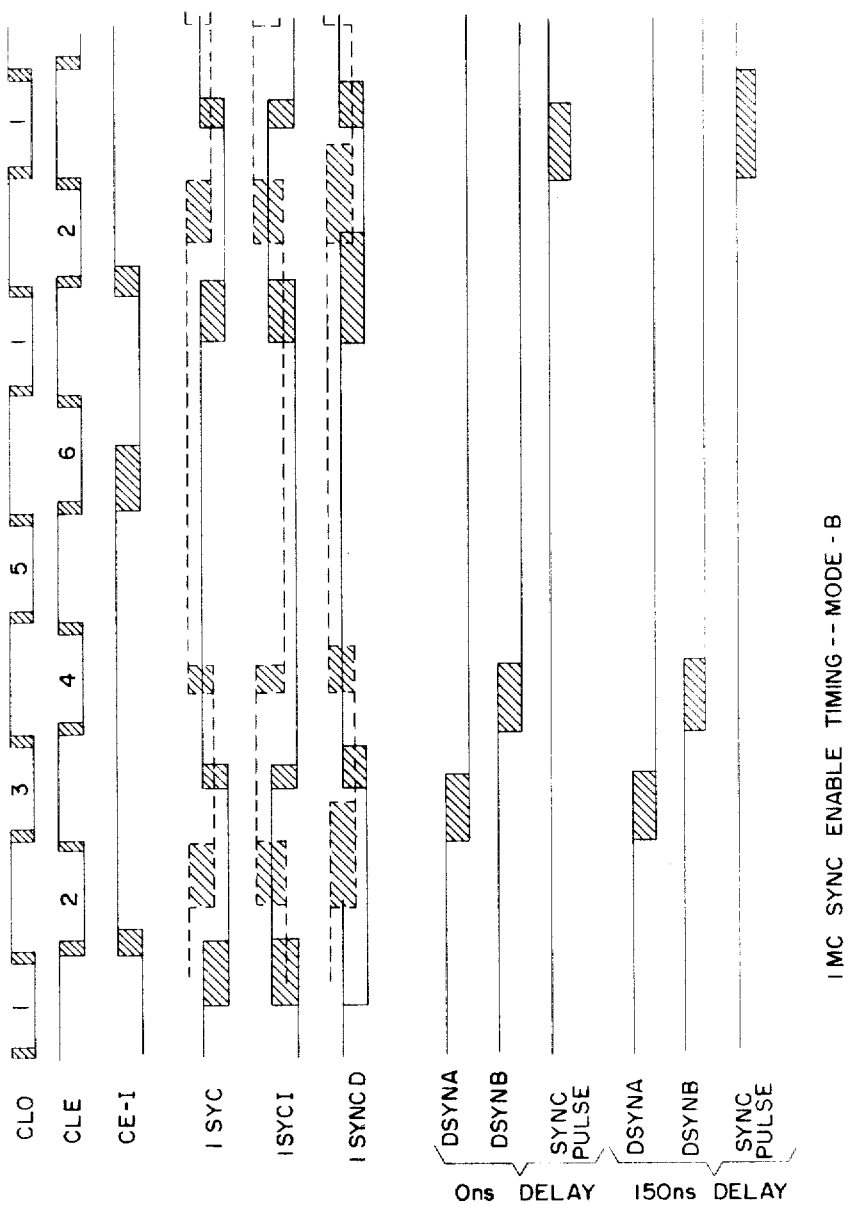

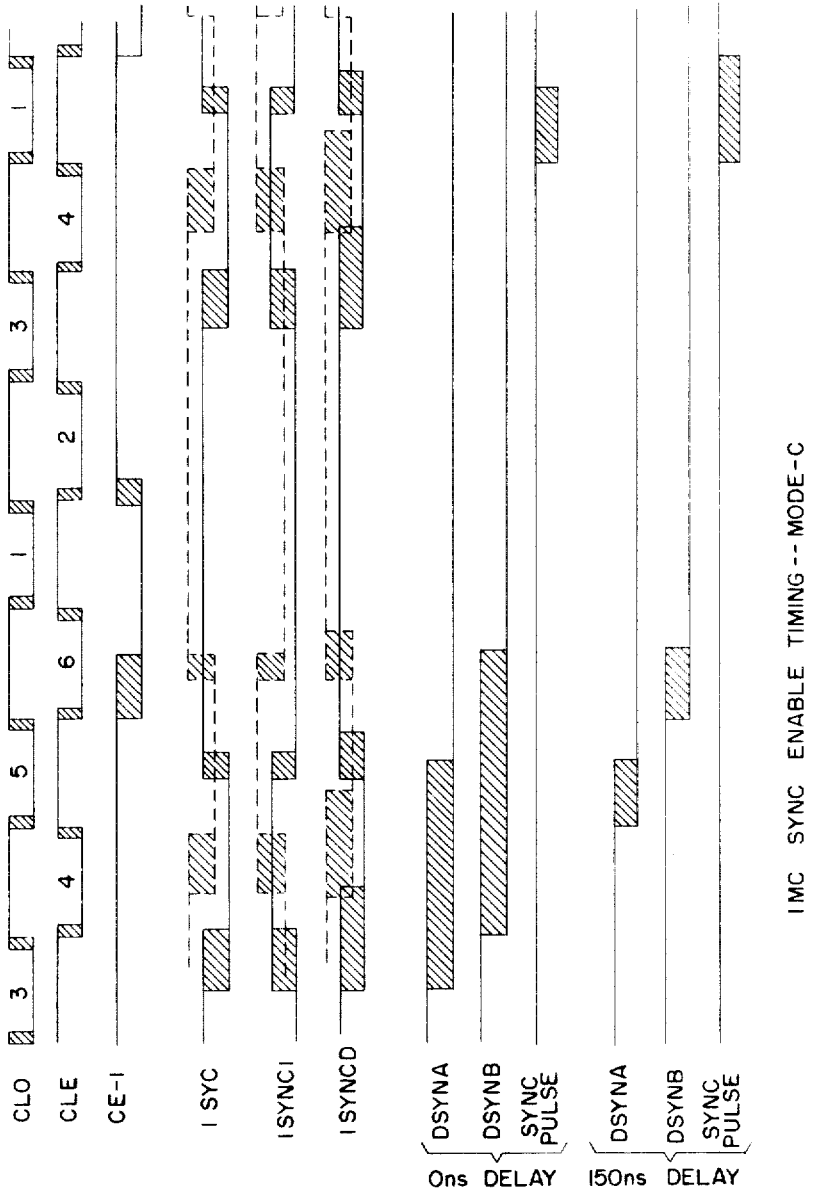

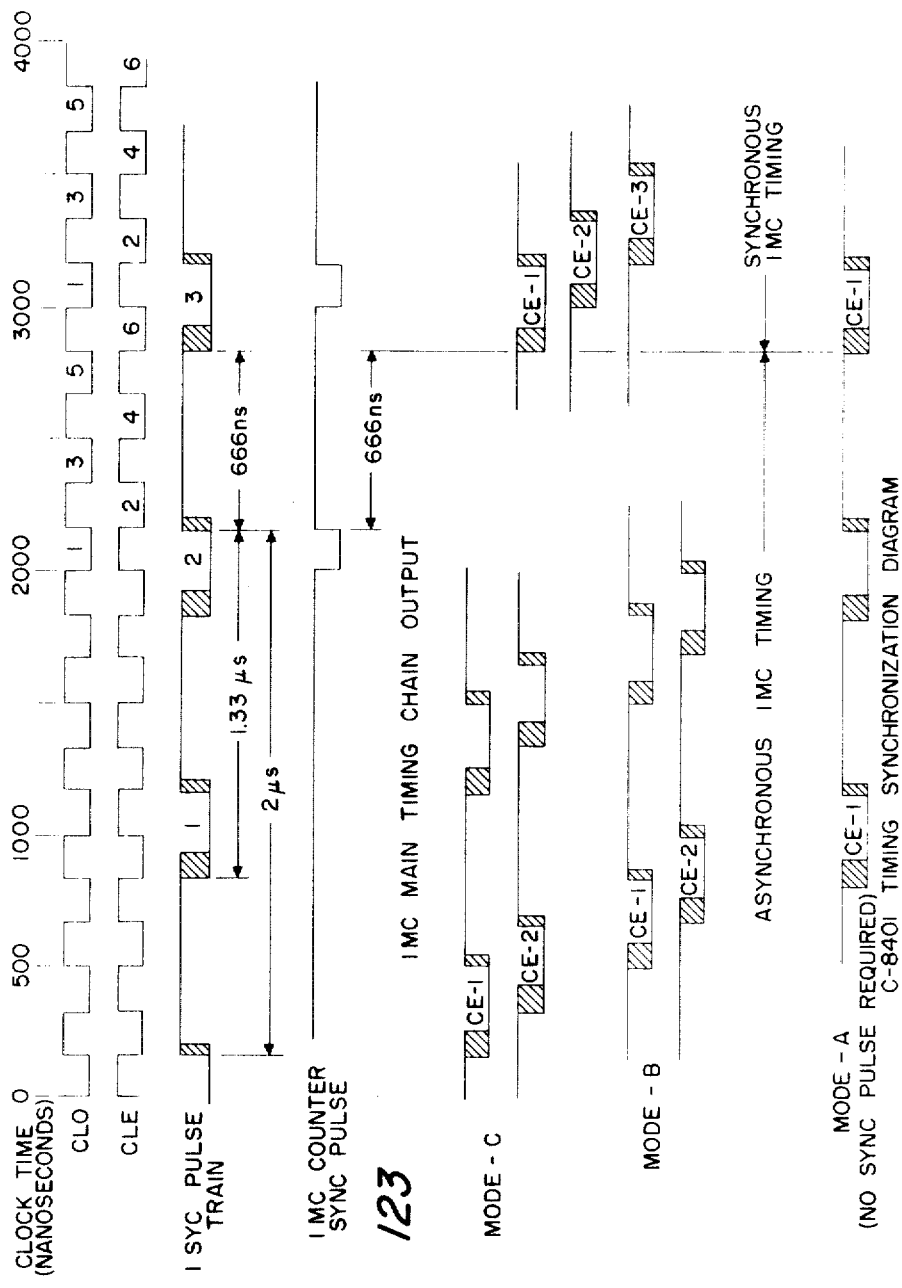

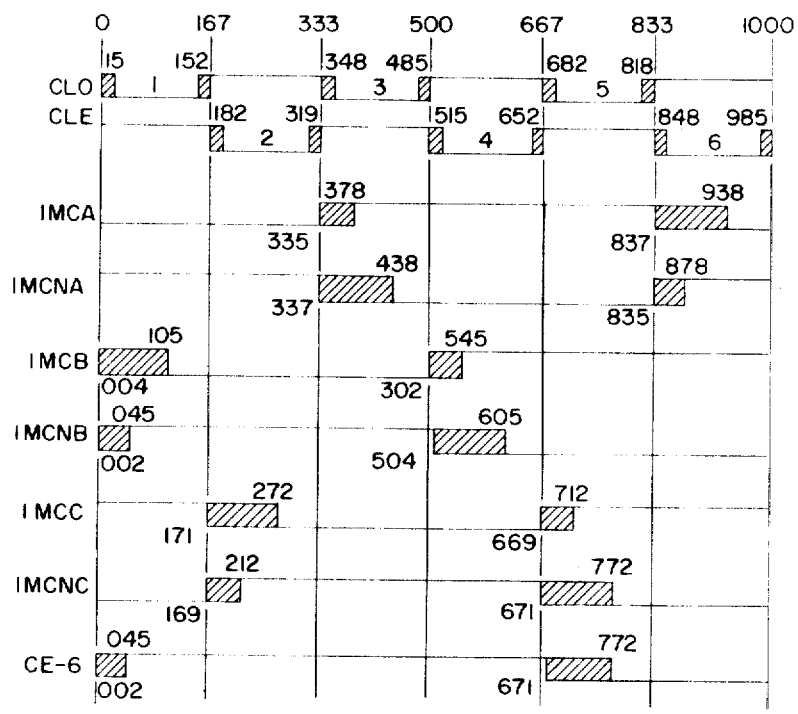
C-8097 TIMING DIAGRAM  FIG 124

United States Patent Office 3,300,764
Patented Jan. 24, 1967

3,300,764
DATA PROCESSOR
Melvin L. Doelz, Corona del Mar, and George F. Grondin, Tustin, Calif., assignors to Collins Radio Company, Cedar Rapids, Iowa, a corporation of Iowa
Filed Aug. 26, 1963, Ser. No. 304,407
44 Claims. (Cl. 340—172.5)

This invention relates generally to data processors and, more particularly, to a data processor employing a main memory system for macroprogramming and a micromemory system for microprogramming, and in which the information being processed can be transferred directly from any register, including input/output registers forming interfaces with peripheral devices, to any other register through a transfer link which is under control of the microprogramming contained in the micromemory.

As the computer art has evolved through the past two decades, it has become increasingly faster and capable of handling larger and more complex problems of both scientific and commercial nature. In an earlier period of development, the arithmetic functions of a computer (also known herein as a data processor) were comprised primarily of fixed wire circuits which were particularly adapted to perform a specific type problem. For example, an early computer designed to handle payroll accounting might have been designed so that the employee's hourly rate and number of hours worked were supplied by input tapes to predetermined storage registers through fixed wire connections. Based on the man's hourly rate, his marital status, number of children, and his gross income, certain fixed and variable deductions would be calculated automatically by the computer and subtracted from the gross pay, thus arriving at the net pay due. Such deductions would be calculated by fixed wire storage and arithmetical units, designed for the very specific purpose described above and ordinarily quite incapable of performing any other computing function without resoldering the fixed wiring into a different arrangement and, in general, completely redesigning the processor.

To be somewhat more general, in a fixed wire computer having registers A, B, C, D, and E therein, for example, it might be possible to pass information directly from register A to register B, or directly from the register B to register C, but not directly from register A to register C. It would be necessary in such a machine to program the transfer of such information from register A to register B, and then from register B to register C, in order to complete the desired transfer of information from register A to register C. It is also quite possible that in a fixed wire arrangement it would be impossible to transfer information from register A to register C under any circumstances simply because no connections, or combination of connections, between registers exist which would permit such a transfer.

As the data processing art has developed, however, its data handling capabilities and general complexity have grown with the result that processors have become increasingly versatile. However, the concept of having fixed wire relationship between the various registers is still prevalent in computers and still provides serious limitations in the usage thereof to the degree that modern computers are capable of efficiently handling either a scientific problem or an accounting or business problem, but not both types of problems.

A recent innovation in the control of operational execution of the commands in a computer has been microprogramming, wherein the transfer of information is controlled by programming. Two types of microprogramming have been proposed for use. One of these is known as horizontal microprogramming, and the other as vertical microprogramming. In horizontal microprogramming each data bit in the instruction code controls a gate or a set of gates through which the information is to be transferred; the bits being scanned in a sequential manner. Horizontal microprogramming has a defect in that only a comparatively small fraction of the possible gating combinations are meaningful.

In vertical microprogramming some operational phases, and the gating involved therein, are specified by separate instructions. It is to be noted, however, that in both vertical and horizontal microprogramming, as presently known, fixed wiring between the various registers is still predominant to a large degree. While such microprogramming does represent an enlargement of the versatility of data processors, many limitations barring efficient data transfers between registers still remain and the transfer of information directly from any given register to other registers in the processor, in a single operation, is very limited.

A principal object of the present invention is to provide a versatile data processor capable of programmed transfer of information from any of its registers directly to any other of its registers.

A second purpose of the invention is a data processor having a higher degree of versatility than known heretofore in prior data processors.

A third object of the invention is a data processor employing a main memory and a micromemory under control of the main memory; said micromemory containing microprogramming for carrying out the detailed steps of an instruction supplied thereto from said main memory.

A fourth aim of the invention is a data processor containing a main memory, a plurality of registers, a transfer link including input and output switching matrices connecting the outputs of each of said registers to the inputs of each of said registers and a micromemory means under control of the main memory and containing microprogram for controlling the transfer of information from a given register to another register through said input and output switching matrices, and said transfer link.

A fifth purpose of the invention is to provide a data processor capable of substantially simulating the characteristics and capabilities of other computers currently available on the market.

A sixth object of the invention is a data processor substantially capable of allowing direct and unrestricted data transfer between all internal and external devices.

Another aim of the invention is a data processor whose mode of operation can be easily adapted for scientific problems or for business computations merely by changing the transfer controlling programming contained in the micromemory.

A seventh purpose of the invention is the improvement of data processing equipments, generally.

In accordance with the invention, the over-all system is perhaps most aptly described in a broad manner as a "from-to" system, a primary element of which is a high-speed transfer link whose main function is to transfer data from one register to another register under control of microprogramming. Such a general definition is appropriate since, in essence, all data processing functions such as addition, subtraction, multiplication, division, complementing, rotation, parity, etc., are in fact made up of a series of data transfers from one type register to another type register.

The processor of the present invention contains all the conventional building blocks necessary to carry out a stored program of data processing. However, the organization of these building blocks is unique in that all the internal and external devices are connected to each other through the common transfer link and a plurality of exchange registers, known herein as input/output registers, thus permitting unrestricted data exchange between internal and/or external devices in a single operation. The functional devices which, in a broad sense, include such devices as adders, utility registers, the main memory, physically remote tape stands, magnetic disc files, or even another computer, have their inputs and outputs connected to input and output switching selector matrices (through appropriate input/output registers in the case of external devices). The matrices are a part of the high-speed transfer link. Both the input and the output matrices contain 32 separate addresses; each address of the input matrix containing 17 lines and each address of the output matrix containing 17 lines. For most of the registers the output leads of the bit positions are connected individually to the lines of a particular address of the input matrix and the input leads of the bit positions of each register are connected individually to the lines of a particular address of the output matrix. In the case of some of the registers, however, the input leads or output leads of the various bit positions may be fixed wired to different address positions of either the input or the output matrix, depending on the function of the particular register. Ordinarily, the fan-out of the outputs of a given register, i.e., the condition where individual bits of a given register are connected to different address positions of the input matrix, are employed for control purposes, as will be discussed in detail in this specification.

By the closing of proper switching co-ordinates in the input and output matrices of the transfer link, the output of any functional device, as defined above, can be supplied to the input of any other functional device. As a means of providing a variable control of the input and output switching matrices, there is provided the aforementioned micromemory within which is stored a program containing the transfer commands (repertoire) of the processor. Such a program within the micromemory means can be altered to accommodate a new type problem simply by erasing the program and writing therein a different microprogram designed to carry out the necessary operations for the new type problem, which can be either of an accounting or a scientific nature.

In the data processor, the main program which is contained in the main memory (not the micromemory), is brought out sequentially for execution. Any given instruction from the main memory is transferred to a selected one of the exchange registers from which it is supplied to a unit defined as the transfer sequence control unit, which unit includes the micromemory. In response to the instruction from the main memory, the micromemory will initiate a series of microprogram steps which will be referred to herein as a "transfer sequence." For any given instruction a predetermined transfer sequence is initiated in the micromemory. Such transfer sequence ordinarily consists of a number of basic steps; each basic step constituting a transfer command which closes selected points of the input and output switching matrices, thus activating the transfer link and causing data to be supplied from a particular register through the transfer link to a destination register; the destination register being determined by the selection of a specific matrix point in the output matrix. Thus, the computer performs its function by transferring data directly through the transfer link from a source register to a destination register, and in the process of such transfer a particular operation is performed upon the data. Specifically, such an operation might be adding, complementing, rotating, subtracting, parity check, or any other of the several functions modern processors perform.

In accordance with a specific feature of the invention, the use of a micromemory, in which the transfer sequences are stored in the form of a program, gives the processor the capability of simulating the characteristics and capabilities of other, more specialized data processors merely by changing the transfer sequence programs stored in the micromemory to conform to the repertoire of other processors.

In accordance with another feature of the invention, expansion thereof can be made with comparative ease. More specifically, the processor's capabilities can be expanded without changing its organization simply by increasing the number of switching points in the input and output matrices of the high-speed transfer link.

To increase the switching points from sixteen to thirty-two, for example, requires the addition of only one bit to the code employed to select the switching points. Since there are two matrices involved, such expansion of switching points would require the addition of two additional data bits. To expand the matrices to sixty-four switching points would require the use of two more data bits. On the other hand, in a given application, some of the matrix switching points can be left unused if the given application does not require full capacity.

In accordance with a third feature of the invention, the choice of the complement of functional devices such as tape stands, magnetic discs, teletypes, etc., which are employed with the processor, are substantially independent of the organization of the processor since, regardless of the nature of these functional devices, they all present a common interface to the transfer link through appropriate adapters and exchange registers and, consequently, are treated on a common basis.

The above-mentioned and other objects and features of the invention will be more fully understood from the following detailed description thereof when read in conjunction with the drawings in which.

Figure 2:
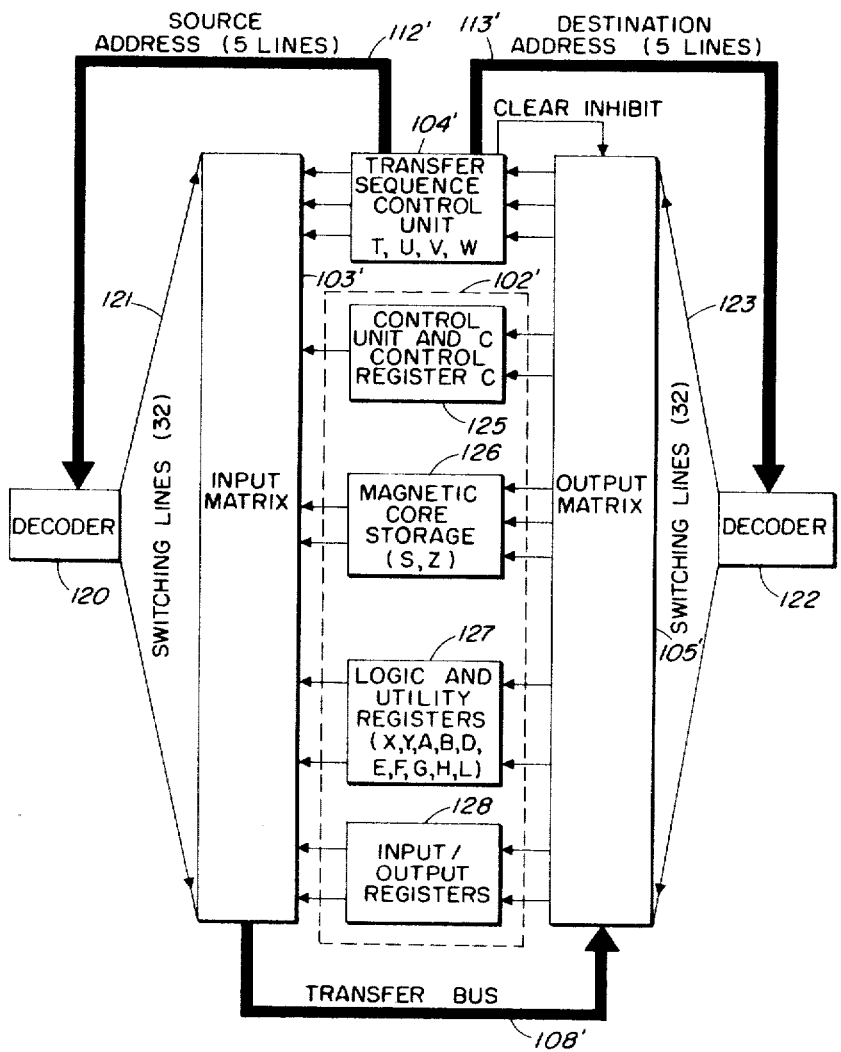
FIG. 2 is a simplified block diagram of the invention of FIG. 1, but arranged in a different manner to show more specifically the relationship of the registers with the transfer link, including the input and output matrices.
Figure 3:
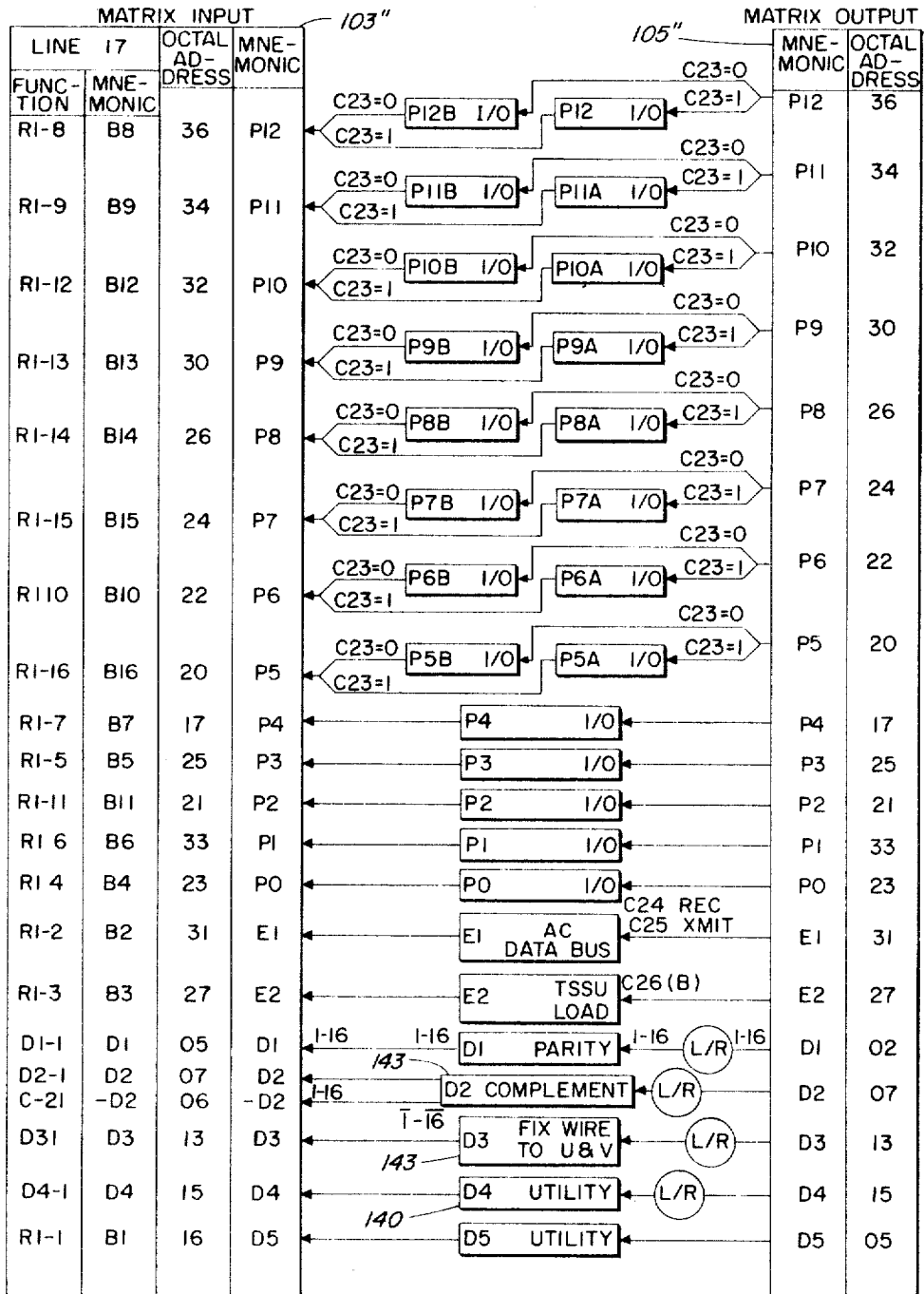
Figure 3A:
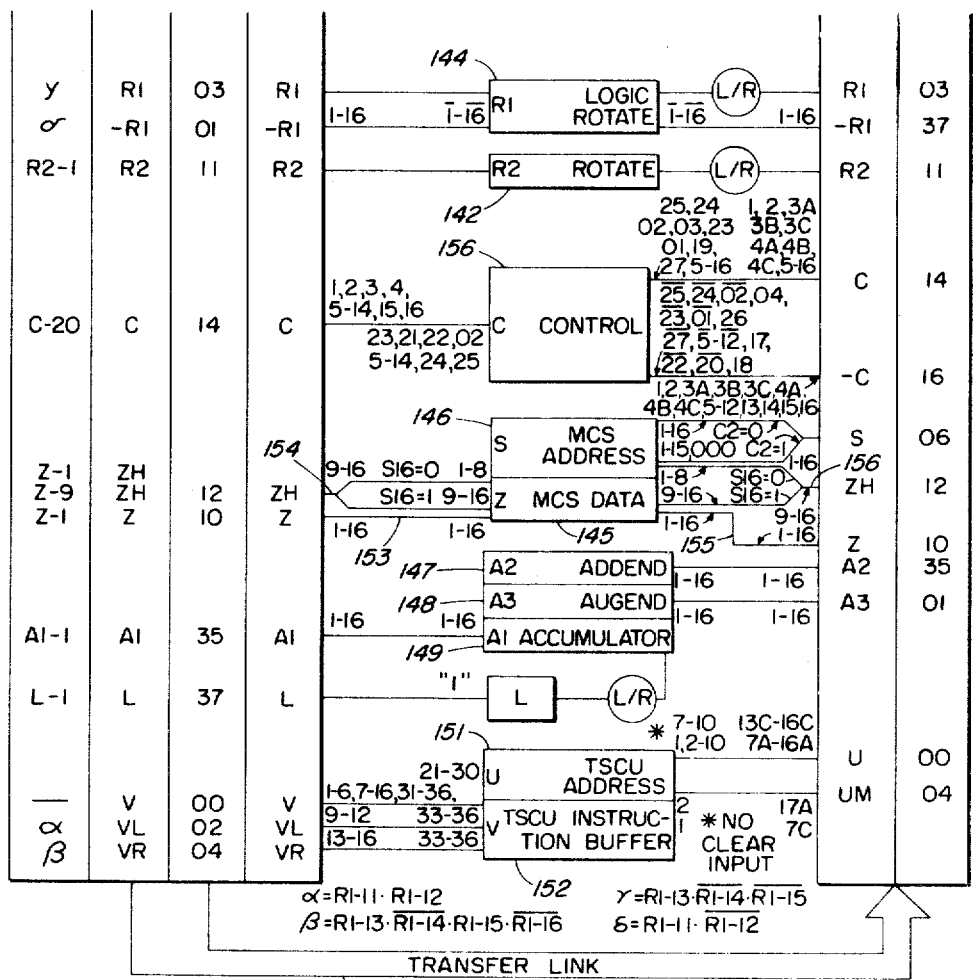
Figure 4:
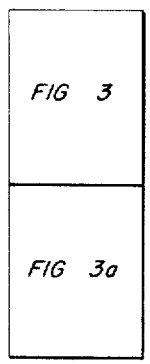
Figure 5:
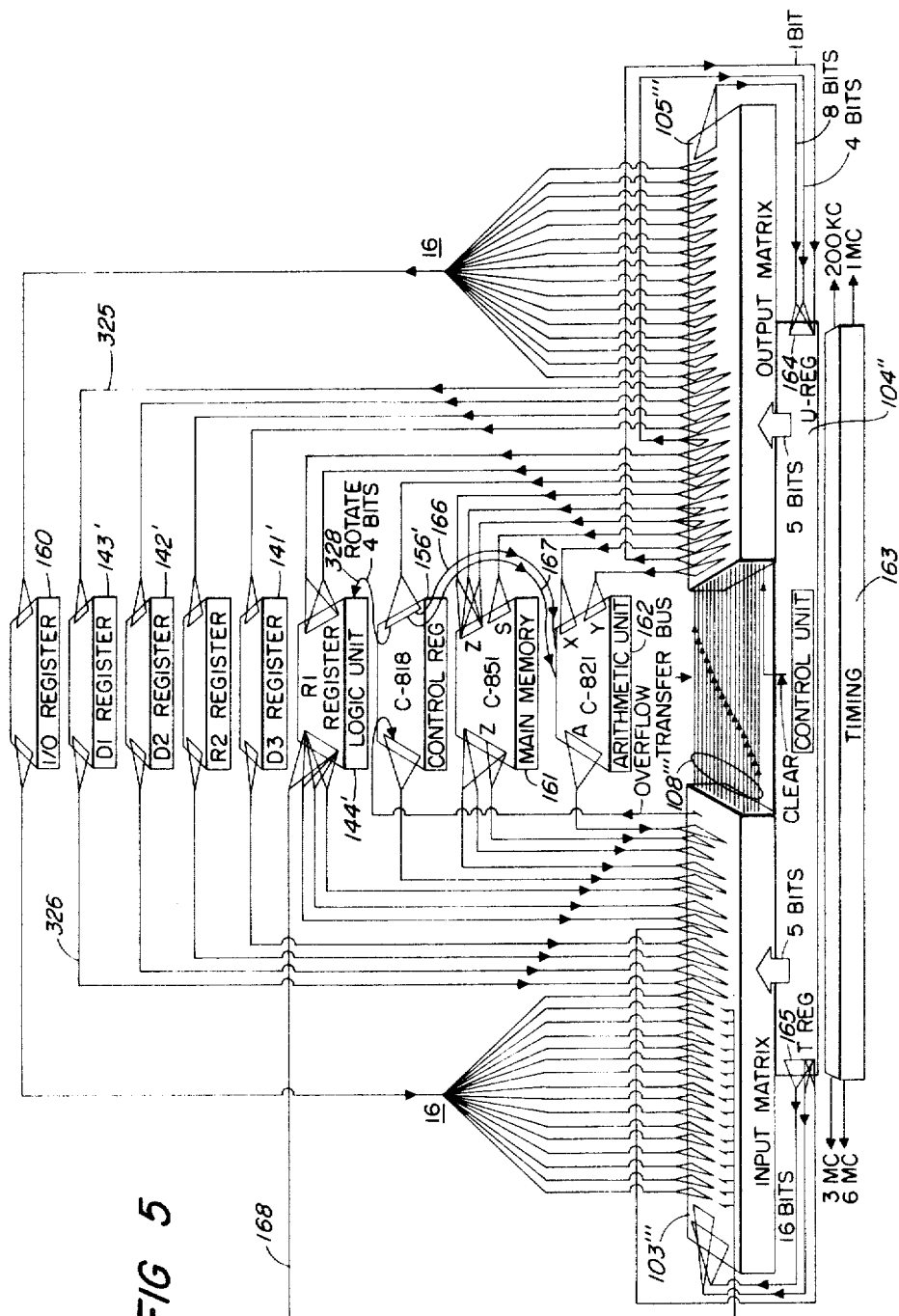
Figure 19:
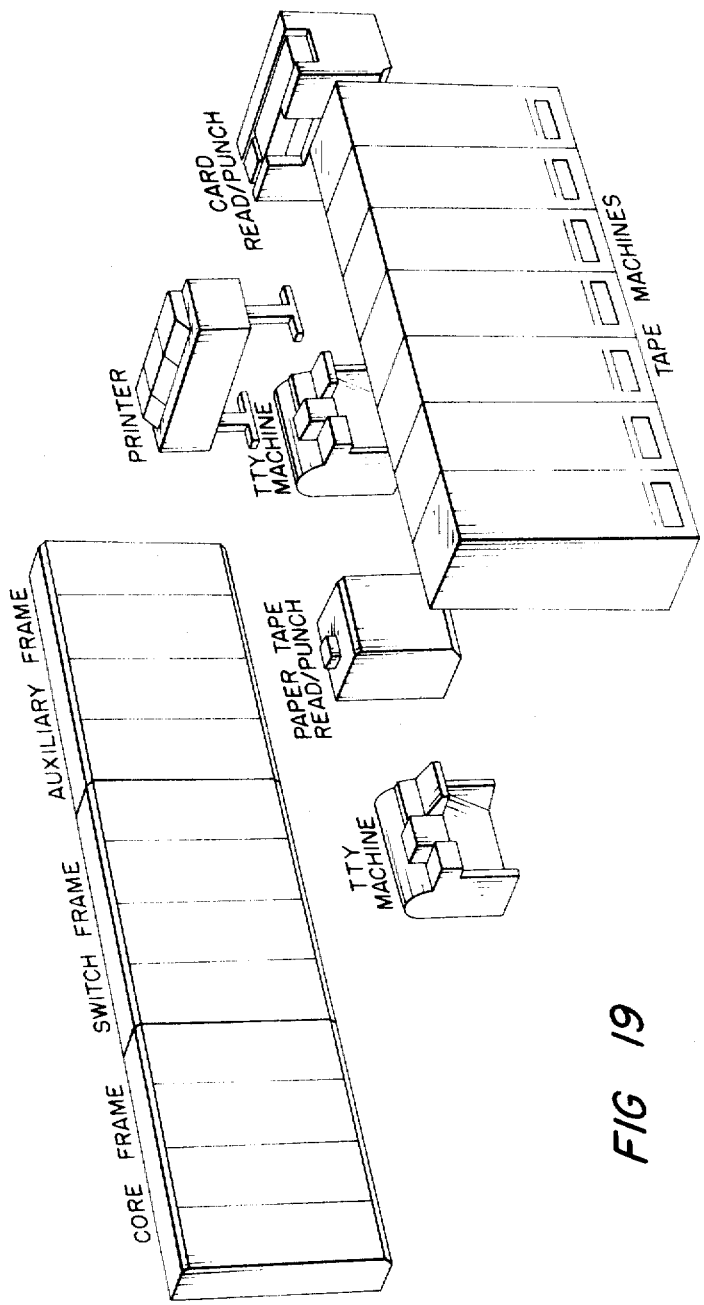
Figure 29:
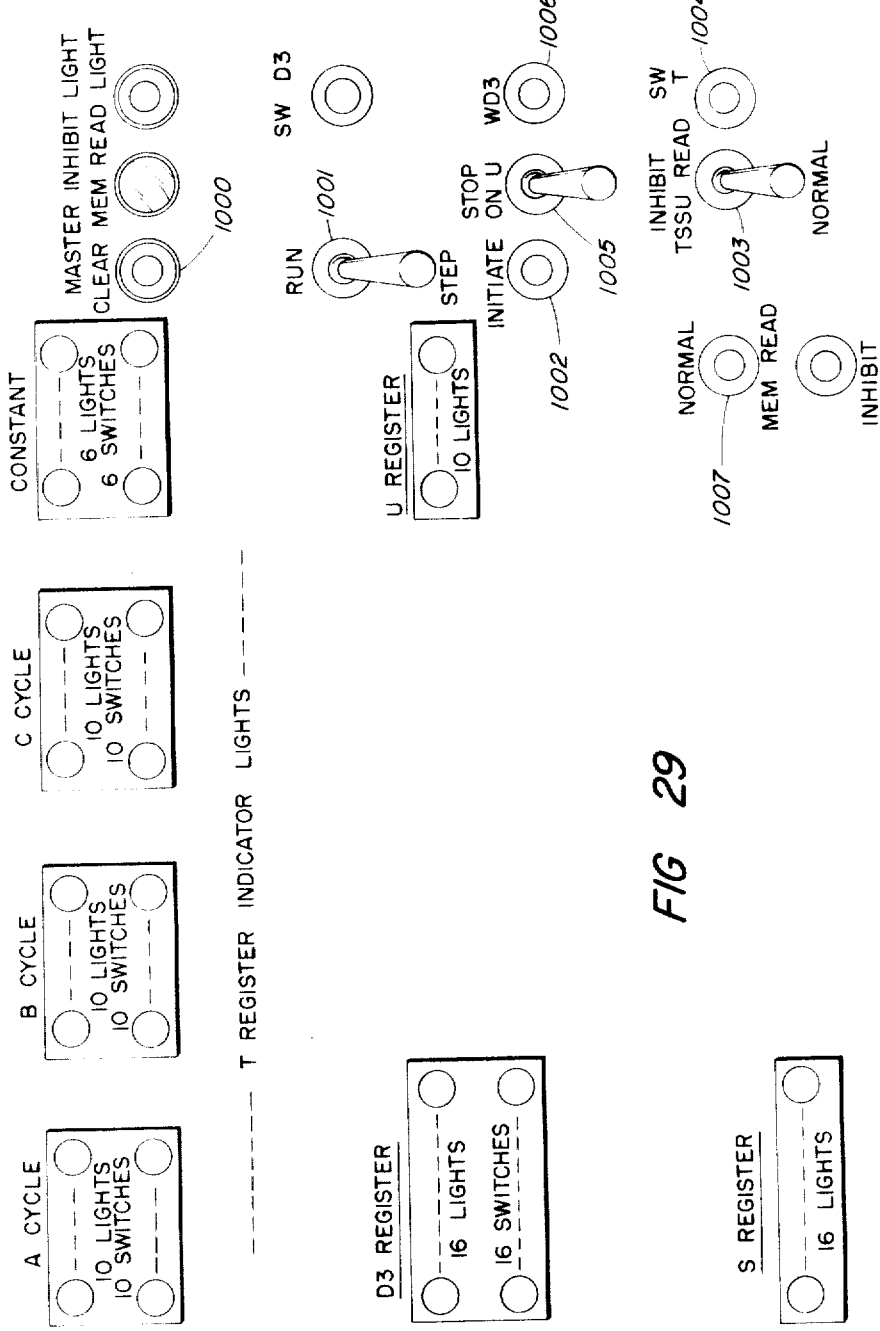

FIGS. 3, 3a, and 4 is another block diagram similar to that of FIG. 2, but showing the register arrangement in considerably more detail;

FIG. 5 is a perspective block diagram of the processor in which the two-dimensional characteristics of the input and output matrices are more clearly delineated, wherein the transfer link is more clearly delineated, and in which some of the interconnections between the registers are shown in a general manner;

FIGS. 6 through 17 fit together in accordance with the diagram of FIG. 18 to provide a block diagram layout of the complete data processor including some peripheral equipment, and also including the general logic means for accessing both the main memory and the micromemory;

FIG. 19 shows an artist's view of a complete processor including several types of peripheral equipment;

FIG. 20 is a block diagram showing the transfer sequence control unit which contains the micromemory, means for addressing said micromemory, and means for reading micro instructions from said micromemory;

FIGS. 21 through 24 are charts showing the connections of the registers included as a part of the transfer sequence control unit;

FIG. 25 is a timing sequence chart showing the cyclical operation involved in reading instructions from the micromemory and interpreting such instructions to cause the proper transfer of information from a source register to a desintation register;

FIG. 26 is a symbolic diagram showing the organization of the transfer sequence storage or, more specifically, the organization of the coding means for selecting a particular address from the micromemory;

FIG. 27 is a chart showing in detail the specific connections of the C register;

FIG. 28 is another chart showing further details including some operational details of the C control register;

FIG. 29 is an illustration of a portion of the maintenance panel of the processor.

Figure 30:
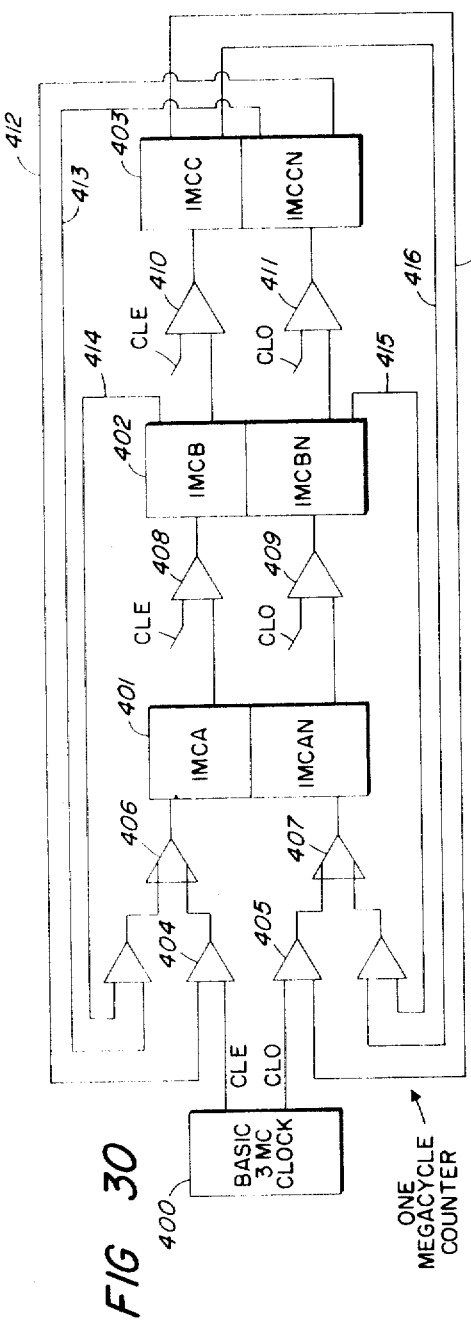
Figure 31:
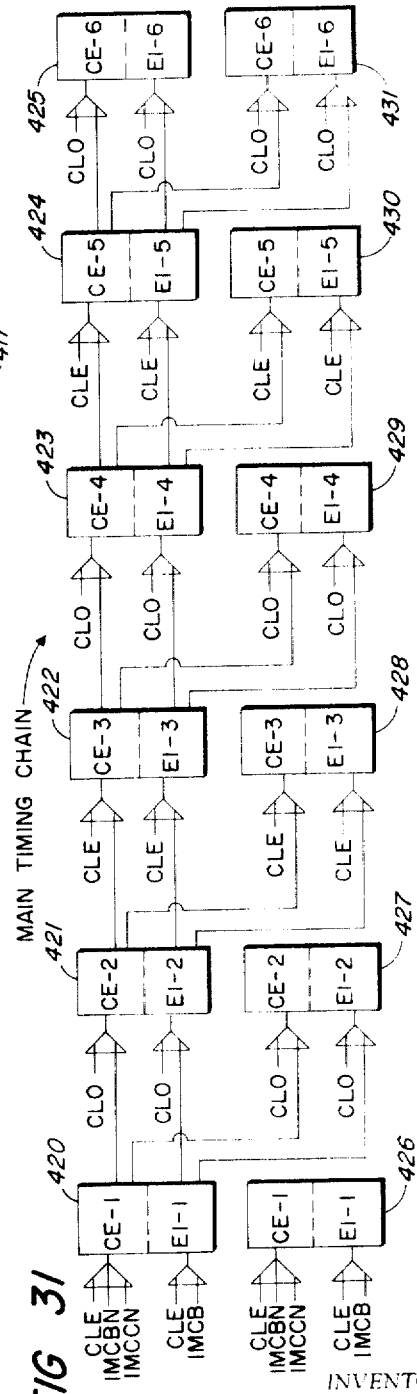
Figure 34:
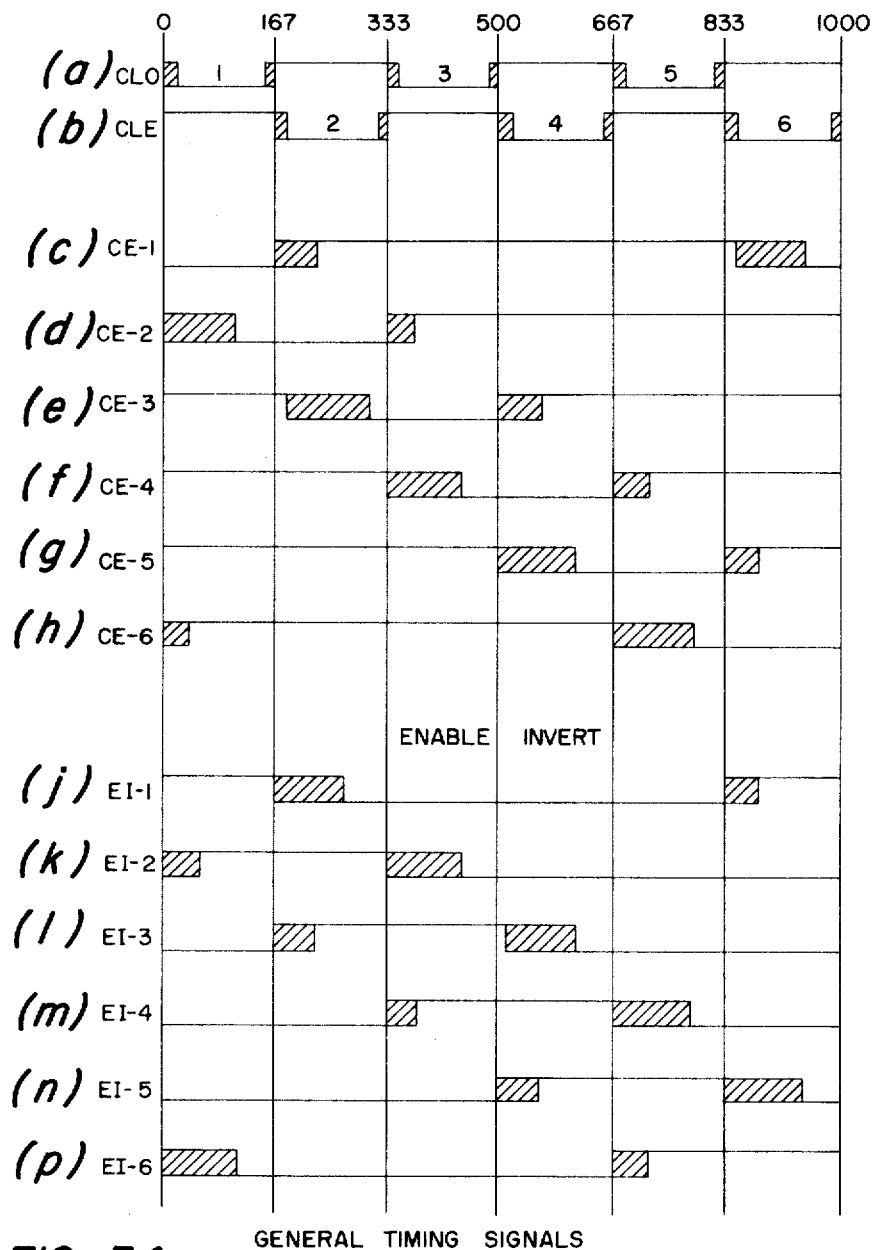
Figure 35:
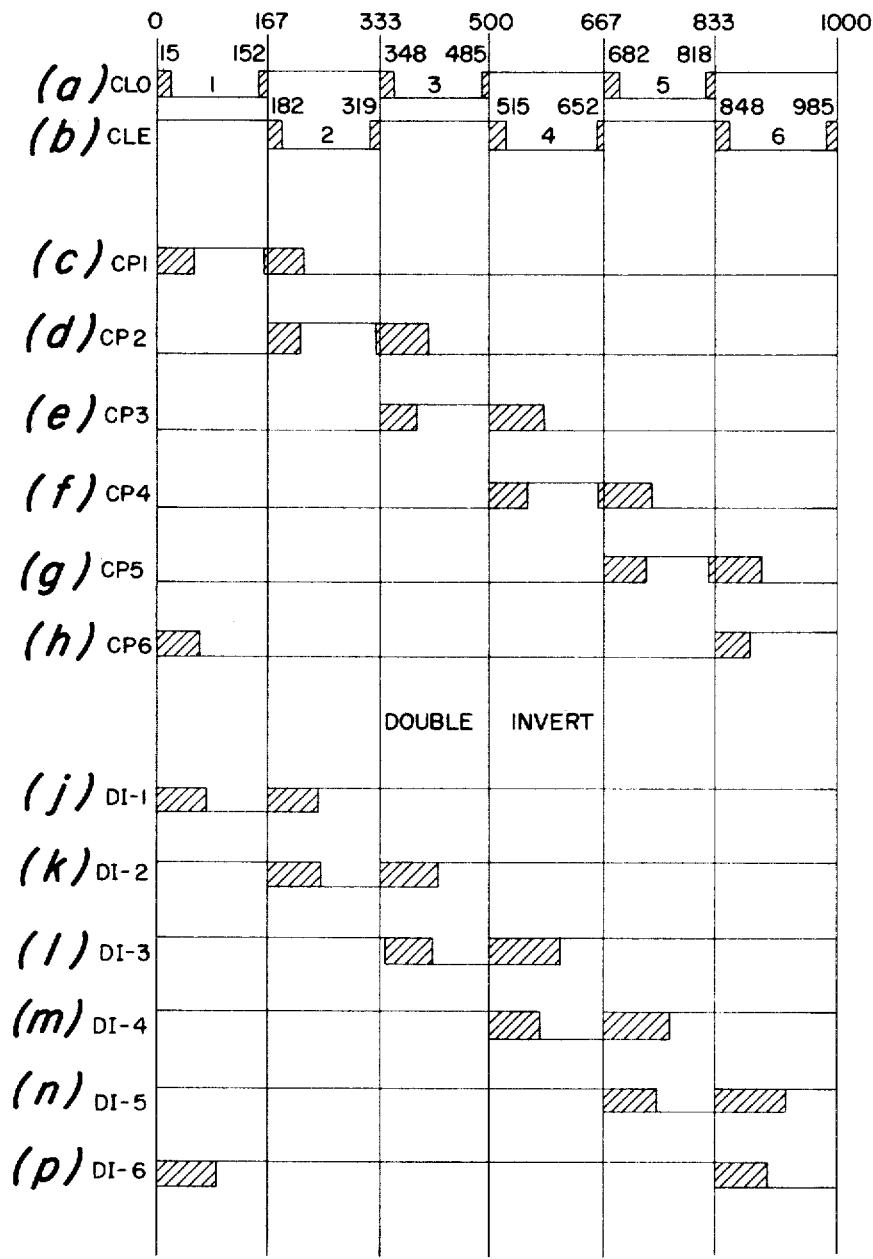
Figure 36:
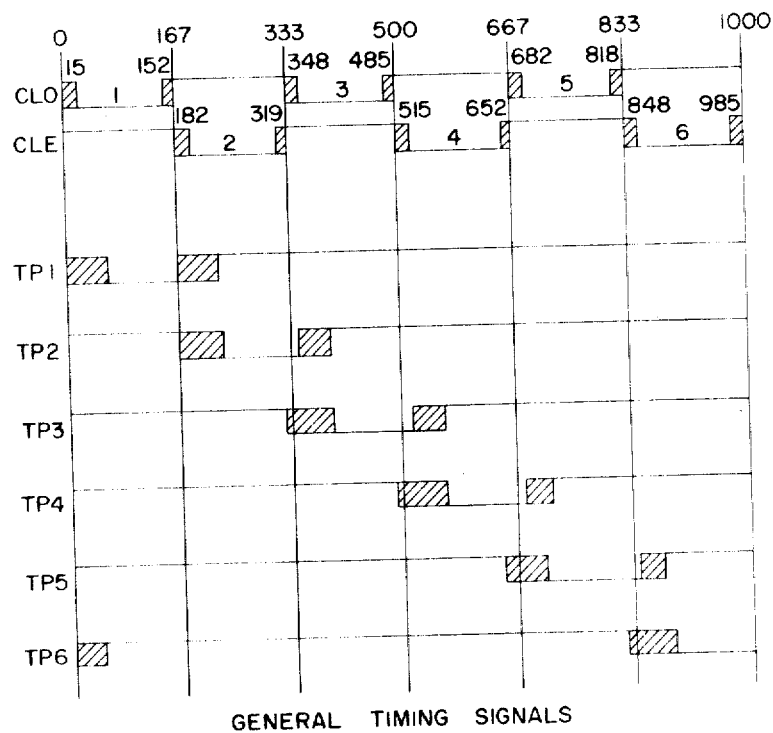
Figure 37:
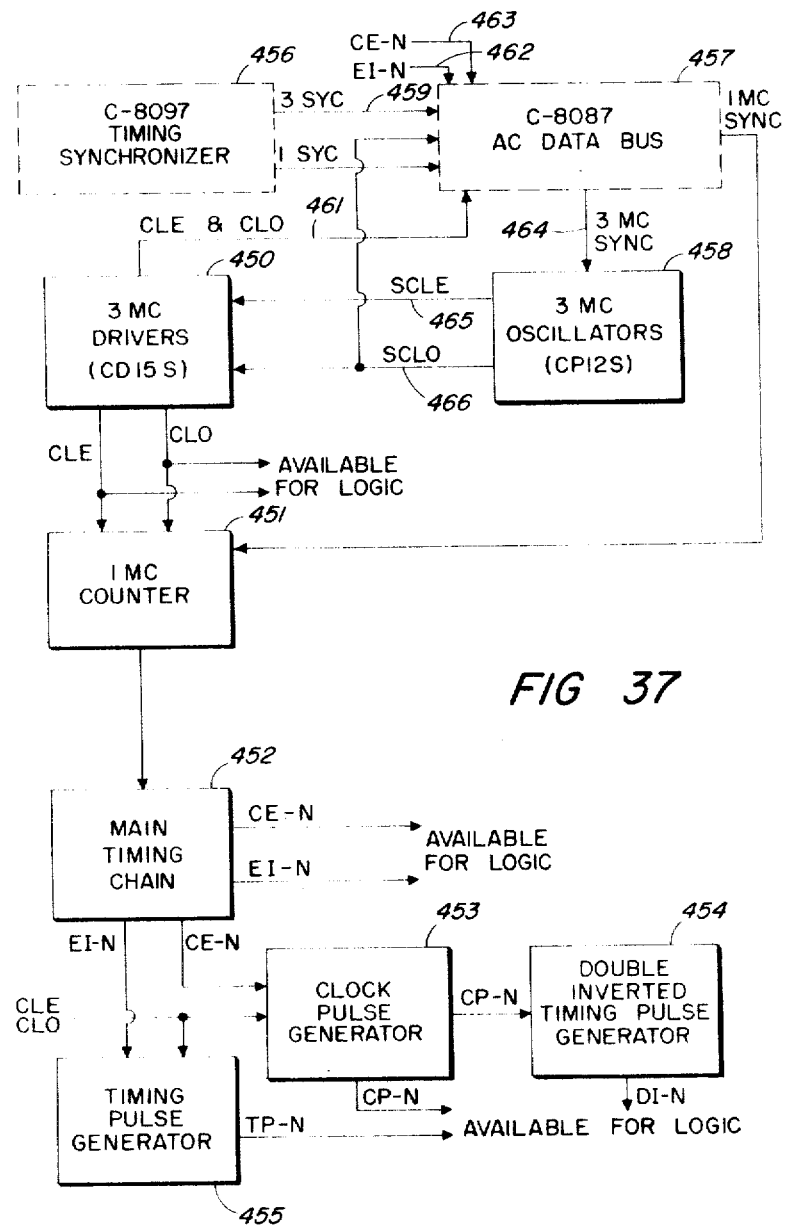
Figure 38:
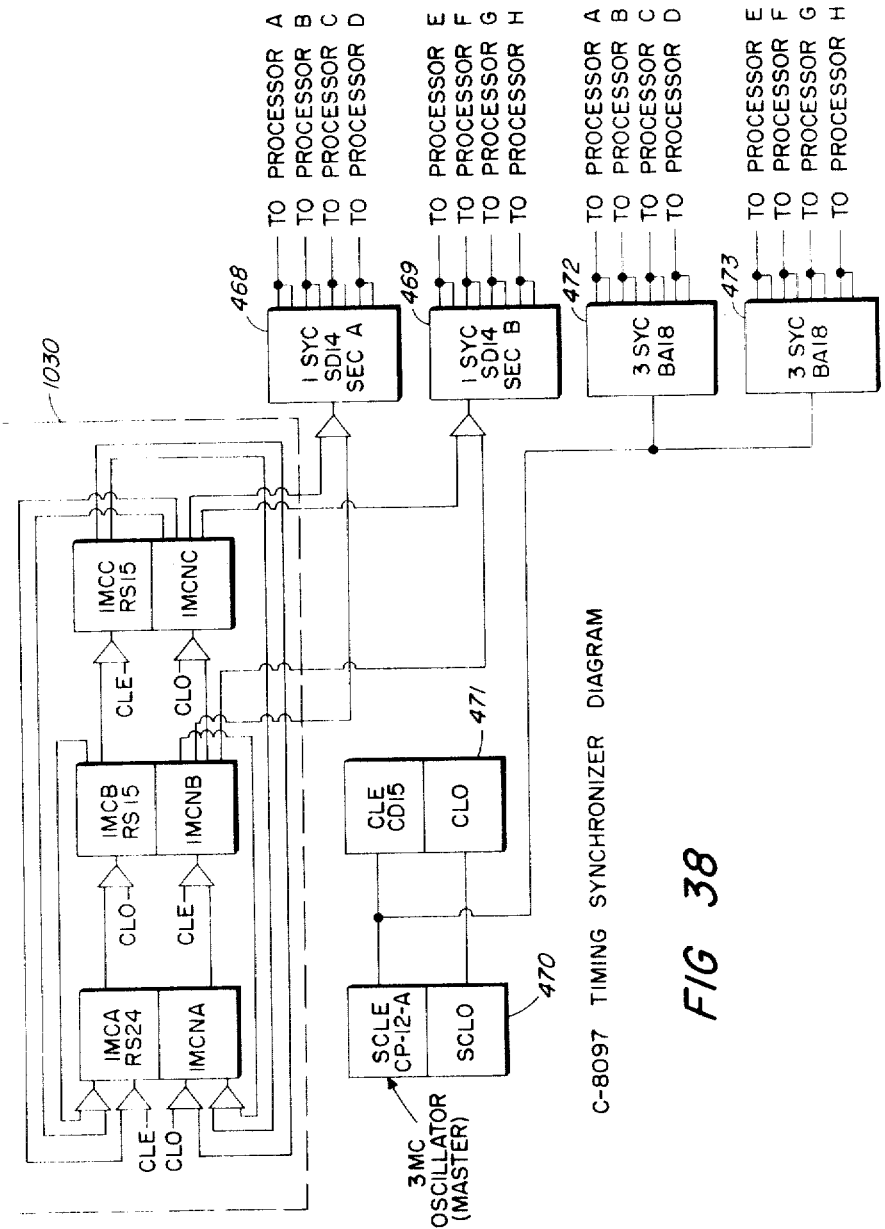
Figure 39:
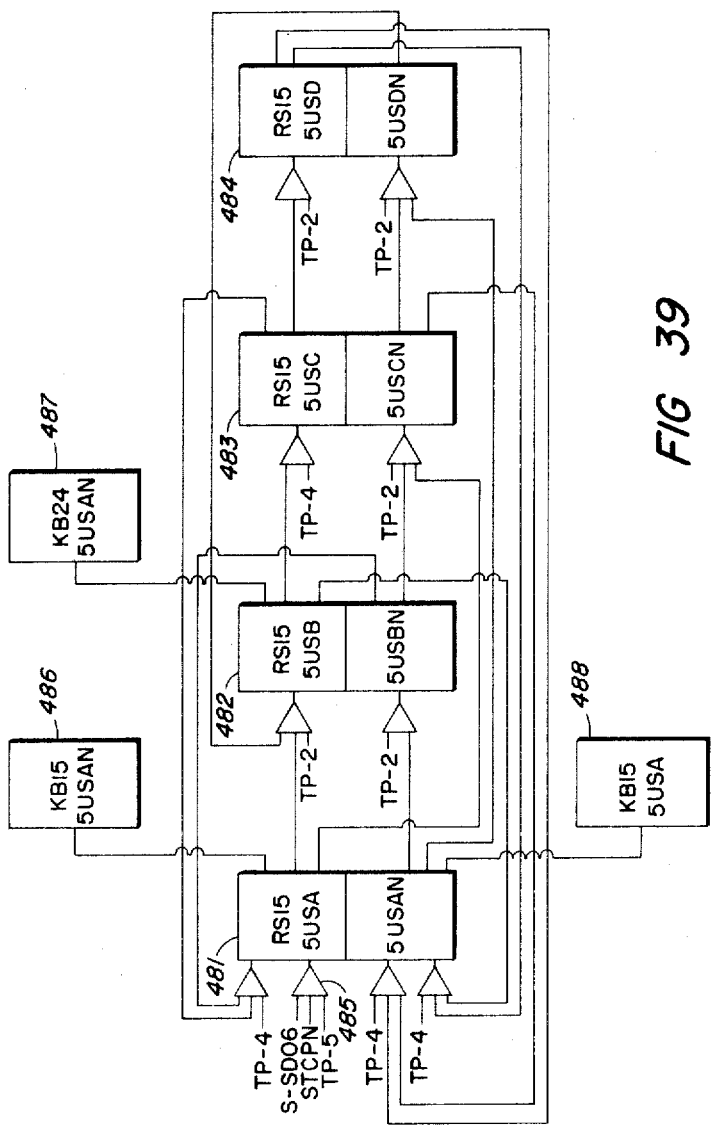
Figure 40:
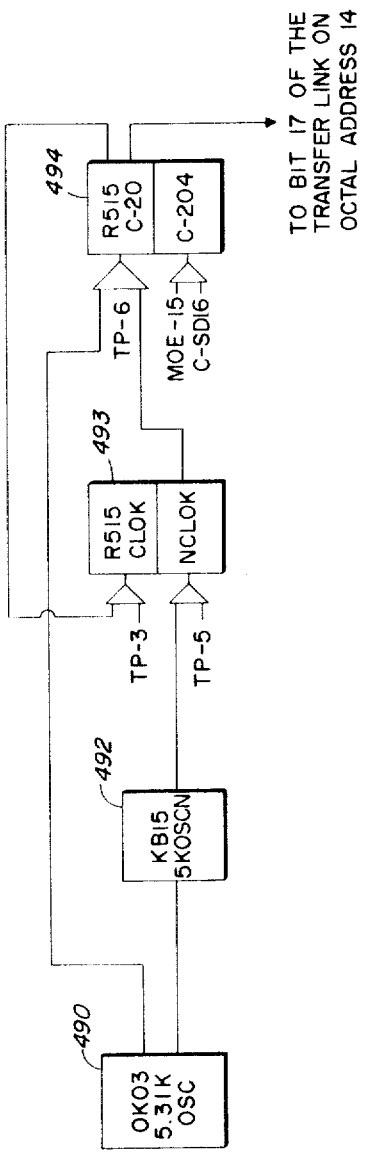

FIGS. 30–40 relate to the generation of timing signals and, more specifically:

FIG. 30 is a one-megacycle counter to produce the basic one-megacycle timing signal for the processor;

FIG. 31 is a block diagram of the main timing chain which produces CE and EI one-megacycle timing signals used for specific purposes as outlined later herein;

FIG. 32 is a chart showing the output waveforms of the one-megacycle counter of FIG. 30;

FIG. 33 shows block diagrams for generating additional one-megacycle signals from the one-megacycle signals produced by the main timing chain of FIG. 31;

FIG. 34 is a set of waveforms showing the output signals of the main timing chain of FIG. 31;

FIG. 35 is a set of waveforms showing the output signals of the block diagram of FIG. 33;

FIG. 36 is another set of waveforms showing additional output signals of the block diagrams of FIG. 33;

FIG. 37 is a general block diagram illustrating how the timing system of individual data processors is controlled by a central timing system in a complex of data processors;

FIG. 38 is a block diagram showing in more detail a portion of the central timing system employed with a complex of data processors;

FIG. 39 is a timing block diagram for producing 5 microsecond pulses employed in accessing the main memory; and FIG. 40 is a timing block diagram of a circuit for producing a 5.34 kilocycle signal employed in transferring information between the data processor and Teletype machines.

Figure 46:
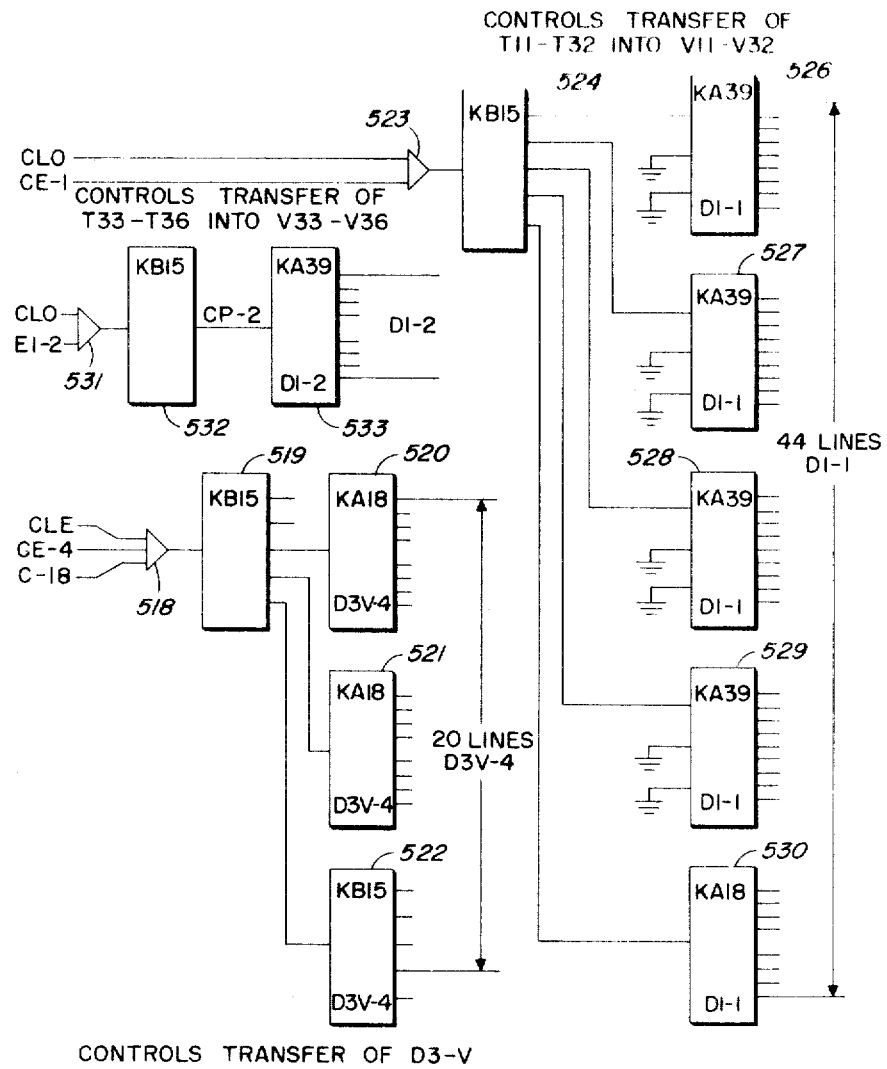
Figure 47:
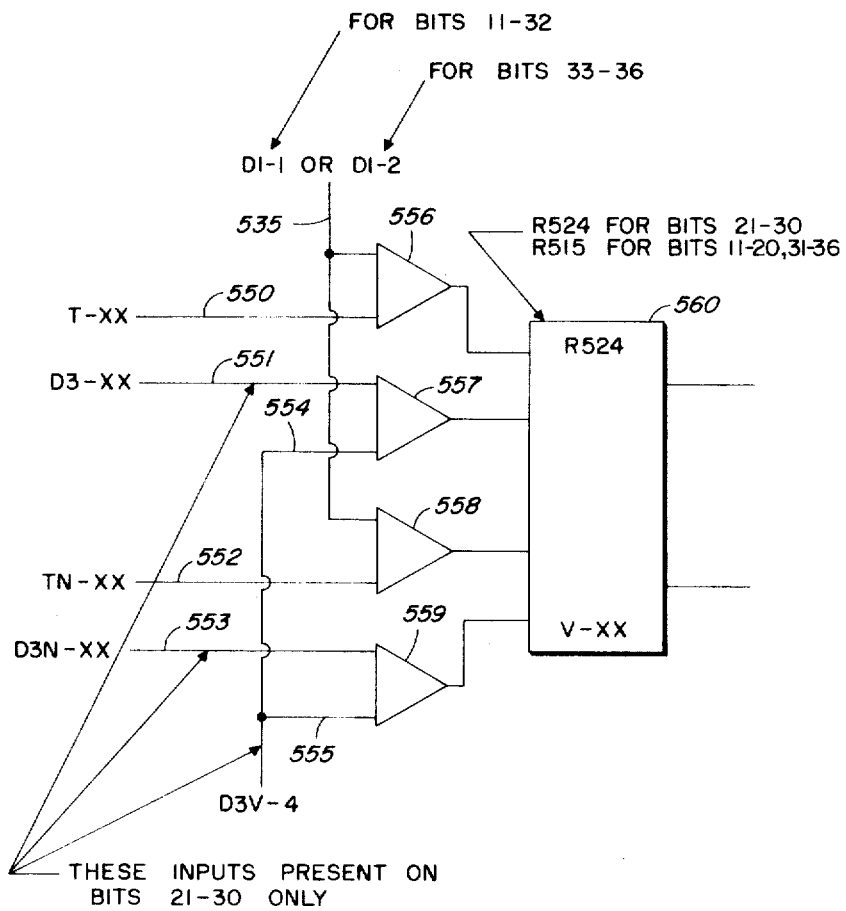
Figure 48:
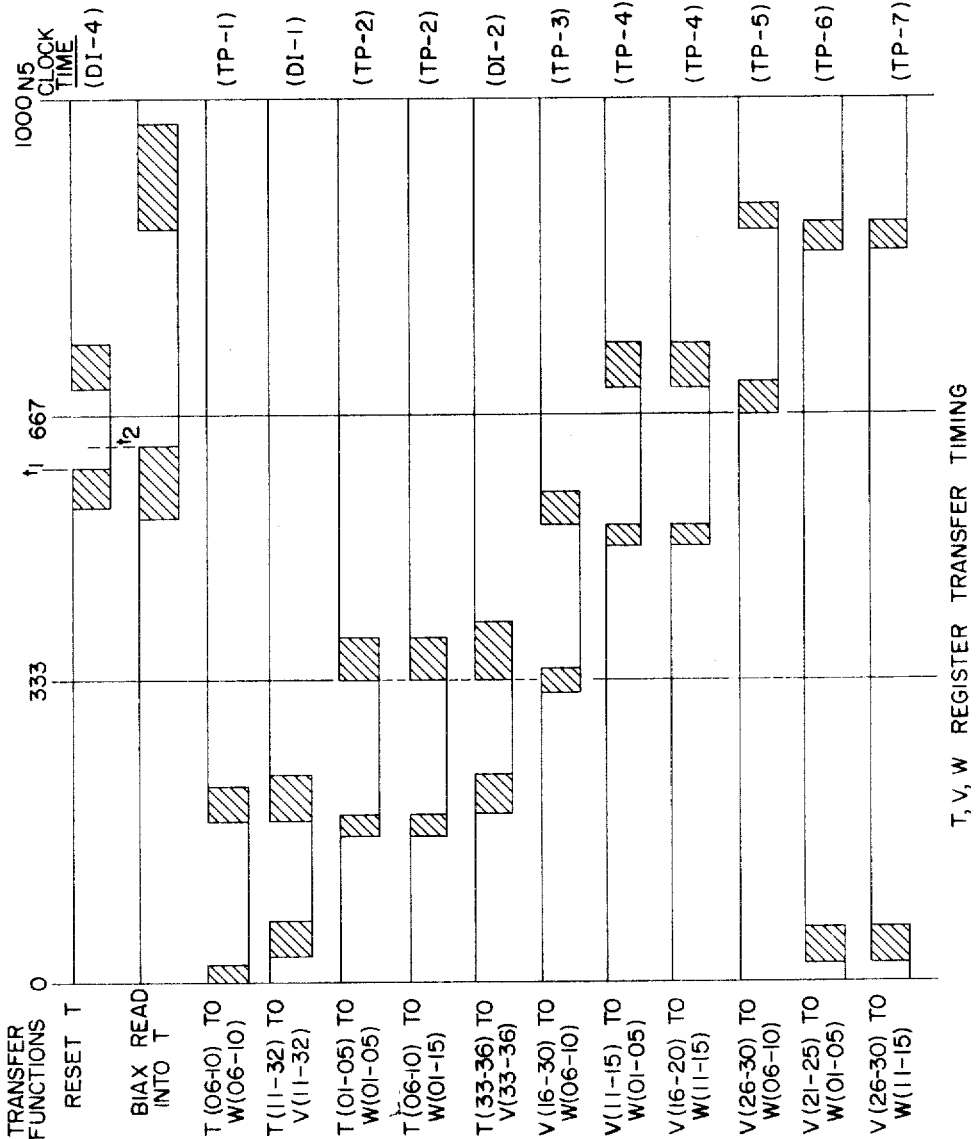
Figure 49:
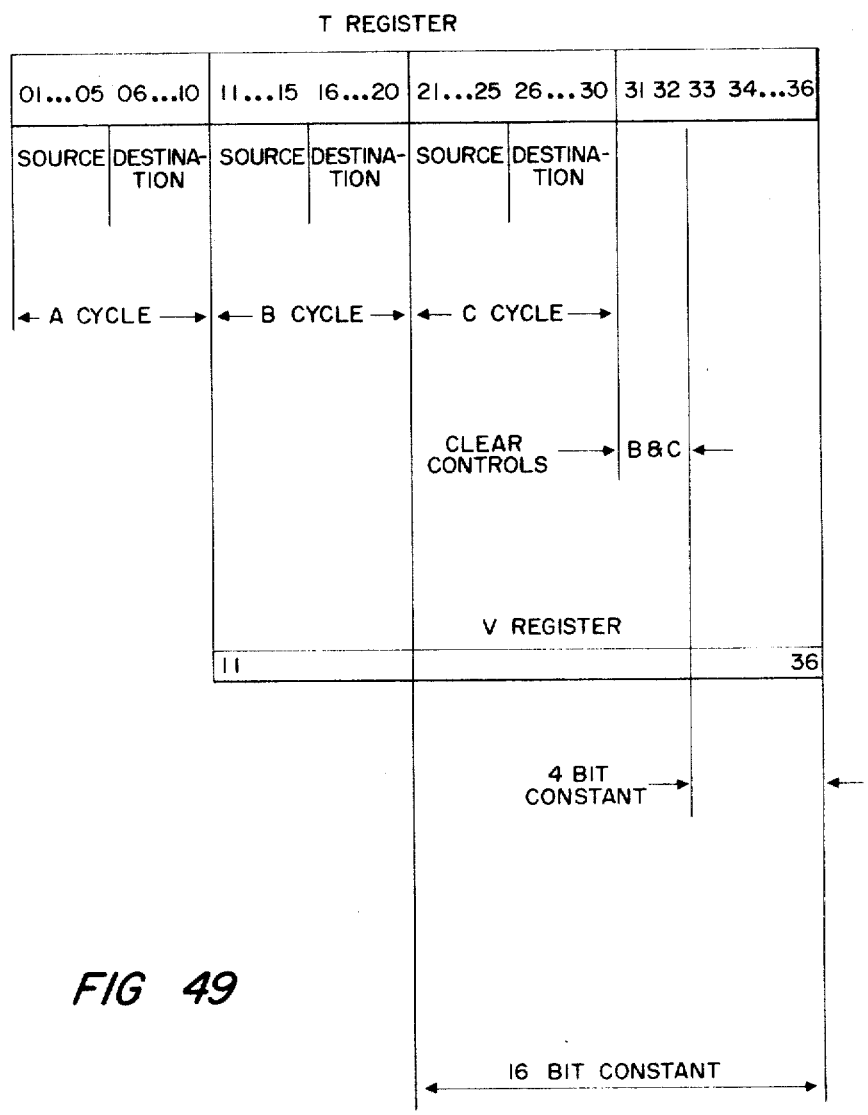
Figure 52:
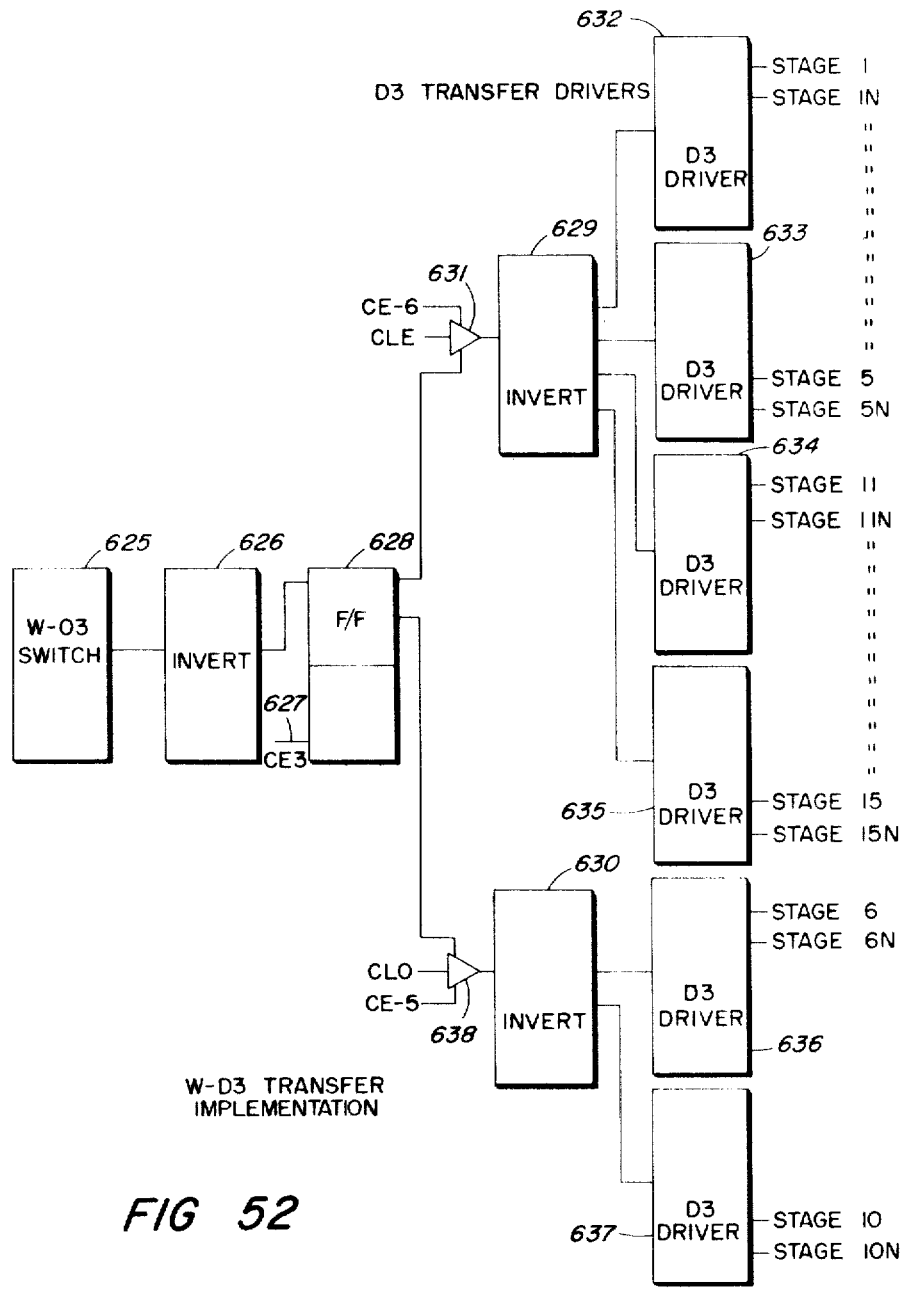

FIGS. 41–52 relate to the T, V, and W registers which are part of the transfer sequence control unit, and in which:

FIG. 41 is a basic block diagram of the T, V, and W registers;

FIG. 42 is a chart showing the transfer link connections of the V register;

FIG. 43 is a chart showing the various sources which are capable of supplying input information into the V register;

FIG. 44 is a chart showing the input connections of the T, V, and W registers;

FIG. 45 is a block diagram showing the T register reset circuit;

FIG. 46 is a block diagram showing the timing implementation of the T and the V registers, and also an additional register D3, which functions as a source for the V register;

FIG. 47 is a block diagram showing the input configuration for a stage of the V register;

FIG. 48 is a set of waveforms showing the timing of the data transfers between the T, V, and W registers;

FIG. 49 is a graph showing the bit assignment of the T and V registers;

FIG. 50 is a block diagram showing the implementation of a T to D1, D2, and R2 transfer;

FIG. 51 is a block diagram showing the implementation for a D3 to D transfer; and FIG. 52 is a block diagram showing the implementation for a W to D3 transfer.

Figure 53:
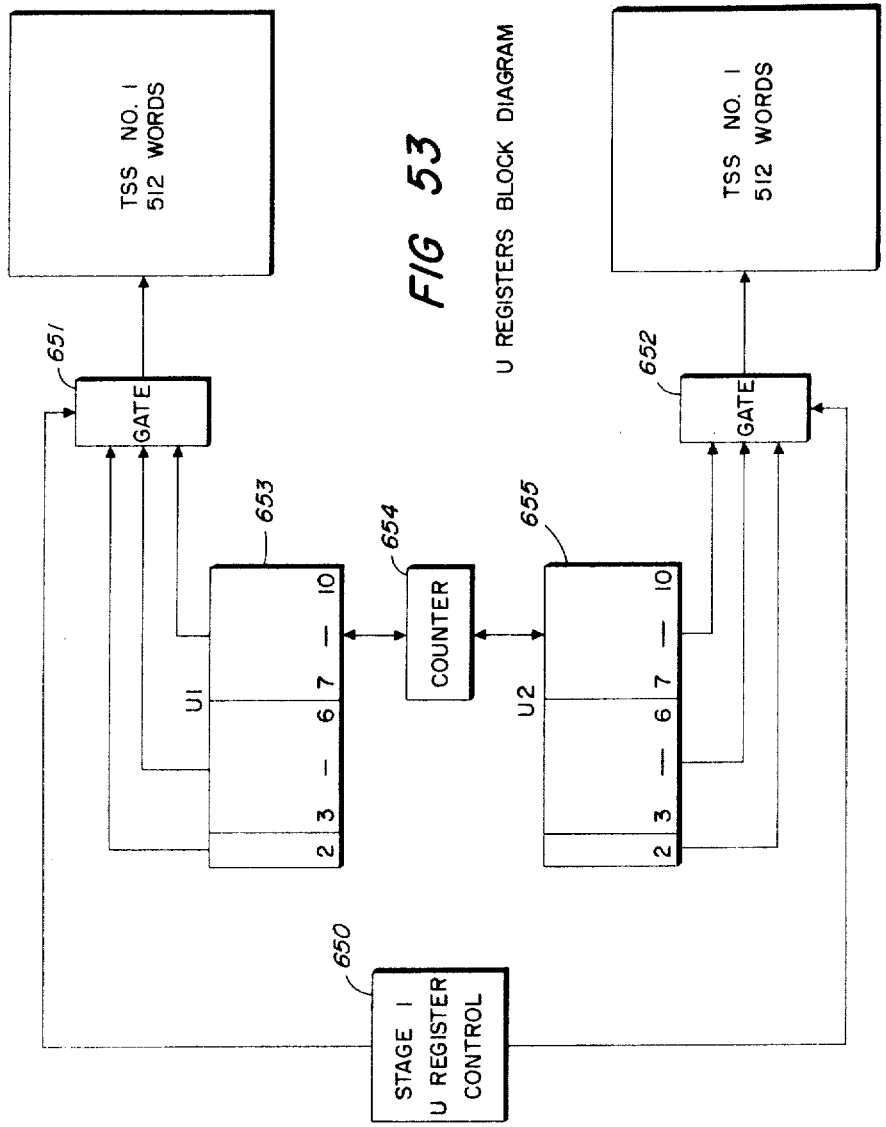
Figure 54:
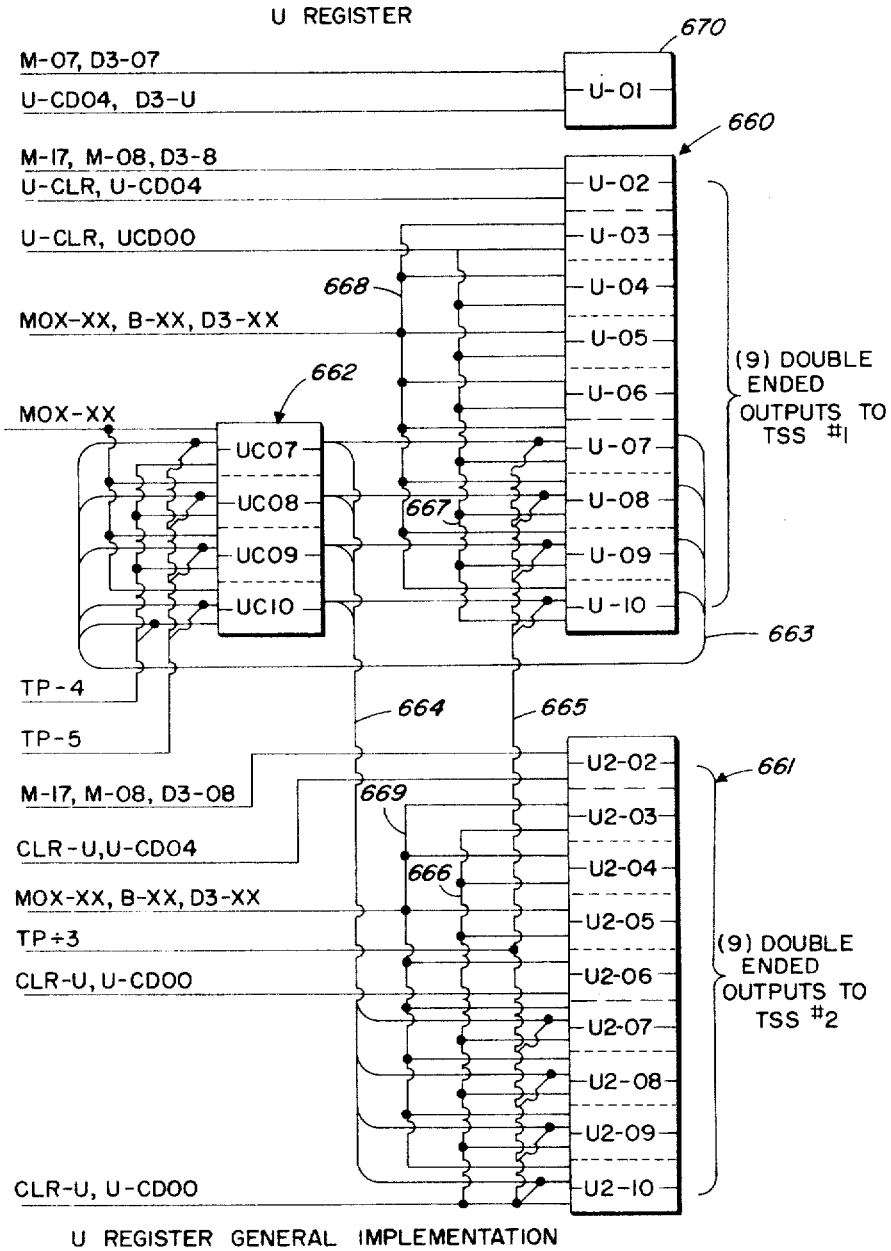
Figure 55:
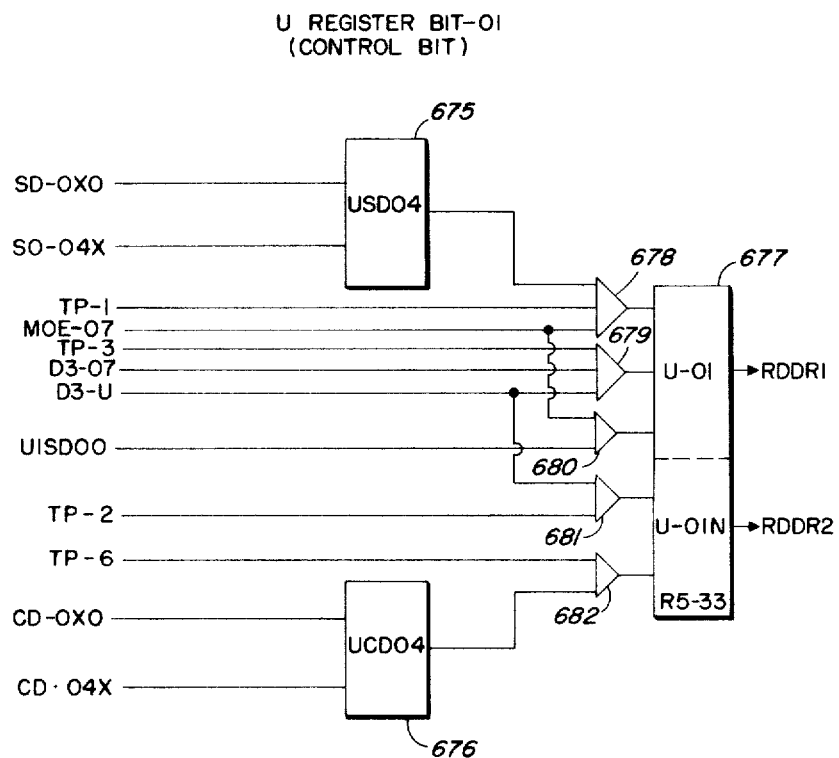
Figure 56:
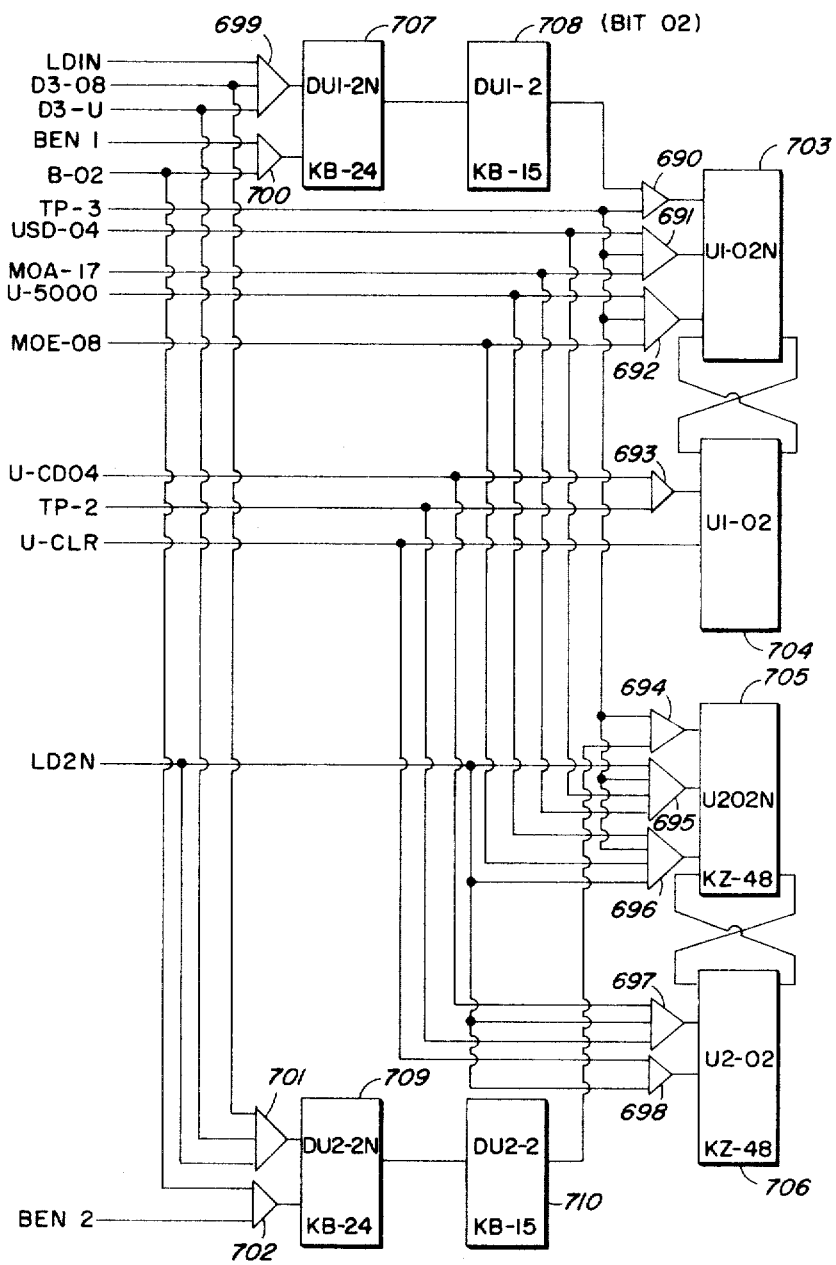
Figure 57:
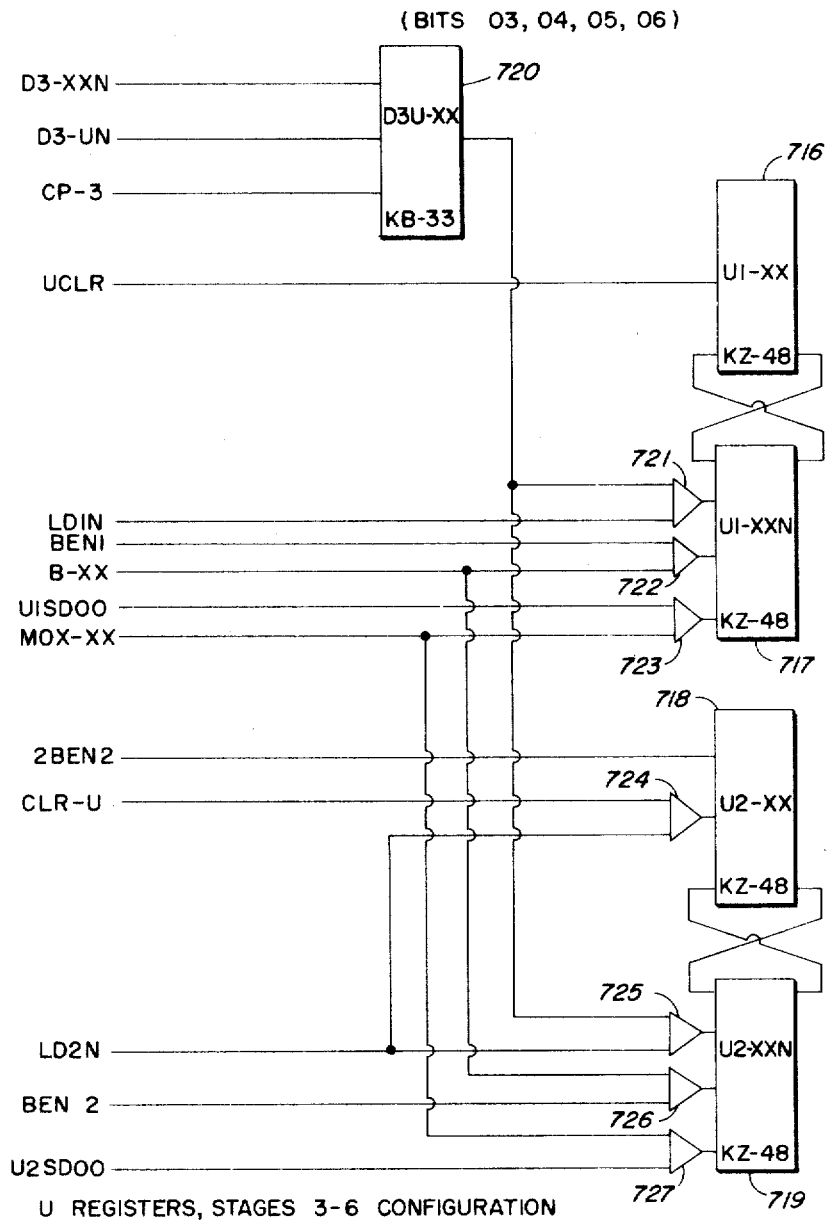
Figure 58:
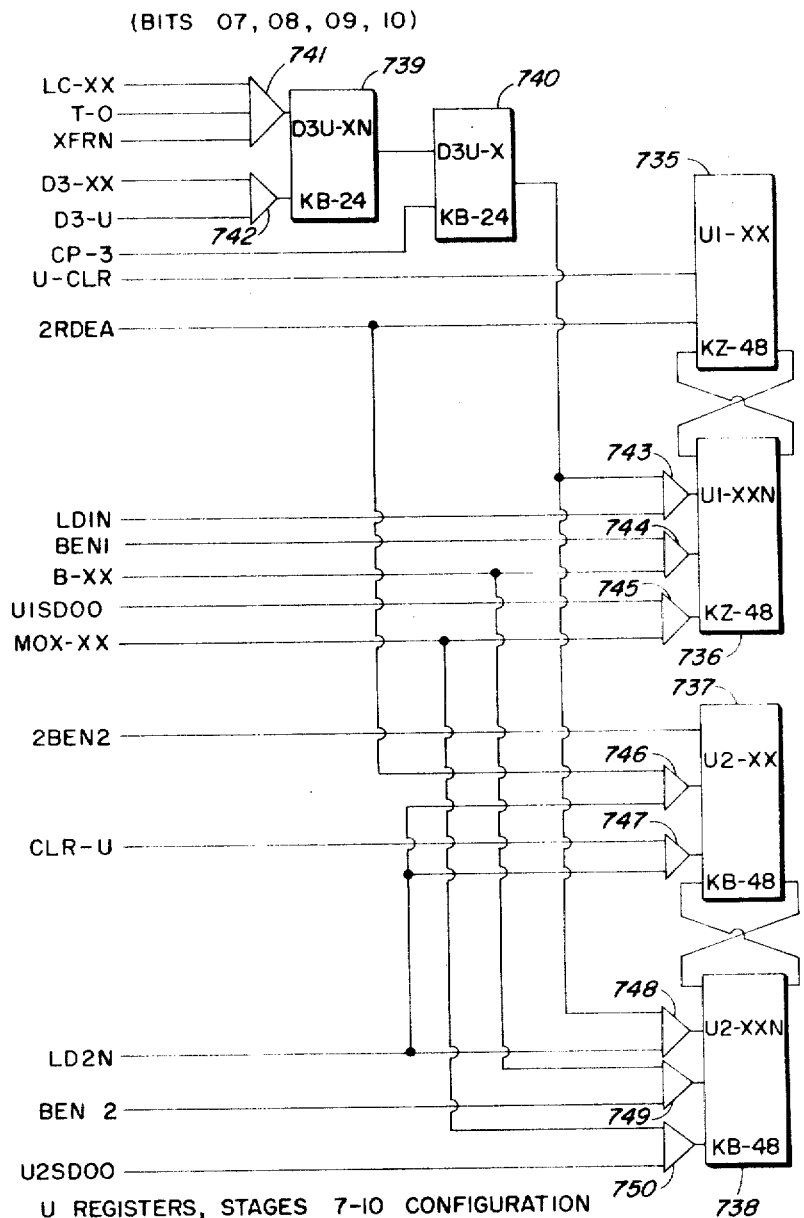
Figure 59:
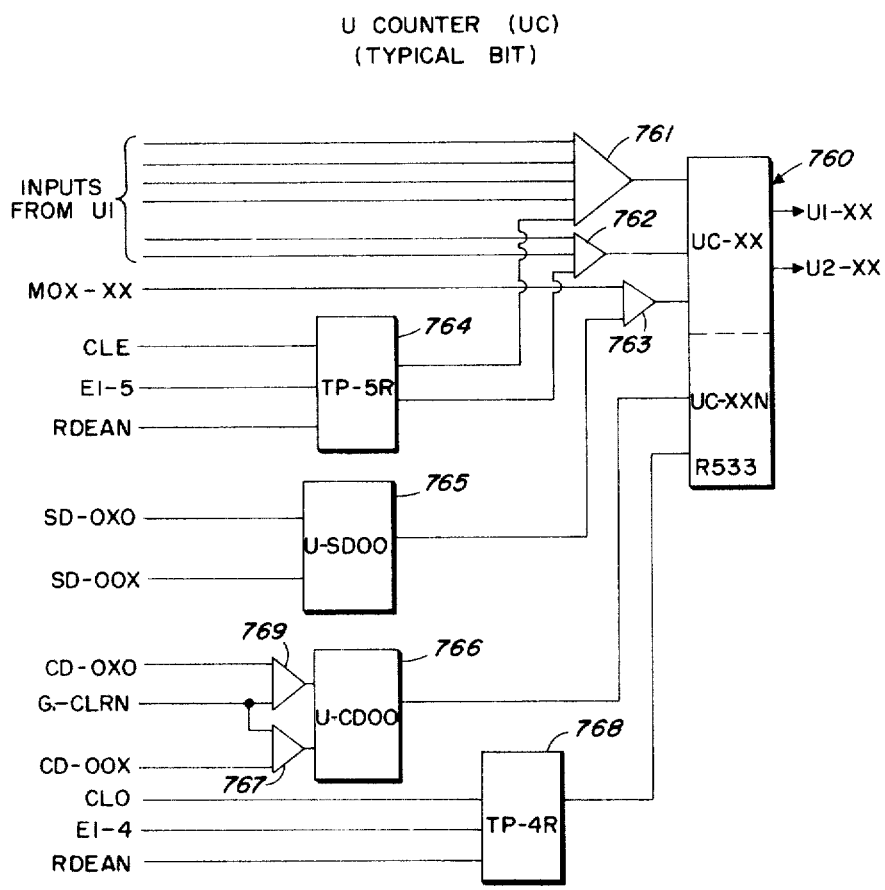
Figure 61:
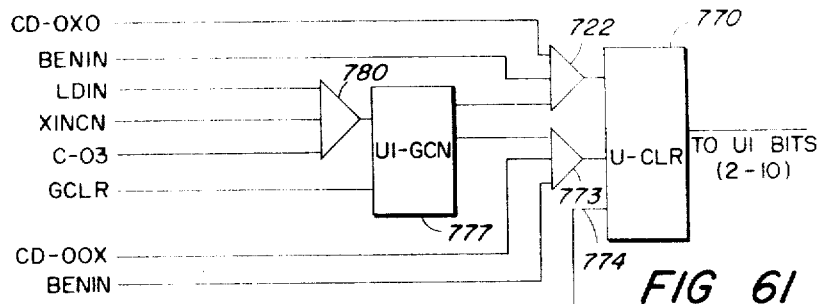
Figure 62:
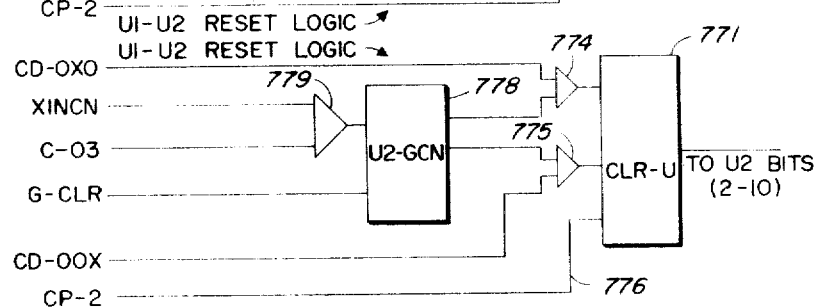
Figure 63:
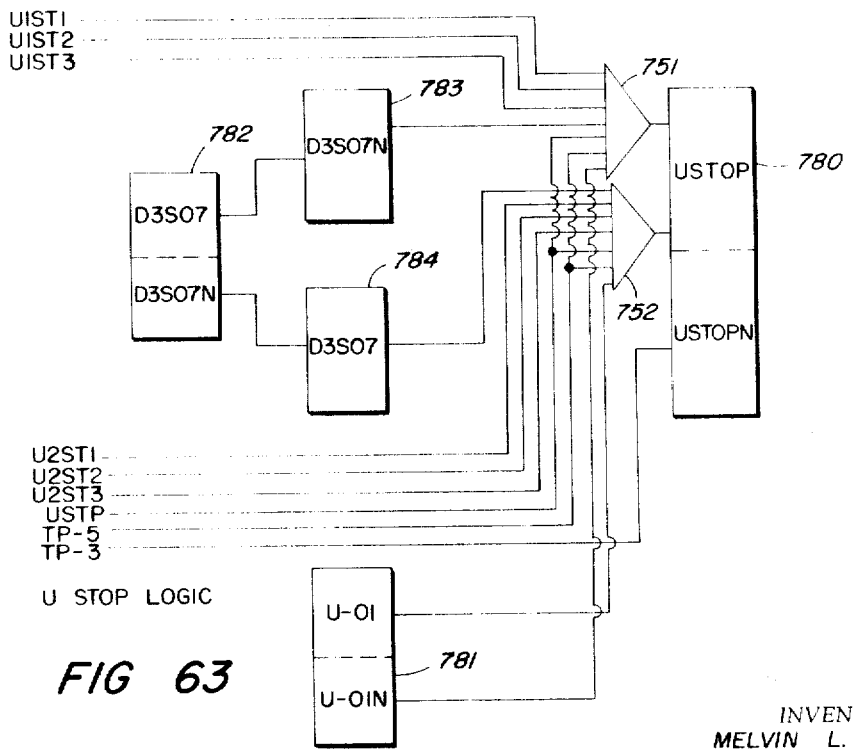
Figure 63A:
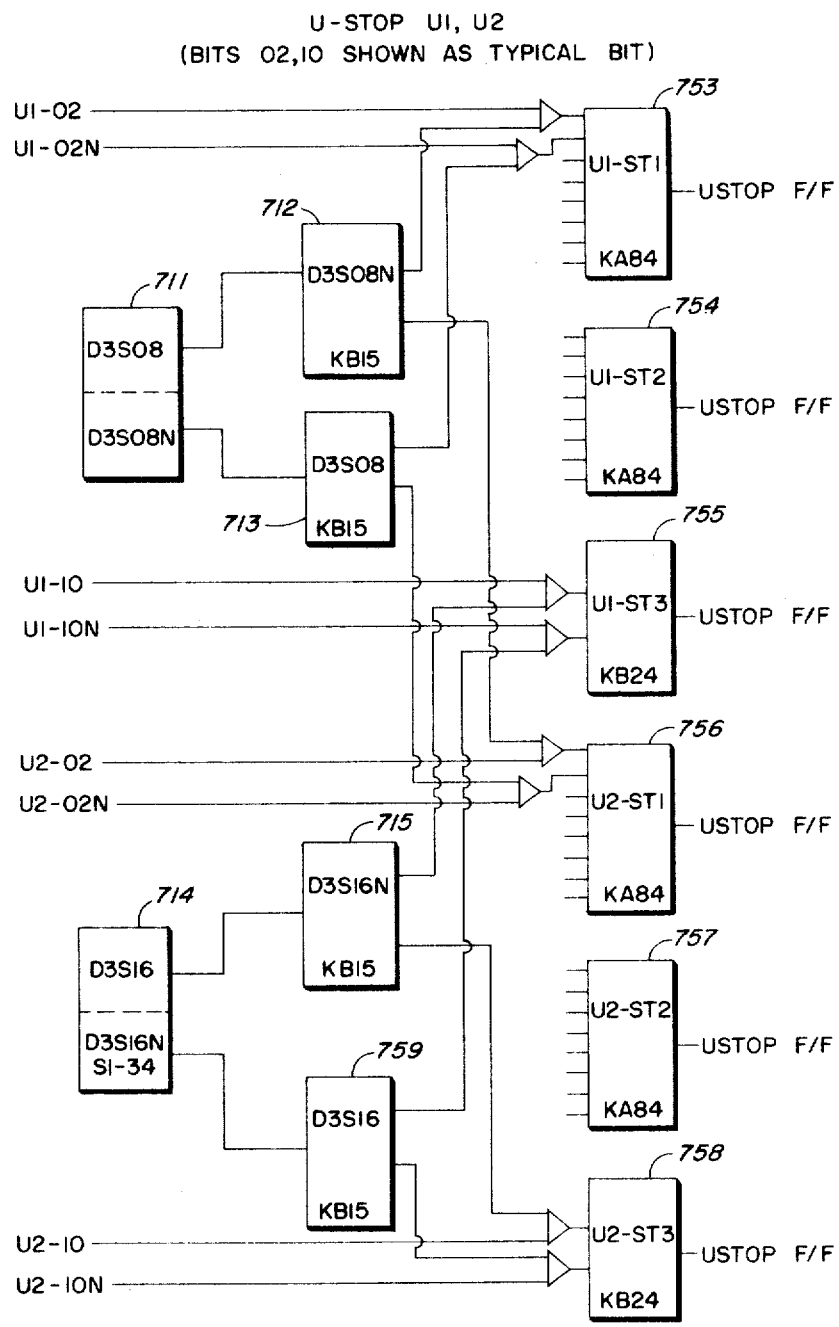

FIGS. 53–63 relate to the U registers, which is also part of the transfer sequence control unit and in which:

FIG. 53 is a general block diagram of the U register unit;

FIG. 54 is another block diagram showing the general implementation of the U registers;

FIG. 55 is a block diagram showing the implementation of stage 1 of the U registers;

FIG. 56 is a block diagram showing the implementation of stage 2 of the U registers;

FIG. 57 is a block diagram showing the implementation of stages 3–6 of the U registers;

FIG. 58 is a block diagram showing the implementation of stages 7–10 of the U registers;

FIG. 59 is a block diagram showing a typical bit of the U counter register;

FIGS. 60, 60a, and 60b comprise an index of various mnemonics used throughout the various parts of the specification, including those mnemonics used in the U register section;

FIG. 61 is a block diagram showing the implementation of the U1 register reset logic;

FIG. 62 is a block diagram showing the implementation for the U2 register reset logic; and FIGS. 63, 63a are diagrams showing the implementation for the U Stop logic.

Figure 67:
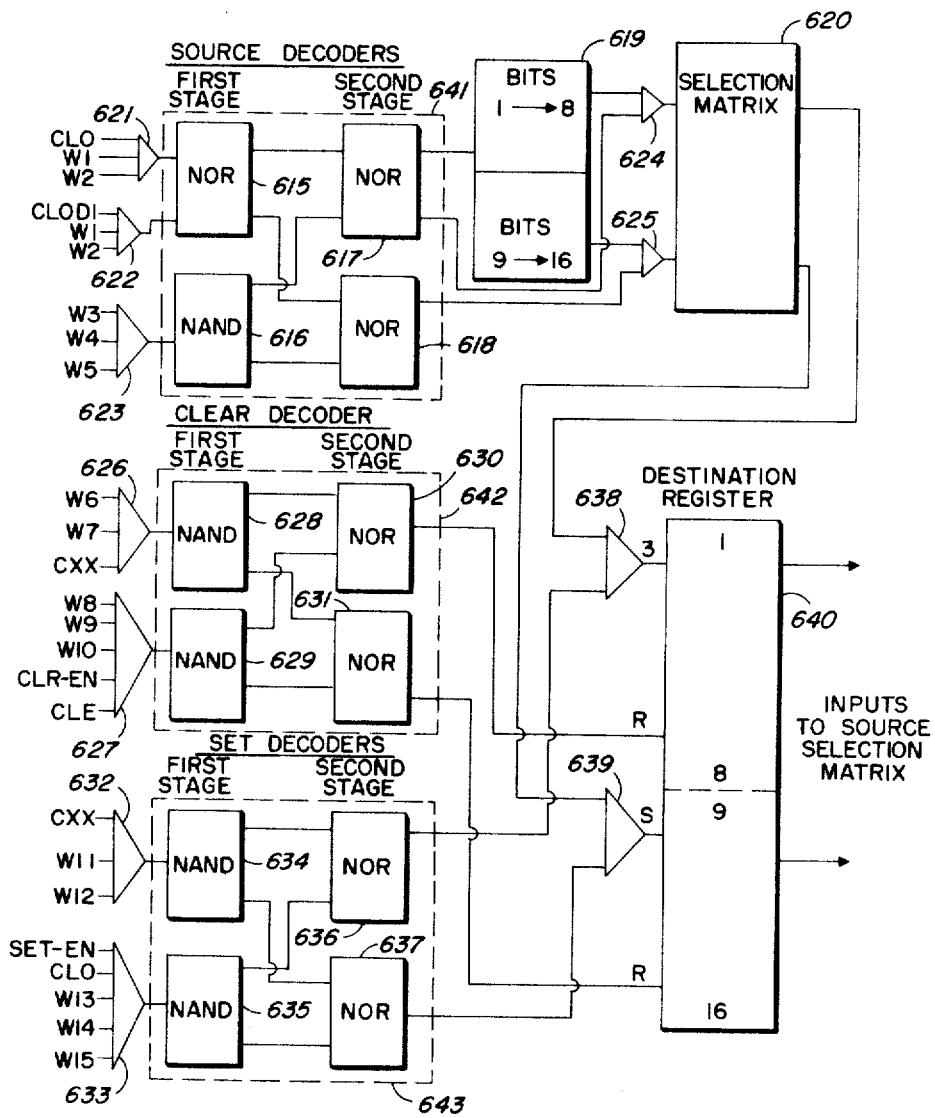
Figure 71:
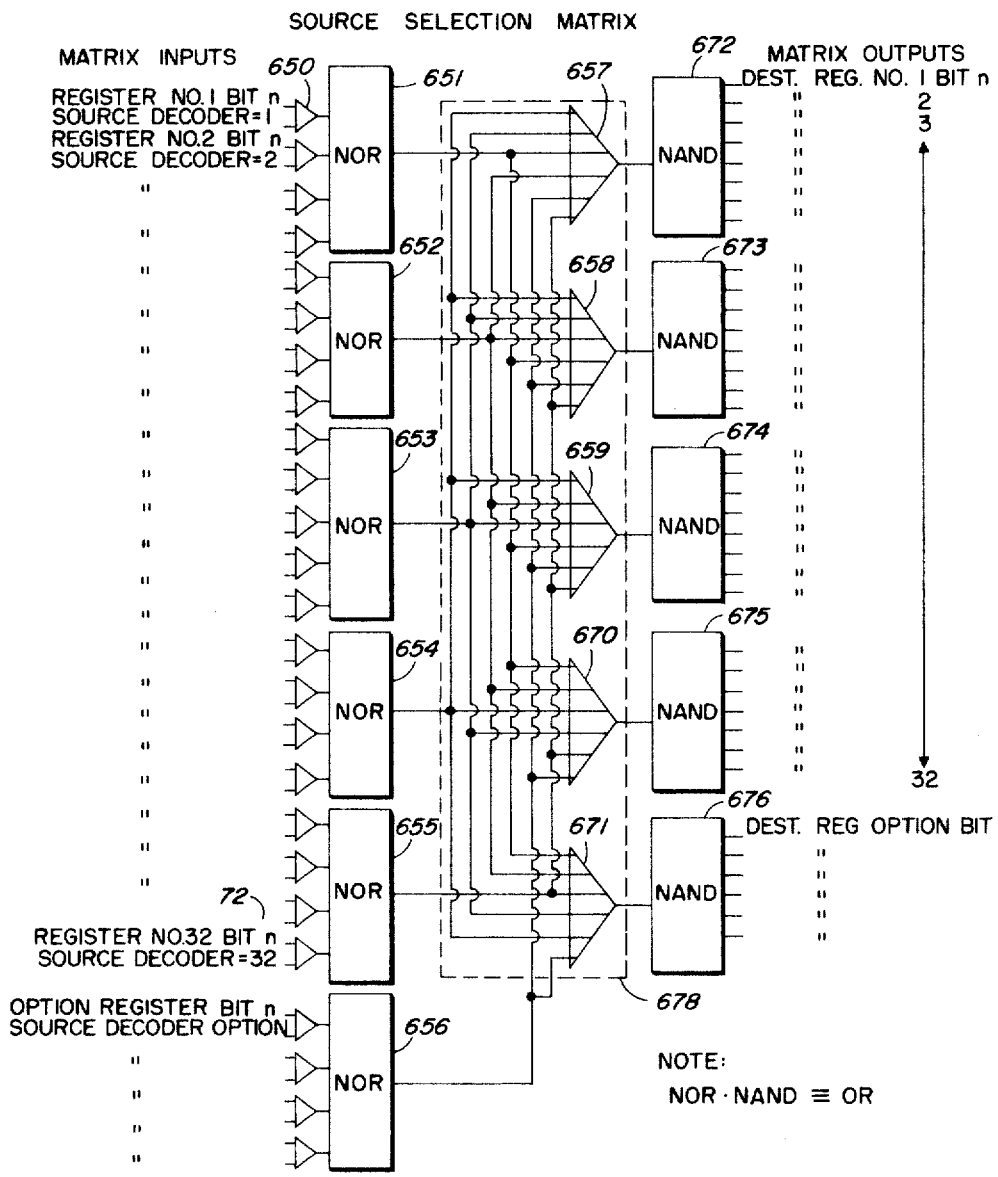
Figure 72:
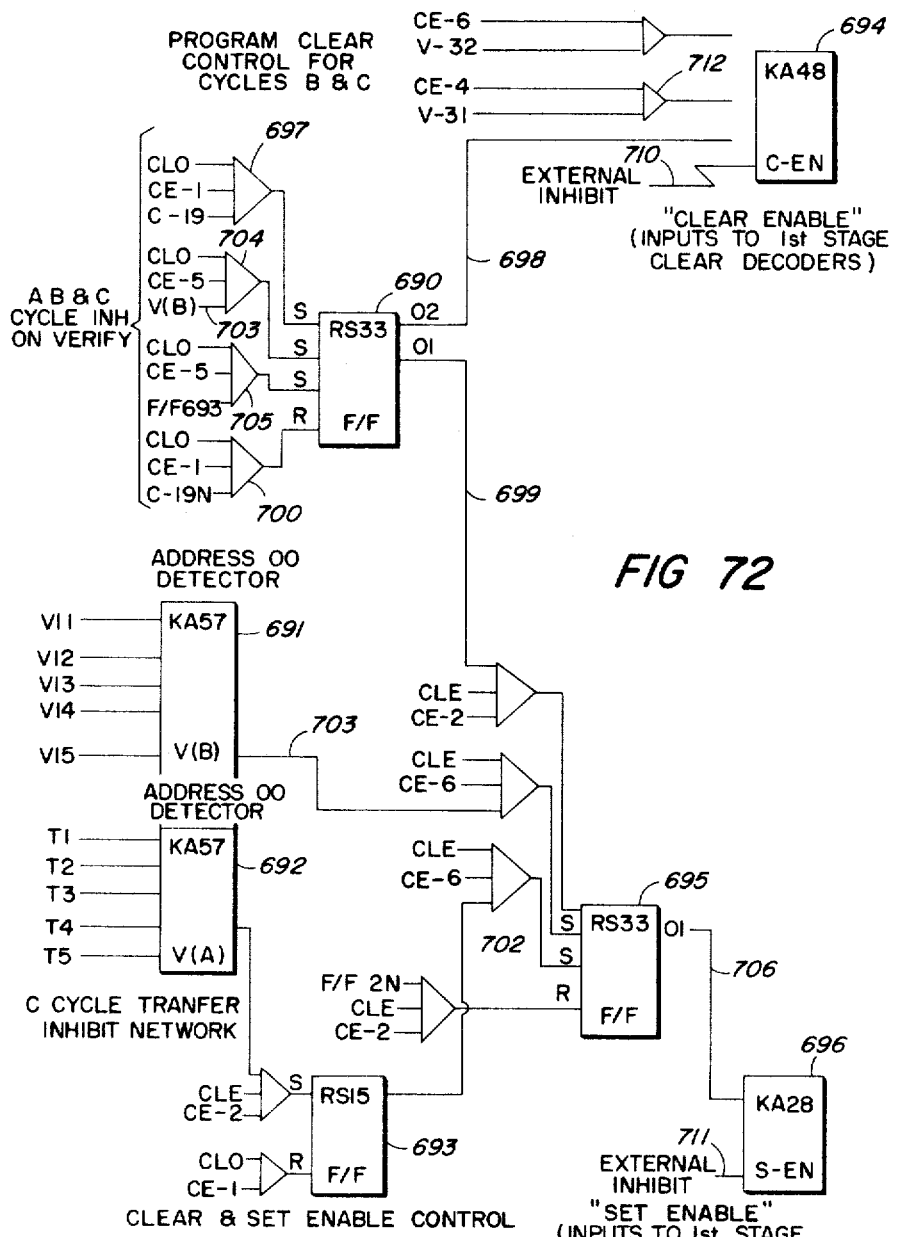

FIGS. 64–73 relate to the transfer link and, more specifically:

FIG. 64 shows a general block diagram of the transfer link;

FIG. 65 is a chart showing the transfer link source connections, i.e., the input matrix;

FIG. 66 is a chart showing the transfer link destination connections, i.e., the output matrix;

FIG. 67 is a block diagram showing the transfer link orientation;

FIG. 68 is a chart showing the register addresses selected by various code settings of the source decoder elements;

FIG. 69 is another chart showing the register addresses selected by various code settings of the set decoder elements;

FIG. 70 is a third chart showing the register addresses selected by the various code settings of clear decoder elements;

FIG. 71 is a typical bit configuration of the source selection matrix;

FIG. 72 is a block diagram showing the clear and set enable control circuits; and FIG. 73 is a chart showing additional information concerning the transfer link connections.

Figure 75:
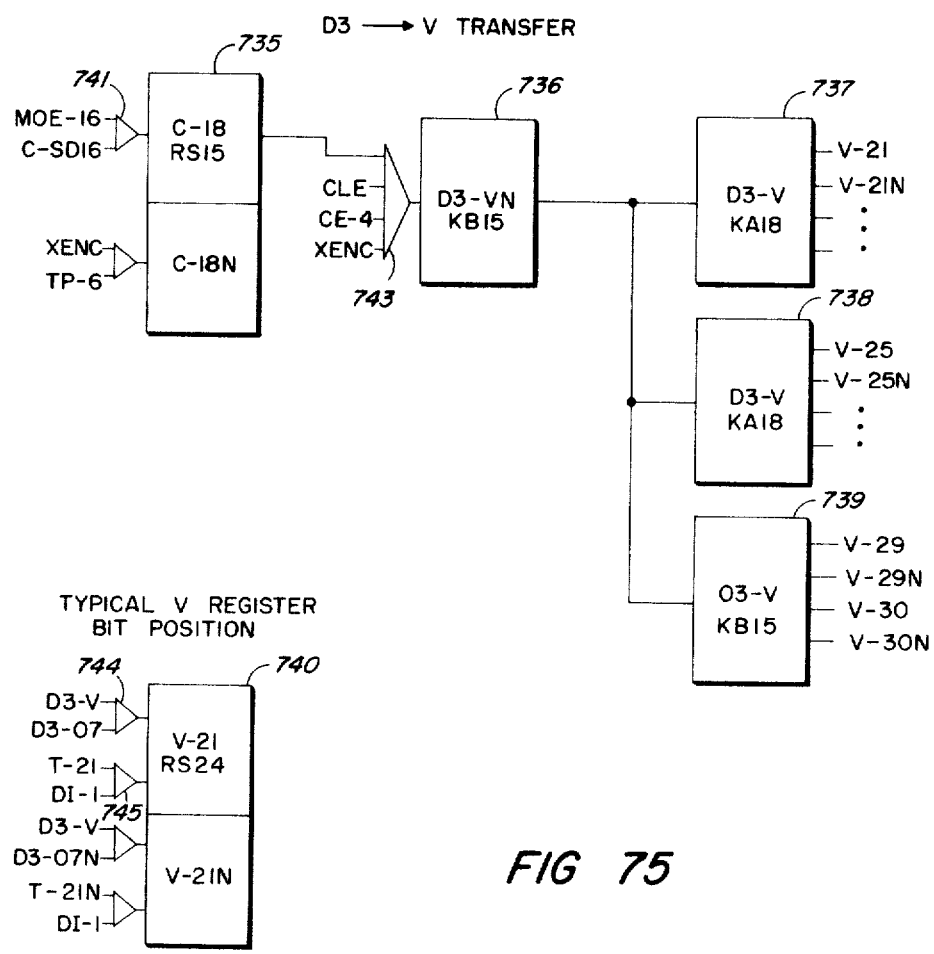
Figure 76:
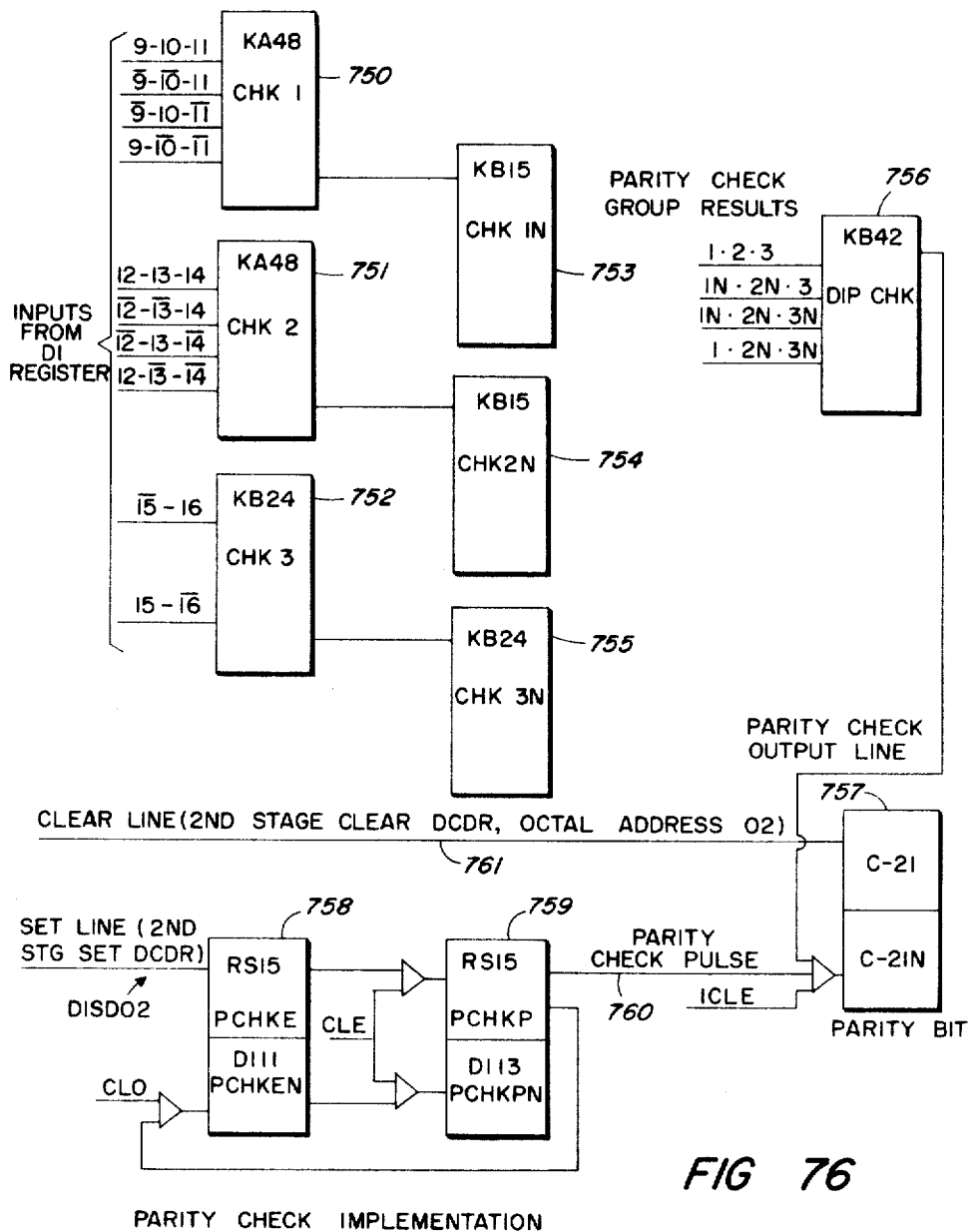

FIGS. 74–77 relate to the D registers and, more specifically:

FIG. 74 shows a block diagram for the implementation of a T to D1, D2, and R2 transfer;

FIG. 75 shows a block diagram for the implementation of a D3 to D transfer;

FIG. 76 shows a block diagram for implementing of the parity check; and

Figure 77:
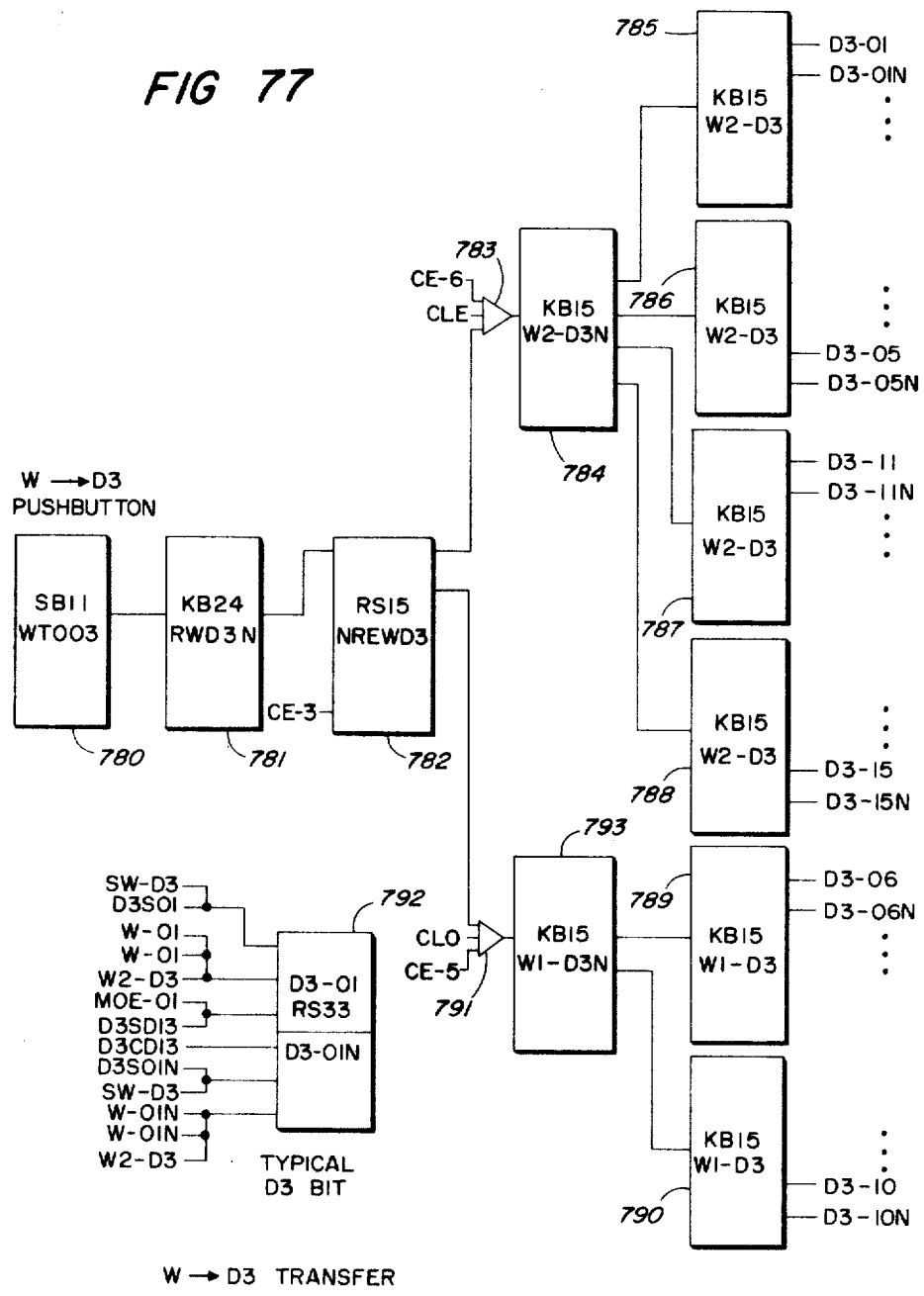

FIG. 77 shows the implementation for a W to D3 transfer.

Figure 78:
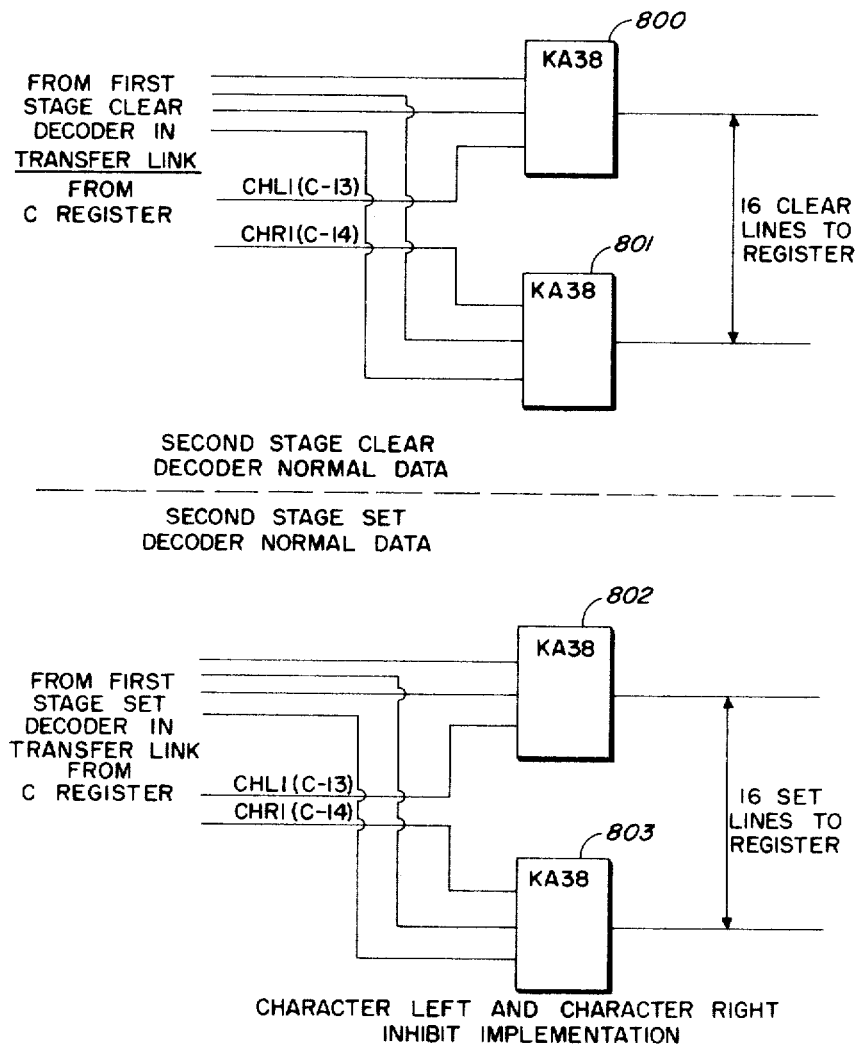
Figure 79:
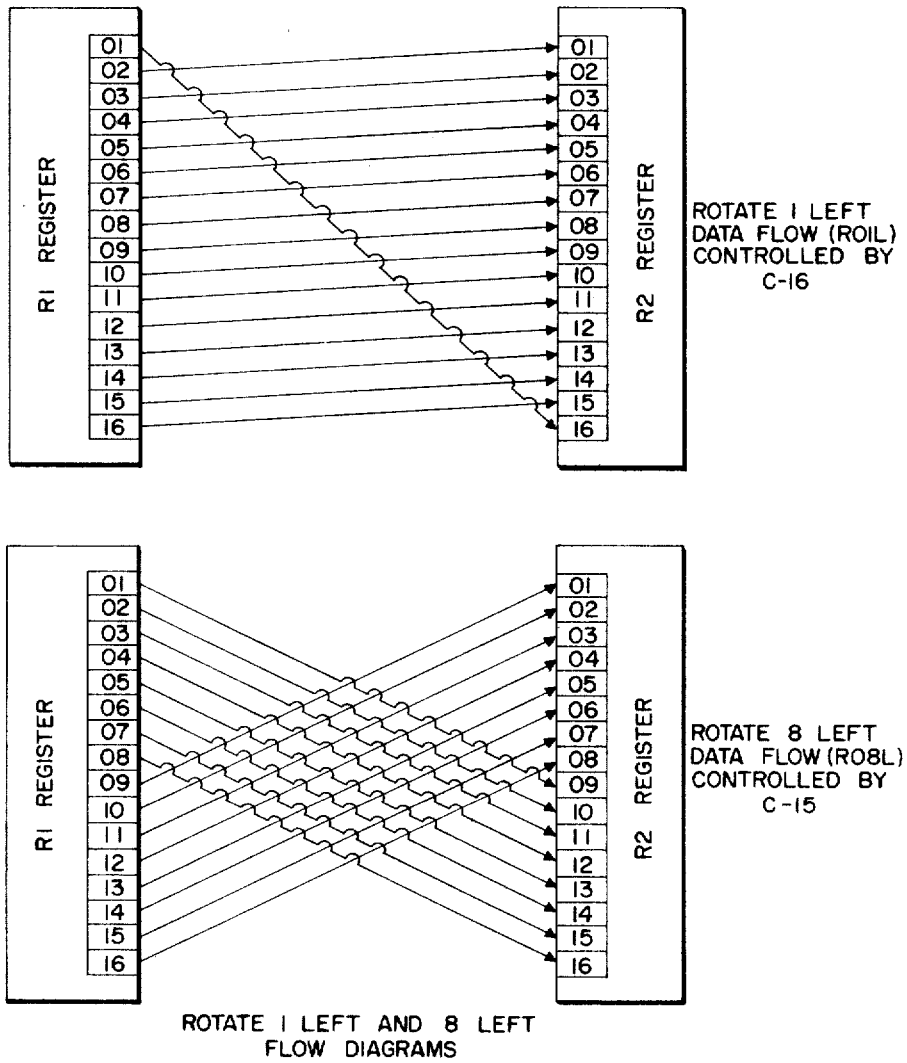
Figure 80:
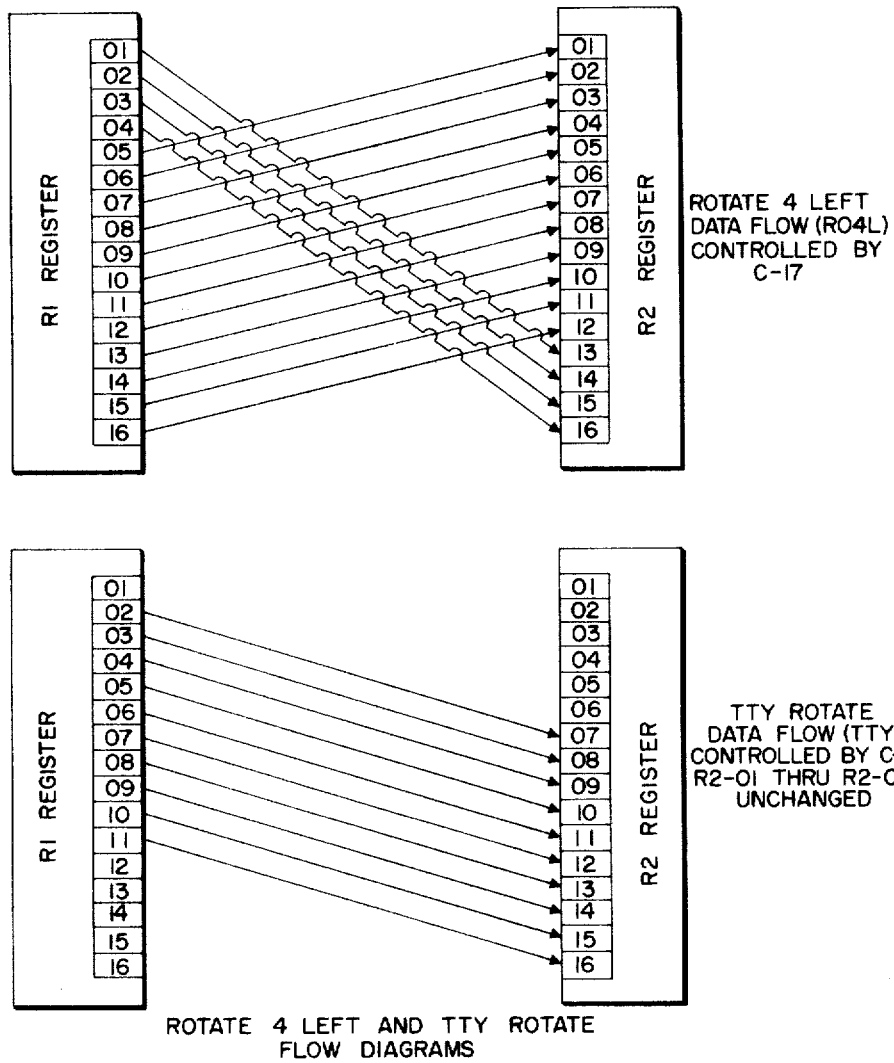
Figure 86:
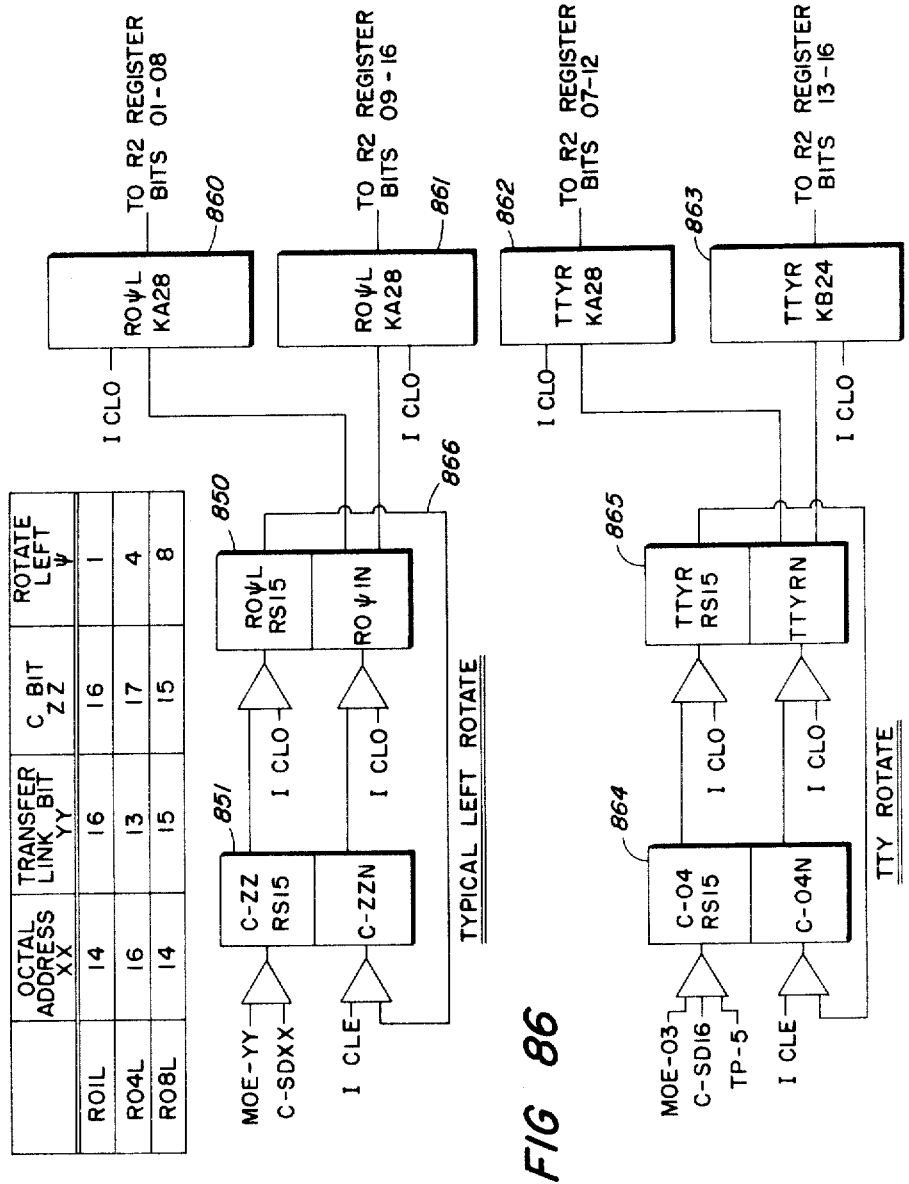
Figure 87:
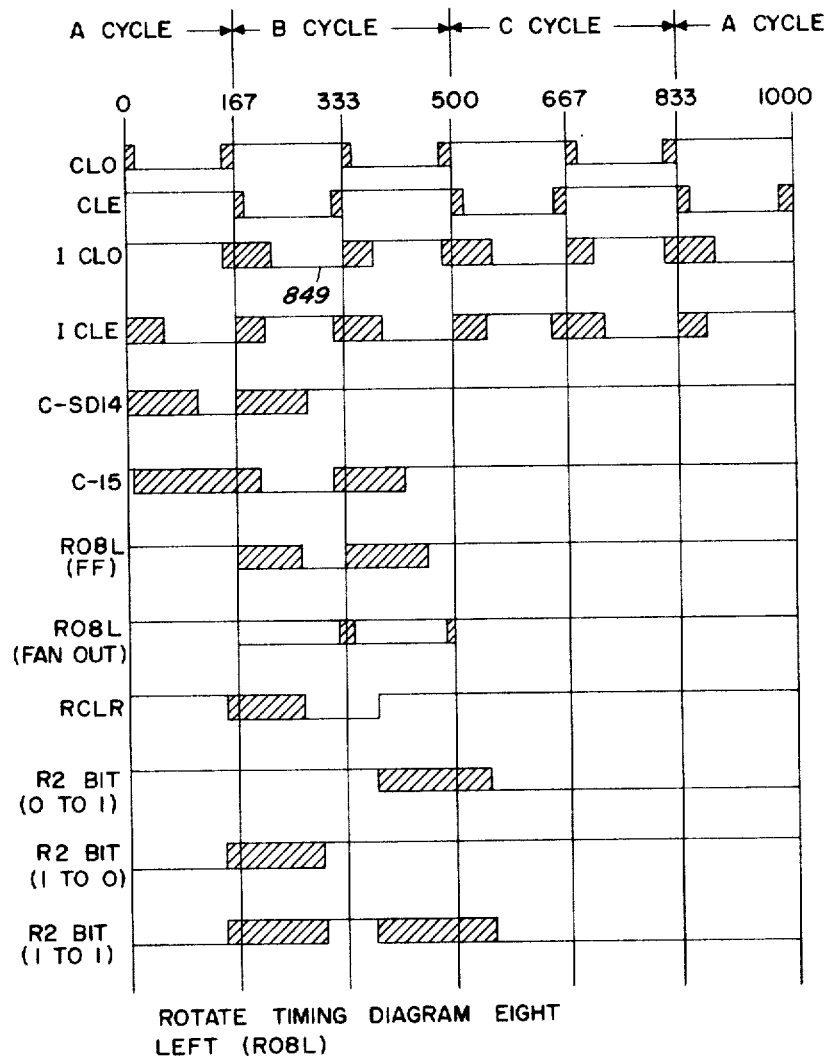

FIGS. 78–87 relate to the R register and, more specifically:

FIG. 78 shows the block diagram for the implementation of the character left and character right inhibit functions;

FIG. 79 is a flow diagram of the rotate 1 left and rotate 8 left functions;

FIG. 80 is a flow diagram for the rotate 4 left and the Teletype rotate function;

FIG. 81 is a chart showing the logic equations for combined rotate commands;

FIG. 82 is a chart showing the transfer link inputs of bit 17 of the transfer link for various addresses of the transfer link, and specifically shows the fan-out feature of the R1 register;

FIG. 83 shows the implementation of a typical bit of the R1 register;

FIG. 84 shows the implementation of a typical bit of the R2 register;

FIG. 85 is a general block diagram for the R1 and R2 registers;

FIG. 86 is a block diagram showing the means for implementing the rotate functions of the R1 and R2 registers; and FIG. 87 is a set of waveforms showing for a rotate 8 left function.

Figure 88:
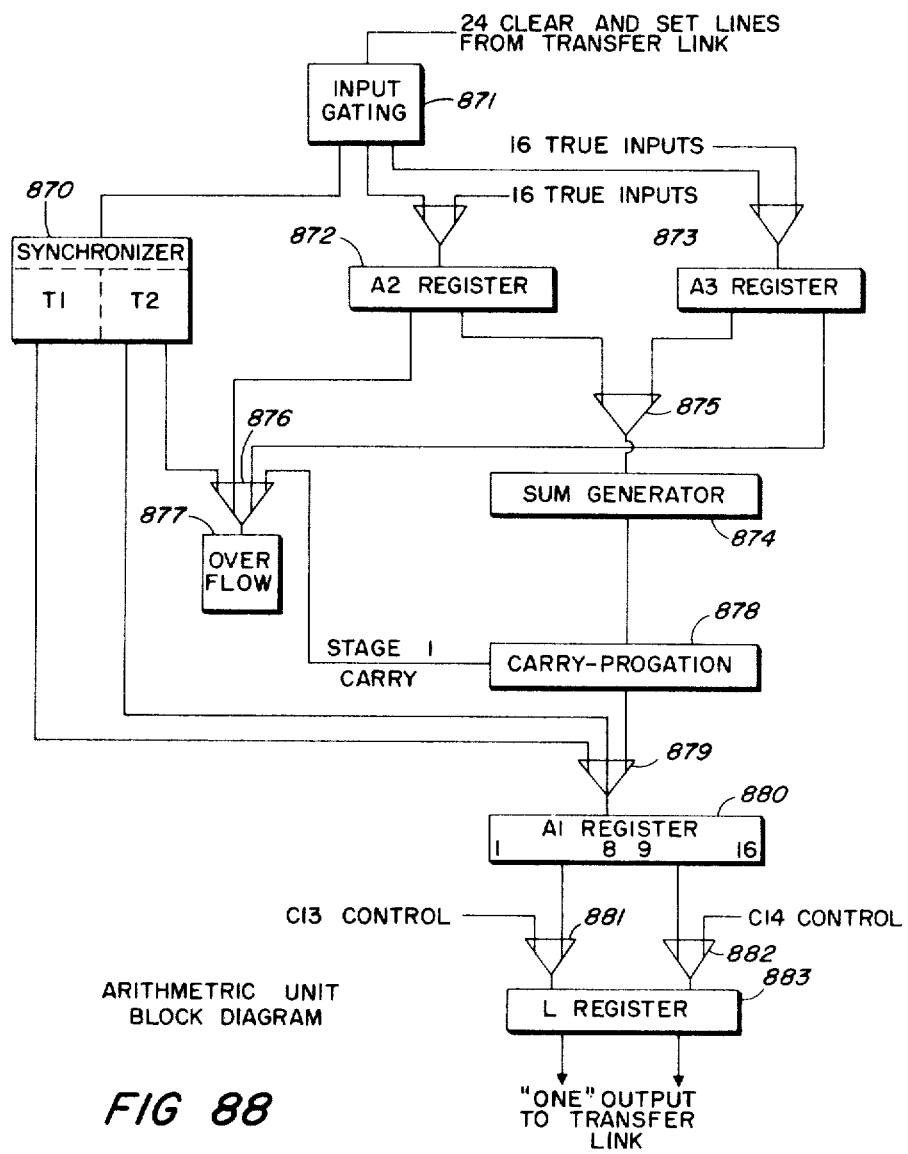
Figure 89:
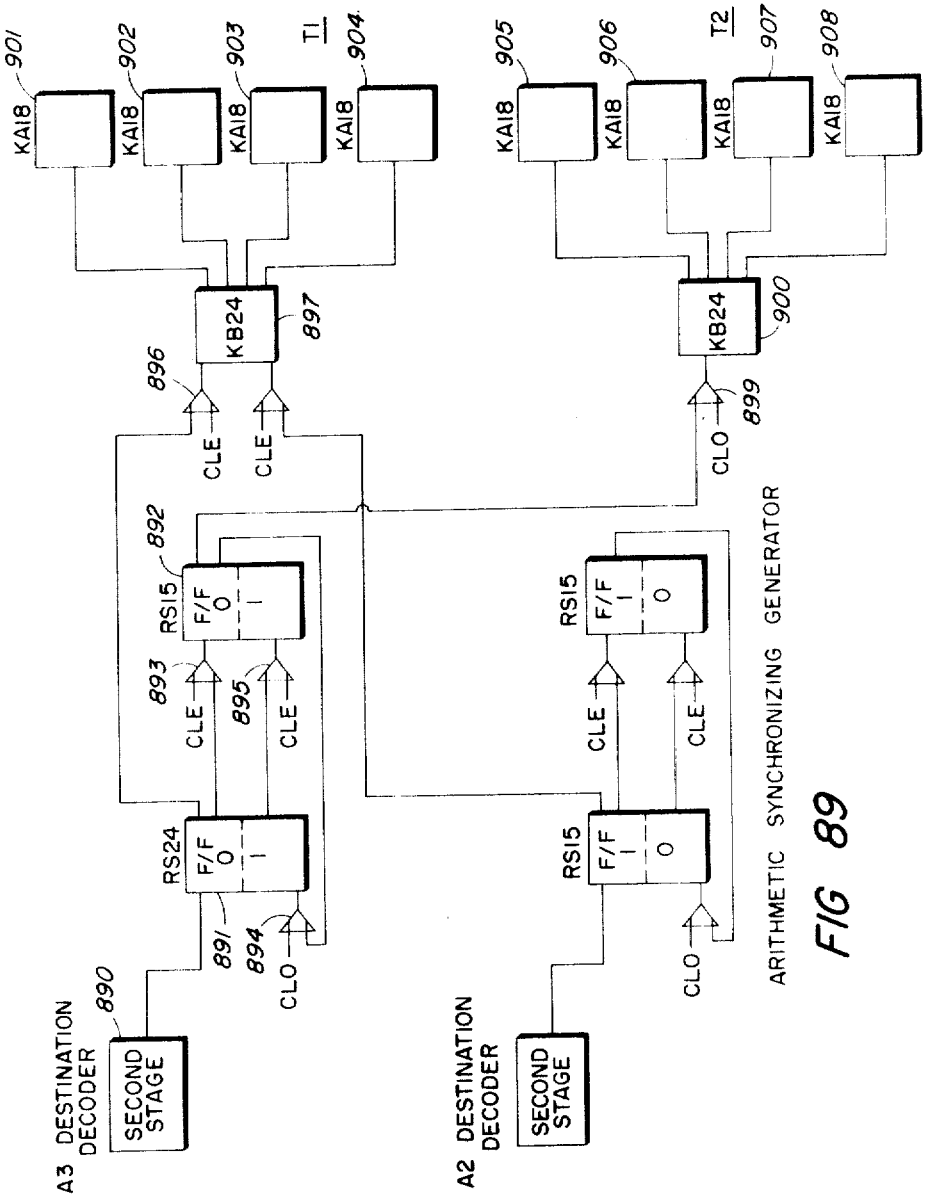
Figure 90:
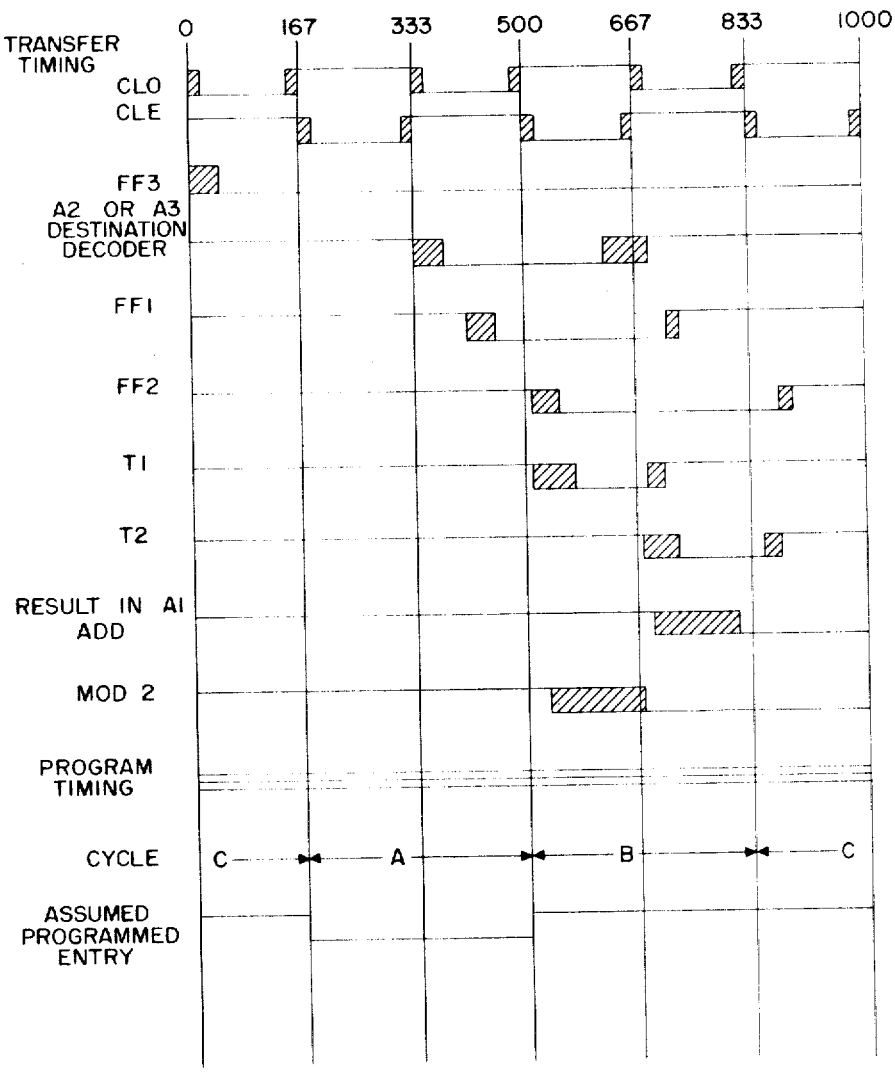

FIGS. 88–91 relate to the A registers and, more specifically:

FIG. 88 is a block diagram of the over-all arithmetic unit which includes the A registers;

FIG. 89 is a block diagram showing the arithmetic synchronizing generator;

FIG. 90 is a set of waveforms showing the timing for the arithmetic unit; and

FIG. 91 is a chart showing the operational steps of a full addition operation and also a modulo 2 sum operation.

Figures 93, 95:
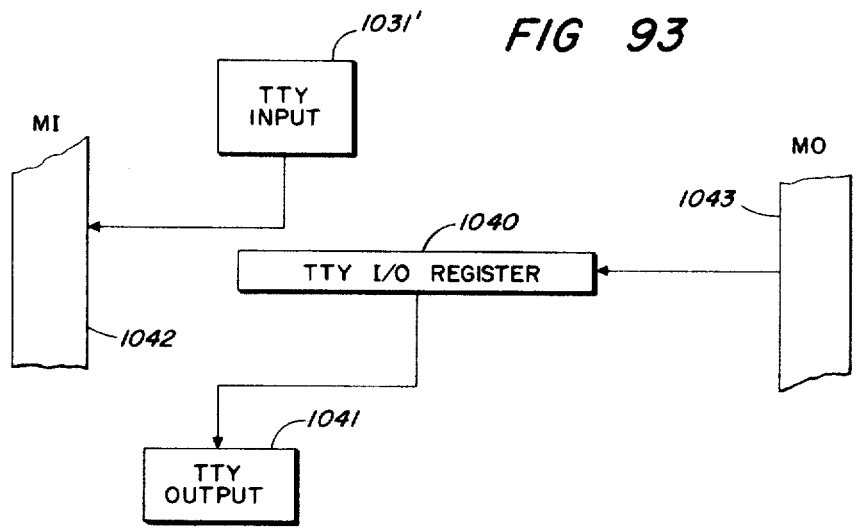
Figure 96:
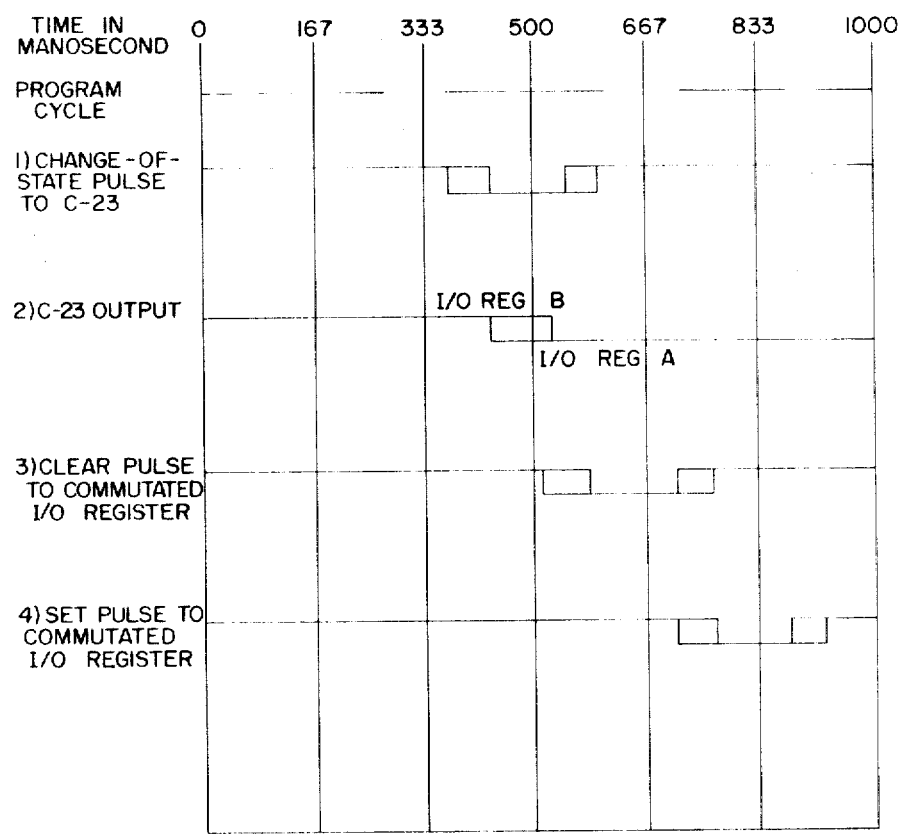

FIGS. 92–98 relate to the output registers and, more specifically:

FIG. 92 is a block diagram showing the wiring implementation for one of the input/output registers;

FIG. 93 is a block diagram showing the general operational relationship between a Teletype machine, an input-output register, and the input and output matrices;

FIG. 94 is a general block diagram showing the implementation of the A and B registers of a pair of commutatable registers employed in connection with transferring information to a battery of Teletype machines;

FIG. 95 is a chart showing the circuit changes required in the input/output registers to adapt them to single operation or to a commutatable operation which is employed when used with a battery of Teletype machines;

FIG. 96 is a set of waveforms showing the timing control exercised over the input/output registers by a particular bit of control register;

FIG. 97 is a block diagram showing two choices or options in which the input/output registers may be employed; and FIG. 98 is another block diagram showing two additional options in which the input/output registers of a pair of commutatable registers may be employed.

Figure 99:
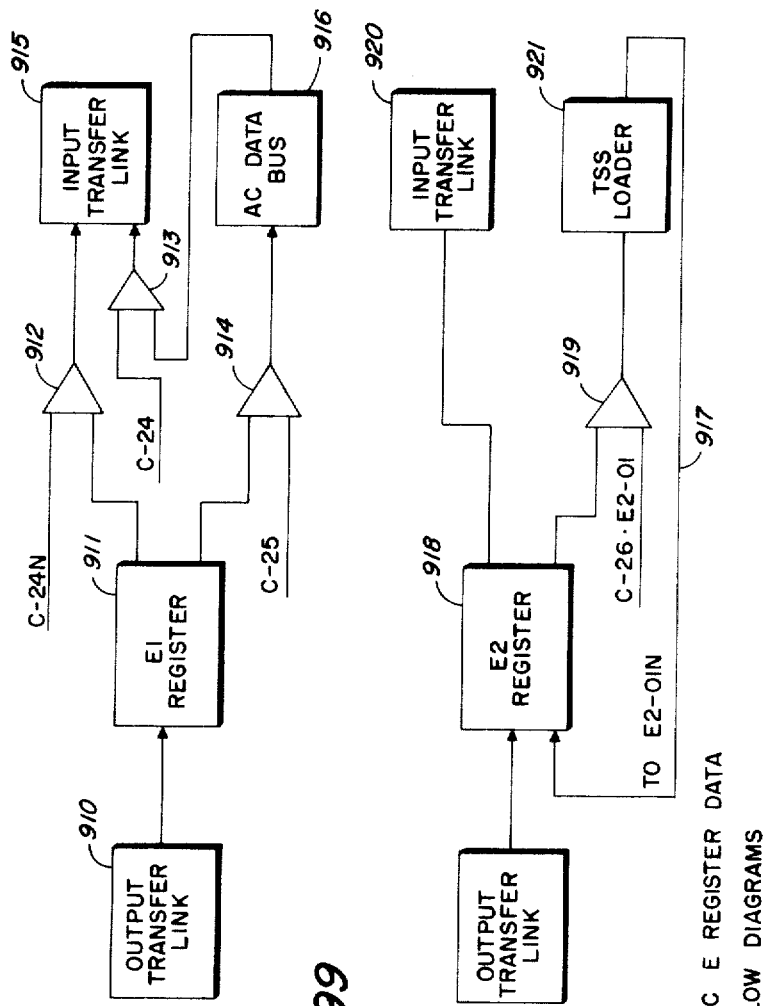
Figure 100:
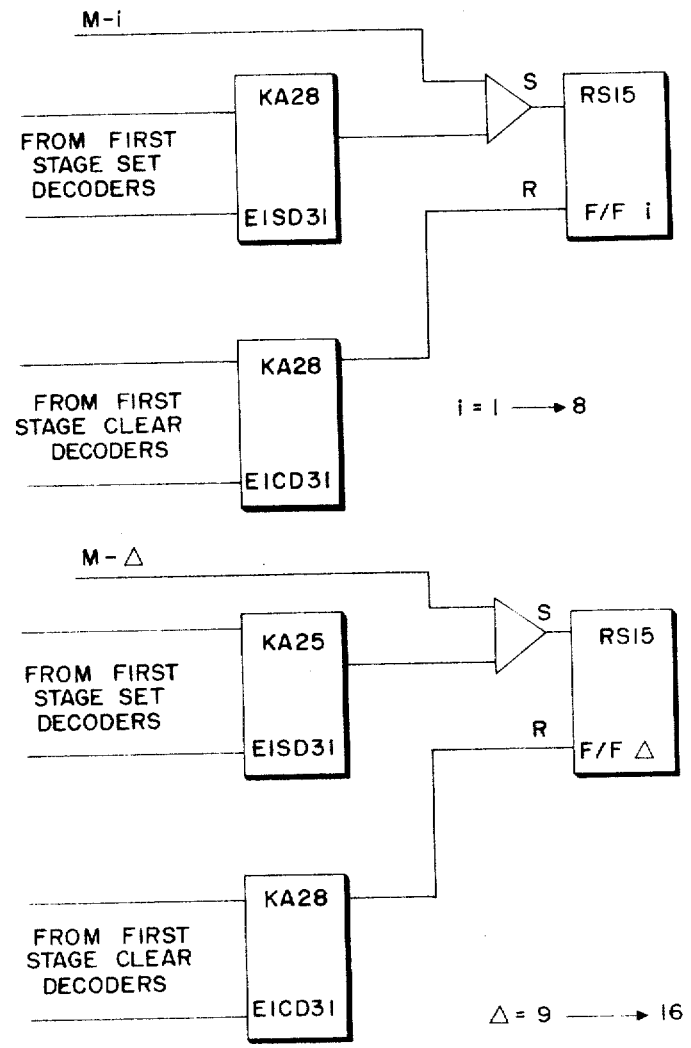
Figure 101:
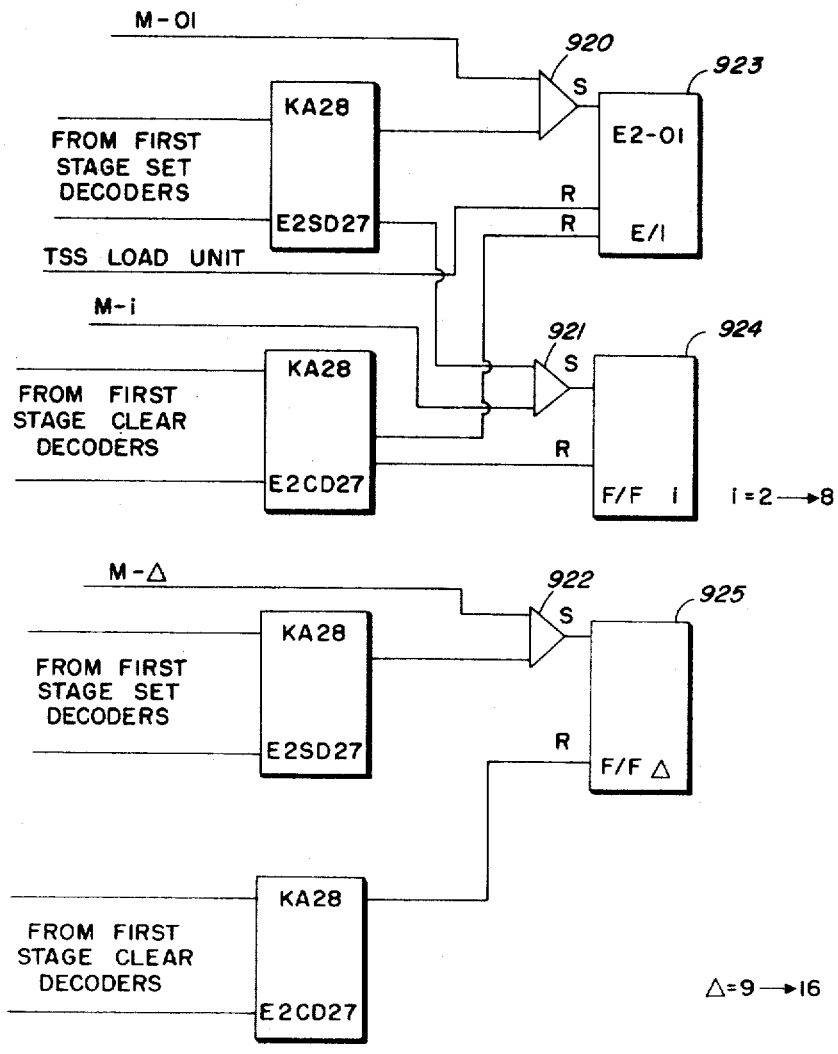

FIGS. 99–101 relate to the E register and, more specifically:

FIG. 99 is a basic block diagram of the E register function;

FIG. 100 is a block diagram showing the input mechanization for one of the E registers; and FIG. 101 is a block diagram showing the input mechanization for the other of the E registers.

Figure 102:
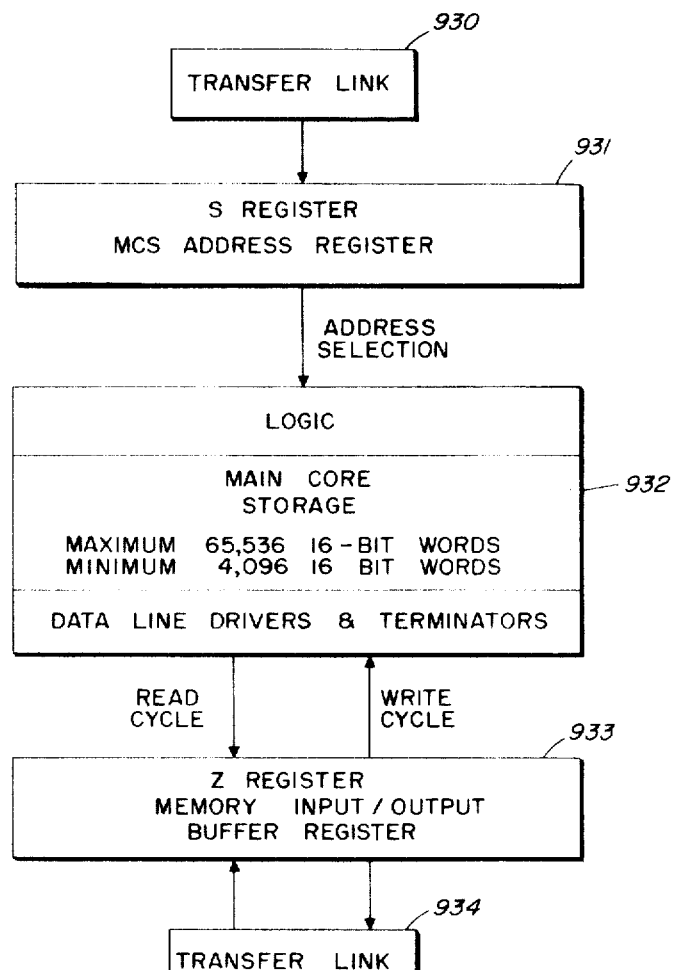
Figure 103:
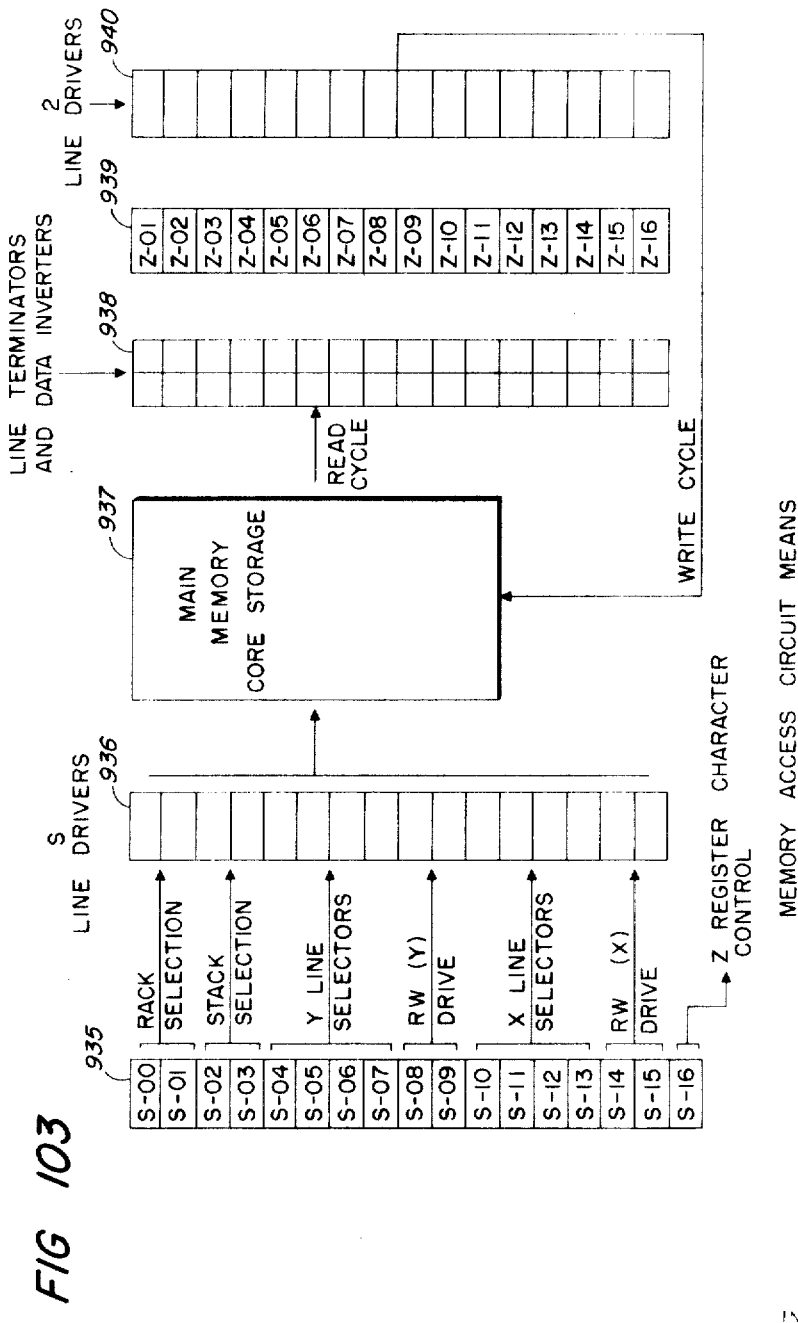
Figure 104:
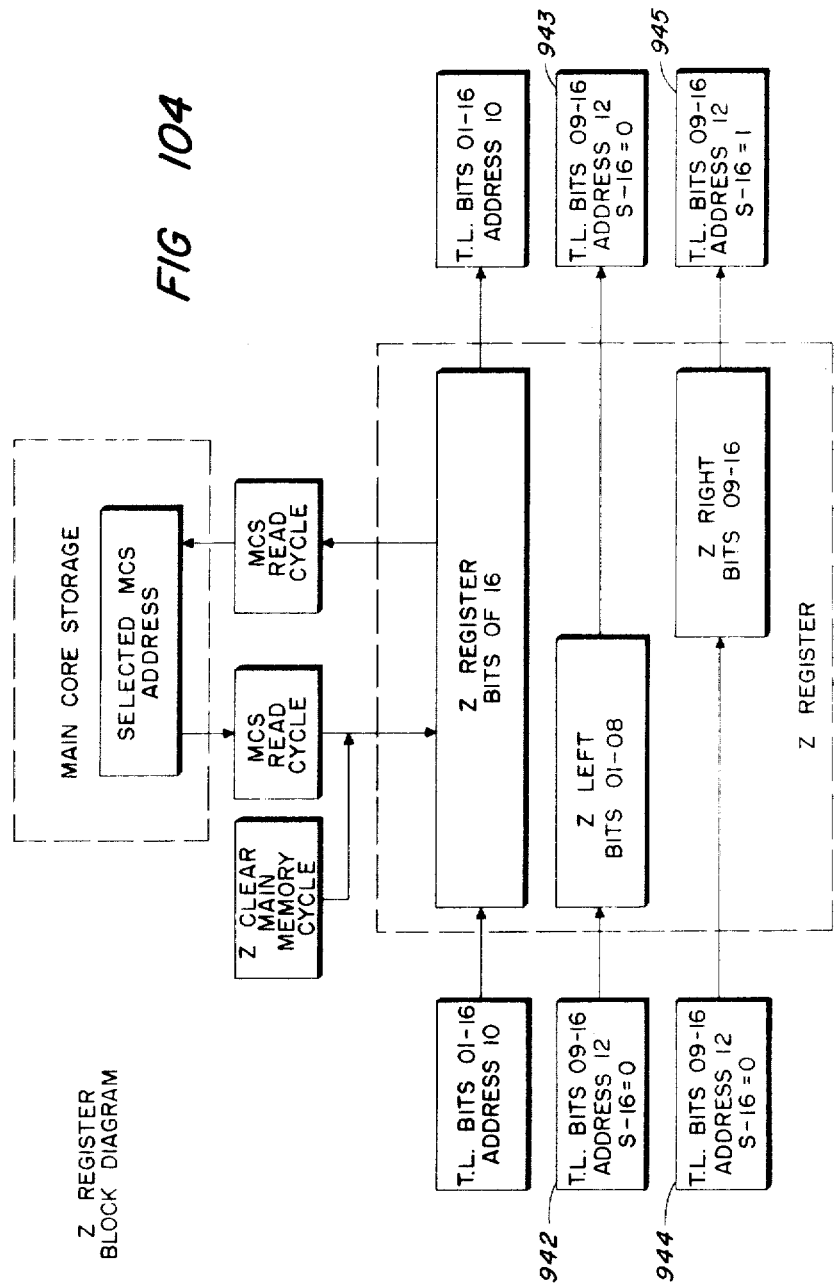
Figure 110:
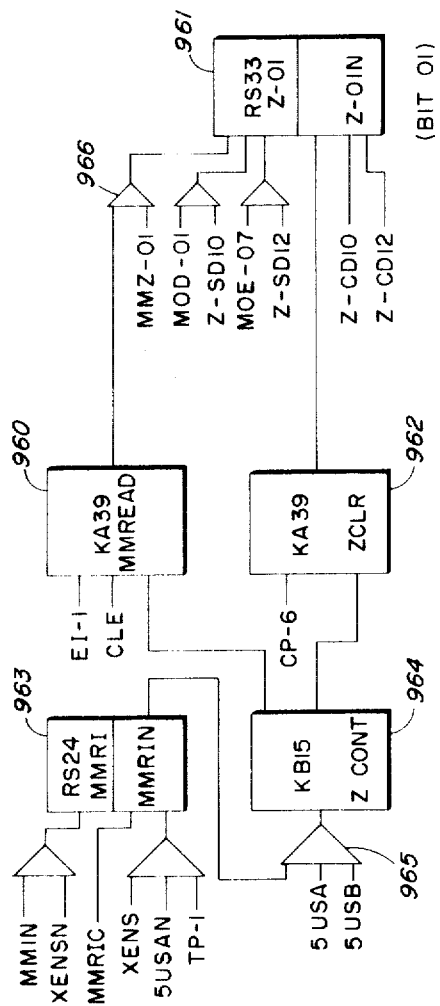

FIGS. 102–110 relate to the S and Z registers and, more specifically:

FIG. 102 is a generalized block diagram of the main memory and the means for accessing said main memory;

FIG. 103 is another block diagram showing in more detail the circuitry for accessing the main memory;

FIG. 104 is a block diagram of the Z register as it relates to the transfer link and the main memory;

FIG. 105 is a chart showing the modes of operation with the main memory from and to the Z register;

FIG. 106 is a block diagram showing the implementation for the S register;

FIG. 107 is a set of waveforms showing the timing required in accessing the main memory;

FIG. 108 is a block diagram showing the inhibiting circuit employed in addressing the main memory;

FIG. 109 shows in diagram form the S register indicators;

FIG. 110 is a block diagram showing the implementation for the Z register; and

FIG. 111 is a table showing in chart form the implementation for the Z register.

Figure 112:
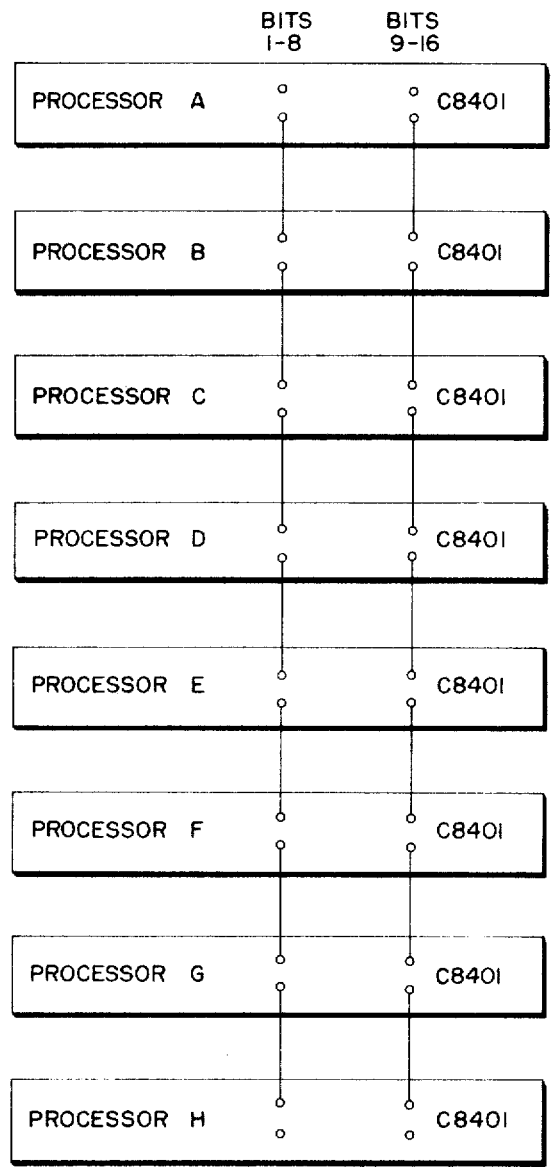
Figure 113:
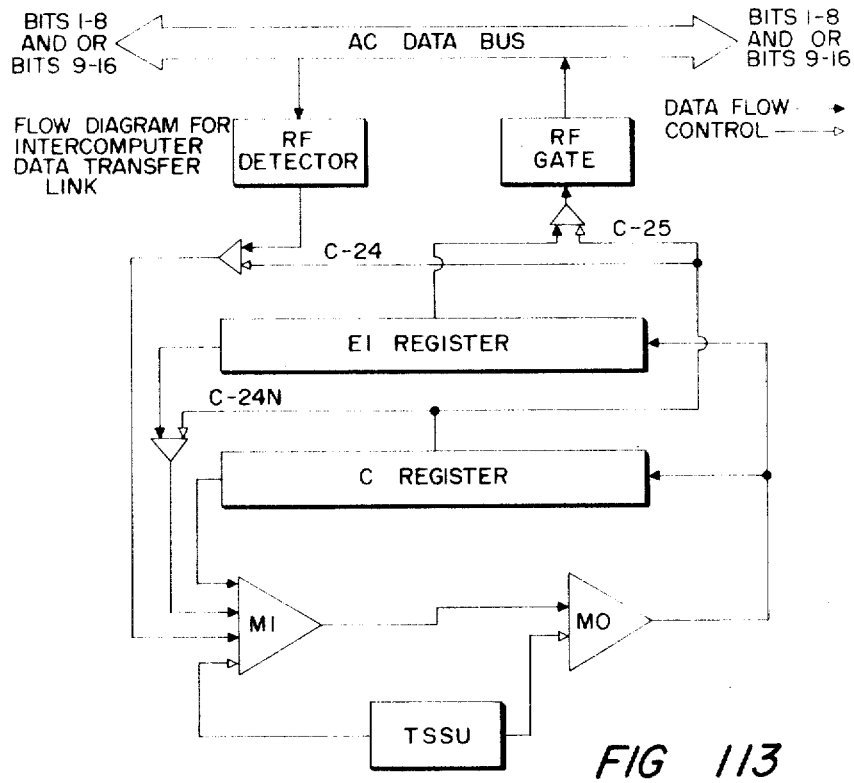
Figure 114:
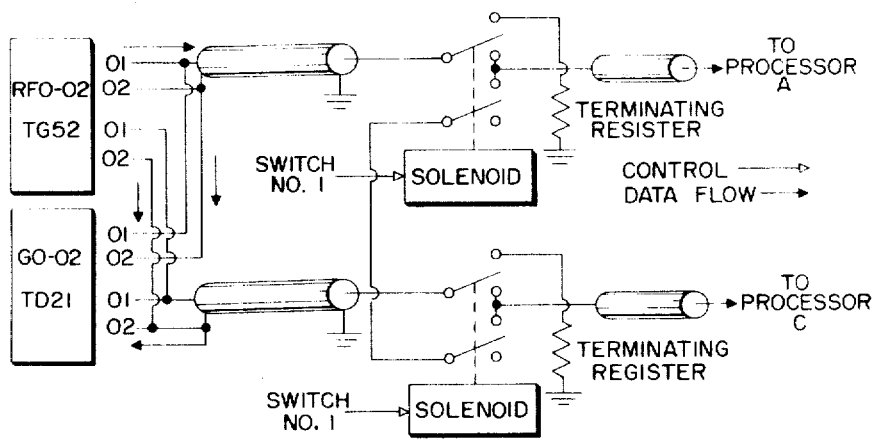
Figure 115:
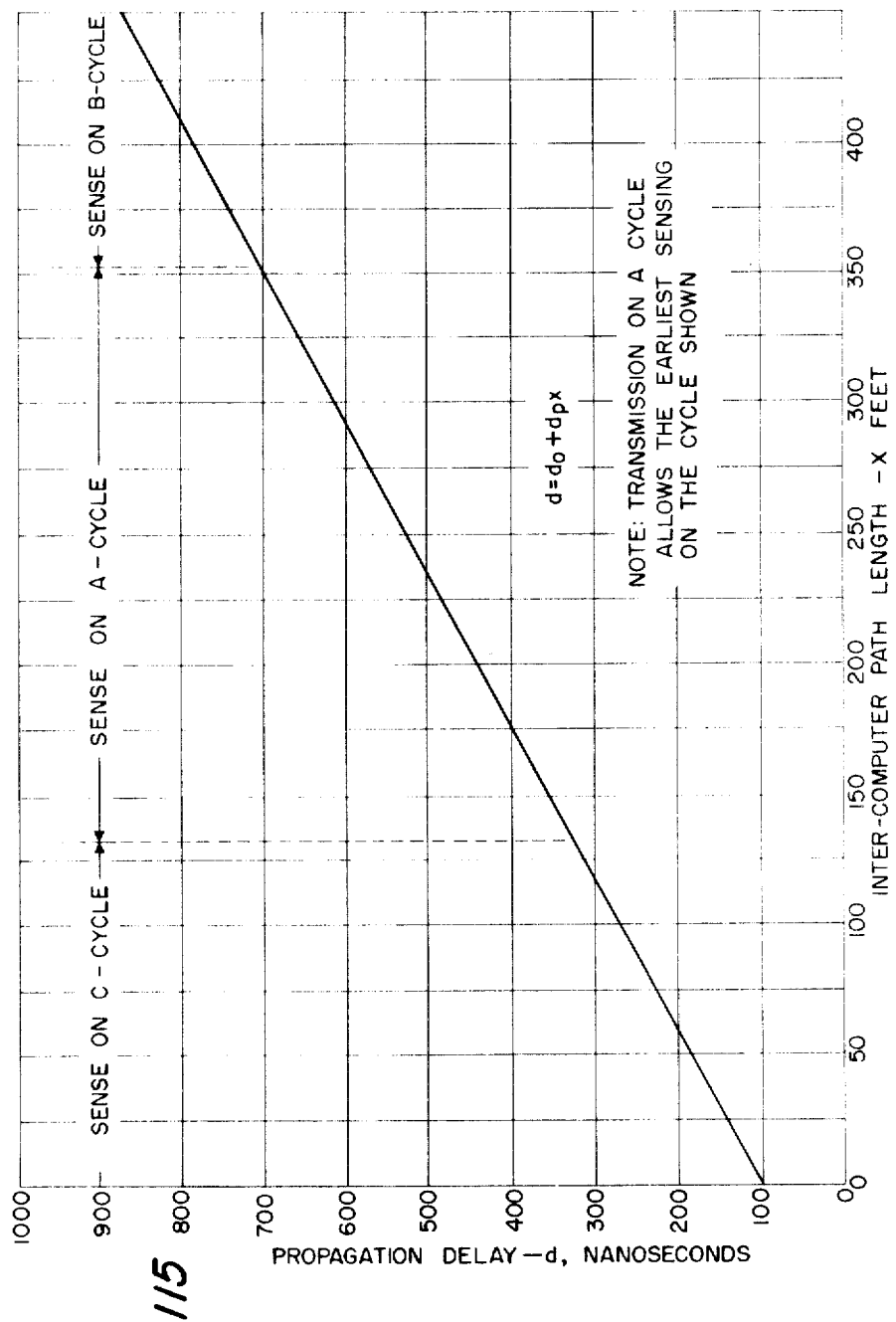
Figure 116:
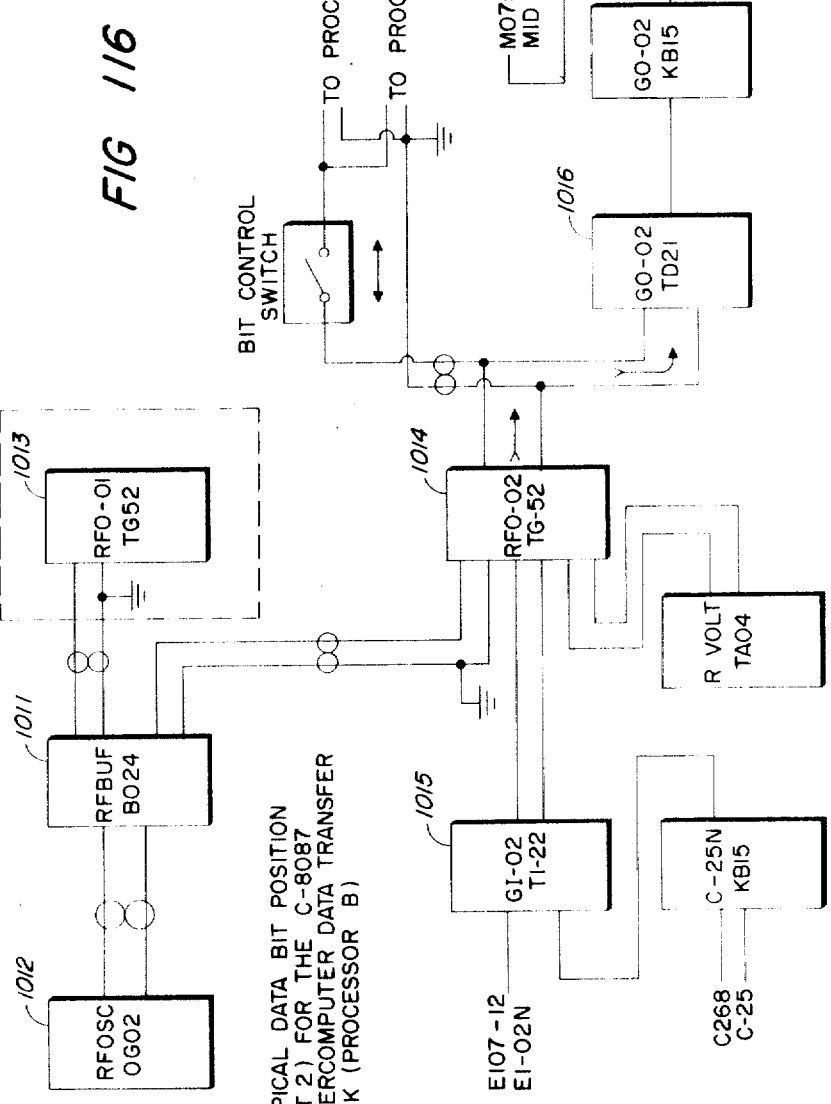
Figure 117:
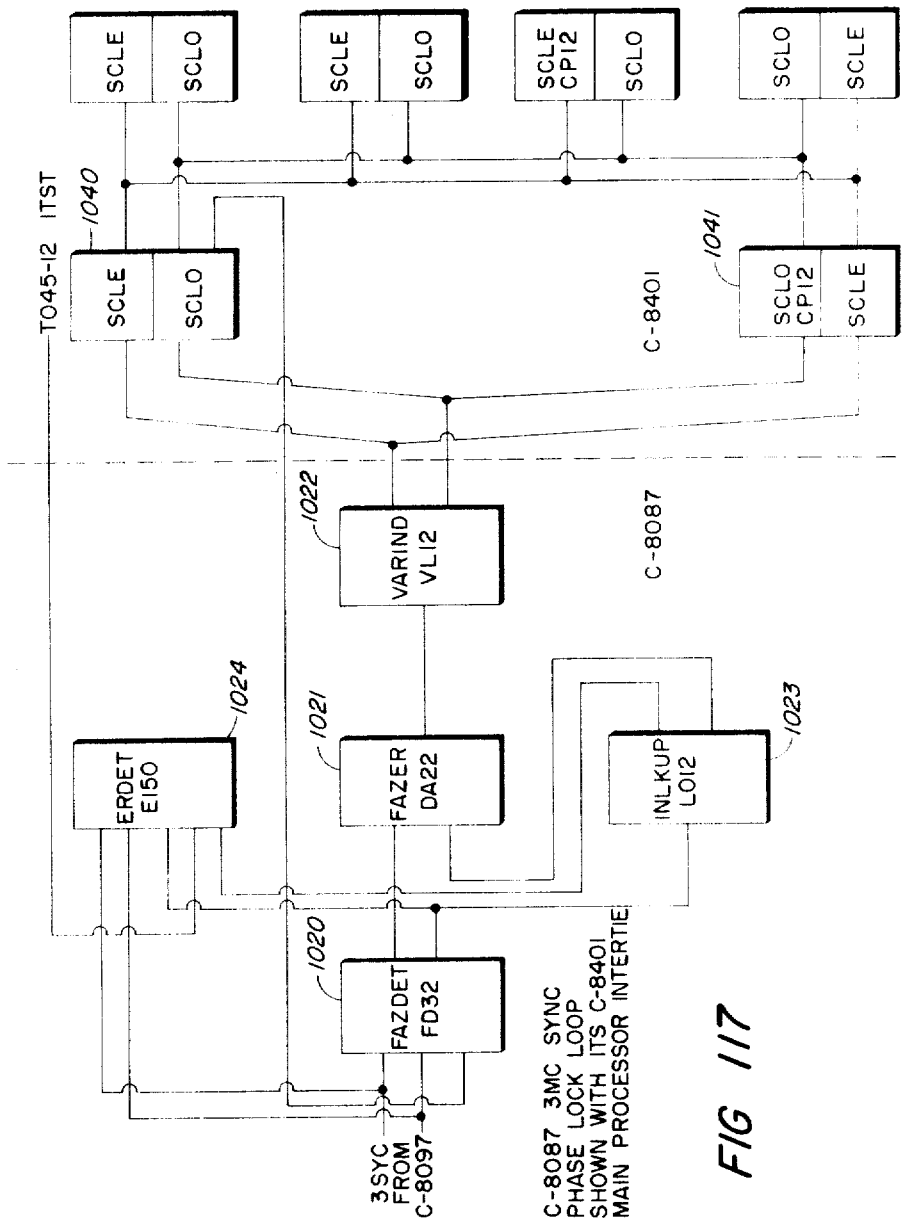

FIGS. 112–123 relate to the C–8087 module which includes the AC Data Bus circuit and, more specifically:

FIG. 112 is a general block diagram showing the inter-computer data transfer linkage in a complex of data processors;

FIG. 113 is a flow diagram for the inter-computer data transfer link;

FIG. 114 is a block diagram showing a typical bit input/output configuration for the inter-computer data transfer link;

FIG. 115 is a graph showing the inter-computer data propagation delay;

FIG. 116 is a block diagram showing a typical data bit position for the inter-computer data transfer link;

FIG. 117 is a block diagram showing the 3MC synchronization phase lock loop with the main processor intertie;

FIG. 118 is a block diagram of the C–8087 one-megacycle synchronizing enable circuit;

FIG. 119 shows the timing diagram of the one-megacycle sync enable circuit when operating in Mode A;

FIG. 120 is a chart showing the outputs of the main timing chain as the function of the one-megacycle counter sync circuit for modes A, B, and C;

FIG. 121 is a timing diagram showing the one-megacycle sync enable circuit when operating in mode B;

FIG. 122 is another timing diagram of the one-megacycle synchonizing enable circuit when operating in mode C; and FIG. 123 is a set of waveforms showing the timing synchronization of the individual processors when used in a complex of processors.

FIG. 124 is a timing diagram showing the output waveforms of the central timing system of a complex of processors.

Owing to the complexity of the present invention, it would be very difficult, if not impossible, to describe any portion thereof completely without considerable background as to the operation of the other portions of the processor. Obviously, all of the parts cannot be described simultaneously. Consequently, in describing any one section thereof, a full understanding of such section may not be possible until other sections herein are read and understood.

In order to best meet the aforementioned problem, the following general approach to a description of the processor has been taken in this specification. First, a very broad description of the over-all philosophy of the processor will be given, and will incorporate a description of the contents of FIGS. 1 through 5, generally. Subsequently, another broad but somewhat more detailed description of the over-all processor will be set forth and will include, generally, the contents of FIGS. 6 through 29. The second general discussion of the processor will also include general discussions of the Transfer Sequence Control Unit, and a general discussion of the Control Unit C, which contains the "C" control register. Subsequently, each of the principal components, such as the individual registers, the timing signal generators, the Transfer Sequence Control Unit, the Control Unit "C," and the circuit means by which several processors may be used in parallel will be described in considerable detail and constitute the bulk of the specification.

An outline of the foregoing approach to this specification is given below.

OUTLINE OF DATA PROCESSOR SPECIFICATION
I. *General Description:*
    A. Introduction to the General Organization of the Data Processor, FIGS. 1–5.
    B. A More Comprehensive Description of the General Organization of Data Processor, FIGS. 6–19, 29.
    C. General Description of Transfer Sequence Control Unit (TSCU), FIGS. 20–26.
        (1) U Registers.
        (2) T, V, and W Registers.
    D. Brief Description of Control Register C, FIGS. 27, 28.
II. *Generation of Timing Signals:*
    A. For a Single Data Processor, FIGS. 30–36.
    B. For a Complex of Several Processors, FIGS. 37, 38.
    C. 200 kc. and 5.34 kc. Signal Sources, FIGS. 39, 40.
III. *Detailed Description of TSCU:*
    A. T, V, and W Registers, FIGS. 41–52.
    B. U Registers (Detailed), FIGS. 53–63.
    C. Transfer Link (Detailed), FIGS. 64–73.
IV. *Detailed Description of Registers:*
    A. D Registers, FIGS. 74–77.
    B. R Registers, FIGS. 78–87.
    C. A Registers, FIGS. 88–91.
    D. I/O Registers, FIGS. 92–98.
    E. E Registers, FIGS. 99–101.
    F. S and Z Registers, FIGS. 102–110.
V. *Control Unit C* (Including C Register), FIG. 111.
VI. *Use of Several Processors in Parallel:*
    A. AC Data Bus, FIGS. 112–123.
    B. C–8097 Central Timing System, FIG. 124.

Also, due to the complexity of this equipment, it has been found expedient to use a dual system of reference characters. One of these systems of reference characters employs numerals to designate a particular block or circuit component. A second system of identification of circuits, and niput and output leads, is the use of letters, which in many cases are simply abbreviations of a type of circuit, or in the case of input or output leads, the type of circuits to which the input or output leads originate from or are connected to. In order that this mneumonic identification system will be of maximum assistance in understanding the specification, an index of mnemonics is given with a definition for each mnemonic in FIG- 77 and 77a.

I. GENERAL DESCRIPTION

A. *Introduction to the general organization of the data processor (FIGS. 1–5)*

Figure 1:
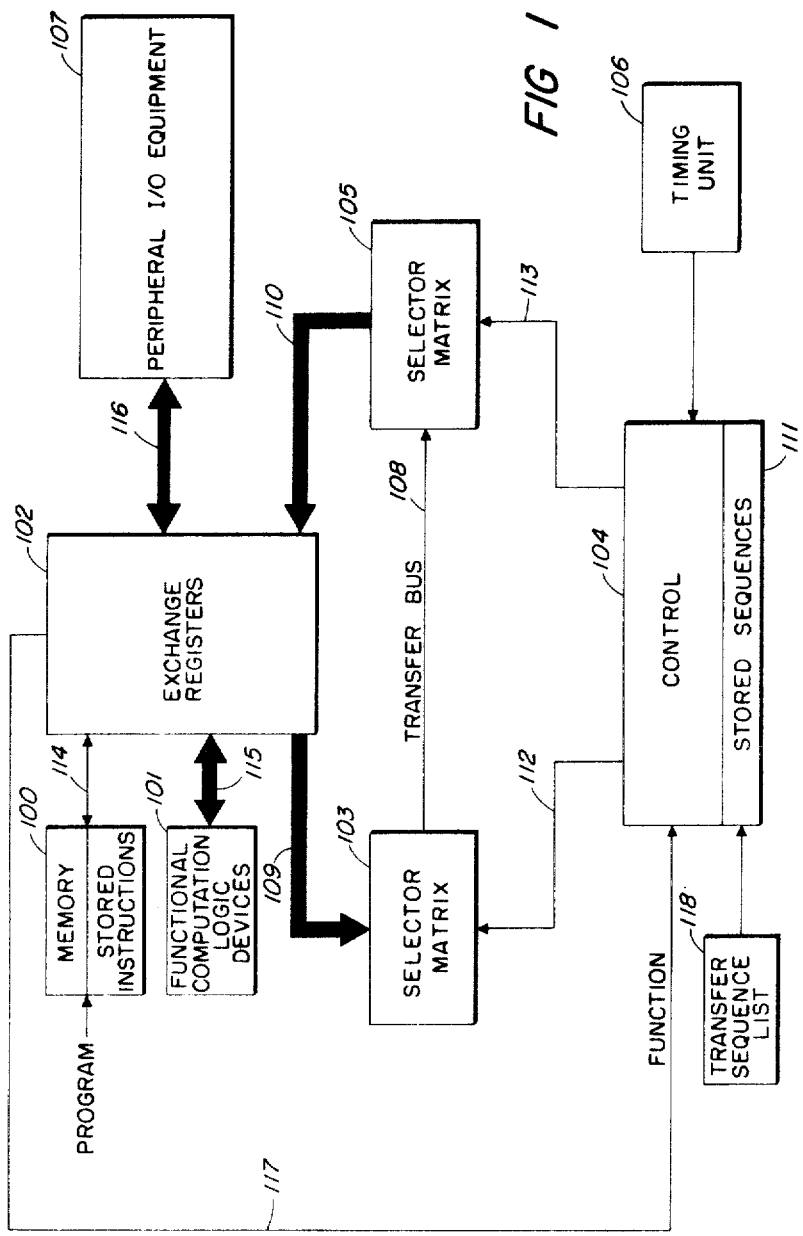
FIG. 1 is a simplified block diagram of the processor.

Referring now to FIG. 1, a main memory 100 contains the main programming for the processor, and in the particular embodiment of the invention to be described herein is comprised of several thousand magnetic cores, each of which can contain a binary "0" or a binary "1," depending upon the polarity of magnetization of the core. The magnetic cores are constructed so that the information contained therein is always destroyed upon readout. More specifically,-immediately after readout, the magnetization of the core will represent a zero ("0").

A second memory unit, referred to herein as a micromemory is contained in the transfer sequence control unit 104. The access rate of the micromemory is about five times that of the main memory, and contains microprograms which, generally speaking, are addressed under control of the main memory 100.

The block 102 contains a plurality of registers which perform different functions upon data supplied thereto. Some of these registers are known generally as input/output registers and function to receive information from peripheral equipment represented generally by the block 107 and to supply information back to such peripheral equipment. The type of peripheral equipment represented by the block 107 can be, for example, tape machines, card punching machines, card reading equipment, Teletype equipment, magnetic disc files, paper tape reading and writing means, cross bar switching means, and in general, any of the means presently known for communicating or storing information. The input/output (I/O) registers can be defined generally as exchange registers and function to form a common interface between peripheral devices and the high-speed transfer link of the processor.

Accompanying each of the peripheral equipments is an adapter which functions to control the operation of the specific peripheral equipment as well as to transform the data being received therefrom or supplied thereto into a more appropriate form. The adapters are not specifically shown in FIG. 1, but are shown in FIGS. 6–17.

The exchange register block 102 also contains registers for performing the various processing functions upon the data and include registers which will perform the adding function, accumulating function, parity function, complementing function, rotating function, insertion function, means for accessing the main memory and/or receiving instructions from the main memory and other functions. Also included in block 102 are some utility registers. All of the above-mentioned registers will be described in more detail later herein.

The high-speed transfer link, which includes input matrix 103, output matrix 105, and transfer bus 108, is under control of the transfer sequence control unit 104 (TSCU) and functions to transfer information from any of the registers in block 102 to any other register in the block 102. More specifically, the input and output matrices 103 and 105 are, in effect, switching units which are controlled by coded signals supplied by the microprograms contained in the micromemory of transfer sequence control unit 104. The input matrix 103 contains 32 matrix switching points with each matrix point containing 16 separate contact positions, of which all or only a part may be used at any matrix switching point. Alternatively, the input matrix 103 may be described as consisting of 32 rows of contacts, each row consisting of 16 separate contacts, with each of the 32 rows being selectable by an output code from the transfer sequence control unit 104. The output matrix 105 has a possible maximum of 17 contacts in each row, with the 17th contact being a special control contact. It is apparent that the code necessary to select one of the 32 switching points of the input or output matrices 103 or 105 must contain five bits since $2^5 = 32$.

At the cost of some accuracy of description, a greatly simplified description of operation of the structure shown in FIG. 1 will be set forth. An instruction from the main memory 100 is received by the transfer sequence control unit 104 through one of the registers in block 102; such instruction functioning to address a particular microprogram in the transfer sequence control unit 104. Such microprogram might consist, for example, of ten or fifteen individual microsteps. Each of said microsteps can perform the function of transferring data from one of the registers of block 102 to another register of block 102 through the high-speed transfer link. More specifically, each of the microsteps in the microprogram selects a particular matrix switching point in the input matrix 103, and a particular matrix switching point in the output matrix 105, so that the information from a selected register of block 102 is transferred through the input matrix 103, the transfer bus 108, the output matrix 105, and back to another selected register in the block 102. It is to be noted that data can also be received from a peripheral device by an input/output register and then transferred through the input matrix, the transfer link, and the output matrix to a destination register. In a reverse manner data can be supplied to a peripheral device.

Each time such a transfer is made a certain operation is performed upon the transferred data due to the construction of the register to which it is transferred. For example, a transfer to certain registers in block 102 will automatically perform an "add" function. Transfers to other registers in the block 102 will automatically perform a complementing function, or a rotating function, or any one of several other functions presently performed by modern data processing equipment.

In certain of the registers, there is required additional functional logic devices designated generally by block 101. Such logic devices aid in performing specific processing functions such as a parity check, addition, or rotation as will be described in more detail later herein.

In the particular embodiment of the processor described herein, the main memory 100 has an access time of approximately five microseconds and contains 65,536 words, with each word containing 16 data bits. The micromemory [also known herein as the transfer sequence storage (TSS)] has an access time of one microsecond and contains 1024 words, with each word containing 36 bits. Since only 10 bits are required to select switching points of both the input matrix 103 and the output matrix 105, each 36-bit word of the micromemory is capable of performing three transfers with 6 bits left over. The extra 6 bits are used as constants, which will be described in detail later herein. However, for the present purposes it will suffice to note that each 36-bit word of the micromemory can perform three transfers, so that a single transfer can be made in one-third of a microsecond or .33 microsecond. Thus, the operation of the transfer sequence control unit is 15 times as fast as the main memory, i.e., 15 separate transfers of data can be made by the transfer sequence control unit during the 5 microseconds required to access the main memory for a single instruction.

While it has been stated herein that the transfer sequence control unit 104 is under the control of the main memory 100, it should be noted that such a statement is an oversimplification made only to introduce the reader to the general concept of the invention. In reality, the transfer sequence control unit 104 and the main memory 100 are interdependent upon each other and, at different times during the operation of the processor, each will assume a dominant control role. Moreover, both the main memory and the transfer sequence control unit do not necessarily operate alternately; that is to say, an instruction from the main memory does not always call for the execution of a microprogram in the transfer sequence control unit, nor does the completion of a microprogram in the transfer sequence control unit always result in the calling for another instruction from the main memory. Both the main memory program and the program contained in the micromemory have decision making capabilities and frequently, when certain conditions exist, both the main memory and the micromemory can jump to other locations therein, and perform additional operations. More specifically, it is possible, during the operation of a microprogram in the transfer sequence control unit, that a decision will be made which will cause the transfer sequence control unit to address itself to another location to perform a second microprogram as a result of the aforementioned decision.

In addition to jumping (also known as branching), the micromemory program can also go through a process known as looping, wherein at the completion of a transfer sequence there is an instruction which will cause the microprogram to loop back to a particular address containing a "read next instruction" instruction. The next instruction will then be read from the main memory which will set into motion the next transfer sequence in the microprogram. It is to be noted that jumping or branching can also occur in the main memory program. Also, considerable data is stored in the main memory in addition to instructions, which data may be extracted either on command of an instruction of the micromemory or as a result of an instruction from the main memory.

Returning again, more specifically, to the diagram of FIG. 1, the selection of particular addresses of the micromemory are controlled by coded signals supplied through lead 117 which may be in the form of an instruction from the main memory or may be a branch or jump instruction originating in the micromemory. Such codes are supplied to the control section of the transfer sequence control unit where they are interpreted to initiate execution of the instructions contained in the indicated addresses of the micromemory. The timing of the system is under control of timing unit 106.

Referring now to FIG. 2, there is shown a general block diagram of the register layout and the memory units with respect to the high-speed transfer bus. Many of the blocks in FIG. 2 correspond to blocks shown in FIG. 1, and are identified by the same reference characters, although primed. Such identification by the same reference characters, primed to various degrees, will be used throughout the various figures of the specification to identify corresponding elements.

Within the dotted block 102' there is shown the various registers represented by blocks 125, 126, 127, and 128. The registers are divided into four general groups in FIG. 2, with block 125 representing control unit C which includes control register C. In block 126 there are two registers, S and Z which are employed respectively in addressing the main memory and in transferring information to and from the main memory which is not specifically shown in FIG. 2. In block 127 are shown logic and utility registers, E1, E2, A2, A3, A1, R1, R2, D1, D2, D3, D4 and D5, which will be described in detail later herein. The block 128 represents input/output registers which are used primarily with external devices; that is to say, peripheral equipment such as Teletype equipment, tape-stands, magnetic disc files, etc.

The transfer sequence control unit 104' contains four registers designated as registers T, U, V, and W, which will also be discussed in more detail later herein. Of the four registers of block 104' only the U and V registers connect directly to the high-speed transfer link, i.e. the matrices. Register U is the address register for the transfer sequence storage unit (TSS) and register T receives the contents of the addressed transfer sequence storage location. Each of the 36 bit instructions obtained from the TSS is buffered by the V and W register combination and transferred into either two or three separate transfer commands which are then supplied from the W register to the input and output matrices of the transfer link to select specific source addresses and destination addresses. Portions of the V register data content can be transferred to the U register to control the sequence of commands, or to other registers for use as operational constants. The transfer sequence control unit is described in some detail later herein in connection with FIGS. 20, 21, 22, 23, 24, and 25, and in considerable detail under the section entitled "Transfer Sequence Control Unit."

In FIG. 2, the transfer bus 108' consists of 17 lines, all of which connect to output switching matrix 105' and 16 of which connect to input matrix 103'. The input matrix 103' and the output matrix 105', as discussed above, each have 32 switching points connected to 32 sources and 32 destinations respectively. On each transfer cycle exactly one input matrix switching point and one output matrix switching point are selected by the transfer sequence control unit 104' acting through the decoders 120 and 122, and causing the data contained in the selected source register to be transferred to the selected destination register.

The individual bit positions or levels of each matrix input switching point connect to one or more of the transfer lines up to a maximum of 16, since there are only 16 transfer lines (or contact levels) at each of the switching points of the input matrix. Each connection essentially is from a particular bit position in the source register to a particular transfer line in the transfer length. Similarly, each output matrix switching point connects each of from 1 to 16 transfer lines to a selected bit position in the destination register. The 17th transfer bus line normally contains a "0" thereon and clears the bit positions in the selected destination register immediately before the data transfer, unless such clearing action is inhibited by a "1" on the said 17th line.

In FIGS. 3 and 3a there is shown a more detailed block diagram of the register layout and the matrix connections to the various registers. The numbers written within the matrices 103" and 105" under the heading "octal address" show the switching points 0 thru 31 (in the octal system) for each matrix. Thus, the three groups of output leads from the Z register 145 connect to switching points 10 and 12 of the input matrix 103" and the three groups of input leads to the Z register connect to switching points 10 and 12 of the output matrix 105".

The numbers adjacent to and just outside the matrices 103" and 105" indicate which transfer lines are connected at that switching point. Thus, referring again to the Z register 145 as an example, the numbers "1–16" at the left end of the lowest group of output leads 153 means that 16 separate output leads from the Z register are connected to 16 levels of switching point 10 of the input matrix 103". The numbers "9–16" adjacent the upper group of output leads 154 from the Z register 145 indicate that bit levels 9–16 of the 12th switching position of the input matrix are connected to bit positions of the Z register; said bit level positions being connectable to either bit positions 1–8 or 9–16 of the Z register, as indicated by the numbers "1–8" and "9–16" adjacent the left side of register Z.

On the input side of the Z register, the numbers 1–16 next to the output matrix block 105" indicate that the lead 155 represents 16 separate leads connected to the 16 bit levels of the matrix switching point 10. Similarly, the numbers 9–16 next to the output matrix block 105" on input lead 156 indicate that said lead 156 represents a group of eight separate leads connected to data bit levels 9–16 of output matrix switching point 12.

The numbers located next to the associated register block, but just outside said register block indicate the bit positions of that register that connect to the input or output matrix, and are listed in the same order as the transfer lines in the matrix to which they are connected. For example, the numbers "1–16" immediately to the right of Z register block 145 and adjacent lead 155 means that the bit positions 1–16 of the Z register are connected to bit positions 1–16 respectively of address 10 of the transfer link.

In some instances the bit position indicating numbers have a small bar over the top thereof. This bar indicates that the inverted form of the bit contained in that particular bit position is supplied to the transfer register. For example, in the D2 complement register 143, the numbers "$\overline{1}$–$\overline{16}$" at the left of the register indicate that the complements of the information contained in the D2 register are supplied to bit positions 1–16 of octal address 06 of the transfer link.

Also in FIG. 3 are columns headed by the term "Mnemonic" which list the mnemonic codes for each of the octal addresses in the matrix and output addresses. For example, in the matrix input the octal address 36 has a mnemonic code of P12, the P standing for peripheral, and the 12 representing the 12th input/output register. It should be noted at this point that the input/output registers are used primarily with peripheral devices. The mnemonics are supplied primarily for the use of a programmer.

In the input matrix block 103" there are two additional columns under the heading "Line 17." Different bit positions of different registers are connected to line 17 with different octal addresses of the transfer link. For example, with octal address 36, bit position 8 of the R1 register has a fixed-wire connection to line 17 of the input matrix. In octal address position 34, bit position 9 of the R1 register is connected to line 17 of the transfer link. The function of such line 17 connections vary, of course, with the octal addresses selected. Each of the specific functions of each of the line 17 connections will be discussed in detail at various places throughout the specification, usually in connection with the register being described at the time. It might be said, generally, at this time that the various R1 connections to the 17th line of the transfer bit function to provide jumping or branching of the addressing of the TSS. Such jumping or branching is necessary in order for the processor to act upon decisions that arise. It will be observed that each of the 16 bit positions of the R1 register are connected to line 17 at separate octal addresses. Such a connection arrangement is known as fanout. The mnemonics for the various line 17 connections are given under the heading entitled "Mnemonics" which is adjacent the heading labeled "Function" on line 17. As in the case of other mnemonics listed in FIGS. 3 and 3a, their use thereof is primarily for programming purposes.

Reference is now made to FIG. 5 which shows another view of the processor similar in arrangement to that of FIG. 1. The principal reason for including FIG. 5 herein is to provide the reader with a better concept of the function of the input and output matrices. It is to be noted that FIG. 5, because it is so simplified, is not completely accurate. FIG. 5 shows a three-dimensional pictorial presentation of the matrices, each with its 32 switching points, and in which the capability of 16 levels in the input matrix and 17 levels in the output matrix is clearly shown. From FIG. 5 it is apparent that all levels in each switching point of the two matrices are not employed. For example, the switching points connected to both the inputs and the outputs of the input/output registers, represented generally by the block 160, only employ bit positions 1–10. The D1 register 143', on the other hand, has its output lead 326, which actually consists of 16 leads, connected to the 16 bit positions of its matrix switching point of input matrix 103'''. The 16 input leads 325 of the D1 register connect to bit positions 1–16 of a switching point of output matrix 105'''.

The specific reasons why all 16 bit levels of the input matrix and all 17 bit levels of the output are not utilized are several. Generally speaking, in those cases where all 16 or 17 bit levels are not employed, it is due to the particular logic being applied to the data, i.e., the particular type operation being performed on the data. For example, when dealing with instructions contained in the Z register which have been obtained from the main memory, it is sometimes desirable to examine either the first 8 bits or the last 8 bits of a particular word. By appropriate control means, either bits 1–8 or bits 9–16 can be extracted and processed in a desired manner. If only 8 bits are to be used, only 8 matrix bit levels are needed.

It should be noted that the outputs from some of the registers go to several switching positions. For example, individual ones of the group of leads identified by reference character 168 are severally connected to level 14 of the switching points connected to input/output registers 160. That is to say, one lead from each of the 16 bit positions of logic register 144' is connected to an individual switching point of the switching points of the input matrix 103''' which are connected to the several I/O registers.

Another register whose connections are quite different from the other registers is control register 156' which is a part of the C control unit. The function of the C register is generally as follows: The transfer sequence control unit, which includes the micromemory, interprets the various microprograms stored therein such as add, subtract, divide, branch, input/output, etc., as sequences of transfers stored in the transfer sequence control units as programs. However, certain individual steps of frequently used operations such as binary add, rotate, and certain options, such as character left inhibit and character right inhibit are implemented by a fixed wire means and a special register, which is the C control register 156' of FIG. 5. Such control register 156' functions to save transfer sequence storage, matrix connections, and computing time. Additional fixed wiring is required for manual operation in maintenance and diagnostic procedure. Such additional fixed wiring is contained within the control register 156' and will be described in more detail later herein.

Also, in FIG. 5 there is shown a timing unit 163 which is part of the C control unit, and there is shown the transfer sequence control unit 104" including the T and U registers 165 and 164 which are respectively the output and input registers of the transfer control unit 104". The U register 164 and a counter (not shown in FIG. 5), are used primarily to address the transfer sequence storage unit.

B. *A more comprehensive description of the general organization of the data processor*

In FIGS. 1, 2, 3, and 4 there have been shown diagrams illustrating, in relatively simple format, the organization of the over-all processor. Referring now to the group of FIGS. 6 through 17, arranged in the manner as shown in FIG. 18, there is shown a more complete block diagram of the organization of the entire data process, with a variety of peripheral devices connected thereto.

It is to be understood, however, that the block diagram of FIGS. 6–17 is not completely correct owing to the fact that the processor is too complex to be shown accurately in a block diagram as simple as that of FIGS.

6–17. There are many special relationships between the various registers shown in the circuit of FIGS. 6–17. The C register, for example, has 27 bits, most of which perform control functions relating to the operation of other registers.

Figure 12:
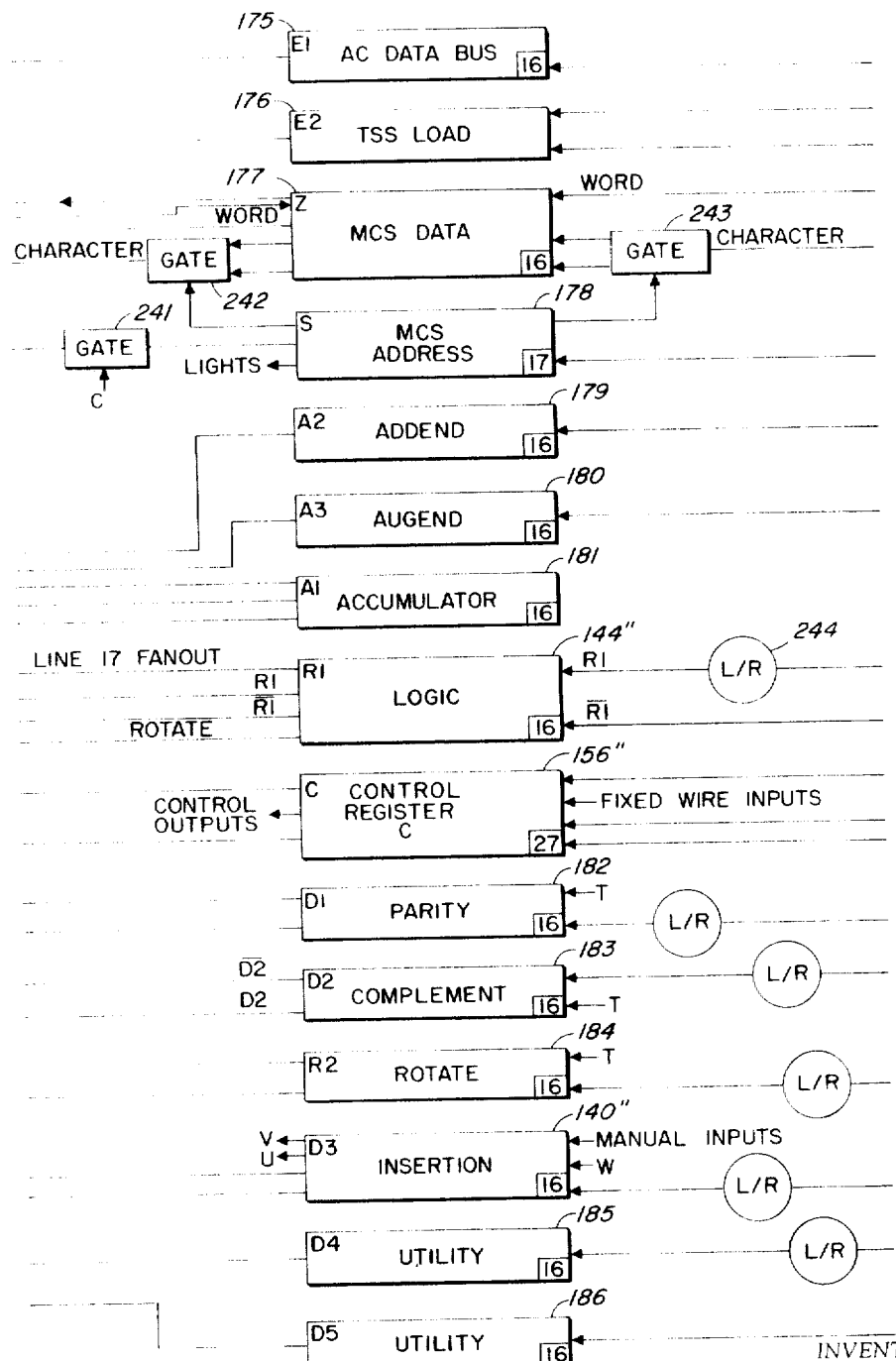
Figure 13:
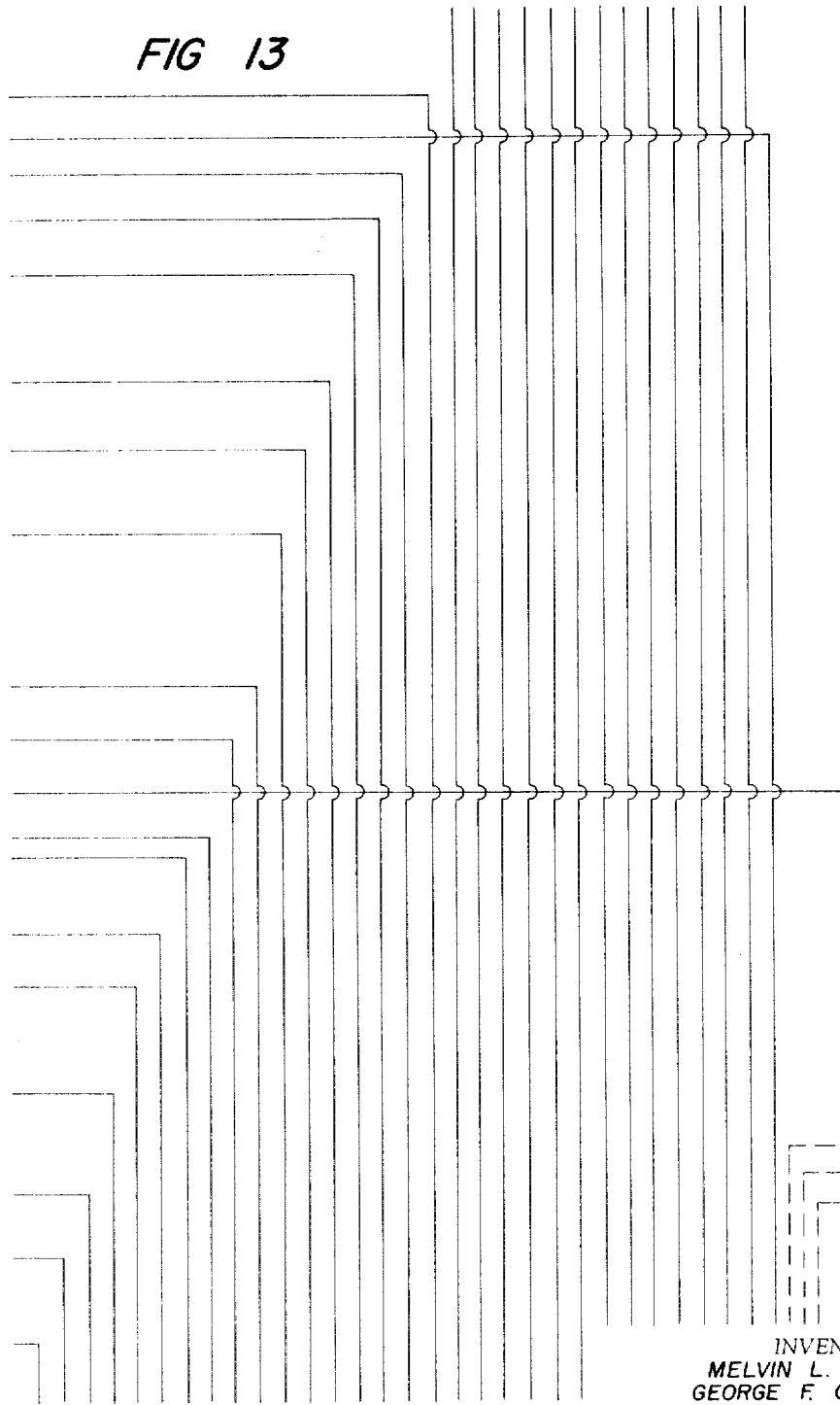
Figure 14:
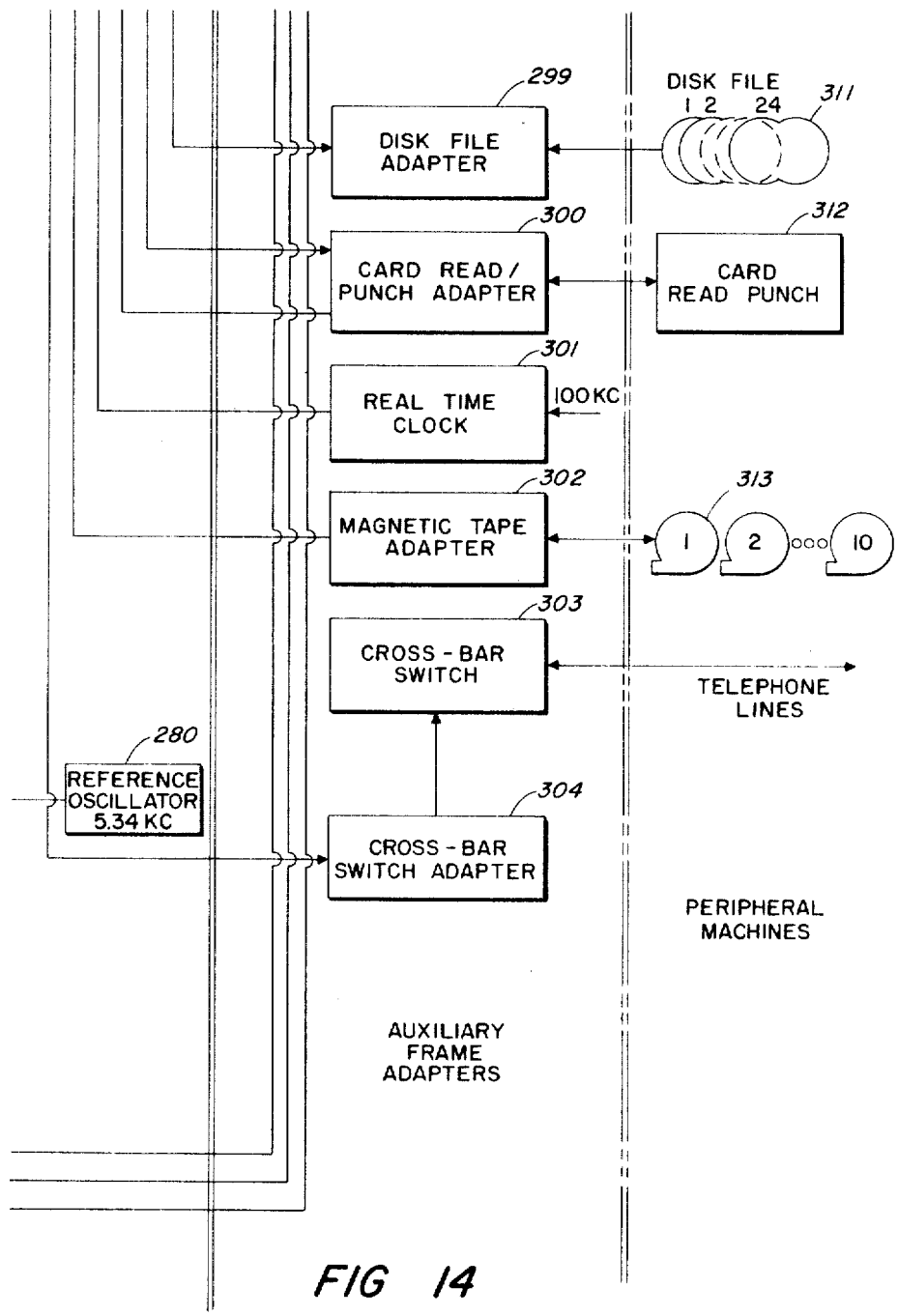

If all the circuitry associated only with the C register were added to the drawings of FIGS. 6–17, the result would be confusing to the point of being nonintelligible. Consequently, in FIGS. 6–17 the function of the various control bits of the C control register are indicated simply by a short lead connected to the controlled circuit with the letter "C" written nearby. In a similar manner, the output of the "T" register, which is part of a Transfer Sequence Control Unit, is intimately associated with the various utility registers D1 and D2, and also with the R2 register. However, for purposes of clarity, the complete connections are not shown. Only short leads entering the input side of the D1, D2, and R2 registers marked with a "T" are shown in FIG. 12 of the block diagram of FIGS. 6–17. As a third example of incompleteness due to simplification, many of the registers have the ability of having the clearing inhibited of either the left half, that is bit positions 1–8, or the right half, including bit positions 9–16. Rather than show the circuit means for accomplishing such a function, the symbol  is employed in the input leads of the various registers having this particular feature. Furthermore, it is to be understood that while a single input or output lead may be shown as going to or from a particular register, such single line may represent a plurality of leads. For example, such single line may represent a total of 16 leads, one lead for each bit position of a 16 bit register. Again, simplification has been employed in order to make the drawing intelligible and serve the purpose of providing a background for the more detailed discussion of the various parts of the processor following the description of FIGS. 6–17.

In FIGS. 6 through 17, all the registers including the input/output registers, the control registers, the magnetic core storage addressing and storage registers, and the logic and utility registers are shown connected across the input and output matrices 103′′′′ (FIG. 10) and the output matrix 105′′′′ (FIG. 12).

The input/output registers are contained in the block 160′ and consist of two types of registers, one of which types being usable in pairs and one type register . . . that is to say, commutatable under control of the control register 156″. The commutatable I/O registers specifically include the top 16 registers in the block 165 identified by reference characters 198 through 213. Each pair of commutatable registers consists of two gates and two registers. For example, gates 190 and 214 and registers 198 and 206 together constitute one pair of commutatable input registers.

The principal purpose of the commutatable registers is to provide more registers for a given number of matrix addresses. For example, each pair of commutatable registers in FIG. 7 utilizes but one input matrix address and one output matrix address, thus doubling the number of registers available. The primary of using commutatable registers is that both registers cannot be used at the same time. They must be commutated. However, when the registers are connected to Teletype machines, as shown in FIGS. 6–17, the operation of the Teletype machine is so slow compared to the operation of the data processor that even on a time-shared basis, the data processor can address the commutatable registers much faster than is necessary to receive and transmit data to and from all the Teletype machines connected thereto, even when they are operating at full capacity.

Figure 9:
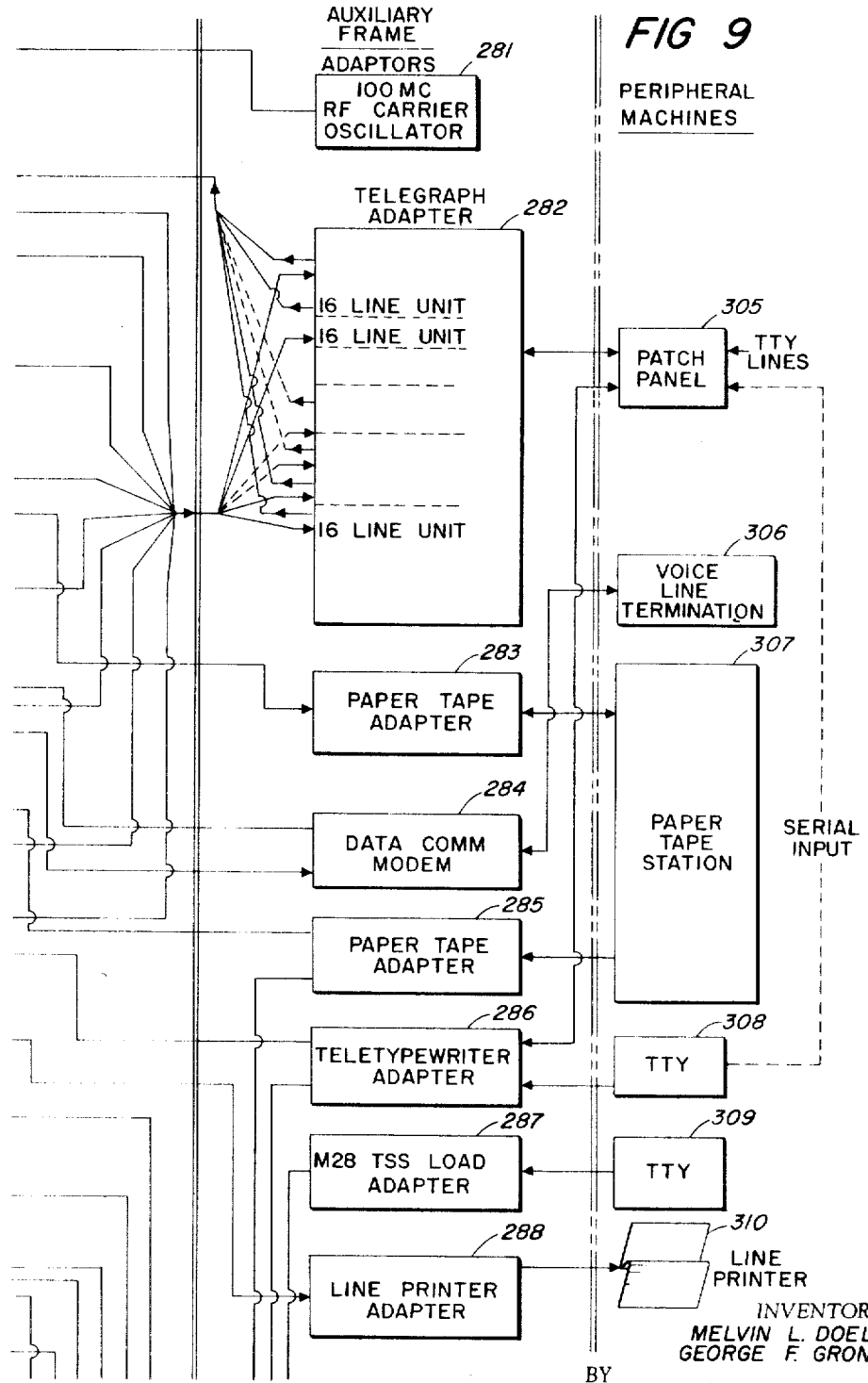

In the specific arrangement shown in FIGS. 6–17, each of the commutatable registers has 16 bit positions. Each of the 16 commutatable registers has 16 bit positions for a total of 256 bit positions. Each bit position is assigned to handle the transfer of information to and from a single Teletype machine. Consequently, 256 Teletype machines can be employed with sixteen 16-bit input/output registers. It is to be noted that when receiving information from a Teletype machine, the commutatable registers are by-passed and the information from the Teletype adaptor 282 of FIG. 9 is supplied directly to the input matrix through one of the gates 190–197 of FIG. 7.

The group of gates 190–197, and the second group of gates 214–221 function to address either the B or the A input/output register, under control of bit 23 of the C control register. More specifically when the C–23 is in its true state, the A register of a given pair of commutatable registers will be connected to the input and output matrices by the two gates associated with the given pair of commutatable registers. If the bit position 23 of the control register is in the false position, then the B register of the given pair of commutatable registers will be connected to the input and output matrices. Thus, the two gates associated with each pair of commutatable registers operate together. For example, gates 190 and 214 of FIG. 7 function to connect or address either the register P12B or the register P12A, depending upon the state of bit 23 of the control register.

The I/O registers P0 through P4 are not commutatable and, consequently, do not require a gating function such as provided by the gates 190–197 and gates 214–221. For the same reason, no control by the C register is needed with respect to I/O registers P0 through P4. Each of the I/O registers P0–P4, also identified by reference characters 234, 233, 232, 231, and 230, contain 16 bit positions and clear and set decoder circuits. The clear and set decoder circuits are employed, respectively, to clear the register, then to set the new information therein. The processor is constructed to have access to both the set and the reset of each toggle, that is, each bit position toggle, of the register. However, input from the peripheral control units such as, for example, the magnetic tape adapter 302 of FIG. 14 will affect only the reset sides of bit position 1 of the I/O register, which bit is reserved for a special purpose, and the set sides of the remaining bit positions 2–16 which contain the data information. Generally speaking, the bit 1 position is employed to communicate to the I/O register that the peripheral device has received information therefrom and is ready to receive additional information.

As can be seen from FIGS. 7–16, the I/O registers 230–234 are connected, respectively, to the line printer adapter 288, the disc file adapter 299, the card read/punch adapter 300, the reel time clock 301, and the magnetic tape adapter 302. Such pairing of the I/O registers and the peripheral device adapters is, of course, arbitrary and could be rearranged easily.

The adapters mentioned above, serve the function of adapting the information read from the various peripheral devices such as the disc file 311, the card/read punch 312, and the tapestand 313 to a form usable by the processor and vice versa. In other words, the adapter translates the information supplied by the various peripheral sources into a form that the processor is able to handle.

Conversely, the various adapters change the information supplied from the processor to the peripheral devices into a form which the peripheral devices are capable of handling. Such a change in form may involve a change in bit rate, timing and coding. For example, in the case of the teletypewriter the data must be changed from a binary, octal, or binary coded decimal form to the standard International Morse code form.

In FIG. 12 there is shown the control register, the magnetic core registers, and the logic and utility registers. The control register 156″, which consists of 27 bit positions, has fixed wire connections going to many places in the processor. Some of the fixed wire controls from the C register are as follows: bit 23 to the gates 191–197 and gates 214–221 of the input/output registers of FIG. 7 to the adder 225, and the parity logic circuit 227 of FIG. 10; the gate 229 of FIG. 11, which controls the flow of data from other processors, to the gate 241 of FIG. 12, which initiates the addressing of main memory 161; to the gate 222 of FIG. 6, which controls the flow of data to other processors, to TSS write control 279, which in conjunction with E2 register 176, controls the loading of the TSS memory, and others. The specific connections of control register C are set forth in FIG. 23, to be discussed in more detail later.

The magnetic core storage registers consist of the Z and S registers 177 and 178 respectively. The S register 178 is employed in addressing the main core storage memory 161', while the Z register 177 is employed as a buffer storage for instructions and data read from and written into the main core storage 161'.

In the operation of the S and Z register, access to the main memory is initiated by a control signal supplied from the control register C to the gate 241 of FIG. 12. The data contained in the accessed address of the main memory is then supplied from the main memory to the Z register 177. By the proper setting of bit 00 of the S register and the appropriate setting of bit C-02 of the control register C, various modes of operation, or addressing, the main memory, can be obtained. More specifically, a full 16 bit word can be accessed with proper settings of the aforementioned bits or, if desired, words specifically from either the upper or the lower bank of the two banks of the main memory can be specifically addressed. Reference is made to FIG. 113 which shows in general chart form the aforementioned modes of operation.

Also shown in FIG. 113 is the effect of the setting of bit 16 of the S register on the data supplied to the transfer link from the Z register through the gate 242 of FIG. 12 and the data supplied to the Z register from the output matrix through the gate 243 of FIG. 12. By the proper setting of bit 16 of the S register, either the bit positions 1–8, or 9–16 of the Z register can be connected to bit positions 9–16 of the transfer link. Reference is also made to FIG. 112 which shows this general operation. It should be noted that FIGS. 112 and 113 will be discussed in detail in the section entitled "S AND Z REGISTERS," and are merely referred to here for introductory purposes.

The logic and utility registers comprise AC data bus register 175, TSS load register 176, addend register 179, augend register 180, accumulator register 181, logic register 144', parity register 182, complement register 183, rotate register 184, insertion register 140''', and utility registers 185 and 186. Each of these registers and their operation is described in considerable detail herein under separate section headings.

Associated with the addend, augend and accumulator registers 179, 180, and 181, is an adder 225 which functions to add the data supplied to registers 179 and 180 and to cause the accumulation of such addition in register 181.

The parity logic circuit 227, under the control of the control register 156'', functions to perform a parity check on data leaving or entering the processor. In the particular embodiment of the invention described herein, no parity check is made of data except when entering or leaving the processor.

The rotate logic circuit 228, in cooperation with logic register 144', and the rotate register 184, and under control of the C register, functions to rotate information to the left in increments of one, four, or eight bits.

The recognition circuit 226 is employed to test for zero in the accumulator register 181. The test may cover either the left half, right half, or full word in the accumulator register, under the control of the C register 156''. By left half, or right half, or full word is meant either the left bit positions 1–8, the right bit positions 9–16, or the full 16 bits of the accumulator register 181.

The main core storage memory 161' of FIG. 10 consists of a basic core stack of 4096 sixteen bit words. A system may have from 1–16 stacks with a maximum capacity of 65,536 words, if desired.

Each of the cores of the main memory has a destructible readout characteristic, i.e., when a bit is read from a particular address, all of the 16 cores of that address will return to ZERO position, destroying the ONES contained therein.

The AC data bus register 175 has an output connected to gate 222 which is under control of the C register 156'' and functions to supply information through AC data bus 224 to other data processors in a processor complex; thus enabling the use of more than one processor in an over-all system. Information is received from other processors through the data bus 224 which includes detector 223 and gate 229; under control of control register 156''.

Figure 15:
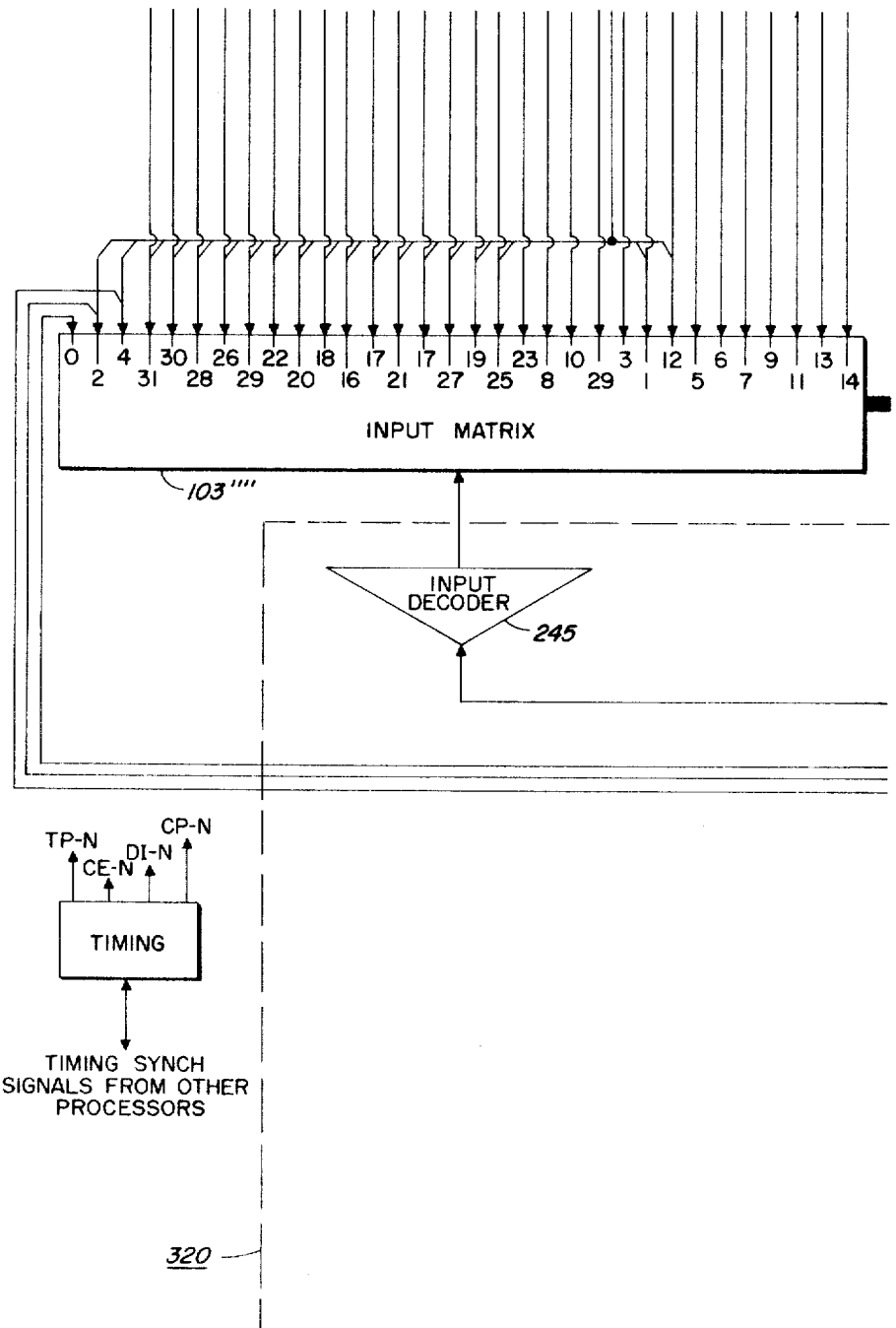
Figure 16:
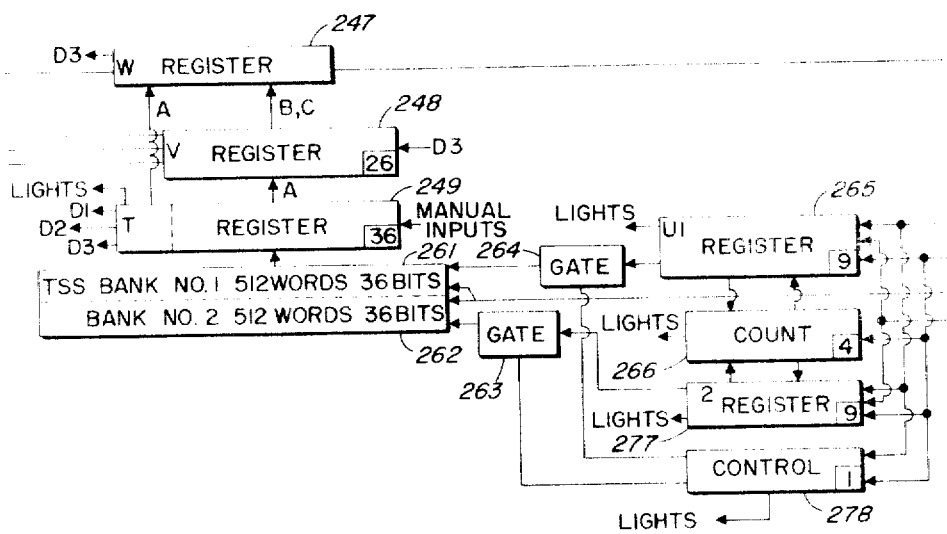

In FIGS. 15, 16, and 17 there is shown a general block diagram of the entire high-speed transfer link including the input matrix, the output matrix, and the transfer control unit, designated generally as block 320. The input and output matrices are shown in somewhat the same manner as in FIG. 5, but with the switching points rearranged to provide for a more readable drawing arrangement.

In the transfer sequence control unit 320 there is contained the micromemory which consists of two banks in the present embodiment. These banks are designated by reference characters 261 and 262; with each bank containing 512 words of 36 bits each. The T register, the V register, and the W register provide the output means for information read from the micromemory. In a broad sense, each 36 bit word of the micromemory consists of three transfer instructions, each 10 bits long, with the additional six bits used as a constant, as will be discussed later herein. Each of the three transfers is called a cycle and identified herein as the A, the B, and the C cycle. The A cycle includes bits 1–10, the B cycle includes bits 11–20, and the C cycle includes bits 21–30. Each transfer cycle is capable of causing information data to be transferred from a given register to another register through the high-speed transfer link, which includes the input and output matrices 103'''', 105'''' and transfer bus 108''''.

Each of the 10 bits of a transfer cycle is divided into two five bit codes supplied respectively to the input decoder 245 and the output decoder 246. The input and output decoders 245 and 246 function to respond to the five bit code supplied thereto to select one of the 32 switching points of the input and output matrices, respectively. It is to be noted that the input decoders are also referred to herein as source decoders and that the output decoders actually consist of clear decoders for clearing a register and set decoders for setting new data into a register. Both the input and output decoders are discussed in detail in the section "HIGH SPEED TRANSFER LINK."

The micromemory banks 261 and 262 are accessed by the U1 register 265, the U2 register 277, the count register 266 and a control unit 278 in cooperation with gating circuits 263 and 264.

The U1 and U2 registers 265 and 277, respectively, are associated with banks 261 and 262 of the micromemory through gates 264 and 263, respectively, under control of control unit 278. In other words, by an appropriate code bit supplied to control unit 278 either the gate 264 or 263 is opened to permit access either into the bank 261 or the bank 262 of the micromemory by the U1 register 265 or the U2 register 277, respectively. Each of the U registers 265 and 277 have nine bit positions, which permits the access of $2^9$, or 512 words.

A counter 266 is associated with the two U registers 265 and 267 and, more specifically, is associated with the last four bits of each of the two registers. The counter itself contains four bits and operates generally in the following manner. Each time an address is accessed in the micromemory, the counter advances one count, so that it will register one count greater than the corresponding last count contained in the last four positions in the U registers 265 and 267. Subsequently, during the next access of the micromemory the count contained in counter 266 is forced into the counter comprised of the last four bits of the registers 265 and 277. The counter then, at a later time during said next access of the micromemory, will advance an additional count, which additional count will be forced into the counters of the U registers during the next subsequent access of the micromemory. For jumps or branches, means are provided to override the effect of the counter 266 as will be described below:

C. *General description of transfer sequence control unit (TSCU)*

Referring now to FIG. 20, there is shown a detailed block diagram of the transfer sequence control unit including the two banks of the micromemory designated collectively by reference character 322, the T register 249', the V register 248', the W register 247', the input matrix 103''''', the output matrix 105''''' and the U register 265'. Only one U register is shown and the four stage counter 266 of FIG. 16 is not shown. In addition there is shown a block 323 identified as a C cycle transfer inhibit block, a block 324 identified as the ZERO source detector for the A cycle, and a block 325 identified as the ZERO source detector for the B cycle. As indicated above, the U register is employed to address the micromemory identified as the TSS memory 322.

C-1. THE U REGISTERS

Also as indicated above, the last four digits of the U register 265' which are labeled 7, 8, 9 and 10 are employed to count successive steps or addresses of the micromemory; which count always occurs on the A cycle. The first six bit positions of the U register are not part of the consecutive sequence four bit counter stage, but rather maintain a given state until changed by data transfer such as a jump or a branch. The transfers which may occur are indicated at the inputs to U register 265' in FIG. 20. They include a fixed wire transfer from register G to the entire U register through MO 4:7–16 during the A cycle. "MO" designates the output matrix; "4" designates the switching address of the output matrix, and "7–16" designates bit positions 7–16 of the matrix address. A second transfer is to bit position 2 through a first bit of the zero switching position of the output matrix which is designated by the nomenclature MO 0:1 wherein the "MO" defines the output matrix; "0" defines the switching matrix; and "1" defines the bit position of the switching level. In a similar manner the various switching positions and bit levels of the input matrix designated by the M1 will be identified. Transfers to the last four bits of the U registers may be made only through MO–4, and only on the C cycle. The other transfers are all limited to the A cycle.

In FIG. 21 there is shown in chart form the individual input/output connections to the U registers. The column laballed "Set Inputs" designates those output matrix bit positions which, if gated by the conditions designated in the column and contain a "1," will place a "1" in the corresponding U register position. For example, in the first row of the first column the number "4–7" indicates the bit position 7 of output matrix address 04 is connected to bit position "1" of the U register and that a signal will be gated therein when address 04 is energized on the "A" transfer cycle.

Thus, a "1" present on the 7th line of the transfer bus would be transferred to the first bit position of the U register 265' when the matrix address 04 was selected on the A cycle. In each designation of a bit position, the number before the dash represents a matrix switching point, while a letter before the dash represents a register. The number following the dash designates a specific transfer line or bit position in the register.

Resetting of the U registers is indicated under the heading "Reset Inputs" of FIG. 21. A reset input, when properly gated, forces a zero into the corresponding U register position, providing a 1 is present in the reset source. For example, reset of all the U register bit positions can be effected by input 4–17 in the A cycle, and of bit position 2 by input 0–17 on the A cycle. Transfer line 17 is gated to the reset terminals of those U register positions which are included in the selected destination address. The state of line 17 in the transfer bus is as follows: The A cycle 1; on the B and C cycles, the complement of bits 31 and 32, respectively, of the V register 248'. The presence of a "1" on line 17 initiates clearing of the destination prior to data transfer.

The columns labeled "True Outputs" and "False Outputs" indicate the locations to which ONES and ZEROS, respectively, are transferred from the U register. There are three sets of outputs: U1–6, K1–4 to MI–29 (only on the C cycle); fixed wire from U7–10 to the counter K1–4, connected as indicated under "Counter Inputs"; fixed wire to the TSS "select" lines (E1–E36).

Operation of the counter is indicated at the bottom of FIG. 21. The fixed wire transfers from the U register to the K counter cause the counter to be loaded on every B cycle with the number one greater (modulo 16) than that present in the last four positions of the U register 265'. The counter (K) to U register transfer shown at the top of the page causes this new number to be forced into the U register on the following A cycle. This count can be overridden and reset to any desired value by the D3– U register transfer in the A cycle, or an MO–4 transfer on the A or C cycle. If the overriding and resetting is done on the C cycle, the new number is transferred into the counter through the transfer link and from the counter to the U register on the following A cycle. The above-mentioned transfer affects only the last four bits of the U register 265'. On the other hand, if the transfer is called for on the A cycle, the new number is transferred directly from the length to the U register 265' and affects all ten positions.

The operation of U register 265' imposes a specific organization on the TSS unit as illustrated in FIG. 28. The 512 words of each module are stored in sixteen blocks, each block containing 216 words. A particular location is selected by the bit content of the U register 265' as follows: Bit 1 of the U register 265' determines the particular module of the two modules available.

Bits 3 through 6 determine the block within the module, bit 2 determines the odd or even range within the selective block. The four bits 7 through 10 count around the ring until changed by a data transfer, when they then resume counting from the new position.

As an example, the following sequence of operation may be obtained:

(1) 0 0 0110 1110
(2) 0 1 0110 1111
(3) 0 1 0110 0000
(4) 1 1 1101 1101
(5) 1 1 1101 0001
(6) 1 1 1101 0010
(7) 1 1 1101 0011

The register U 265' is first loaded with the ten bits 0 0 0110 1110, thereby selecting with the first bit the first module, with the second bit, the even ring, with the bits 3 through 6, the sixth block and with the bits 7 through 10, the fourteenth position in the selected ring. Such loading of the U register may be done either by MO–4 transfer during the A cycle or a G–V transfer bit. Sequence (2) is obtained by changing bit 2 from "0" to "1" by an MO–0 transfer, while the count advances to 15. Sequence (3) follows as count advances from 15 to 0, the other positions remaining unchanged. Sequence (4) is obtained by a 10-bit transfer (D3–U or MO–4, during the A cycle), and in this case selects a location in the other module since bit 1 is changed. Sequences (6) and (7) follow as the count advances.

The U register readout provides a return address after branching to a sub sequence. For example, suppose that step 6 above contains a branch command in the A cycle and it is desired to return to sequence (7) after the branch sequence. Under such circumstances step 5 during the C cycle should be a U readout to temporary storage as for example, register D3. At the time step 5 is being executed the U register contains address 06. The register D3 is the contents of U incremented by 1, that is, address 07, the desired return address.

C–2. THE T, V, AND W REGISTERS

The T register 249' of FIG. 20 is 36 bits long so that it can accept a complete 36-bit command word from the TSS unit 322. As discussed above, each 36-bit word is subdivided into the A, B, and C portions plus 6 additional bits, as shown in FIG. 20. Each of the A, B, and C cycles contain ten bits and is capable of performing one transfer command. Such transfer commands are executed in sequential order during the A, B, and C cycles. In each transfer command of 10 bits, five are employed to select the switching point of the input matrix and five are employed to select the destination or switching point of the output matrix 105''''.

Under certain circumstances, it is desired to inhibit clearing the destination register. Such inhibition is accomplished by bits 31 and 32 of the T register. More specifically, if bits 31 or 32 contain ONES, they will function to inhibit clearing of the destination register on the B or C cycle, respectively. Such inhibit function capability is not provided for the A cycle. In addition, bits 21 through 36 can be used as a 16 bit constant transferable either on the A or the B cycle. Bits 1–5 and 11–15 are transferable to recognition circuits 324 and 325, respectively, which inhibit execution of the C cycle as a command when it is being used as a part of the aforementioned constant. More specifically, when bits 1–5 or bits 11–15 are all ZEROS, the ZERO source detectors 324 or 325, respectively, will detect such a condition and will supply a signal to the C cycle transfer inhibit block 323, which will inhibit the execution of the C transfer as a command and instead will cause bits 21–36 to be employed as a 16 bit constant.

The chart of FIG. 22 lists the input and output connections to the T register 249' of FIG. 20. Inputs are from the TSS unit 322 and a set of switches SW on the maintenance panel. Outputs are to the V register 248' and the W register 247', the C transfer inhibit control 323, and the registers D1, D2, D3, and R2 of FIG. 12. Transfers from the T register 249' to registers D1, D2, D3, and R2 are primarily for diagnostic purposes and are of a fixed wire nature. Such transfer is indicated at the bottom of the T register 249' in FIG. 20.

The V register 248' serves as a buffer for T register 249' during the readout of the next subsequent word from the TSS unit 322. Since the readout of the next subsequent word begins in the B cycle, the A cycle command does not require buffering. Hence, the V register 248' which is a buffering register between the T and W registers, is only 26 bits long. Besides receiving data from the T register 249', the V register 248' may also receive data in bit positions 21–30 by fixed wire transfer from the D3 register 140'' of FIG. 12. The output terminals of the V register go to several places, including those listed below; bits 11 through 30 constituting the B and C cycle commands, go to the W register 247', bits 31 and 32 go to the B and C cycle clear inhibits, and to matrix point MO–0, 2 and 4. The aforementioned connections are listed along with their gating controls in the chart of FIG. 23.

The W register 247' of FIG. 20 performs a function of storing the instruction for each individual transfer as it is being executed. It accepts three inputs in succession; first, the A command consisting of bit positions 0 through 10 from the T register 249' with the ZERO bit position going to the bit position W–16 in the W register which is the clear inhibit position; secondly, the B command which consists of bit positions 11 through 20 from the V register 248' and bit position 31 from the V register; and the C command which consists of bits 21 through 30 and bit position 32 from the V register 248'. The first five bits in W register 247' are read out to the matrix input of decoder 103''''' to select one of the 32 switching points. The selected point forms an enabling connection to the input matrix from the designated source which is usually one of the registers. In the same manner, bits 6 to 10 are transferred to the output matrix "clear" decoder which selects an output connection for line 17 of the switching matrix. A "1" on the said line 17 of the switching matrix will cause the selected destination register to be cleared, unless inhibited by a "1" in W–16.

Bits W11–15 which correspond to bits V11–15 have the same inputs as W6–10, but a slightly later timing. Such bits W11–15 are transferred to the MO "set" decoder, which enables a data output from the transfer link to the selected destination. The combined effect is a data transfer from the selected source register through the transfer link to the selected destination register.

In the chart of FIG. 24 there is shown the specific connections for the W register 247' of FIG. 20.

There have been, up to this point, several references and some discussion concerning the A, B, and C transfers of a 36 bit instruction from the TSS unit. In FIG. 25 there is shown the coaction between the T register 249', the V register 248', the W register 247', the U register 265', and the counter to produce the A, B, and C transfers and the timing relationships relating thereto. Each main core storage (MCS) cycle of 5 microseconds is divided into five TSS cycles which can arbitrarily be numbered 1, 2, 3, 4, and 5 cycles; with each TSS cycle being subdivided into three transfer cycles identified above as the A, B, and C transfer cycles. In FIG. 21 the events pertaining to a particular TSS cycle during any transfer are indicated on the right hand column of FIG. 25. The numbers in the chart represent a 36 bit word from the TSS. For example, during transfer 1B the last four bits in U (of cycle 3) are gated into the counter incremented by a ONE count to generate the address for cycle 3. During transfer 2A the incremented count from the counter is gated back into the U register 265'. At transfer 2B the command word is read out of the TSS unit 322 into the T register 249' (FIG. 20). Also, as indicated in the extreme right-hand column of FIG. 21, on the same cycle, i.e. cycle 2B, the counter is incremented for the next address (cycle 4). The incrementation of the counter is designated by the numeral 4 in transfer 2B.

During transfer cycle 2C several events occur. Firstly, the A command is loaded into the W register 247' of FIG. 20 in preparation for its execution; secondly, the remaining bits 11 through 36 of the T register 249' are gated into V register 248', and thirdly, the bits 1–5 and 11–15 of the T register are gated to the source detectors 324 and 325, respectively, of FIG. 20 for possible inhibition of the C cycle transfer. The 3A transfer takes place during its transfer cycle and the B cycle transfer command is then loaded into the W register 247'. During cycle 3B, the B cycle transfer is executed and W register 247' is loaded in one of two ways.

Normally, the W register 247' receives the C transfer command during cycle 3B as designated by the number 3 in the cycle 3B. However, if either the bits 1–5 or 11–15 of the T register 249' all happen to be ZEROS, signifying a transfer from source V on the A or B cycle, then instead of the C cycle transfer command to the W register 247', there will be a "no operation" transfer command. Such "no operation" transfer command occurs through the switching points MI–31 and MO–14 of the input and output matrices. During time interval 3C the selected transfer is completed into the destination register through the output matrices. However, by this time word 4 is in the T register 249' and its A command is transferred into the W register.

If the address for cycle 3 command word had resulted from a transfer to the U register 265', rather than a simple incrementing of the previous address, the timing would have been as indicated on one of the next two lines of FIG. 25. More specifically, if the MO-4 cycle transfer were employed (affecting only the command) such transfer would occur during 1C, which is two TSS cycles preceding execution. Any A cycle transfer to the U register 265', such as through matrix switching point MO-0 or MO-4, or from the D3 register blank, would occur during 2A, which would be in the TSS cycle immediately preceding complete execution of the TSS instruction.

During each transfer cycle a single transfer of data is initiated via the transfer link. A clear pulse is sent to the receiving register unless inhibited and is followed immediately by transfer of the data. For example, in FIG. 21 row 9 shows the timing of the clear pulses which are followed immediately and in the same A, B, or C, cycle time unit by a transfer of the data indicated in row 10.

The C transfer inhibit is employed when the C transfer does not represent a command. In such a case the C transfer bits will be read out through the switching point MI-0 during the A or the B cycle, and the C cycle will not be used as a transfer command. However, one restraint on this usage of the C cycle bits must be observed. When the C cycle is transferred from the V register 248' through the matrix, it includes bit 31. Such bit will then play a dual role. The said bit 31, firstly, will be the first bit of the data word which is transferred during the A or B cycle, and it will also act as the clear control for the B cycle transfer. Any sequence in which this command occurs must be designed so that the two functions of bit 31 are compatible. That is, if the V constant which includes the bits 21 through 36 begins with a ONE, the B transfer must take place without clearing the destination. If the V constant begins with a ZERO, clearing must occur. Such conflict is not likely to occur often, since most of these transfers go to the U register and so do not involve bit 31. A similar conflict of bit 32 cannot arise.

A sequence of commands may be constructed to implement any instruction within the capabilities of the equipment. An operation code number is designated to represent the particular instruction, and the first command word of the sequence is stored at the corresponding location in the TSS unit. If the sequence is short, the remaining command words may follow in succession with the same range. If more than 16 words are required, however, or if the sequence shares a common sub-sequence with another one, a jump can be made to another ring.

A jump is made by changing the contents of the U register 265' through one of its three matrix connections, as noted in FIG. 20, or by fixed wire transfer from the D3 register. Transfer to the U register 265' must always occur on the A or the C cycle. Referring to FIG. 25 again, note that if the U register is changed during the A cycle time, the new number will be there during the following B cycle when the TSS access is initiated. Specifically, see rows 2 and 3 of FIG. 25. Thus, the jump will take place on the next word. If the count in the register U 265' of FIG. 20 is changed during the C cycle time, the next word will already have been called from TSS, so the jump will not occur until the following word. If the count in register U were to be changed during B cycle time, that is during the initiation of the TSS access, the jump would be unpredictable. Hence, transfer to the U register during the B cycle time is forbidden.

The number which causes a jump may come from one of the stored command words, in which case the same sequence will be followed through every time its first word is addressed, which constitutes an unconditional jump. On the other hand, the number may be transferred to the U register counter from an external source, such as the MCS memory unit, that is the main memory, or the logic register 144' of FIG. 12, thus causing what is defined as a conditional branch. A different sequence will be followed, depending upon the value of the number transferred to the U register. Transfer to the second bit position of the U register to MO-0, which is the transfer of a single bit resulting from a test, is one example of branching in the transfer sequence control unit.

D. *Brief description of C control register*

Referring now to FIG. 27 there is shown a chart of the C register connections. More specifically, there is shown the octal address of the set and the reset inputs to the C register, the functions of the various bit positions of the C register, and the octal address of the output terminals of the various bit positions of the C register.

As can be seen from FIG. 27, bit positions 5-12 are employed for indicator purposes which will be discussed in detail later herein in the section entitled "CONTROL UNIT C." The remaining 19 positions of the 27 bit positions of the C register are used for control purposes, and in the manner indicated in the chart of FIG. 27. In each of the address columns, the first number represents the octal address and second number represents the transfer bit position of the particular octal address. In some cases a letter, A, B, or C or some combination thereof follows the second number. Such letter represents the transfer during which the control will occur. In other instances, the notation FW is employed. Such notation represents a fixed wire connection wherein it is not necessary to go through the transfer link to effect the connection.

A detailed discussion of the C control register is somewhat lengthy and appears in the section herein entitled "CONTROL UNIT C." However, it is believed desirable to introduce to the reader some basic ideas relating to the C register. Consequently, the drawings of FIGS. 27 and 28 have been included at this point.

FIG. 28 shows the C register destination connections. More specifically, the C register can be addressed only through output matrix addresses 12 and 14 (decimal address). Such restriction is noted in the row entitled "Address" in FIG. 28. Further, the setting or resetting of the various bits of the C register can be accomplished only during certain transfers of the transfer cycles A, B, and C. Such restrictions are noted in the row entitled "Cycle."

In the row entitled "Destination" the notation "C" represents a setting of the particular bit of the C register and the notation "CN" represents the resetting of the particular bit of the C register with the restrictions, of course, set forth in the rows entitled "Cycle" and "Address."

The particular bits of the C register that are set and reset under the conditions outlined in FIG. 28 are shown under the particular bit position of the transfer link address selected. For example, bit C-02 can be set by addressing decimal address 12 of the output matrix on the A cycle and by transferring a ONE through the third bit position of said transfer link address.

From the foregoing it is apparent that the programmer must set and sometimes reset the various C register bit positions in order to accomplish some desired function controlled by the C register.

II. GENERATION OF TIMING SIGNALS

The timing circuits for the Data Processor must be considered from two aspects. Firstly, the data processor may consist of only a single switching frame (with peripheral devices) which would require timing circuits only for the said single switching frame. In the second case, the specific system might employ two or more switching frames (each with peripheral devices) which must be synchronized with each other. In such a case, a central timing system is employed which controls the timing system of each of the individual switching frames.

A. For a single processor

There will first be considered the case where only a single switching frame is employed.

Generally speaking, there are three different timing circuits for each switching frame. It might be noted that the term switching frame defines the data processor without the peripheral devices. One of these timing circuits consists of a one megacycle counter circuit used to control the transfer sequence. More specifically, the one microsecond time interval is required since one microsecond is the time interval required to access one word from the TSS unit and to execute the instructions contained in said one word. As will be seen later herein, the one microsecond counting circuit is employed to generate several other types of pulses having a repetition rate six times as great as the one megacycle signal.

A second timing circuit consists of a 200 kilocycle signal generating means employed to control the main memory which has an access time of five microseconds, for each word therein.

It is to be noted that both the one megacycle timing and the 200 kilocycle timing are both derived from the same basic three megacycle clock.

The third timing system consists of a 5.34 kilocycle signal generating circuit which is derived from a 5.34 kilocycle crystal oscillator and is employed, primarily, to create pulses which can be utilized to poll a plurality of teletype stations, each of which may have a different one of the several rates of sending and receiving currently employed in teletype apparatus.

Referring now to FIG. 30, there is shown a 3-stage counter designed to establish various one megacycle signals from a basic three megacycle clock 400. The 3-stage counter is comprised of flip-flops 401, 402, and 403. Each of the two halves of the three flip-flops is labeled for identification purposes. For example, flip-flop 401 has one state labeled 1MCA, which represents the set state of stage A of the one megacycle counter. The lower half of flip-flop 401 is labeled 1MCAN, which represents the reset state of stage A of the one megacycle counter. In other words, when the half 1MCA contains a ONE, the flip-flop 401 is in a set condition, and when the half 1MCAN contains a ONE, the flip-flop 401 is in a reset condition. Similarly, the labeling of flip-flops 402 and 403 identify the states of the B and C stages of the 3-stage counter of FIG. 30.

The one megacycle counter of FIG. 30 is driven by the two output signals from the basic three megacycle clock generator 400. The two output signals of the three megacycle clock generator 400 are basically rectangular in shape and are substantially 180° removed from each other in phase, as shown in the curves of FIGS. 32a and 32b. The aforementioned two-level timing waveforms are identified as CLO and CLE, respectively, which represent the phases clock output odd (CLO) and clock output even (CLE), respectively. In FIG. 50 the outputs CLE and CLO of the three megacycle clock 400 are supplied to the reset and set sides of flip-flop 401 through AND gates 404 and 405, respectively, and OR gates 406 and 407, respectively. The CLE and CLO output signals of the three megacycle clock 400 are also supplied to the AND gates 408, 409, 410, and 411 of the B and C stages of the counter, as shown in the drawing. Further the outputs of the set and reset states of each stage is supplied to the set and reset sides of the following flip-flop stages through AND gates 408 to 411.

Although a three stage counter has a maximum possible count of eight, the particular counter shown in FIG. 50 has a count of six, rather than eight. The count of six is accomplished by conventional means whereby certain stages of the normal count of eight are prohibited by feedback means 412, 413, 414, 415, 416, and 417 from stages B and C to the input gating circuit of the first stage A.

With the circuit arrangement shown in FIG. 30, the count sequence is as follows:

```
000
001
011
111
110
100
000
```

As will be more evident later herein, several different timing signals each having a one megacycle rate or multiple thereof are employed in the data processor. More specifically, it is necessary to generate five different timing signals from the one megacycle rate. These five different timing signals are as listed below:

CE=clock enable
EI=enable inverted
CP=clock pulse
DI=double inverted timing pulse
TP=timing pulse The five classes of general timing signals listed above are produced by circuitry including the one megacycle counter of FIG. 30, the main timing chain of FIG. 31, and the circuit shown symbolically in FIG. 33.

Referring now to the main timing chain of FIG. 31, there is generated the CE and the EI signals. The main timing chain consists of six pairs of flip-flop circuits. The first pair of flip-flop circuits includes flip-flop circuits 420 and 426; the second pair includes flip-flops 421 and 427; the third pair includes flip-flops 422 and 428; the fourth pair includes flip-flops 423 and 429; the fifth pair includes flip-flops 424 and 430, and the sixth pair includes flip-flops 425 and 431. The flip-flops 426 and 431 are merely duplicates of flip-flops 420 to 425, and are provided merely to supply additional output terminals for the CE and EI signals. As in the flip-flops of FIG. 30, each of the flip-flops of FIG. 31 has a set and a reset state with the set state existing when the upper half of the flip-flop contains a ONE and being reset when the lower half of the flip-flops contain a ONE. The first stage 420 of the timing chain is activated directly by the output of the one megacycle counter of FIG. 30, thus establishing a definite time relationship between the pulses CE–1 and EI–1 and the output of the one megacycle counter of FIG. 30. The specific conditions for activating flip-flop 420 of FIG. 31 are the simultaneous occurrence of a CLE, a 1MCBN, and a 1MCCN, which will cause flip-flop 420 to be set. Each subsequent flip-flop 421 to 425 is then energized to a set condition by subsequent CLO's and CLE's as they occur alternately. After the sixth flip-flop 425 has become energized to a set condition, the one megacycle counter will have cycled through six one megacycle pulses so that the initial flip-flop 420 will again be set.

A more detailed discussion of the operation of the main timing chain of FIG. 31 follows. The first flip-flop 420 is set when the following three conditions exist: when a CLE is supplied thereto and when the B and C stages of the one megacycle counter are both in the reset condition. The next subsequent CLO pulse will cause the flip-flop 421 to assume its set condition; i.e., to have a ONE in its upper stage designated by the letters CE–2. The said next subsequent CLO pulse will also perform the function of setting the B stage of the one megacycle counter of FIG. 30. Thus, when the next CLE pulse occurs, two things will happen in the main timing chain of FIG. 31. Firstly, the flip-flop 422 will be set due to the said CLE pulse and the set condition of the prior flip-flop 421. Secondly, the first flip-flop 420 of the main timing chain will be reset since both the low level states of the CLE signal and the 1MCB signal are supplied to the reset side of flip-flop 420. The next CLO pulse will set flip-flop 423 and will function to reset flip-flop 421 since the prior flip-flop 420 is in a reset condition. Thus, it can be seen that each flip-flop remains in a set condition for two raw clock pulses, that is a CLO and a CLE.

In FIGS. 32 and 34 there are shown the various output pulses of the three flip-flop stages of the one megacycle counter of FIG. 30 and the six flip-flop stages of the main timing chain of FIG. 31. It will be observed that the output signals CE–1 through CE–6 each have a one megacycle rate, but are timed approximately 167 nanoseconds apart in a progressive manner. Each of the CE–N signals has its lower level encompass a specific CLO or CLE signal. More specifically, the CE–N signals where N is odd, have their low level portions encompass CLO signals, whereas the CE–N signals, where N is an even number, have their low level portions encompass the CLE signals.

The enable invert (EI) signals shown in FIGS. 53–J through 53–P are substantially inversions of the corresponding CE–N signal, as can be seen from the drawings.

In FIG. 54 there is shown the waveforms of the clock pulses designated generically as CP–N and the double inverted pulses designated as DI–N. The CP–N and the DI–N timing waveforms are formed as shown in FIG. 33. More specifically, the CP–N signals are formed by supplying CLE and CLO signals and CE–N singals to inverted AND circuits. For example, to form the CP–N where N is odd, the CE-odd waveforms are supplied with the CLO signals to an AND circuit 441 and an inverter 440. To produce the double inverted (DI–N) signals, the CP–N signals are simply passed through a second inverter, such as inverter 442 of FIG. 33.

In FIG. 36 there is shown a waveform of the timing pulses designated generally as TP–N. Similar to the case of the other timing signals there are six timing pulse signals spaced apart about 167 nanoseconds and occurring progressively through each one microsecond time interval.

The TP–N timing pulses are formed specifically by supplying EI signals and either a CLO or CLE to an inverted OR circuit, such as the inverted OR circuit 443 of FIG. 33. More specifically, to form the TP–N signals, where N is an odd number, the EI-odd signals and the CLE signals are supplied to inverted OR circuit 443. To form the TP–N signals, where N is an even number, the EI-even signals and the CLO signals are supplied to an inverted OR circuit, such as inverted OR circuit 444.

It is to be understood that there exist output leads from the two stages of the flip-flop circuits of FIG. 31, which are not specifically shown. The reason why such output leads are not shown is to avoid unnecessary complication of the drawing without appreciably adding to the completeness of the description. Such output leads, however, are used to form the CP–N and the TP–N signals as shown in FIG. 33. Such CP–N signals, DI–N signals, or TP–N signals, are generally formed at or near the point where they are needed in the processor.

The usages of the various timing signals CP–N, DI–N, and TP–N, will be discussed in more detail in connection with the register or particular circuit of the processor in which they are employed.

B. *Generation of timing signals for a complex of several processors*

Figure 6:
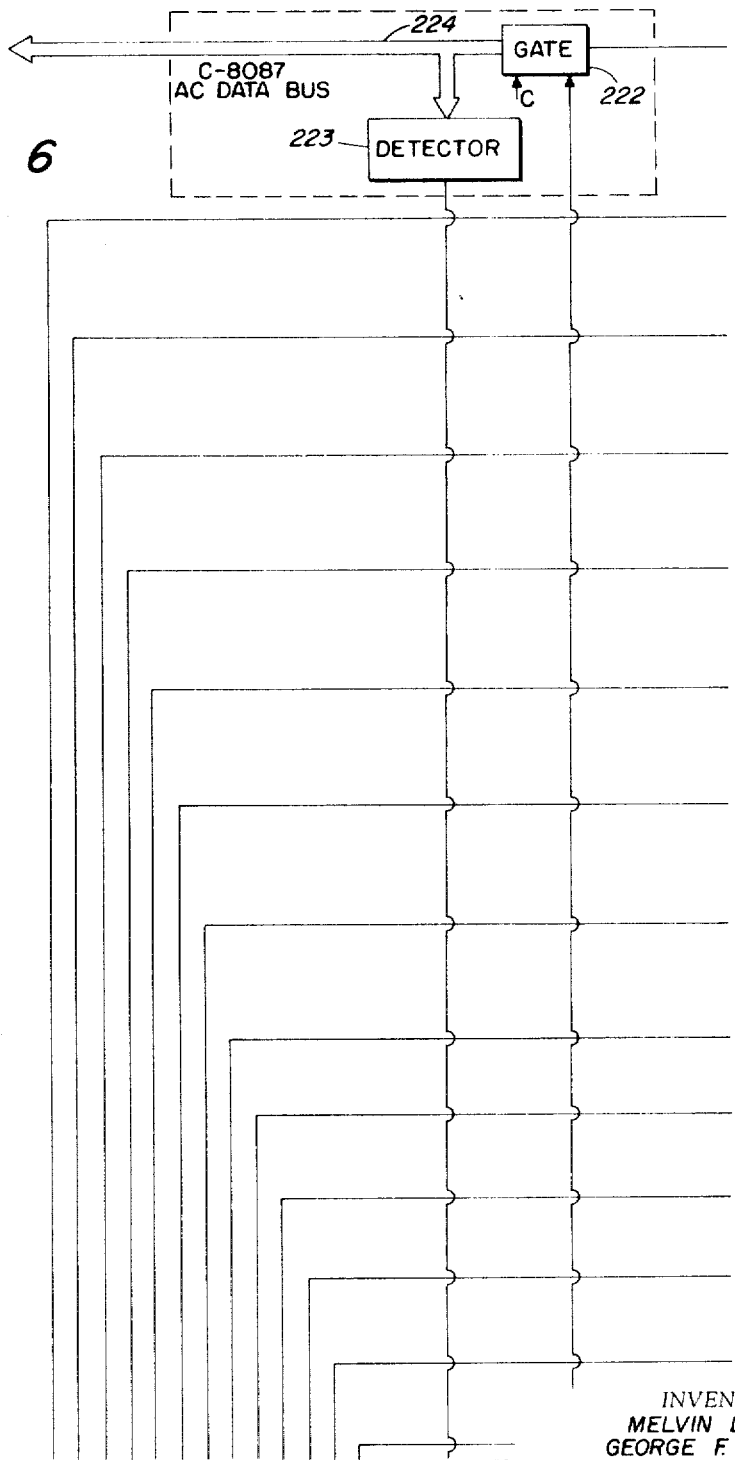

As discussed hereinbefore, when a plurality of switching frames are employed in a system, each switching frame has its own timing system which is controlled by a master timing system so that the timing systems of all of the switching frames may be the same. In FIG. 37 there is shown a block diagram of the central timing system and the timing system of a single switching frame. More specifically, in FIG. 56 the blocks 450, 451, 452, 455, 453, and 454 represent the timing system of a single switching frame. With only a single switching frame there would, of course, be no necessity for synchronizing the timing system with any other switching frame. However, when two or more switching frames are employed, a common or central timing system must be employed. Such a common timing system employs a timing synchronizer 456 and for each switching frame an AC data bus block 457. In FIG. 6 such AC data bus is designated by reference character 224. It should be noted that the AC data bus 457 is a circuit means not only for synchronizing two or more switching frames, but also to transfer information from one switching frame to another which, of course, necessitates the synchronization of the various switching frames with each other.

The timing synchronizer 456 is constructed to generate a three megacycle signal and a one megacycle signal, respectively, on output leads 3 SYC (three megacycle) and 1 SYC (one megacycle) which are supplied to data bus 457. The data bus 457 passes the three megacycle signal to the oscillator 458 and the one megacycle sync signal to the one megacycle counter 451. The output of the three megacycle oscillator 458 consists of two signals substantially 180° reversed or out of phase with each other and labeled SCLE and SCLO. These signals are sine wave signals and represent the clock even and clock odd signals before transformation from sine waves to two-level rectangular waveforms. Such a transformation is accomplished by the three megacycle drivers 450 so that the output signals thereof are the CLE and the CLO signals described in connection with FIG. 30.

Feedback means are supplied from the three megacycle driver 450 to the data bus 457 and also CE–N and EI–N signals from the main timing chain 452 to the AC data bus 457 via leads 463 and 462. Such circuit feedback means function to maintain synchronism between the output of the three megacycle oscillators 458, the one megacycle sync signal from the AC data bus 457 and the one and three megacycle signals supplied from the timing synchronizer 456 to the AC data bus 457.

Referring now to FIG. 38, there is shown a block diagram of the main timing synchronizer 456 of FIG. 37. In FIG. 38 there is provided a three stage binary counter 1030 which is substantially identical to the three stage binary counter of FIG. 30. The output of such three stage binary counter 1030 is supplied through driver circuits 468 and 469 to processors A, B, C, D, E, F, G, and H. Such one megacycle timing signal is employed to synchronize the local one megacycle counter into some desired state, such as the 110 state. Thus, the following expression will be true:

Sync state 1 mc. counter=1MCA; 1MCB; 1MCCN

Three megacycle clock oscillator 470 and clock driver 471 provide a three megacycle synchronizing signal to buffer amplifier circuits 472 and 473 which, in turn, supply the three megacycle synchronizing signal to processors A through H. The waveforms generated by the one megacycle counter 1030 of FIG. 38 must meet both the time duration and the occurrence requirements of the individual switching frames. This requirement is that the delayed CE–6 signal transmitted from a source processor and received by AC data bus 457 of FIG. 37, for example, must match the main processors CE–1 signal. Obviously, there is some delay involved in transmitting signals from one processor to another due merely to the length of cable involved in the interconnections. Such delay is standardized, however, in accordance with the aforementioned requirement.

Furthermore, to minimize the effects of delay due to cable length, all cables utilized to interconnect the master timing circuit designated in block 456 of FIG. 37 with the various AC data busses, such as AC data bus 457, of the individual switching frames, must be identical in both type and length. Such identity provides a fixed delay upon the signals reaching the processors, thereby providing synchronized timing in all the processors with respect to the main timing synchronizer 456 of FIG. 37.

Additional information regarding the operation of the AC data bus will be found herein in this specification under that portion of the description entitled "AC DATA BUS."

As mentioned briefly above, two other timing circuits are employed in the processor. One of these timing circuits functions to generate a 200 kilocycle signal having a period of five microseconds which is employed to access the main memory. The 200 kilocycle timing signals are derived from the one megacycle timing signals discussed above by means of the circuit shown in FIG. 39.

In FIG. 39 there is shown a counting chain consisting of four stages, including flip-flops 481, 482, 483, and 484. Although these flip-flops have a capacity to count to 16 by means of feedback controls, the count is limited to 10 and produces the output waveforms shown in FIG. 115. The waveforms of FIG. 115 are discussed in detail in the section entitled "S & Z REGISTERS" where their usage in accessing the main memory and reading the words contained therein into the Z register is explained in detail. For purposes of this section, only a description of the timing diagram of FIG. 39 wil be made. The operation of the timing circuit of FIG. 39 is initiated only by a special set of signals which must be supplied coincidentally to the upper half of flip-flop 481 through AND gate 485. The timing diagram will then go through a specified cycle generating the waveforms shown in FIG. 115 and then come to rest and remain quiescent until the special set of signals are again applied to the input AND gate 485. These special signals are labeled as follows:

S–SD06___Second state set decoder (matrix address 06).
STCPN___Not stop 200 kc. pulse.
TP–5.

The five microsecond memory cycle used to access the main memory is initiated only on a data transfer to the S register from the second state set decoder through matrix address 06 (S–SD06), ANDED with the B cycle timing pulse, TP–5. The following TP–4 and TP–2 signals will then activate the counter through its various steps in accordance with the timing waveform diagram of FIG. 115.

The third timing means employed in the processor is the 5.34 kilocycle generator which produces clock pulses every 187 microseconds. Such 187 microseconds pulse rate signal is employed in polling Teletype machines and functions, generally, as a common denominator of time for the various receiving and transmission rates employed by present day Teletype equipment. The block diagram for generating such 5.34 kc. timing signals is shown in FIG. 40.

The 5.34 kc. timing system is composed of an oscillator 490, a standard inverter circuit 492 and a flip-flop circuit 493 having the capability of resetting the bit C–20 (block 494) of the control register every 187 microseconds.

During the half period in which the oscillator 490 is a logic ZERO, the clock flip-flop 492 will receive reset inputs during TP–5 time. The first TP–6 time following the oscillator transition to the logic ONE state will provide a set pulse to C–20. Thus, C–20 will be set on a C transfer cycle, if it is in the reset state prior to the oscillator transition.

The clock flip-flop 493 will be set on the A cycle following the setting of C–20, thereby inhibiting further inputs to C–20 for the remainder of the half period. C–20 will provide a valid conditional jump test on the same A cycle by selecting octal address 14 for a transfer to octal destination 00; i.e., a C–20 to UM data transfer.

The control bit C–20 may be reset on any cycle following a test which indicates that C–20 is in the logic ONE state, or it may be reset on B and C cycle transfers without qualifications. If C–20 is program reset on the A cycle immediately following the setting of C–20 at TP–3 time, the clock flip-flop may not set. As a result C–20 could receive an additional set pulse on the next C cycle, thereby leaving C–20 in the logic ONE state rather than the logic ZERO state.

III. DESCRIPTION OF THE TRANSFER SEQUENCE CONTROL UNIT

A. T, V, and W registers

The T, V, and W register units function, generally, to accept a 36 bit word from the transfer sequence storage unit, which is the biax memory, to provide a temporary storage for a portion of the accepted 36 bit word, and to drive the input of the source, set, and clear decoders of the transfer link. The source, set and clear decoders of the transfer link will be discussed in more detail under the heading marked "TRANSFER LINK."

The T register is a 36 bit storage register and accepts a 36 bit word directly from the TSS unit every microsecond as shown in FIG. 41. The TSS word contained in the T register consists of four parts, including three transfer commands of 10 bits each and a constant of six bits. The three transfer commands, designated as A, B and C cycles, are executed for every TSS word read into the T register 500. It should be noted that information may also be set into the T register via 36 manual entry switches in combination with a data transfer switch which functions to transfer the information stored in the 36 manual switches into the T register. Thus, the T register contents can be displayed on lamp indicators for maintenance and TSS status verification purposes.

The V register 501, also shown in FIG. 41, is a 26 bit stage buffer register which functions as a buffer for the contents of bit stages 11 through 36 of the T register 500. The aformementioned buffering of the T register bits 11 through 36 is necessary in order to permit a new TSS read cycle to begin while the transfers that were commanded by the previous TSS word are being performed. Because a TSS recycle is performed during a B transfer cycle, bits 1 through 10 of the T register 500 do not require buffer storage and are passed directly to the W register 502 of FIG. 41.

The W register is a 15 bit storage register which stores the A, B, or C cycle transfer commands called out in the 36 bit TSS word held in the T register. On the A cycle, bits 1 through 10 of the T register 500 are sent to stages 1 through 15 of the W register. On the B and C cycles, stages 1 through 15 of the W register accepts the contents of the V register stages 11 through 20 and 21 through 32, respectively, as shown in FIG. 58.

The outputs of stages 1–5 of the W register 502 are supplied to the source decoders (the input matrix) whereby one of the 32 possible sources is decoded. The output stages 6–10 of the W register 502 and also the output stages 11–15, which contain information identical to stages 6–10, are applied to the clear and set decoders, respectively. The clear and set decoders select one of 32 destination registers. Thus, the W register 502 is the source of information controlling data transfers within the transfer link. The clear and the set decoders function generally in the following manner. The clear decoders select the destination register and clear the information contained in part or all of the bit positions of the particular register. The set decoders select a destination register, which is always the same one selected by the clear decoders so that information may be transferred into said destination register to set the various bit stages therein in accordance with the information being supplied thereto. The clear function must occur a short interval of time before the set function since clearing is preparatory to setting, when clearing is used.

Certain program requirements must be met in the operation of the T, V, and W registers. These requirements will now be discussed.

The V register, as discussed above, is a 26 stage register containing the last 26 bits of the TSS word held in the V register. These 26 bits may be used in several manners. More specifically, the 26 bits may be used as a constant, a constant and an address, or as several constants. However, stages 31–36 of the V register always hold a constant, but may be applied to any of three groups of bit positions of the transfer link corresponding to which of three V register source addresses is being used. Reference is made to the table of FIG. 42 for source addresses and corresponding transfer link bit positions. In addition to bits 31–36, bits 21–30 may be used as a constant, instead of a transfer code, with the C cycle transfer being inhibited. Again reference is made to the chart of FIG. 42 for the transfer link bit positions occupied by the register stages 21–36 when one of the three V register source addresses is employed. Thus, for example, in FIG. 42, if the constant represented by 31–36 of the V register is supplied to the matrix address 02, then the transfer link is fixed wired in such a manner that the bits 33–36 of the T register will be supplied to transfer link positions 09–12, respectively.

Two of the three transfer cycles, B and C, allow the automatic clear of the destination register to be inhibited. On the A transfer cycle, the selected destination register is always cleared prior to the transfer of information.

Bit 31 of the T register (T–31) is the clear inhibit bit for the B cycle transfer and bit 32 of the T register is the clear inhibit bit for the C cycle transfer. Thus, a binary bit 1 in T–31 will inhibit the automatic clear of the B cycle destination register and a binary bit 1 in T–32 will inhibit the C cycle automatic clear. Such a function is shown at the bottom of the chart of FIG. 43.

Because T–31 and T–32 are transferred to V–31 and V–32, respectively, for storage they play a dual role when the V register is used as a source. Such dual role is as clear inhibit bits and also as a part of the information to be transferred.

The input connections to the T register may be from several sources, all of which are tabulated in the table of FIG. 44. Some of the aforementioned inputs are set forth and discussed briefly below.

(1) 72 lines, 36 from each TSS, are applied to the input circuits of the T register from the two TSS memory units.

(2) 72 input lines, including 36 true and 36 false lines from the manual switches, each ANDED with an enabling signal, are connected to the set and reset input circuits of the T register. The enabling circuits are derived from a common input line from the switch to the T initiating circuit, which unit is described in more detail herein, under the section marked "CONTROL UNIT C."

(3) Five input lines connected to the T register are necessary to reset the T register.

(4) Two lines from the C register are ANDED with a clock enable line and one other line from the C register to ANDED with a control switch which is associated with the C register, to implement the logic for clearing the T register.

Reference is made to FIG. 62 where the circuit and the inputs required to clear the V register are shown.

In FIG. 45 it can be seen that five input lines to the T register are required to reset the T register. These five lines consist of lines 503–507. Two lines 504 and 505 are ANDED with a clock enable line 503 through AND gate 510. Another line 506 (from the C register) is ANDED with a control switch line 507 (also associated with the C register), through AND gate 509, to complete the logic for clearing the T register. The T control circuit 508 in response to signals simultaneously applied to the five input lines will supply a signal on its output lead 513. The input control circuit 514 will respond to appropriate signals as indicated on its three input leads 511, 512, 513 ANDED through AND gate 517 to supply an output signal to the driver circuit 515 which drives the individual bits of the T register. One such bit is represented by the block 516.

On certain occasions it is necessary or desirable to transfer information into the V register from one of the storage registers. The specific register capable of transferring information directly into the V register, by means of fixed wiring, is register D3. The D3 register contains 16 bits of which bits 7–16 can be transferred into bit stages 21–30 of the V register. Such a transfer takes place under control of bit C–18 of the control register. The C–18 bit is set by bit 16 of the transfer link of address 14 (MO 14:16) and is automatically reset at clock 6 time which occurs early in the C cycle. Since the D3 to V transfer occurs during the B cycle, bit C–18 must be set on an A or a C cycle only.

Specifically, the D3 to V transfer is accomplished at TP–4 time, which occurs early in the B cycle.

Three input signals (CLE, CE–4 and C–18) are ANDED through three input lines to AND gate 518, through driver circuit 519 to inverter circuits 520, 521, and 522, as shown in FIG. 46, to control a transfer of the contents of register D3 to V. Half of the outputs of the inverter circuit are ANDED with 10 lines from the true outputs (D3–XX) of the D register through AND gates, such as AND gate 557, as shown in FIG. 47. The other half are ENDED with 10 output lines from the false side (D3N–XX) of the D3 registers through AND gates such as AND gate 559.

More specifically, in FIG. 47 the line 551 represents one of the lines from a true output of register D3 and line 553 represents one of the ten lines from the false side of register D3. The AND gate 557, as an example, has as its inputs the line 551 from a true output of register D3, and the line 554 which is from one of the inverter circuits 520, 521, or 522 of FIG. 46.

In certain instances it is desirable to transfer information directly from certain bit stages of the T register through the transfer link and the input matrix to a chosen destination. Such transfer of information from the T register is employed only for the group of bit stages T–33—T–36 and the group of bit stages T–21—T–36. The transfer of such information from the T register is accomplished by fixed wiring. More specifically, input matrix addresses 02 and 04 function to select the bit stages T–33—T–36 only. The input matrix address 00 functions to select a 16 bit word, V–21 through V–36. Thus, the T register on the above defined conditions will act as a transfer link source on the matrix address 00, 02, or 04.

The aforementioned transfer link connections are shown in the following chart which contains all of the transfer link connections:

| Address | Source | Destination | Address | Source | Destination |
|---|---|---|---|---|---|
| 00 | V | U | 16 | P5 | P5 |
| 01 | R1N | A3 | 17 | P2 | P2 |
| 02 | VL | O1* | 18 | P6 | P6 |
| 03 | R1 | R1* | 19 | P9 | P9 |
| 04 | Vr | U | 20 | P7 | P7 |
| 05 | D1 | D5 | 21 | P3 | P3 |
| 06 | D2N | S | 22 | P8 | P8 |
| 07 | D2 | D2* | 23 | E2 | E2 |
| 08 | Z | Z | 24 | P9 | P9 |
| 09 | R2 | R2* | 25 | G, E1 | E1 |
| 10 | Zh | Zh | 26 | P10 | P10 |
| 11 | D3 | D3* | 27 | P1 | P1 |
| 12 | C | C | 28 | P11 | P11 |
| 13 | D4 | D4* | 29 | A1 | A2 |
| 14 | D5 | C | 30 | P12 | P12 |
| 15 | P4 | P4 | 31 | "L" | R1N |

*D1, R1, D2, R2, D3, D4 are subject to left-right control of C–13, C–14. P5, P6, P7, P8, P9, P10, P11, and P12 are commutated by C–23. Source Address 25 is commutated between the AC data bus and the E1 register by C–24.

Referring again to FIGS. 46 and 47, there is also shown a means for controlling the transfer T–33—T–36 to V–33—V–36, and of the transfer T–11—T–32 to V–11—V–32.

To control of transfer T-11—T-32 to V-11—V-32 a CLO pulse and a CE-1 timing pulse is supplied to driver circuit 524 through AND gate 523 and thence to inverter circuits 526, 527, 528, 529, and 530. The outputs of the inverter circuits are double inverted clock pulses DI-1 which are supplied to the input lead 535 of FIG. 47 and is ANDED with the outputs of the T register bits through AND gates such as AND gates 556 and 558.

The T-33—T-36 to V-33—V-36 transfer is controlled by a CLO pulse and an EI-2 timing pulse supplied through AND gate 531 to driver circuit 532. The output of the driver circuit 532 is supplied to the inverter circuit 533 which produces double inverted clock pulse outputs denoted as DI-2, which double inverted clock pulses are also supplied to input lead 535 of FIG. 47 where they are ANDED with the outputs of the various bits of the T register. The V register is represented by the block 560 of FIG. 47.

Returning again to the V register, when address 00 is selected as a source the 10 bits which ordinarily constitute the C cycle transfer instruction are included in the 16 bit data word as a constant. Under such conditions the C cycle transfer is not performed. Consequently, transfer from the V register, when the address 00 is selected, is effected only on the A and B cycles. The two clear control bits 31 and 32 of the V register are also included in the 16 bit word. However, the C cycle clear control bit, V-32 under such circumstances is not used as a clear control since the C cycle transfer is inhibited. On the other hand, the B cycle control bit V-3 does function as a B cycle clear control as well as being part of the source word. Such dual function of V-31 must be considered in the preparation of transfer sequence programs.

The timing waveforms of the T-33—T-36 to V-33—V-36 and T-11—T-32 to V-11—V-32 are shown in FIG. 48. The double inverted clock pulses DI-1 and DI-2 are listed in the extreme right-hand column.

The aforementioned transfers from the T register into the V register permit the T register to be cleared during the DI-4 time, as shown in FIG. 48. Once the T register is cleared by the DI-4 signal new information can be read from the TSSU for the next A, B, C, sequence, without interfering with the B and C cycles currently being executed from the immediately prior instruction from the TSSU.

Also in FIG. 48, there is shown the complete timing waveforms for transferring a word from the biax into the T registers and, subsequently, into the V and W registers. The column at the left of FIG. 48 under the heading "TRANSFER FUNCTION" describes the specific bits transferred between specific registers during a given interval of time. At the right of the waveforms is another column of labels under the heading "CLOCK TIME." It will be observed that the transfer of information between T, V, and W registers is accomplished by TP–N pulses and by DI–N pulses which are formed in the manner described hereinbefore under the section entitled "GENERATION OF TIMING SIGNALS" which is illustrated in FIGS. 32–36.

As a specific example of the functioning of the timing charts of FIG. 48, the bits 6–10 of the T register are transferred to the W register by timing pulse TP-1. A short interval of time later the bits 11–32 of the T register are transferred to stages 11 to 32 of the V register by a double inverted clock pulse DI-1.

At about time $t_1$ all the information contained in the T register has been transferred either to the V or W register, so the T register can now be reset by double inverted clock pulse DI-4. Once reset, the T register is in condition to receive a new word from the biax memory. Such new word is read into the T register beginning at time $t_2$.

The specific bit assignment of the T and V registers is shown diagrammatically in FIG. 49. The A, B, and C cycles are shown as consisting of groups of bits 1–10, 11–20, and 21–30. The bit stages 11–36 of the T register are transferred to stages 11–36 of the V register, with a choice of a 4 or a 16 bit constant. Bits 31 and 32 are, respectively, the B and C cycle control bits, as discussed hereinbefore.

The 4 bit constant or the 16 bit constant may be placed directly on the transfer link lines by use of one of the three transfer link matrix addresses 02, 04, or 00, as discussed hereinbefore.

Just as the V register functions as a buffer for the T register, the W register functions as a buffer for both the T and V registers during each executed transfer. The W register contains 16 bit stages which accept the transfer command for the A cycle from the T register, and for the B and C cycles from the T register in the following manner:

| Transfer Cycle | W Register Stages | | |
|---|---|---|---|
| | (1–5) | (6–10) | (11–15) |
| A | T1–5 | T6–10 | T6–10. |
| B | V11–15 | V16–20 | V16–20. |
| C | V21–25 | V26–30 | V26–30. |

The timing diagrams for the W register are shown in FIG. 48. From the W register the information is supplied directly to the transfer link, in the following manner:

W1–W5 goes to the input of the first stage source decoder, which is discussed under the general heading labeled "TRANSFER LINK."

W6–W10 goes to the input of the first stage clear decoders.

W11–W15 goes to the input of the first stage set decoders.

The source decoder, the clear decoders, and the set decoders are all discussed in detail under the section entitled "TRANSFER LINK."

Certain special fixed wire transfers are associated with the T, V, and W registers. Two of these fixed wire transfers, involving the T and the W registers, are program-controlled fixed wire transfers. One of these two controlled fixed wire transfers is a transfer of the T register contents to the D1, the D2, and the R2 registers. The other of the two program-controlled fixed wire transfers is a transfer of data from the D3 register into the V register.

Considering now the transfer of the information from the T register to the D1, the D2, and the R2 registers (T–D1, D2, R2), such transfer is used primarily to verify operations. See the section entitled "CONTROL UNIT C" for more discussion regarding the purpose of the T–D1, D2, and R2 transfers.

The contents of the T register may be transferred on the A cycle and under control of bit C–19 of the control register C. The contents of the T register are transferred to the following stages of the D1, D2, and R2 registers in accordance with the following chart:

| T Register Stages | Destination | |
|---|---|---|
| | Register | Stages |
| 1–6 | R2 | 3–8 |
| 7–12 | R2 | 11–16 |
| 13–18 | D2 | 3–8 |
| 19–24 | D2 | 11–16 |
| 25–30 | D1 | 3–8 |
| 31–36 | D1 | 11–16 |

The implementation of the T register fixed wire transfer is shown in FIG. 50. In FIG. 50 the controlling flip-flop circuit 600 as set by simultaneous ones low-level signals) supplied to the AND gate 601 from the sources indicated in the figure. The output of the set side (C–19)

of flip-flop 600 is supplied to a transfer inverting circuit 604 through AND gate 603 which becomes opened (conductive) only during the concurrency of a CLE pulse, CE–2 pulse, and a transfer enable pulse (XENC), as well as the output of the set stage of flip-flop C–19. The output of the transfer inverting circuit 604 consists of 36 bit leads of which bit stages 1–12 are supplied to T to D transfer driving circuit 605, of which bit stages 13 to 24 are supplied to T to D driver circuit 606, and of which bit stages 24 to 36 are supplied to T to R2 transfer driving circuit 607. The output terminals of the transfer driver 605, 606, and 607 are connected to the bit stages of the D1, D2, and the R2 registers, as indicated in the above chart.

The control register bit stage C–19, which controls the T–D1, D2, and R2 transfers, is set only on the B cycle and is automatically reset on the following B cycle. On the TSS word A cycle following the setting of C–19, the TSS word held in the T register will be transferred and the operation of the transfer link will be inhibited for the A, B, and C cycles while the transfer is occurring.

The program-control fixed wire D3–V transfer functions in the following manner. Such transfer is under the control of the control register bit stage 18, that is C–18. More specifically, the contents of stages 7–16 of register D3 are transferred to stages 21–30 of the V register on the B cycle when C–18 is in the 1 condition.

The implementation of the fixed wire transfer from D3 to V is shown in FIG. 51. The flip-flop 611 is set when low-level signals are present simultaneously on the input leads KDE–16 and C–SD16, to the AND gate 610, as indicated in FIG. 51. When flip-flop 611 is in a set condition and, further, when the other three input leads to AND gate 62 are at their low level from sources as indicated in FIG. 51, the D3 register driver 613 is caused to drive the individual transfer drivers 614, 615 and 616. The transfer driver 614 has four pairs of output leads, each pair going to the true and the false side of bit stages V–21 through V–25, inclusively. Similarly, the transfer driver 615 has its output terminals connected to the bit stages 25 to 28, inclusively, of the V register. The transfer driver 616 has only two pairs of leads, each pair being supplied to the (set and reset) terminals of bit stages 29 and 30 of the V register.

The operation of the D3–V transfer is initiated by setting the bit stage C–18 of the control register on either the C or the following A cycle, with the transfer actually occurring on the following B cycle. There is no design feature to prevent setting the bit stage C–18 on the B cycle. Caution must be exercised to prevent program setting of C–18 on the B cycle, since the control bit C–18 is automatically reset on the first portion of the C cycle by the timing pulse TP–6. Thus, if C–18 were programmed on the B cycle, bit C–18 would be reset before reaching the next transfer cycle.

Since bit C–18 is set during a C or the following A cycle, the transfer operation designated by the new V register transfer code can and will be executed during the next B cycle, as illustrated in the following chart:

D3 TO V TRANSFER SEQUENCE

Cycle:             Function
D cycle           TSS Word–1 to T Register.
C cycle           TSS Word–1 to V an W Registers.
A cycle
B cycle           TSS Word–2 to T Register.
C cycle           Set C–18 (TSS Word–1 C Cycle Instruction).
A cycle           Set C–18 (TSS Word–2 A Cycle Instruction).
B cycle           Perform TSS Word–2 B Cycle Instruction.
Cycle:             Function
B cycle (TP–4)     D3 to V Transfer (Change C Cycle Instruction) (f.w.).
C cycle           Perform modified TSS–2 C Cycle Instruction.

Because the D3 to V fixed wire transfer occurs on a B cycle, the use of the V register as a source of 16 bit constant on that B cycle, is a programming restriction.

In addition to the transfers mentioned above, the contents of the W register may be transferred to the D3 register under manual switch control via fixed wires as shown in FIG. 52.

The manual W to D3 transfer is a push-button control transfer which enables the C cycle transfer instruction to transfer contents of bit stages 1–15 of the W register to register D3. The processor must be in the STEP MODE for the aforementioned manual operation. (See the section entitled "CONTROL UNIT C" for a discussion of the STEP MODE, IDLE, and processor initiation.) Since the machine is idling in the STEP MODE, the next TSS instruction word is continuously being transferred to W. Thus, the instructions will be implemented after, or immediately after, the processor initiation.

The register D3 has a visual display on the control panel of the processor. Consequently, the W to D3 transfer can be used to verify the next C cycle transfer instructions.

The W–D3 wire transfer occurs during the time pulses TP–5 and TP–6 in accordance with the following chart:

Time:                   Transfer
TP–5            W (06–10) to D3 (06–10)
TP–6            W (01–05) to D3 (01–05)
TP–6            W (11–15) to D3 (11–15)

Because the bit stages W–01 and W–02 of the W register are dual flip-flops, the corresponding inputs to the bit stages of register D3 are the AND function of signals from the two flip-flops of the corresponding bit stage of the W register. For example, the outputs of the two W–01 flip-flops are ANDED to produce an output to D3–01 and the signals from the two W–02 flip-flops are ANDED to produce an output to the bit stage D3–02. Such feature is intended for maintenance purposes.

Bits 3–16 of the W register, however, each consist of only one flip-flop. In FIG. 52 there is shown the implementation for a typical bit of the W register. The output from the bit position 03 of the W register is supplied from switch 625 to inverter 626 and thence to the set side of flip-flop 628, which is reset by CE–3 pulse supplied to input terminal 627, during the following B cycle. However, during the preceding C cycle, after flip-flop 628 has been set by the output from inverter 626, the information stored in each particular bit is supplied through AND circuit 631 or AND circuit 638 to inverters 629 and 630, respectively. The outputs of inverters 629 and 630 feed to a first group of drivers 632 to 635 and a second pair of drivers 636 and 637. Such drivers function to drive the flip-flops comprising the bit stages 1–15 of the D3 register. More specifically, D3 drivers 632 and 633 drive bit stages 1–5 of register D3, drivers 634 and 635 drive stages 11–15 of the D3 register, and drivers 636 and 637 drive stages 6–10 of the D3 register.

It will be noted that the AND gate 631 becomes opened, i.e. conductive, during the simultaneous presence of a CE–6 pulse and a CLE pulse supplied thereto. The AND gate 638, however, becomes energized a short interval therebefore during the simultaneous application of a CLO pulse and a CE–5 pulse.

Another manually operated transfer built into the processor by fixed wiring involves the transfer of data into the T register from a group of 36 manually operated switches when the processor is in the STEP MODE. The contents of the 36 switches are transferred to T when a "Switch To T" button is depressed. For a more detailed discussion of the "Switch To T" button, refer to section entitled "CONTROL UNIT C." One true and one false line are wired from each switch to the corresponding flip-flop of the T register. Each of the 72 lines is ANDED with an enabling signal. The 72 enabled signals are obtained from AND circuits whose inputs are driven in parallel by a false line from the "Switch To T" switch. The "Switch To T" switch is interlocked within the control circuits to prevent manual data entry while the processor is in RUN MODE. In STEP MODE the clearing of the T register is inhibited except when a word is read out of a TSSU, or when the general clear button is depressed.

B. The U registers

Some means of addressing the transfer sequence storage TSS is required. The specific structure by which the TSS is addressed consists of the U register unit. The U register unit consists, generally, of the following parts:

(1) Two 9-stage registers identified as registers U1 and U2.
(2) A 4-stage counter identified as counter Uc and sometimes as "K."
(3) A control stage identified as control stage U–01.
(4) A U-stop logic circuit.
(5) Second stage Set and Clear decoder units.
(6) Display indicators.

The two 9-stage registers U1 and U2 function to address memory locations within the two TSS memory units, respectively. The nine stages of the U1 and U2 registers are each capable of selecting any given one of the 512 memory word locations in a single TSS memory unit.

For purposes of ease of understanding all of the memory word locations of the two TSS units are categorized into rings, blocks, and modules, as shown in FIG. 28, with each of the two modules representing a single TSS storage unit, and with each of the 16 blocks containing two rings, each ring in turn containing 16-word locations. For a given module, therefore, the number of word locations in a ring, which is 16, times the number of rings in a block, which is two, times the number of blocks, which is 16, is equal to 512 locations.

Generally speaking, the control stage U–01 functions to select the module, or, more specifically, functions to connect either the U1 or the U2 register to either the first TSS or the second TSS memory storage unit. Bits 3 to 6 of the U1 or U2 register selected function to determine the particular block within the selected module. Bit 3 of the U1 or U2 register selected functions to determine whether the particular word location being addressed is contained in the odd or the even ring of the selected block. Bits 7 to 10 of the U1 or U2 register function to count around the ring selected until changed by a data transfer at which time they will resume counting around a new ring of 16 word locations.

Reference is made to FIG. 53 wherein a general block diagram of the U register unit is shown.

In FIG. 53 the control stage 650 functions to open either gate 651 or 652 to connect either the U1 register 653 or the U2 register 654 to TSS storage unit #1 or TSS storage unit #2.

The 4-stage counter 654 of FIG. 71 is used to increment the four least significant stages, that is, stages 7 through 10 of the U registers. Uc is a sequential binary counter consisting of four flip-flop stages which provide U register incrementation from 0 through 16. For further counting the U1 and U2 register stages 2 through 6 must be incremented by 1 for every 16 counts of Uc.

The general purpose of the 4-stage counter 654 is to store the particular address of the TSS being accessed, incremented by an additional count of 1. After the access of the TSS has been completed, the word locations stored in the counter is then read back into the U1 and U2 registers so that the next subsequent word location is thereby addressed.

The timing relations affecting the transfer sequence shown are summarized in FIG. 25. For example, at cycle 1B in FIG. 25, the last four bits in the U register are gated into the counter, incremented by 1, to generate the address for cycle 3. At time 2A this incremented count is gated back into the U register. At 2B the command word is read out of the TSS into the T register. Also, at 2B the counter is incremented for the next address. Because the U registers are incremented by the counter Uc at B cycle time, no transfer can be made to the U registers on the B cycle.

Input to the U1 and U2 registers is accomplished by destination addresses 00 for the U registers and 04 for the UM destination on either the A or the C transfer cycle. It should be noted at this point that the UM destination address is always on the 17th line of the transfer link or the 7th line of the transfer link on the C cycle. A more detailed description of the UM destination address will be given later herein. Generally speaking, the UM address is bit 02 of the U registers and is used to jump or branch from a sequential order of addressing.

The contents of transfer link lines 7 through 17 are transferred to the 10 U register stages according to the following chart:

| Cycle | Transfer Address | Register | Transfer Link Line | | | | | | | | | | |
|---|---|---|---|---|---|---|---|---|---|---|---|---|---|
|  |  |  | 7 | 8 | 9 | 10 | 11 | 12 | 13 | 14 | 15 | 16 | 17 |
| A | 00 | U1, U2 |  | 2 | 3 | 4 | 5 | 6 | 7 | 8 | 9 | 10 |  |
| C | 00 | U1, U2 |  |  |  |  |  |  | 7 | 8 | 9 | 10 |  |
| A | 04 | U1, U2 |  |  |  |  |  |  |  |  |  |  |  |
| C | 04 | U |  1 |  |  |  |  |  |  |  |  |  | 2 |
| A or C | 00 | Uc |  |  |  |  |  |  | 7 | 8 | 9 | 10 |  |

On the A cycle, with clearing address 00 transfers, the clearing of U register, stage 1, is inhibited. Thus U–01 may become a ONE if previously a ZERO, but cannot become a ZERO if previously a ONE.

On the C cycle, with clearing address 04 transfers, U–01 will be occupied by the contents of transfer link line 7 which may be either a ZERO or a ONE.

Also, on the A cycle, during the address 04 transfer, the contents of line 17 is transferred to U–02. The rest of the U1 and U2 registers are not changed. The aforementioned use of line 17 to control U–02 is the only function of line 17 in the transfer link. The specific purpose of such use of line 17 is to cause a jump or a branch in the address of the TSS storage unit.

The U registers can be entered by means of several external connections. More specifically, the U registers can be entered from the transfer link under program control, that is, under control of the TSS storage unit; from the D3 register under C register control; or from the TSS loader equipment under loader control. It should be noted that the TSS loader equipment has not yet been described, but will be described later herein under the section entitled "E Registers." The outputs of the U registers are supplied only to the TSS units.

In the following table there is shown the U register input connections:

U REGISTER INPUT CONNECTIONS

| Source | Lines | U Register Destinations |
|---|---|---|
| TSS Loader Counter | 9 | U1 Stages 2-10. |
| Do | 9 | U2 Stages 2-10. |
| TSS Loader | 6 | Uc Inhibit. |
| TSS Loader Enable | 2 | |
| D3 Stages 7-16 | 10 | U1 Stages 1-10. |
| Do | 10 | U2 Stages 1-10. |
| Transfer Link 7 | 1 | U-01. |
| Transfer Link 8 | 1 | U1 Stage 2. |
| Do | 1 | U2 Stage 2. |
| Transfer Link 17 | 1 | U1 Stage 2. |
| Do | 1 | U2 Stage 2. |
| Transfer Link 9-16 | 8 | U1 Stages 3-10. |
| Do | 8 | U2 Stages 3-10. |
| Transfer Link 13-16 | 4 | Uc Stages 7-10. |

Some of the various input connections to the U registers will now be considered separately. The transfer link enters data to the U register unit when destination addresses 00 and 04 are selected. These destination addresses are proper on either the A or the C cycle. No transfer can be made to the U register on the B cycle since incrementation of the U counter register occurs on the B cycle and conflict would arise.

The destination address 00 on the A cycle, and in normal operation, transfers only the logic ONE state of transfer link line 07 to the register U–01; the logic states of transfer link lines 8 through 12 to stages 2 through 6 of the U1 and U2 registers; and the logic states of transfer link lines 13 through 16 to stages 7 through 10 of both the U1 and the U2 registers and, also, to stages 7 through 10 of the U counter. All stages, except U–01 of the U registers, are cleared on the 00 address, A cycle transfer. Because U–01 is not cleared, only a ONE state may be set into the U–01 flip-flop.

In the LOAD mode of operation whereby the TSS memory units are loaded, the above transfers are made to the U1 register only; the U2 register being used independently of the transfer link to address TSS No. 2.

On a C cycle the destination address 00 transfers the logic states of transfer link lines 13 through 16 to the four stages of the Uc counter register which correspond to stages 7 through 10 of the U1 and U2 registers. The stages 7 through 10 of the U1 and U2 registers, however, are not changed by the destination address 00 transfer, but are changed a short interval of time later by the transfer of the contents of Uc to the stages 7 through 10 of the U1 and U2 registers on the next succeeding A cycle. The aforementioned transfer to the U counter register is accomplished regardless of the operating mode, either NORMAL or LOAD mode.

In the case where destination address 04 is selected (during the A cycle) there occurs a transfer of the logic state of transfer link 17 into stage 02 of registers U1 and U2 in the NORMAL operating mode, or into stage 02 of U1 only in the LOAD mode.

With destination address 04, on a C cycle, there occurs a transfer of the logic state, either ONE or ZERO of the transfer link line 7 into the U–01 register, regardless of the operating mode. U–01 is cleared on such a transfer.

Another means by which a jump in the TSS may be accomplished is by fixed wire transfer from the D3 register. The D3 to U fixed wire transfer, which is made on an A cycle under control of bit stage C–03 of the C register, transfers the contents of bit stages 7–16 of register D3 to bit stages 1–10 of the U register. Reference is made to the chart set forth above for the input connections. In normal operation, the D3 to U transfer is made to both the U1 and U2 registers. In the TSS LOAD mode, however, the input from the D3 register to the U2 register is inhibited.

There are two general methods by which the TSS may be loaded. One of these means is through the manual LOAD mode and the other means is through the program LOAD mode.

In the manual LOAD mode, external logic signals are applied to the U registers via cable wiring from the TSS loader. Because the processor at this time is in the STEP (or HALT) mode, these inputs apply to both the U1 and the U2 registers.

Reference is now made to FIGS. 54, 55, 56, 57, and 58 for the implementation of the U registers unit, including the manual load mode.

In FIG. 54 there is shown the general implementation of the U registers unit. The U1 register, denoted generally by reference character 660, is comprised of nine bits, U–02 through U–10. Register U2, identified by reference character 661, is also comprised of nine bits U–02 through U–10. The control register 670 has one stage U–01, which is common to both the U1 and the U2 registers. The 4-stage counter 662 has output leads connected to the least significant four stages of the U1 and the U2 registers and has a feedback from the last four stages of the U1 register via leads 663. The input connections to the various U registers are shown at the left of the drawing of FIG. 54 and are, as usual, shown in mnemonic form. Thus, for example, an input signal from U–CD04 or a transfer D3–U will function to reset the U–01 register and inputs from sources M–07 or D3–07 will function to set the U–01 register 670.

In FIGS. 55, 56, 57, 58, and 59 there is shown, respectively, the implementation of the U–01 control bit, stage 2 of the U1 and U2 registers, stages 3, 4, 5, and 6 of the U1 and U2 registers, and stages 7, 8, 9, and 10 of the U1 and U2 registers, and the typical bit of Uc.

It should be noted that the particular mnemonics used in connection with the U registers, and also other sections herein, are set forth in detail in FIG. 60.

In FIG. 55 it can be seen that register U–01 can be set in three different ways: specifically through AND gates 678, 679, and 680; and can be reset in two different ways: specifically through AND gates 681 and 682. The blocks 675 and 676 represent, respectively, the U register set decoder, and the U register clear decoder.

In FIG. 56, blocks 703 and 704 represent the two halves of stage 2 of the U1 register, and blocks 705 and 706 represent the two halves of stage 2 of the U2 register. It will be observed that the upper halves of the second stages of the U1 and U2 registers can be set by three different means. More specifically, stage 2 of the U1 register can be set through AND gates 690, 691, and 692, and stage 2 of the U2 register can be reset through AND gates 694, 695, and 696. Resetting of the stage 2 of the two registers is accomplished in two different ways, which are not the same for both registers. Stage 2 of the U1 register can be reset through AND gate 693 or directly by a clear pulse. Stage 2 of the U2 register must be reset through AND gates 697 and 698 which require, respectively, three and two input leads thereto. The circuits represented by blocks 707, 708, 709, and 710 are inverter and driver circuits required with the input signals supplied thereto.

In FIG. 57 there is shown the circuit implementation for writing data into the third, fourth, fifth, and sixth stages of the U1 and U2 registers. The block 716 represents the reset side of any one of the bits 3 through 6 of the U1 register, and the block 717 represents the set side of the stage. Similarly, the block 718 represents the reset side of a given stage of stages 3 through 6 of the U2 register and the block 719 represents the set side of the same stage. Interconnecting wires between the set and reset stages are shown to provide the required flip-flop action. It will be observed that for the U1 register the resetting of stages 3 through 6 is accomplished only by the use of UCLR input, while setting may be accomplished in several manners by supplying the indicated inputs to the gate 721, 722, or 723.

For bits 3–6 of the U2 register resetting may be accomplished by two means, one of them a direct connection to the input 2BEN2 and the other through the AND gate 724. Setting may be accomplished through the AND gates 725, 726, or 727, respectively, as indicated in FIG. 57. The circuit represented by the block 720 is an inverter circuit.

Referring now to FIG. 58, there is shown a circuit implementation for transferring information into bit stages 7, 8, 9, and 10 of the U1 and U2 registers. Typical stages of the U1 and U2 registers are shown to the right of the drawing. More specifically, blocks 735 and 736 represent the reset and set sides of one of the stages 7 through 10 of the U1 register and blocks 737 and 738 represent, respectively, the reset and set sides of one of the stages 7 through 10 of the U2 register. The set and reset sides of each bit are interconnected by wires to provide the necessary interconnections for flip-flop operation. Stages 7 through 10 of the U1 register may be reset by two separate conductors, U–CLR and 2RDEA, connected directly to the bit stages, as shown in FIG. 58. The set side of the stages 7 through 10 of the U1 register may be set through the three AND circuits 743, 744, and 745.

In the U2 register the bit stages 7 through 10 may be reset directly from the input 2BEN2 or through the AND gate 746 or 747. The set side of stages 7 through 10 of the U2 register are activated through AND gate 748, 749, or 750 with the input indicated in FIG. 58. The circuits represented by blocks 739 and 740 are inverter and driver circuits required by the inputs supplied thereto.

Referring now to FIG. 59, there is shown the circuit implementation for supplying input information to a typical bit of a Uc counter register. In FIG. 59 the block 760 represents a single bit of the four bits of the Uc counter. The bit 760 is a flip-flop circuit having a first state identified by the mnemonic UC–XX and the reset state identified by the mnemonic UC–XXN. Setting of the bit may be accomplished by the proper signal supplied to the AND gate 761, 762, or 763. Resetting of the bit is accomplished by the output of the U register clear decoder element 766 or the timing pulse TP4R represented by block 768. The inputs to the blocks 764, 765, 766, and 768 are indicated in the mnemonic code at the left of the drawing of FIG. 59. The output of block 764 is a TP–5 timing pulse which causes read-in of information from the U1 register to the Uc counter.

In FIGS. 61 and 62 there is shown the implementation for obtaining the U–CLR input signal and the CLR–U input signal which are supplied, respectively, to the bit stages of the U1 register and the bit stages of the U2 register. Such inputs are used specifically in the drawings of FIGS. 54, 55, 56, 57, and 58. The circuits 770 and 771 are, basically, OR circuits followed by a driver circuit, each operable by one of three separate input circuits. For example, the U–CLR circuit 770 can be energized through the AND gate 772, the AND gate 773, or through the direct connection 774. Similarly, the CLR–U block 771 can be energized through AND gate 769, AND gate 775, or the direct connection 776. The blocks 777 and 779 function as coincidence circuits for the inputs thereto.

In FIG. 63 there is shown the circuit implementation to carry out the U Stop logic. In general, the U Stop logic operates as follows. The U register unit has the provision whereby further incrementing of the U registers can be inhibited. The transfer sequence will be HALTED when the contents of either register U1 or U2 (determined by the stage of U–01) coincide with the settings of the manual switches of the D3 register, with the U-Stop switch active. When the coincidence of the U register and the switches of register D3 occurs, the transfer sequence operation will be confined to the one transfer sequence which caused the coincidence, and the transfer link set and the clear decoder outputs will be inhibited. This, in effect, is a HALT of the processor.

More specifically, in FIG. 63 the U stop flip-flop 780 is set when the U stop switch (USTP-Switch 1005 of FIG. 29) is set and when the U register bits U1 through U10 agree with the manually set switches 7–16 of register D3. The set inputs to the U stop flip-flop 780 consists of two AND gates 751 and 752. Inputs to AND gate 751 consist of U1ST1, U1ST2, U1ST3, D3S07N, U–01N, USTP and TP–5. The U1ST1 input is obtained from coincident circuit 753 of FIG. 63a and is a logic one when switches 8, 9, 10, and 11 of register D3 coincide with bits 2, 3, 4, and 5 of register U1. Similarly, input U1ST2 is obtained from coincident circuit 754 of FIG. 63a and is a logic one when switches 12, 13, 14, and 15 of register D3 coincide with bits 6, 7, 8, and 9 of register U1. The input U1ST3 is obtained from coincident circuit 755 and is a logic one when switch 16 of register D3 contains the same information as bit 10 of the register U1.

In a similar manner the inputs U2ST1, U2ST2, U2ST3 are obtained from coincident circuits 756, 757, and 758 of FIG. 63a, which circuits compare switches 8–16 of the register D3 with bits 2–10 of register U2.

Switch 7 of the register D3 (D3707, block 782 of FIG. 63) is compared with bit 1 of the U register unit and designated as block 781 in FIG. 63. Thus, AND gate 751, which energizes the set side of the U stop flip-flop 780, includes D3707N and U–01N. These signals D3S07N and U–01N are a logic one when bit U1 and switch 7 of D3 are logic zeros, and coincidence will occur if bits 2–10 of register U1 agree with switches 8–16 of register D3.

Similarly, AND gate 752, which leads to the reset side of the U stop flip-flop 780, includes as inputs D3707 and U–01 and functions to reset flip-flop 780 when bit 1 of the U register unit and switch 7 of register D3 are logic ones and bits 2–10 of the register U2 coincide with switches 8–16 of register D3.

FIG. 63a shows the implementation for comparing the bits of the U1 and U2 registers with the bit stages of register D3. However, in FIG. 63a only bits 2 and 10 are shown, with the implementation of bit 2 being typical of the implementation of the 8 bit positions not shown in FIG. 63a. Block 711 represents switch 8 of register D3, and blocks 712 and 713 are inverter circuits rsepectively connected to the true and the false outputs of switch 711. Block 714 represents switch 16 of register D3, and blocks 715 and 759 are inverter circuits respectively connected to the true and false outputs of bit stage 714.

The micromemory or TSS storage means has been referred to frequently in the specification and, particularly, in connection with the sections entitled "T, V, and W REGISTERS" and "U REGISTERS (Detailed)" such micromemory is preferably of the nondestructive read-out type. One particular micromemory which has been employed successfully in the system is known as the BIAX memory and is currently manufactured by the Aeronutronic Division of the Ford Motor Company, a corporation of Michigan. A description of the BIAX memory is given in a publication entitled "Technical Note— The BIAX Instruction Memory," Publication No. U–1176, published March 1961 by the Aeronutronic Division and hereby incorporated by reference as a part of this specification.

C. The transfer link

The transfer link performs the general function of transferring information between the various registers of the processor under the control of the program stored transfer sequence control unit.

In earlier discussion of the transfer link, it has been described generally as being comprised of an input matrix, an output matrix, a 17-line cable connecting all of the input matrix points to all of the output matrix points, and decoder means for selecting a particular input matrix point and a particular output matrix point. In the present discussion of the transfer link configuration a much more detailed description and definition of the transfer link will be given. More specifically, the transfer link may be said to consist of the following major parts:

(1) Source decoder
(2) Source selection matrix
(3) Destination clear decoder—1st stage
(4) Destination set decoder—1st stage Reference is made to FIG. 64 which shows a block diagram of the components of the transfer link as defined immediately above. In FIG. 64 the W register 600 corresponds to the W register 247 of FIG. 16. The source decoder 602 corresponds to the input decoder 245 of FIG. 15, the source selection matrix 604 corresponds to the input matrix 103'''' of FIG. 15. Further, the first stages 606 and 609 of the set decoder and the clear decoder correspond, generally, to the output decoder 246 and the output matrix 105'''' of FIG. 17.

During each machine subcycle A, B, or C, the transfer line will perform three separate operations.

These operations are:

(1) Sampling of the source register information.
(2) Clearing of the destination register, which clearing incidently may be inhibited by the clear inhibit bits T–31 and T–32 of the T register on the B and C cycles.
(3) Transfer of the source register data to the destination register.

In FIG. 64, the source decoder 602 responds to the data contained in bits 1–5 of the W register, to select one of 32 matrix points of matrix 604. More specifically, the first stage of the source decoder functions to decode the five bit code to select one of the 32 points of the source selection matrix 604 and the second stage of source decoder 602 functions as a driver circuit. The source register which is connected to the particular matrix point selected is represented, generally, by block 603, which block shows just one representative bit stage thereof. (Actually, most of the source registers contain 16 bit stages.) The information contained in the source register is passed through AND gate 612 to the source selection matrix 604.

It is to be understood that the block 604 representing the source selection matrix, represents only one bit position. Actually, each matrix point consists of 17 levels and only one level is represented schematically by the block 604.

The output of source selection matrix 604 is supplied to almost all of the registers in the processor through AND gate 613. Such an AND gate 613 will be associated with each of the almost 40 registers. It is necessary, however, to open (to make conductive) one of said AND gates in order to permit the information from the source register 603 to pass through the source selection matrix 604, the AND gate 613 to the selected destination register, represented generally by block 611. Only one bit stage of the destination register is shown, said bit stage being the block 611. Actually, the destination register in most cases is comprised of 16 bit stages. Another point that should be clearly understood is that the output of the source selection matrix 604 is supplied to all of the destination registers through individual AND gates, such as the AND gate 613. However, the information will be passed only to that selected destination register in which the AND gate corresponding to the AND gate 613 is opened to a conductive state by the output of second stage 607 of the set decoder of FIG. 64.

Under many operating conditions it will be desired to first clear the destinaton register and then to supply a signal to the AND gate 613 from the second stage 607 of the set decoder to cause the information from the source register 603 to be entered into the destination register 611.

The first stage 606 of the set decoder receives the information contained in bits 11–15 of the W register, and decodes such information to select one of the 32 destination registers. Similarly, the first stage 609 of the clear decoder responds to the five-bit address contained in bit stages 6–10 of the W register to select one of the 32 destination registers.

It is to be noted that the addresses contained in bit stages 11–15 and 6–10 of the W register are the same. In other words, the same destination register that is selected to receive information from the source register is the same register that is selected for clearing. However, in some cases clearing of the register is not desired. The particular situations where clearing is not desired and the means by which clearing is inhibited will be discussed later herein. Generally speaking, inhibition of the clear function is performed under control of bits 31 and 32 of the T register.

Another feature of the processor is a character left inhibit (CHLI) or a character right inhibit (CHRI) feature, which enables the loading of data into either the left or the right half of the destination register. This feature is controlled by bit stages 13 and 14 of the control register C.

As indicated hereinbefore, in the TVW section, all of the registers are not addressable through the transfer link. However, most of the registers are addressable through the transfer link. In FIG. 65 there is shown the transfer link source connections in table form. Under the column marked "ADDRESS" is listed the 32 addresses (decimal, not octal) of the source selection matrix. Some of these source selection addresses, however, have fixed wiring connections which enable two possible connections to a destination from a source register. Such control signals are indicated under the column at the left of the gating signal. Thus, for example, the matrix address point 16 can select either the P5A register or the P5B register, depending on the state of the 23rd bit of the control register C.

Under the column marked "REGISTER" there is indicated the particular register which is connected to the address identified in the same row. In the middle of the chart there is shown the particular bit stages which are connected to the levels of the transfer link. Where cross hatching appears, the bit stages of the register correspond to the level of the transfer link. Thus, for example, at matrix point 3, to which is connected the register R1, bit stage 1 of register R1 will be connected to the first level of the transfer link. However, at matrix point 2, to which the V register is connected, it will be seen that bit stages 33, 34, 35, and 36 are connected, respectively, to levels 9, 10, 11, and 12 of transfer link. Where nothing appears, there is no connection.

While most of the registers have only 16-bit stages, the transfer link has 17 individual lines, the 17th level connection being shown at the extreme right of FIG. 65. The 17th bit of the transfer link performs various functions which will be described in more detail later herein. Some of these functions are for purposes of rotating a particular word, such function being represented by the Greek characters $\delta$, $\alpha$, $\gamma$, and $\beta$ appearing at bits 17 of addresses 1, 2, 3, and 4, and for branching or jumping transfers caused by the conditions of the various bit stages of the R1 register, as mentioned briefly hereinbefore. It might be noted at this point that the R1 register has a dual purpose. Firstly, it can function as a utility register wherein all of the 16 bits are entered or read simultaneously in a parallel fashion. Secondly, each of the bit stages of the R1 register are connected to a separate matrix point of the source selection matrix by the fixed wiring, as indicated in the right-hand column of the table of FIG. 65, which connections will determine whether or not a jump or a branch transfer will occur in the transfer storage memory.

In some other cases a particular bit of the source register will appear not only on the 17th line of the transfer link, but also on some other level of the transfer link.

For example, at address 8, bit position 1 of the Z register will not only appear at the level 1 of the transfer link, but will also appear on level 17 of the transfer link, as indicated in FIG. 81.

As a matter of definition, the letter "N" appearing in some of the control signals in left-hand column under the heading "GATING SIGNAL" indicates the false side of the register. Thus, for example in address 18, the bit 23 of the C register can be either in a true or a false condition. If in a true condition, it is denoted as C-23 and addresses the register P6A. If the bit 23 of the C register is in a false condition, it is denoted as CN-23 and addresses register P6B.

FIG. 66 shows a chart similar to that of FIG. 65, except the chart of FIG. 66 represents the transfer link connections to the destination registers. The general layout of the chart of FIG. 66 is precisely the same as that of FIG. 65; only the specific connections are different.

In FIG. 66, in the left-hand column under the heading "GATING SIGNAL," in addition to register bit stages, there appear the letters A and C, in the first five addresses 0 through 04. Such letters represent a transfer cycle, during which the transfer link will connect to the indicated bit stages of the indicated registers. For example, on an A cycle with address 00 data will be supplied to the U1 and the U2 registers, in the bits indicated in transfer link stages 7 through 16, with the exception that level 7 of the transfer link will not be supplied to bit stage 1 of the U2 register. Also, in 00 address on the A and the C cycle, the last four levels, that is, levels 13, 14, 15, and 16 of the transfer link will be supplied to the Uc counter stage.

In matrix address 04, on the A cycle, information contained on the 17th line of the transfer bit is supplied to bit 2 of the U1 and U2 registers. Such a transfer will effect only the second bit stage of the U1 and U2 registers and, if the bit transferred is a ONE, will cause a jump in the transfer memory; said jump consisting of 400 addresses. If the transfer in address 4 of the output matrix occurs on the C transfer, the 7th level of the transfer bit will pass information to the first bit of the U1 register only and will thereby function to cause a change in the transfer storage memory being addressed. Reference is made to FIG. 3a wherein the matrix output addresses 00 and 04 are shown as being connected to the U register and UM, respectively. The notation "UM" simply indicates that a transfer is being made to a single bit of the U1 or U2 registers as indicated in addresses 04 of the chart of FIG. 66.

For further discussion of the operation and function of the U registers, reference is made to the section entitled "U REGISTERS (Detailed)."

In addresses 12 and 14, the notation is made as follows (see "C REGISTER TABULATION").

As indicated hereinbefore, the C register is a complex control system which, generally speaking, functions to provide certain fixed wire controls into the circuit. Each of the 27 bits of the control register C perform some control function, all of which will be described in detail in the C register section herein. For the time being, reference is made, however, to the table of FIG. 27 which shows in detail the C register connections and the general function which each bit performs.

In FIG. 67 there is shown another block diagram of the transfer link, plus the second stages of the clear and set decoders which, by definition, are not a part of the transfer link, but rather are a part of the destination register. In FIG. 67 it will be seen that the source decoder consists of three NOR circuits and a NAND circuit connected as shown in the figure. More specifically, the NOR gate 615 has two inputs thereto through AND gates 621 and 622. The outputs of bit stages W1 and W2 are applied to both AND gate inputs of NOR gate 615. One input of each of W1 and W2 is ANDED with a clock pulse CLO and the second input is ANDED with a clock pulse delayed CLODI. The bits W3, W4, and W5 are supplied to the AND gate 623 and then to the NAND circuit 616, which decodes the bits W3, W4, and W5.

If the source address pertains to a commutatable input/output (I/O) register, a signal from the stage 23 of the C register is applied to the inputs of the NOR and NAND circuits 615 and 616. Reference is made to the chart of FIGS. 68, 69 and 70 which show the terminal connections, respectively, of the first stage decoder, the first stage of the source decoder, the first stage of the set decoders and the first stage of the clear decoders, which are shown in block diagram in FIG. 67.

Before going further with the discussion of FIG. 67, a brief discussion of the charts of FIGS. 68, 69, and 70 will be made. Basically, these charts show the particular register addressed in response to particular codes appearing in the various stages of the W register. Additionally, at the extreme left of each chart there is a column headed by the term "C-23" which represents the 23rd stage of the C register.

The chart of FIG. 68 shows the destination address selected by the bit stages W1-W5, the chart of FIG. 69 shows the destination registers selected by the bit stages W11-W15, and the chart of FIG. 70 shows the destination registers selected by the bit stages W6 through W10.

Referring now specifically to FIG. 68, the various combinations of data content of bit stages W1 and W2 are shown in the columns at the left in the figure. The various combinations of data contents of bit stages W3, W4, and W5 are indicated in the top row of the figure to form a co-ordinate type chart. Thus, for example, when W1 and W2 contain zeros, and W3, W4, and W5 contain 0, 1, and 0, respectively, the destination register selected is VL which, as discussed hereinbefore, consists of the eight left-hand bit stages (bits 1-8) of the register. In a similar manner, all other destinations for the various combinations of the W register bits can be determined in the charts of FIGS. 68, 69, and 70.

In the three FIGURES 68, 69, and 70 it will be observed that there are columns and rows having the heading "ELEMENTS." All of the elements in the columns and rows under "ELEMENTS" have nomenclature beginning with the letter "N," each of which represents an inverter circuit. For example, in FIG. 68 the column of elements includes elements N-001, N-002, N-003, etc. The row of elements includes elements N053/107, N053/151, etc. The nomenclature beginning with the letter "N" identifies the specific logic elements or inverter cards employed with various outputs of the W register to select a particular address of the input matrix. The foregoing will become clearer from the following example. In FIG. 68, the first column of "N" elements is N053/107. Above this column are the three numbers "00 0." These three zeros signify that the input of element N053 is W3N and W4N and that the input to element N107 is W5N. As indicated hereinbefore, the columns headed "W1" and "W2" indicate the combinations of W1 and W2 to be decoded by first stage source decoders under the "ELEMENTS" column.

Thus, for example, assume it is desired to select input matrix octal address 10, which happens to be the address for the Z register. Octal 10 is equal to 01000 in the binary system. The W register bits 1-5 contain the source address which, in this case, is W1N, W2, W3N, W4N, and W5N. The letter "Z" denoting selection of register Z at octal address 10, appears in the N053/107 column opposite the N-003 row. The first stage source decoders for addressing register Z can be seen to consist of inverter circuit N053 whose input is W3N and W4N; inverter circuit N107 whose input is W5N; and inverter circuit N-003 whose input is W1N, W2. The outputs of the first three inverter circuit decoder elements will be combined at the input of the second stage source decoders to give the desired function; namely, the selection of the octal address 10 of the input matrix.

The detailed arrangements of the various inverter circuits identified in the "ELEMENT" rows and columns of FIGS. 68, 69, and 70 are not shown in detail in the drawings since such arrangements, constructed to respond to particular combinations of binary coded words from a code source to select a given one of several lines, is generally known in the art.

The clear and set decoders 642 and 643 are two-stage decoders with only the first stage thereof being defined as part of the transfer link; the second stage thereof being defined as part of the destination register. Reference is made to the charts of FIGS. 69 and 70 to show the specific registers addressable by the clear and set decoders 642 and 643 of FIG. 67.

The second stages, including NOR circuits 630, 631, 636, and 637 of the set and clear decoders of FIG. 67, associated with registers which incorporate the character left and the character right inhibit feature, are further controlled by stages 13 and 14 of the C register. Reference is made to FIGS. 3 and 3a which show those registers having the left/right inhibit features. Such features enable the clearing and setting of only eight stages of the destination register without disturbing the remaining stages of that particular register. For a detailed discussion of the left/right inhibit feature, reference is made to the section herein entitled "C CONTROL UNIT." From an inspection of FIG. 67, however, it can be seen that the source register 619 is divided into two sections, one including bit stages 1–8 and the other including bit stages 9–16. The two outputs of source selection matrix 620 carry these two groups of 8 bits of destination register 640 through AND gates 638 and 639, respectively. By proper coding of the input to the first stages of the clear and set decoders, it is possible to energize either AND gate 638 or AND gate 639, or to energize both of said gates in the event that all 16 bits contained in the source register are to be entered into the 16 bits of the destination register 640.

The first stage of the set decoder decodes the contents of stages 11–15 of the W register in the manner shown in FIG. 69. It is to be noted that the timing signal CLO and a set enable signal is applied to the NAND gate 635 of the set decoders (FIG. 67). The second stages of the set decoders, consisting of NOR gates 636 and 637 receive the output from the first stage and provide the drive necessary to set the individual stages of the decoded destination register. In other words, the outputs from the NOR gates 636 and 637 function to open one or both AND gates 638 and 639, depending upon the particular address code.

The first stage of the clear decoder 642 operates in substantially the same manner as the first stage of the set decoder but decodes stages 6–10 of the W register. CLE and clear enable signals are applied to the first stage NAND gate 629 of the clear decoder. The second stages of the clear decoder, consisting of NOR gate 630 and NOR gate 631, receive the outputs from the first stage and provide the drive necessary to clear the decoded destination register.

Referring to FIG. 71, there is shown a block diagram of the source selection matrix 620 of FIG. 67. All of the output leads of the processor registers are supplied to the first stage NOR gates 651 through 656 of the source selection matrix through AND gates, such as AND gate 650. In FIG. 71 it is to be understood that only one bit position is shown for each register. Actually, for most registers there are 16 bit positions, so there would be 16 NOR gates for each 16-bit register and, similarly, 16 AND gates 650 for each register. Also, there would be 16 NAND gates, such as NAND gate 672 for each destination register.

Each of the AND gates 650 receives the input from a bit of a selected register and a signal from the source decoder such as the source decoder 641 of FIG. 67. These two inputs are ANDED together in AND gate 650 and supplied to a NOR gate 651, for example, and thence to the inner connecting circuit network 678 which connects all of the source registers to all of the destination registers through the NAND circuits, such as NAND circuits 672 through 676. The NAND gates 672 through 676 comprise a second stage of the source selection matrix and have the primary function of driving the selected destination register. The means for selecting the destination register is shown more in detail in FIG. 67.

The outputs of the NAND gates 672 to 678 actually have 16 levels rather than the single level, as shown in FIG. 71, one level for each bit stage of the destination.

Because of the various options in addressing many of the 32 registers as shown in the chart of FIGS. 65 and 66, more than 32 inputs to, and more than 32 inputs from, the source selection matrix must be provided, as shown in FIG. 71.

Referring now to FIG. 72, there is shown the transfer enable circuit (XENC). The transfer enable logic is that part of the transfer link which functions to inhibit either the set and clear, or only the clear, of a destination register. The transfer enable controls may be activated by the program, or by external manual switches.

Under program control and on a B cycle, the flip-flop of stage 19 of the control register C may be set. When C–19 is set, the transfer enable control circuits prevent the set and the clear pulses from being applied to the destination register denoted by the next command word read from the TSS unit.

As shown in FIG. 72, the true output of C–19 is applied through the AND gate 697 to set the flip-flop circuit 690. The true output of flip-flop 690 drives an inverter 694 through lead 698 which then inhibits the first stage of the clear decoders shown in FIG. 67. Further, the flip-flop circuit 690, through its output lead 699, also enables the set input of flip-flop 695. In response to the true output of flip-flop 695, the inverter circuit 696 is driven to a logic ZERO to inhibit the first stage of the set decoders, such as stages 634 and 635 of FIG. 67.

When C–19 is reset, as represented by the input lead C–19N to AND gate 700 of FIG. 72, the reset input lead of flip-flop 690 will be enabled, thus resetting the flip-flop 690. Such enabling of the reset input of flip-flop 690 allows the inhibit action, which is present, to remain for a complete A, B, and C transfer sequence and to be removed in time for a normal transfer operation on the next cycle.

As indicated hereinbefore, under certain circumstances the information contained in the V register will be supplied directly to the transfer link. The particular code which designates the V register as a source on the A cycle is detected by a special decoder of the T register outputs. When the V register is designated as a source on the B cycle, a special decoder associated with the V register is employed.

In FIG. 72 the T register decoder 692 has supplied thereto stages 1–5 of the T register. When a ZERO is contained in all five stages, this indicates that the V register is to be a source for the transfer link on the A cycle. The T register decoder output is stored in flip-flop 693 for use at a later time as a set input to flip-flop 695. More specifically, this later time is during the pulse of CE–6, which is supplied to AND gate 702. When the V register is designated as a source on the B cycle, the bit stages 11–15 of the V register must all contain ZEROS. The output of the V register decoder 691 is used directly as a set input to flip-flop 690 (input lead 703) and is also supplied to flip-flop 695 through AND gate 702.

In FIG. 72, it can be seen that the flip-flop 690 can be set in three different manners, e.g., through AND gates 697, 704, and 705 and, more specifically, by means of the bit C–19 of the control register, by means of an output from the A cycle, V register decoder 691, or by means of an output signal from the B cycle, T register decoder 692.

Under any of the three foregoing methods of setting flip-flop 690, the result will be that the V register will be a source of information transferred directly to the transfer link. Only the last 16 bits of the 36-bit TSS word are transferred to the transfer link from the V register under the above-mentioned circumstances.

The flip-flop 695 is set by the output of the decoders 691 and 692 in co-operation with flip-flop 693. The true outputs of flip-flop 695, which appears on lead 706, is employed to inhibit the first stage of the set decoders on the C cycle by inhibiting the set enable pulse generator 696.

Flip-flop 690 is reset by the false output of bit 19 (C-19N) of control register C, and when reset removes the clear inhibit in time for the following A cycle Clear Operation. Flip-flop 695 is reset by the false output of flip-flop 690, and when reset functions to remove the set inhibit in time for the following A cycle operation.

It is to be noted that both the clear enable generator 694 and the set enable generator 696 have external inhibit means which are operated manually from the control panel of the processor.

Two of the three transfer cycles (specifically transfer cycles B and C) allow the automatic clear of the destination register to be inhibited. On transfer cycle A, however, the selected destination register is always cleared prior to the transfer of the information. Bit 31 of the T register (T31 or V31) is a clear inhibit bit for the B cycle and is supplied to AND gate 712. Bit 32 of the T register (T32 or V32) is a clear inhibit bit for the C cycle transfers. Thus, a "1" in bit T31 will inhibit the automatic clear of the B cycle destination register, and a "1" in T32 will automatically inhibit the C cycle automatic clear.

Because bits T31 and T32 are the same bits of the corresponding stages of the V register, such bits play a dual role when the V register is used as a source to the transfer link. More specifically, both bits T31 and T32 function as clear inhibit bits and also as part of the information to be transferred.

Reference has been made several times to the 17th level of the transfer link, also known as transfer link line 17. This 17th line is a special line and has its destination connected only to bit stage 2 of the U registers, as shown in FIG. 66. The contents of line 17 whether a ONE or a ZERO will be transferred into U1 and U2 on the A transfer cycle only. Stages 1 and 3 through 10 of the U registers are not changed; i.e., the clear is inhibited when matrix address 04 (UM) is given as a destination on the A cycle. From the table of FIG. 65, which shows the connections to line 17, it can be seen that any transfer link matrix source address, except 00, will apply the contents of a certain stage or the results of some logic expression from the logic register R to line 17.

The principal function of line 17 is to test various bits in particular registers by program means. For example, the individual stages of the R1 register, as shown in the column designated "17" in FIG. 65, can be tested for ONE or ZERO content by addressing the corresponding matrix source addresses, shown in the column designated "ADDRESS" in FIG. 65, and by addressing UM as a destination point. Such a procedure will transfer the contents of that particular stage of R1 to U2, thus allowing the program to jump to a new TSS location if U2 underwent a change. In this manner a decision can be made by the program in response to the content of an individual stage of register R1.

The contents of various stages of the C register, the contents of the various stages of the Z register, and the contents of stage 1 of registers D1, D2, D3, D4, and R2, also, may be tested in this manner. In addition, very useful logical expressions called α, β, γ, and δ, which pertain to R1 register stages 11 through 16, may be tested as to their ONE or ZERO result.

Reference is made to the sections entitled "R1 and R2 REGISTERS," "CONTROL UNIT C," and "D REGISTERS," for more detailed explanations of the meanings of a ONE or a ZERO in the various bits thereof tested by line 17 of the transfer link.

IV. DETAILED DESCRIPTION OF REGISTERS

A. D Registers

The D registers group are comprised of five different registers identified as registers D1, D2, D3, D4, and D5, and further identified in FIG. 12 by the blocks 182, 183, 140″, 185 and 196. All the D registers have the capability of transferring data to and from the transfer link, and some of the D registers are capable of performing special functions which will be described below. Further, the D registers D1, D2, D3, and D4 have a character left and a character right inhibit feature under control of the 13th and 14th bits of the control register C.

The D1 register is a 16-bit position multiple input type register used primarily for temporary storage and for transferring data to and from the transfer link. Register D1 is also capable of accepting data directly from the T register upon a command from bit C-19 of the control register. Further, the D1 register includes a parity check which determines even parity on information contained in bit positions 09 through 16, for each transfer of information to the D1 register; the result of said parity check being stored in the bit C-21 of the control register.

Clearing of the D1 register is accomplished by the second stage of the clear decoders (D1CD02), as discussed in the Transfer Link section, when octal address 02 is used as a destination address. The 16 bit stages of the D1 register are then set by the 16 respective transfer link positions which are ANDED with the second stage set decoders.

The D2 utility register is also a 16-bit position multiple input storage register whose primary function is to store and to transfer data from the transfer link. The D2 register also has the capability of accepting data directly from the T register upon a command from bit C-19 of the control register. Address 07 of the input matrix provides the output of D2 register as a source to the transfer link while input matrix address 06 provides a complement of the D2 register as a source to the transfer link.

Clearing of the D2 register is accomplished by the second stage clear decoders (D2CD07) when octal address 07 is used as a destination address. The 16 bits of the D2 register are then set by the 16 respective transfer link bit positions which are ANDED with the second stage of set decoders (D2SD07).

The D3 utility register is a 16-bit position multiple input storage register whose primary function is to store and transfer data to and from the transfer link. However, in addition, fixed wire transfers are provided from the D3 register to the V register, the U registers and the indicators. Other fixed wire transfers are provided from the W register to the D3 register and also from the manual switches to the D3 register.

Clearing of the D3 register is accomplished by the second stage clear decoders (D3CD13) associated with the transfer link when octal address 13 is employed as a destination address. The 16 bits of the D3 register are then set by the 16 respective transfer bit positions ANDED with the second stage set decoders (D3SD13), through destination address 13.

The D4 and D5 registers consist of single ended storage registers whose functions are to store and to transfer data to and from the transfer link. The clearing of the D4 register is effected by the second stage clear decoders (D4CD15), when octal address 15 is employed as a destination address. The 16 bits of the D4 register are then set by the 16 respective transfer link positions ANDED with the second stage decoders (D4SD15).

Clearing of the D5 register is accomplished by the second stage clear decoders (D5CD05), when octal address 05 is employed as a destination address. The 16 bits of the D5 register are then set by the 16 respective transfer link bit positions ANDED with the second stage set decoders (D5SD05).

Data is stored in all of the D registers, D1, D2, D3, D4, and D5, until the respective clear decoders reset them on the next incoming data transfer. Bits 01 of D1, D2, D3, and D4 are inputs to both bits 01 and 17 of the transfer link, while the remaining bit positions 2–16 supply the transfer link bit positions 02 through 16, respectively.

Registers D1, D2, D3, D4, and D5 may be addressed either as a source or as a destination on any cycle. A listing of the D utility registers and the control bit connections with the transfer link bit positions is shown in the chart of FIG. 73. Clearing of the D utility registers may be inhibited by bits 31 and 32 of the T registers on the B and C cycles, respectively.

As stated above, the utility registers D1, D2, D3, and D4 have the character left and the character right inhibit feature. Such a feature enables the transfer link to load data into either the left or right half of the utility register under control of the C register bit positions 13 and 14. The transfer link bit positions thus controlled are as follows:

| C–13 | C–14 | |
|---|---|---|
| 0 | 0 | Enables Transfer Link 01–16 to entire Utility Register. |
| 0 | 1 | CHR1—Inhibits Transfer Link 09–16 to Utility Register bits 09–16. |
| 1 | 0 | CHL1—Inhibits Transfer Link 01–08 to Utility Register bits 01–08. |
| 1 | 1 | Inhibits all transfer to Utility Registers controlled by C–13 and C–14. |

Bits C–13 and C–14 are controlled by the transfer link bits 13 and 14, respectively. The selection of octal address 14 clears both bit positions through clear decoder C–CD14. A ONE is then required from the transfer link along with set decoders C–SD14 to set the bits C–13 and C–14 of the control register.

There are provided certain fixed wire transfers involving the D1, D2, and D3 utility registers. These fixed transfers are specifically as follows:

(1) T to D1, D2, and R2 registers,
(2) D3 to D registers,
(3) D3 registers to U register.

The T to D1, D2, and R2 registers transfer occurs on an A cycle under control of bit C–19 of the C register. To effect such a transfer the 19th bit of the C register must be set on the B cycle, and is automatically reset on the following B cycle. The transfer link is inhibited for one microsecond on this operation beginning with the next A cycle. Data transfer to the D1, D2, and R2 registers on this next A cycle consists of the TSS word following the word that contains the C–19, B cycle transfer. The transfers to the destination register are as follows:

T (01–12) to R2 (3–8) (11–16)
T (13–24) to D2 (3–8) (11–16)
T (25–36) to D1 (3–8) (11–16)

The TSS instruction word that is read into the T register during the one microsecond transfer inhibit period mentioned above will control the data transfers on the following TSS period. The TSS word transferred to the D1, D2, and R2 registers will *not* be utilized as an instruction word.

The T–D1, D2, and R2 transfer operation is used in the TSS verify program. Such program employs a D3 to U transfer to control the next TSS instruction rather than utilizing the normal TSS address sequencing feature of the U register. More will be discussed concerning the TSS verify program later herein under the heading marked "CONTROL UNIT C."

Reference is made to FIG. 74 which shows the general block diagram for a T to D1, D2, and R2 transfer. In FIG. 74 the block 720 represents bit 19 of the control register which bit can be set through the AND gate 727 by the sources indicated and can be reset through AND gate 728 by the sources indicated. The driving circuit 721 opens the gates 722, 723, and 724 to permit passage of the transfer of the information contained in the T register to the D1, D2, and R2 registers, respectively. The bit stages of the D1, D2, and R2 registers are not shown and are indicated merely by letters at the extreme right of FIG. 74. It will be noted that the bit positions involved in the D1, D2, and R2 registers do not include all 16 bit stages, but only those indicated in the small chart set forth above.

A specific example of the T to D1, D2, and R2 transfers is illustrated as follows:

Time: Function
B cycle _____ TSS word–1 to T Register.
C cycle _____
A cycle _____ Perform TSS word–1 A cycle instruction.
B cycle _____ Set C–19 with TSS word–1 B cycle instruction.
C cycle _____ Perform TSS word–1 C cycle instruction.
A cycle (TP–2) ____ T to D1, D2, and R2 transfer (f.w.) Transfer Link inhibited.
B cycle _____ TSS word–2 or TSS word–$n$ to T Register Transfer Link inhibited.
C cycle _____ Transfer Link inhibited.
A cycle _____ TSS word–2 or TSS word–$n$ A cycle instruction.

The second fixed wire transfer is a D3 register to V register transfer which occurs on the B cycle at time TP–4 under control of bit 18 of the control register. The D3 to V transfer is a program control transfer to the C register transfer code position of the V register. The bit positions involved are D3 (07–16) to V (21–30).

The operation of the D3 to V transfer is initiated by setting C–18 on either C or the following A cycle, with the transfer occurring on the following B cycle. There is no design feature to prevent setting C–18 on the B cycle. Therefore, caution must be exercised to prevent programmed setting of C–18 on the B cycle, since the control bit is automatically reset on the first portion of the C cycle at time TP–6, causing C–18 to be reset before reaching the next transfer cycle.

If C–18 is set during a C or the following A cycle, the transfer operation designated by the new V register transfer code will be executed during the next B cycle. An example of the D3 to V fixed wire transfer is shown in the following operational chart:

Time: Function
B cycle _____ TSS word–1 to T register.
C cycle _____ TSS word–1 to V and W registers.
A cycle _____
B cycle _____ TSS word–2 to T register.
C cycle _____ Set C–18 (TSS word–1 C cycle instruction).
A cycle _____ Set C–18 (TSS word–2 A cycle instruction).
B cycle _____ TSS word–3 to T register.
B cycle _____ Perform TSS word–2 B cycle instruction.
B cycle (TP–4) _ D3 to V transfer (change C cycle instruction) (f.w.).
C cycle _____ Perform modified TSS–2 C cyle instruction.

Since the D3 to V transfer occurs on the B cycle, address 00 which is the 16-bit constant in the V register, cannot be designated as a source on the B cycle of a TSS period in which the D3 to V transfer is to be executed.

In FIG. 75, which shows a block diagram of the D3 to V transfer, the block 735 represents the flip-flop of stage C–18 of the control register, which stage controls the D3 to V fixed wire transfer. The flip-flop C–18 is set by the signals from the sources indicated at the input of the AND gates 741 and is reset by the input signals from the sources indicated at the input of AND gate 742. When bit C–18 is in a set condition, the driver 736 will become energized at time corresponding to TP–4 which occurs at the same time substantially as pulse CE–4, which is supplied to an input of AND gate 743 immediately preceding driver 736. Gates 737, 738, and 739 are opened to become conductive in response to energization of driver 736 to thereby cause the transfer of data from the D3 register to the bit stages of the V register as indicated at the extreme right of the figure.

The block 740 represents a typical V register bit position. More specifically, block 740 represents bit position 21 of the V register. It will be observed that bit 21 of the V register, which is a flip-flop circuit having a true and false output, can be set in two manners. One of such setting means includes the output from block 737, indicated by the mnemonic D3–V, supplied to AND gate 744. It is also necessary to supply a ONE from the 7th bit of register D3 in order to enter information into the bit 21 of the V register. It is to be understood that the lead D3–07 is a fixed wire connection between the 7th bit position of the D3 register and the 21st bit position of the V register. However, information will not pass between the D3 and V registers until gate 744 is opened by an input from gatitng circuit 737.

The 21st bit of the V register can also be set by inputs having the mnemonics T-21 and D1–1 supplied to the AND gate 745. The resetting of bit 21 of the V register is accomplished by the inputs supplied to the lower half of block 740.

Another fixed wire transfer involving the D registers is the D3 to U fixed wire transfer. Under certain circumtances, it is desirable to store an address of the TSS in the D3 register while a jump or branch is made to some other section of the TSS to perform another function. At the end of said other function some means are required to return to a specific desired TSS address. The D3 register can be employed to store this specific desired TSS address. At the end of said other function the processor is programmed to supply the address stored in the D3 register directly into the U register which, as discussed under the heading entitled "U REGISTERS" functions to control the addressing of the TSS. The D3 to U fixed wire transfer is initiated by setting the third bit stage of the C register. C–03 can be set only on the B cycle, since octal address 14 (C–SD14) and the transfer link bit 03 are gated by a TP–5 signal. C–03 is automatically reset on the following B cycle, in the RUN mode, by TP–4 signal. The D3 to U operation transfers D3 (07) to U (01) and D3 (08–16) to U1 and U2 registers (02–10). The aforementioned transfer occurs on the A cycle during the TP–3 pulse following the setting of C–03. If the address of a TSS word is set into D3 (either manually, or under program control), the transfers deignated by this word are executed on the second TSS period following the setting of C–03.

An example of the foregoing transfer is as follows:

| Time: | Function |
|---|---|
| B cycle | TSS word–1 to T register. |
| C cycle | |
| A cycle | Perform TSS word–1 A cycle instruction. |
| B cycle (TP–5) | Set C–03 (TSS word–1 B cycle instruction). |
| B cycle | TSS word–2 to T register. |
| C cycle | Perform TSS word–1 C cycle instruction. |
| A cycle | Perform TSS word–2 A cycle instruction. |
| A cycle (TP–3) | D3 to U (Select TSS word–*n*) (f.w.). |
| B cycle | TSS word–*n* to T register. |
| B cycle | Perform TSS word–2 cycle instruction. |
| C cycle | Perform TSS word–2 C cycle instruction. |
| A cycle | Perform TSS word–*n* A cycle instruction. |
| B cycle | Perform TSS word–*n* B cycle instruction TSS word–(*n*+1) to T register. |

Built into the D1 utility register is the special capability of performing an even parity check. Information entering the computer from peripheral equipment may be parity checked on a character basis by transferring the information to bit positions 09 through 16 of the D1 register.

The 21st bit position of the C register is employed to store even parity information. When data is transferred to the D1 register, through address 02, the bit C–21 is normalized, that is, set to a ONE by clear decoder D1CD02. The parity check circuitry shown in FIG. 76 will check stages 9 through 16 of the D1 register and reset C–21 when even parity fails. Since the parity check circuit of FIG. 76 contains three logic levels, the data in C–21 will not be valid until the second cycle after the D1 destination command. In FIG. 92, blocks 750, 751, and 752 comprise the three check circuits which are identified as check circuit 1, check circuit 2, and check ciruit 3, respectively, for checking the eight bits from the D1 register. The check circuit 750 checks bits 9, 10, and 11; the check circuit 751 checks bits 12, 13, and 14; and the check circuit 752 checks bits 15 and 16. The inputs to the three check circuits are as indicated in FIG. 76. Blocks 753, 754, and 755 receive the ODD or EVEN outputs from each of the check circuits 750, 751, and 752, respectively, and then function to drive the parity check group circuit 756, whose inputs from circuits 753, 754, and 755 are as indicated in FIG. 76.

The equations for check circuits 750, 751, and 752 are as follows:

$CHK1N = (D1-09)(D1-10)(D1-11)$
$\quad + (D1-09N)(D1-10N)(D1-11)$
$\quad + (D1-09N)(D1-10)(D1-11N)$
$\quad\quad\quad + (D1-09)(D1-10N)(D1-10N)$ $CHK2N = (D1-12)(D1-13)(D1-14)$
$\quad + (D1-12N)(D1-13N)(D1-14)$
$\quad + (D1-12N)(D1-13)(D1-14N)$
$\quad\quad\quad + (D1-12)(D1-13N)(D1-14N)$ $CHK3N = (D1-15N)(D1-16) + (D1-15)(D1-16N)$ A check group output is ZERO if there is an odd number of ONES in its respective data bits. An even number of ONES in a data group will result in a ONE output. The negation of each group is then provided by means of blocks 753, 754, and 755 of FIG. 76 for implementation of the following parity check equation which is accomplished by means of check circuit 756:

$D1PCHKN = (CHK1)(CHK2)(CHK3)$
$\quad + (CHK1N)(CHK2N)(CHK3)$
$\quad + (CHK1N)(CHK2)(CHK3N)$
$\quad\quad\quad + (CHK1)(CHK2N)(CHK3N)$ The output of the D1 parity check (D1PCHK) is a ZERO if an odd number of check groups are ONE. More specifically:

D1PCHK=0 for even number of ONES in D1 (9–16)
D1PCHK=1 for odd number of ONES in D1 (9–16)

The output of parity checking circuit 756 is gated into the reset side of block 757 which represents stage 21 of the control register. Such gating is effected by the parity check pulse (PCHKP) from block 759 of FIG. 76. Such gating prevents coincident set and reset inputs on C–21 during the next following transfer to D1. Transient inputs to C–21 are prevented since the checking circuit 756 has stabilized prior to the parity check pulse occurrence.

A logic one-shot circuit comprising flip-flops 758 and 759 of FIG. 76 is employed in the D1 register to generate a parity check pulse (PCHKP). This logic one-shot circuitry is in addition to the regular or conventional bit stages of the D1 register. The timing of the one-shot circuit is as follows. The destination address, which is the D1 register, is set into the W register at times TP–2, TP–4, or TP–6 (CLE times). First stage set decoders which are part of the transfer link, as discussed above but not shown in FIG. 76, are gated with the CLO times immediately following the CLE times mentioned in the preceding sentence. The second stage set decoders D1SD02 provides an input to the set side of flip-flop 758. The parity check pulse will appear on output lead 760 of flip-flop 759 at the next CLE time. In other words, a data transfer to D1 on the A cycle results in a parity check pulse being generated on the B cycle with the parity result at block 757 available on the C cycle. Thus, the data in C–21 (block 757) is not valid until the second cycle after the D1 destination command.

Immediately after the D1 register has been selected as the destination register, bit 21 of the control register is cleared to the ONE state, that is, is set by the clear pulse appearing on the input lead 761 to the block 757. The clear pulse is derived from the second stage clear decoder of octal address 02. The coincidence of an output from the parity check pyramid, i.e., from block 756, and a parity check pulse (PCHKP), resets the flip-flop C–21 whenever bits 9–16 of register D1 do not meet EVEN parity requirements.

Another fixed wire transfer is the W register to D3 register transfer. Such transfer is manually controlled by push buttons on the control panel and enables the C cycle transfer instructions to be transferred from bit stages 1–15 of the W register to bit stages 1–15 of the register D3. The processor must be in the STEP mode for this manual operation. Since the machine is idling, the next TSS instruction word is continuously being transferred to W; thus, the instructions will be implemented after processor initiation.

The D3 register has a visual display so that the W to D3 transfer may be employed to verify the next C cycle transfer instructions. The W to D3 transfer occurs during the TP–5 and TP–6 times, as follows.

| Time: | Transfer |
|---|---|
| TP–5 | W(06–10) to D3(06–10) |
| TP–6 | W(01–05) to D3(01–05) |
| TP–6 | W(11–15) to D3(11–15) |

Bit positions W–01 and W–02 are implemented twice, and the outputs of both implementations are ANDED into D3–01 and D3–02 as a maintenance feature. Reference is made to FIG. 77 which shows a block diagram which initiates the W to D3 fixed wire transfer. In FIG. 77 block 780 represents the push-button mechanism which initiates the W to D3 fixed wire transfer. Blocks 781 and 782 represent, respectively, an inverter circuit and a flip-flop circuit. Blocks 784 and 793 are driver circuits which respond to input pulses from AND gates 783 and 781 to open gating circuits 785, 786, 787, 788, 789, and 790 to cause transfer of the contents of the bits 1–15 of the W register into bit stages 1–15 of the D3 register as indicated at the extreme right of FIG. 77. It will be observed that the transfer to bits 1–5 and 11–15 of the D3 register occurs at TP–6 time since AND gate 783 is opened by a CE–6 pulse. Similarly, the transfer to bit stages 6–10 of the D3 register occurs at TP–6 time since AND gate 791 is opened by a CE–5 pulse.

An additional feature of the D3 register is that each of the 16 bit stages therein can be set from the manually operated control panel by 16 switches mounted thereon.

B. *R1 and R2 registers*

The R1 and R2 registers are the registers designated by reference characters 144' and 184 of FIG. 12. These registers are capable of functioning independently as utility registers, with special input/output capabilities, or conjunctively as a means of rotating information.

A character left inhibit feature (CHLI) and a character right inhibit feature (CHRI) is provided for the normal inputs of both the R1 and R2 registers under control of bits 13 and 14, respectively, of the control register. The complement inputs to the R1 register and the rotate inputs to the R2 register are not affected by the control bits 13 and 14.

Generally speaking, the R1 register is a multiple input storage register which can be used to store and transfer data to and from the transfer link discussed hereinbefore. Data can be loaded into the R1 register from the transfer link with character left and character right inhibit, by selecting octal address 03 as a destination; or data may be loaded into the R1 register in complemented form by selecting octal address 37 as a destination.

Data from the R1 register is provided to the transfer link in the following manners:

(1) Sixteen parallel data bits in normal form with octal address 03.
(2) Sixteen parallel data bits in complement form with octal address 01.
(3) Sixteen individual bits, depending on the source address, to the 17th bit of the transfer link, and for data group fanouts $\alpha, \beta, \gamma, \delta$.
(4) Four data group fanouts $(\alpha,\beta,\gamma,\delta)$, depending on the source address, to the 17th bit of the transfer link.

Data from the R1 register is provided to the R2 registers for the fixed wire rotate functions, which will be described in considerable detail later herein. Generally, these fixed wire rotate functions are as follows:

(1) RO8L—rotate 8 to the left under control of bit 15 of the C register.
(2) RO1L—rotate 1 to the left under control of the 16th bit of the control register.
(3) RO4L—rotate 4 to the left under bit 17 of the control register.
(4) TTYR—a Teletype rotate where bits 2–11 of the R1 register are rotated into bits 7–16 of the R2 register. The Teletype register rotate function is under control of the 4th bit of the control register.

The R2 register is a multiple input storage register which can be employed to store and to transfer data to and from the transfer link. Data can enter the R2 register in three general ways, as follows:

(1) From the transfer link, with character left and character right inhibit, by selecting octal address 11 as a destination.
(2) From the R1 register during the fixed wire rotate functions, TTYR, RO8L, RO1L, and RO4L, under control of C–04, C–15, C–16, and C–17, respectively.
(3) From the T register during the fixed wire T to D1, D2, and R2 transfer under control of bit 19 of the control register. Reference is made to the section entitled "D REGISTERS" herein for a more complete description of the T to D1, D2, and R2 transfer.

Data from the R2 register is provided to the transfer link as 16 parallel data bits, in normal form, with octal address 11, while bit 1 of the R2 register is also provided to the 17th bit of the transfer link with the same address.

In addition to the rotate and other functions mentioned, the R1 and the R2 registers perform several other functions, all of which will first be listed below and then will be described in some detail in the immediately following paragraphs. After the description of these functions, an operational description of the R1 register and the R2 register, separately, will be made.

The various functions of the R1 and the R2 registers are:

(1) Utility function.
(2) Character left and character right inhibit.
(3) Complement function.
(4) Clear inhibit function.
(5) Rotate functions.
(6) Conditional jump logic.
(7) T to D1, D2, and R2 fixed wire transfer function.

The utility function has already been described above and is quite the same as with several of the other registers.

The character left and character right inhibit function enables the transfer link to load data into the left or the right hand of the R1 and the R2 registers under control of C register bit positions 13 and 14. Reference is made to FIG. 78 which shows the implementation diagram for the character left and the character right. In FIG. 78 blocks 800 and 801 comprise second stage clear decoder circuits which, respectively, are connected to groups of eight of the bit stages of the R1 or the R2 register. It is to be understood that FIG. 78 is applicable to both the R1 and the R2 register.

The second stage clear decoder circuits 800 and 801 are under control of bits 13 and 14 of the C register which are applied, respectively, to the leads marked CHLI and CHRI. Thus, if bit 13 of the C register is a ONE, the input CHLI will gate open the decoder circuit 800 to clear the bit stages 1–8 of either the R1 or the R2 register. The bit stages 9–16 of such register will not be cleared if C–14 of the C register is a ZERO. In a similar manner, setting of bit stages 1–8 and 9–16 is effected by the second stage set decoders 802 and 803, which also are under control of bits 13 and 14, respectively, of the C register.

The specific transfer link bit positions controlled by the circuit shown in FIG. 78 are, as follows:

| C–13 | C–14 | |
|---|---|---|
| 0 | 0 | Enables transfer link 01–16 to entire register. |
| 0 | 1 | CHRI—Inhibits transfer link bits 09–16 to the register bits 09–16. |
| 1 | 1 | CHLI—Inhibits transfer link bits 01–08 to the register bits 01–08. |
| 1 | 1 | Inhibits all 16 transfer link bits to registers controlled by C–13 and C–14. |

Bit positions 13 and 14 of the control register are controlled by transfer link bits 13 and 14, respectively. The selection of octal address 14 of the transfer link clears both bit positions 13 and 14 through clear decoder circuit C–CD14. A ONE is then required from the transfer link, along with the set decoder C–SD14, to set C–13 and/or C–14.

When the R1 register is being utilized data may be complemented on either incoming or outgoing transfers. With octal address 13 as a destination address, 16 parallel data bits from the transfer link are entered into the R1 register in complement form. The data in the R1 register will be provided to the transfer link in its complement form when octal address 01 is selected as a source.

Both the R1 and the R2 registers, like many other registers of the processor, may be clear inhibited under control of bits 31 and 32 of the T register on the B and C cycles thereof, respectively. As with the other registers, a logic "OR" is performed when data is entered into the R1 and R2 registers during a clear inhibited cycle. When the complement input of R1 is entered during a clear inhibited cycle the logic OR will not be obtained. Instead, a masking function is obtained wherein an incoming logic ONE will clear the respective data bit and an incoming logic ZERO will leave the respective data bit as it was prior to the clear inhibited transfer into the complement side of the R1 register.

As mentioned above, the R1 and R2 registers function conjunctively as a rotate unit with three distinct rotate left operations; these operations being Rotate One Left, Rotate Four Left, and Rotate Eight Left. In essence, the rotate functions are end around shifts with the most significant bit position; that is, bit 01 of the R register being shifted around to, or through, the least significant bit position, which is bit 16 of the R2 register. The rotate flow diagrams are shown in FIGS. 79 and 80. More specifically, in FIG. 79 the Rotate One Left and Rotate Eight Left flow diagrams are shown. In FIG. 80 the Rotate Four Left and also the Teletype Rotate (TTYR), flow charts are shown.

In a rotate operation, the data in the R1 register remains unchanged during the operation. However, the R2 register is automatically cleared and the rotated data is inserted into R2 by fixed wires from R1. It is to be understood that the rotation of data, as discussed herein, is not a function similar to that of a shift register, for example. More precisely, the information is transferred from the R1 to the R2 register by fixed wire means and occurs in a parallel manner.

All rotate functions are performed by first entering the R1 register with the data to be rotated and then by setting the respective control bit in the C register. The C register control bits can be set on any cycle with the actual transfer occurring on the following C cycle. Due to transients, the rotated data in the R2 register is not available until the second cycle following the setting of the appropriate control bit. If the rotated information in the R2 register is to be valid, transfers must not be made to either the R1 register or the R2 register during the rotating operation.

In the teletype shift the R1 and R2 registers function conjunctively as a rotate unit with the bits 02–11 of the R1 register being transferred to bits 07–16 of the R2 register under control of C–04. Bits 01–04 of the R2 register remain unchanged during the TTYR rotate operation. The data in the R1 register remains unchanged during the TTYR rotate operation. However, the bits 07–16 of the R2 register are automatically cleared and the rotated five right data from the R1 register is inserted into these cleared bit positions by fixed wire connections.

Performance of the TTYR rotate function is accomplished by first entering the R1 register with the data to be rotated and, secondly, by setting the fourth bit of the control register on a B cycle. The actual fixed wire transfer occurs on the following C cycle and the data is available in the R2 register on the next following A cycle. The R2 register will be in a transient condition on the C cycle during which transfer occurs. Thus, the R2 register should not be selected as a source during such C cycle since valid information cannot be obtained.

It is possible to set both the RO8L (C–15 bit) and RO1L (C–16 bit) controlled on a single data transfer. The net result of this combined rotate command will be a logic OR of the two individual rotate functions, and not a rotate nine left. Thus, $$R2\ (01-16)_{n+1} = R1\ (02-16,\ 01)_n + R1\ (09-16,\ 01-08)_n$$

It is also possible to set the RO4L (C–17 bit) and TTYR (C–04 bit) controls on A–B cycle transfer. The net function obtained in R2 register will be a combination logic OR resultant as follows:

(a) $R2\ (01-06)_{n+1} = R2\ (01-06)_n + R1\ (05-10)_n$
(b) $R2\ (07-16)_{n+1} = R1\ (02-11)_n$
$$+ R1\ (11-16, 01-04)_n$$

The logic equations for the individual bits of the R2 register for the two combined rotate commands set forth above are tabulated in FIG. 81.

Under certain conditions, as discussed hereinbefore, it is desirable to cause a jump in the sequential order of addresses in the transfer storage memory. Such jump logic, usually termed conditional jump logic, is accomplished in the following manner. The R1 register has 20 outputs to bit 17 of the transfer link which includes the 16 individual bit positions and four data groups identified as $\alpha$, $\beta$, $\gamma$, and $\delta$ depending on the source address. Equations for the four data groups are as follows:

$$\alpha = R1\text{-}11 \cdot R1\text{-}12$$
$$\beta = R1\text{-}13 \cdot R1\text{-}14N \cdot R1\text{-}15 \cdot R1\text{-}16N$$
$$\gamma = R1\text{-}13 \cdot R1\text{-}14N \cdot R1\text{-}15N, \text{ and}$$
$$\delta = R1\text{-}11 \cdot R1\text{-}12N$$

The R2 register bit 01 is also an input to bit 17 of the transfer link. Conditional jump inputs to the 17th bit of the transfer link are shown in the chart of FIG. 82. This chart includes not only the outputs from the R1 and R2 registers, but also the outputs from all other registers.

The output from the 17th bit of the transfer link is used to control U1–02 and U2–02 under normal operation, and U1–02 during program loading of the number 2 transfer storage memory (TSS–2) by selecting octal address 04 (UM) as a destination. A transition (change) of U register bit 02 will result in a 400 octal change in the TSS address (microprogram). Thus, a conditional jump depends on bit 17 of the transfer link and bit 02 of the U register.

A further function of the R registers is the T to D1, D2, and R2 fixed wire transfers. This particular fixed wire transfer has been discussed in detail in the heading marked "D REGISTER" to which reference is now made.

Referring now again to the R1 register, additional description of the operation thereof will be made. In FIG. 83 there is shown typical bit positions of the R1 register and also the R2 register. Both the R1 and the R2 registers have complement inputs, as shown on the typical bit configuration of FIG. 83.

When the normal inputs are employed, register R1 is cleared by the second stage clear decoder (R1CD03), with octal address 03 used as the destination address. The 16 bits are then set by the respective transfer link bit positions ANDED with the second stage set decoders (R1SD03). The AND gate employed is designated by reference character 808.

When the complement inputs are used, register R1 is set to ONES by the second stage clear decoders (R1CD37) with octal address 37 used as a destination address. The 16 bit positions are then cleared to ZERO by logic ONES in the respective transfer link bit positions ANDED with the second stage set decoders (R1SD37) in AND gate 807. A logic ZERO ANDED with the set decoders R1SD37 will leave the respective bits in the logic ONE, that is, the cleared state. Thus, incoming data on address 37 will appear as its complement in the R1 register, i.e., an incoming ONE registers a logic ZERO and an incoming ZERO registers a logic ONE.

By using the complement input when the transfer link is clear inhibited with T register bits 31 and 32, the clear decoders (R1CD37) will leave the data in the R1 register unchanged, incoming ONES will mask out, that is, set to zero, their respective bit positions and incoming ZEROS will leave their respective bit positions unchanged. Thus, the mask function is obtained.

The outputs of the reset half 805 and the set half 806 of each bit of the R1 register, as shown in FIG. 83, have outputs marked True and False identified by the letters "T" and "F." The True outputs of the R1 registers are connected to the 16 transfer link bit positions when source address 03 is utilized and the False (or complement) outputs of R1 are connected to the transfer link when source address 01 is utilized. By this means either the True output or its complement can be obtained from the R1 register. The typical bit of register R2 shown in FIG. 84 will be discussed later.

Reference is made to FIG. 85, which shows the over-all diagram of the relationship between the R1 and the R2 registers. In FIG. 85 the R1 register 813 has three groups of inputs, two of which are identified as "Normal Inputs" and the third of which is identified as a "Complement Input." Two groups of normal input leads are required in order to perform the character left inhibit and the character right inhibit function described hereinbefore. The blocks 810, 811, and 812 represent the set and clear decoders associated with each of the groups of inputs. The leads marked "Matrix Output" come from the transfer link and may be derived from any suitable address. The normal outputs, the complement outputs, and the individual bits, or $\alpha$, $\beta$, $\gamma$, or $\delta$, of the R1 register are supplied to matrix input leads via output leads 830, 831, and 832 through AND gates 833, 834, and 835. Blocks 814, 815, and 816 represent selective source decoders associated with the input matrix addresses as discussed in connection with the high-speed transfer link. The lead 837 connecting the R1 register to the R2 register represents the group of leads necessary to effect the various rotate functions as described hereinbefore. Such fixed wire connections, as represented by lead 837, are supplied to one side of AND gates 821, 822, 823, and 824 under control of the bits 04, 16, 17, and 15 of the control register to effect any of the desired rotate functions. The blocks 819 and 820 represent set and clear decoders necessary to supply information from the transfer link into the R2 register in the conventional manner described herein with other registers.

An additional fixed wire transfer is the T to D1, D2, and R2 transfers. The lead labeled TR2XFR represents the T to R2 transfer and is supplied to one input of gate 825. The other input of gate 825 receives bits 1–12 of the T register. It is to be understood, of course, that the said other lead to the AND gate 825 is actually 12 leads.

The output of the R2 register is supplied to AND gate 836 and then to the matrix input as indicated in FIG. 85. Block 817 represents the input matrix source decoder.

Referring again to FIG. 78, the bits C–13 (CHLI) and C–14 (CHRI) are inputs to the second stage clear and set decoders. Thus, when a control bit is set, the outputs from the respective decoders will be ZERO, thereby inhibiting the initializing clear and the corresponding data set on bits 01–08 and/or bit 09–16, depending upon the setting of bits C–13 and C–14.

Referring now to the R2 register, additional functional description thereof will be given. Like the R1 register, the R2 register is a 16 bit multipurpose register composed of NOR logic elements interlinked to form flip-flop circuits.

A typical bit position R2–07 is shown in FIG. 84. Bit 07 was chosen for this example because it displays all of the properties associated with the bits of the R2 register, whereas other bit positions contain fewer inputs.

The R2 register is cleared by second stage clear decoders (R2CD11) as shown in FIG. 84 when octal address 11 is the destination address. The 16 bits are then set by the 16 respective transfer link bit positions ANDED with the second stage set decoders (R2SD11).

Further, the R2 register has been implemented to permit a fixed wire data transfer from the T register to the R2 register, as discussed briefly above. For a detailed description of such a transfer, reference is made to the section herein entitled "D REGISTERS."

As in the case of the R1 register, the R2 register has been implemented with the character left and character right inhibit features on its inputs. Bits C–13 (CHLI) and C–14 (CHRI) are inputs to the second stage clear and set decoders as shown in FIG. 78. Thus, when a control bit C–13 or C–14 is set, the outputs from the respective decoders will be ZERO, thereby inhibiting the initializing clear and the corresponding data set on bits 01–08 and/or 09–16 of the R2 register.

FIGS. 86 and 87 show additional information concerning the rotate function of the R2 register. A rotate operation will now be followed through for the RO8 command which rotates 8 to the left. First, data is set into the R1 register in preparation for the rotate. Secondly, a transfer is made to the C register to set bit C–15 thereof, to thereby initiate the rotate.

In FIGS. 86 and 87 it is shown that setting C–15 on an A cycle transfer will result in setting the RO8L flip-flop 850 on an ICLO time at the first half of the B cycle. This particular ICLO timing pulse is represented by the reference character 851 of FIG. 87. As will be shown by logic equation set forth below, the bit positions of the R2 register affected by the rotate operation will be cleared during the same ICLO time period as mentioned above. Subsequently, as the aforementioned ICLO pulse goes to ZERO (its low level state), the RO8L flip-flop 850 of FIG. 86 allows gating of the appropriate bit positions of the R1 register into the R2 register. The R2 register may be used as a source on the C cycle, which is the second cycle following the setting of the C–15 bit of the control register, represented by block 851 of FIG. 86.

The equations for the automatic rotate clear input to the R2 register are as follows:

$$RCLRN = (C-04N \cdot C-15N \cdot C-16N \cdot C-17N) + CLO$$

so $$RCLR = (C-04 + C-15 + C-16 + C-17) \cdot CLE$$

For the RO1L, the RO4L, and the RO8L commands, all bit positions of the R2 register will be automatically cleared during the rotate operation. However, the bit positions 01–06 of the R2 register will not be cleared during the TTYR rotate function. More specifically, during the TTYR function the bit C–04N of the control register will function to inhibit the RCLR gate on bits 01–06 of R2 when C–04 is a logic ONE. The following logic equations illustrate the foregoing function:

Reset Input = $RCLR \; TTYDC$ where $$TTYIC = C-04N$$

or

Reset Input = $(C-04 + C-15 + C-16 + C-17) \cdot C-04N \cdot CLE$

If either of two pairs of rotate commands are initiated simultaneously, i.e., RO1L and RO8L, or RO4L and TTYR, the individual bit positions of the R2 register will sample the R1 register as if the bit positions of the R2 register were two independent sources. Reference is made to FIGS. 84 and 86 and, particularly, FIG. 86 which illustrates the appearance of the R1 register as two independent sources when simultaneous functions occur. In FIG. 86, the blocks 851 and 850 function to supply a rotation function to the R2 register which can be, for example, an RO4L function. Blocks 864 and 865 which represent, respectively, bit 4 of the control register and a driving circuit, function to initiate the TTYR rotate function into the R2 register.

The contents of the R2 register will be a logic OR function of the inputs for the bit positions that are automatically cleared during both conditions, and a logic OR function of one input with the prior contents of the uncleared R2 bit positions (R2 bits 01–06) during a $TTY + RO4L$ command. Reference is made to the chart of FIG. 81 for the individual logic equations of each of the individual R2 bit positions.

As indicated in FIGS. 85 and 86 all rotate operations are performed by utilizing a logic one-shot to gate the inputs of the R2 register with the appropriate outputs from the R1 register during the cycle following the setting of the control bit. The timing associated with an RO8L transfer is shown in FIG. 87.

Thus, for a valid rotate the R1 register must be set prior to setting the control bit and the R2 register must not be sampled before the second cycle time following the setting of the respective control bit in the C register.

C. "A" registers

The "A" register section of the Data Processor constitutes the arithmetic unit and is, basically, a 16 bit binary parallel adder which performs the arithmetic operations of binary addition and Modulo 2 Sum for the processor.

The three A registers identified as registers A1, A2, and A3, and further identified as blocks 181, 180 and 179 of FIG. 12 perform the aforementioned arithmetic operations. Negative numbers in the A1 and the A2 registers are expressed in ONES complement form. A ONE in the most significant bit position of an operand is interpreted as indicating a negative operand. Carryovers are propagated in a look-ahead method to decrease propagation time. The bits are arranged in groups of four, and group carry, or propagation carry, signals are generated in parallel.

Referring now to FIG. 103 there is shown a block diagram of the arithmetic unit consisting of a synchronizer 870, A1, A2, and A3 registers 880, 872, and 873, respectively, a Modulo 2 Sum generator 874, an overflow indicating circuit 877 and input gating circuit 871, an L register 883, and a carry propagation circuit 878.

The synchronizer circuit 870 is shown in more detail in FIG. 89 and functions to generate the T1 and T2 timing signals used in the arithmetic operations. The synchronizer 870 receives two control signals (Add) and (Sum Modulo 2) from the input gating circuits 871. The Add control signal is received when information is transferred to the A3 register from the transfer link through the input gating circuit 871 and the Sum Modulo 2 command is received when information is transferred into the A2 register 872 from the transfer link. Both command signals to the synchronizer 870 are derived directly from the second stage destination set decoders associated with the A3 register 873, and the A2 register 872, respectively.

The synchronizer 870 generates only the T1 timing signal for the Sum Modulo 2 operation, but generates both the T1 and the T2 timing signals for the Add operation.

Referring now more specifically to FIG. 89 and the timing diagram of FIG. 90, additional description of the synchronizer will be set forth. It should be noted that the timing diagram of FIG. 90 is applicable to both the A2 and R3 registers as destination registers. The accumulation, whether it be an addition or a Modulo 2 Sum, is always accumulated in the A1 register.

In FIG. 90, assume that a signal is received from the second stage of the A3 destination decoder. Such second stage is designated by block 890 in FIG. 104 and will cause the flip-flop 891 to set, i.e., have a ONE in its upper stage. The following CLE signal will then pass through AND gate 893 to set the flip-flop 892. Also, the said CLE signal is supplied through AND gate 896 to energize the driving circuit 897 which, in turn, will cause four T1 pulses to be produced in the circuits 901 through 904. The next CLO pulse will be applied to AND gates 894 and 899 and will perform two functions. Firstly, the said CLO pulse will reset the flip-flop 891 so that a ZERO will appear in the upper half thereof, and the AND gate 896 will be thereby closed. Secondly, the said CLO pulse will pass through AND gate 899, which has a ONE on the other lead thereof from the upper stage of flip-flop 892, to energize driver circuit 900 and to cause four T2 pulses to be produced in the circuits 905–908. The next subsequent CLE pulse will function to reset the flip-flop 892 through AND gate 895. AND gate 893 will be closed since a ZERO is now in the upper half of flip-flop 891.

The Sum Modulo 2 generator 874 of FIG. 88 functions generally to operate the logical sum and product signals employed in forming the Sum Modulo 2 and in forming the group carry signals. Additional information will be given regarding the Sum Modulo 2 generator later herein.

The general purpose of the carry propagation unit 878 is to provide the necessary logic circuits for generating group and stage carry signals. The circuit 878 consists essentially of four group carry pyramids in parallel, which determine if there is a carry into or out of a particular group. Additional logic circuits then generate the individual stage carries from a group carry.

In the operation of the circuit of FIG. 88, the information is transferred into the operand registers A2 and A3 from the transfer link and, normally, is transferred in a predetermined sequence to effect an arithmetic addition or a Modulo 2 Sum. To perform the arithmetic addition, a transfer to A2 is followed by transfer to A3. To perform a Sum Modulo 2, the sequence is reversed. The A2 register is denoted as the addend register and the A3 register as the augend register. Accumulation occurs in the accumulator register A1, designated by block 880 of FIG. 88.

The A1 register consists of the 16 bit double ended register which stores the result of the arithmetic operation. The result of the Sum Modulo 2 operation will be available for further transfer operations in the processor on the next transfer cycle following the transfer to A2. The result of the arithmetic addition operation will be available for further transfer on the second transfer cycle following the transfer of the information to the A3 register.

Under certain conditions it is desirable to detect the presence of all binary ZEROS in either the group of bits 1–8 or 9–16 of the A1 register. Fixed wire connections from the A1 register to the L register 883 of FIG. 88 are provided to detect the presence of all ZEROS in these two groups of bit positions. Such fixed wire connections are controlled by bits 13 and 14 of the C register. It will be recalled that bits C–13 and C–14 are the clear inhibit bits. The information supplied from A1 to the L register will be available to the processor at the same cycle time that contents of the A register is available to the transfer link and is obtained by addressing the L register. In essence, the fixed wire outputs from the A register, which are under control of the bits C–13 and C–14, actually comprise the L register.

Certain program requirements must be met in employing the addition unit. For example, the program transfers from the transfer link control the operation performed by the arithmetic unit. Such program transfers may be clear inhibited by bits 31 and 32 of the T register on the B and C cycles, respectively, in a manner similar to that disclosed in connection with other registers.

As shown in FIG. 90, the destination decoder output is true when the Modulo 2 Sum enters A1. Because a Modulo 2 Sum is generated upon every entry to A2, the transfer of the contents of register A1 to A2 will result in a race condition whereby it is possible for the contents of A1 to change during the transfer. Therefore, the programmer cannot program a transfer of the contents of register A1 to register A2.

The transfer sequences for Full Addition and Modulo 2 Summation, as shown in the table of FIG. 106, are as follows:

FULL ADDITION (a) Transfer an operand to A2 on any cycle: This initiates a Modulo 2 sum which is ignored.
(b) Transfer an operand to A3 on any later cycle from the entry to A2: This initiates a full addition operation.
(c) Skip One Cycle: Any operation not involving A2, A3, or A1 may be performed at this time.
(d) Transfer of the Sum of the two operands from A1 to any register except A2 is permitted on any cycle: A transfer to A3 will result in another full addition.

MODULO 2 SUMMATION (a) Transfer an operand to A3 on any cycle: This initiates a full addition which may be interrupted by a transfer to A2 or may be ignored.
(b) Transfer an operand to A2: This initiates a Modulo 2 summation.
(c) Transfer of the Modulo 2 Sum of the two operands from A1 is permitted as follows:
   (1) Transfer of A1 to A2 is not permitted.
   (2) Transfer of A1 to A3 is permitted, but will result in another full addition.
   (3) Transfer of A1 to any nonarithmetic Register is permissible on the cycle following entry to A2.

FIG. 90 shows typical timing of the arithmetic unit for full addition and Modulo 2 summation. Entry is assumed on the A cycle to the A3 register for full addition, and the A2 register for Modulo 2 addition.

The subtraction operand is performed by complementing the subtrahend prior to entry to A3 and following the full addition sequence set forth above. The inversion of the subtrahend is under program control. Similarly, a negative sum appears as a ONES complement in Register A1. Such negative sum is restored to a positive value under program control.

The zero test, or L register control of a sum in A1, is also under program control. At any time before or after an arithmetic process, the character left and/or the character right inhibit bits 13 and 14 of the control register may be set to the desired states to control the meaning of the L register outputs, as set forth immediately below:

| C–13 | C–14 | Zero Test of A1 Stages |
| --- | --- | --- |
| 0 | 0 | 1–16 |
| 0 | 1 | 1–8 |
| 1 | 0 | 9–16 |

If the test succeeds, a logic ONE will be put on line 17 of the transfer link. If C–13 and C–14 are both in the ONE state, a ONE will be put on line 17 of the transfer link regardless of the contents of register A1.

The internal logic characteristics of the A registers will now be examined in somewhat more detail. In a computer system, the binary arithmetic sum of the two contents of the addend and augend registers, that is the A3 and A2 registers, may be expressed on a per-stage basis as the logical exclusive OR of the contents of a stage from each of the registers, ANDED with a CARRY-NOT from the preceding stage, or, the logical exclusive NOR of the stages ANDED with the CARRY from the preceding stage. The generalized expression for the binary sum is as follows:

$$A1 = (A2 + A3)(CN) + (\overline{A2 + A3})N(C)$$

$$0 = (A2 \cdot A3) + (A2 + A3)C$$

In the arithmetic unit of the present system, the binary sum of the contents of the addend register A2 and the augend register A3 is held in the accumulative register A1. The following rules represent the method used in the present precessor to generate binary addition:

(1) At time T1 as shown in FIG. 90, if the *n*th bit of register A2 or A3 are in opposite states, the corresponding bit of the accumulator will be set to a ONE; otherwise, the corresponding bit of the accumulator register A1 will be reset to the ZERO state. It is to be noted that this rule by itself forms the Modulo 2 Sum in the accumulator register A1.

(2) If there is a propagated carry from the previous lower order stage at time T2 of FIG. 90, and if the $n$th bit of registers A2 and A3 are in the same state, then the corresponding bit position of the accumulator register A1 will be set to the ONE state. If there is not a propagated carry into a stage, the corresponding bit position of the accumulator A1 remains unchanged at time T2.

The logical expression for the preceding two rules is as follows:

$$A1 = (A2 \cdot A3N + A2N \cdot A3)T1$$
$$+ (A2N \cdot A3N + A2 \cdot A3)C \cdot T2$$
$$A1N = (A2N \cdot A3N + A2 \cdot A3)T1$$
$$+ (A2 \cdot A3N + A2N \cdot A3)C \cdot T2$$

To perform Modulo 2 Sum, only the T1 timing signal is generated, as indicated above and only Rule 1, as set forth above, is applicable. The result of the Sum Modulo 2 will be available in the A1 register on the cycle following a transfer to the A2 register. For a valid Sum Modulo 2 in the accumulator register, two consecutive transfers to the A2 register are prohibited inasmuch as an overlapping transfer condition will exit.

The conditions which set the overflow indicating circuit 877 of FIG. 88 of an arithmetic sum are as follows:

(1) A carry into stage 1 of the register A1 and ZEROS in both first stages of registers A2 and A3.
(2) ONES in both first stages of registers A2 and A3 and no carry.

Therefore, overflow can occur because of either a full addition or Modulo 2 Sum usage of the arithmetic unit. The Boolean expression for overflow is as follows:

$$O = A2 \cdot A3 \cdot CN + A2N \cdot A3N \cdot C$$

In determining overflow conditions, a logic ONE in the most significant position of an operand is interpreted as indicating a negative number. Therefore, for valid indication of overflow, the operands cannot exceed the octal equivalent of 77,777 (15 binary bits). Whenever the overflow condition exists, the result in the A1 register does not correctly indicate the arithmetic sum.

The overflow indication, which is represented by a flip-flop, i.e. a bit stage in the control register, will be available for transfer operations from the second cycle following transfer of information into register A3. The reset of the overflow indicator is under program control.

Reference will now be made specifically to the specific input signals or connections from the transfer link to the A registers and the specific output signals or connections from the A register. With respect to input signals from the transfer link, there are 16 parallel data lines to the said inputs of the A2 register and also the A3 register. In addition, there are 24 lines of decoder and control signals.

With respect to the output signals, there are 17 data lines from the true outputs of the A register to the transfer link. The 17 lines consist of outputs from bit positions 1–16 of the A register to source selection matrix bit positions 1–16, plus an additional output from bit 1 of the A registers to the source selection matrix line 17. Eight overflow status control signals connect to bit position 27 of the control register. Further, two lines, logic one left and logic one right, are connected to source matrix line 17 of address 31.

D. Input/output registers

With the data processor there are used many different types of peripheral devices. The input/output (I/O) registers provide the input and output interface requirements between the processor and the specific peripheral devices. Some equipment using a standard input/output register are listed below, although such listing is not exclusive.

(1) Inquiry Station
(2) Paper Tape Systems
(3) Magnetic Tape Systems
(4) Line Printer Systems
(5) Punched Card Systems
(6) Random Access File Storage Systems
(7) Line Scanning Units In order to increase the capacity of the machine, some of the I/O registers are arranged in commutatable pairs in which the two I/O registers making up a pair employ the same input and output matrix addresses, but on a time sharing basis. The commutatable pairs of I/O registers are commonly used with the Teletype apparatus, as will be discussed in more detail later herein.

Figure 7:
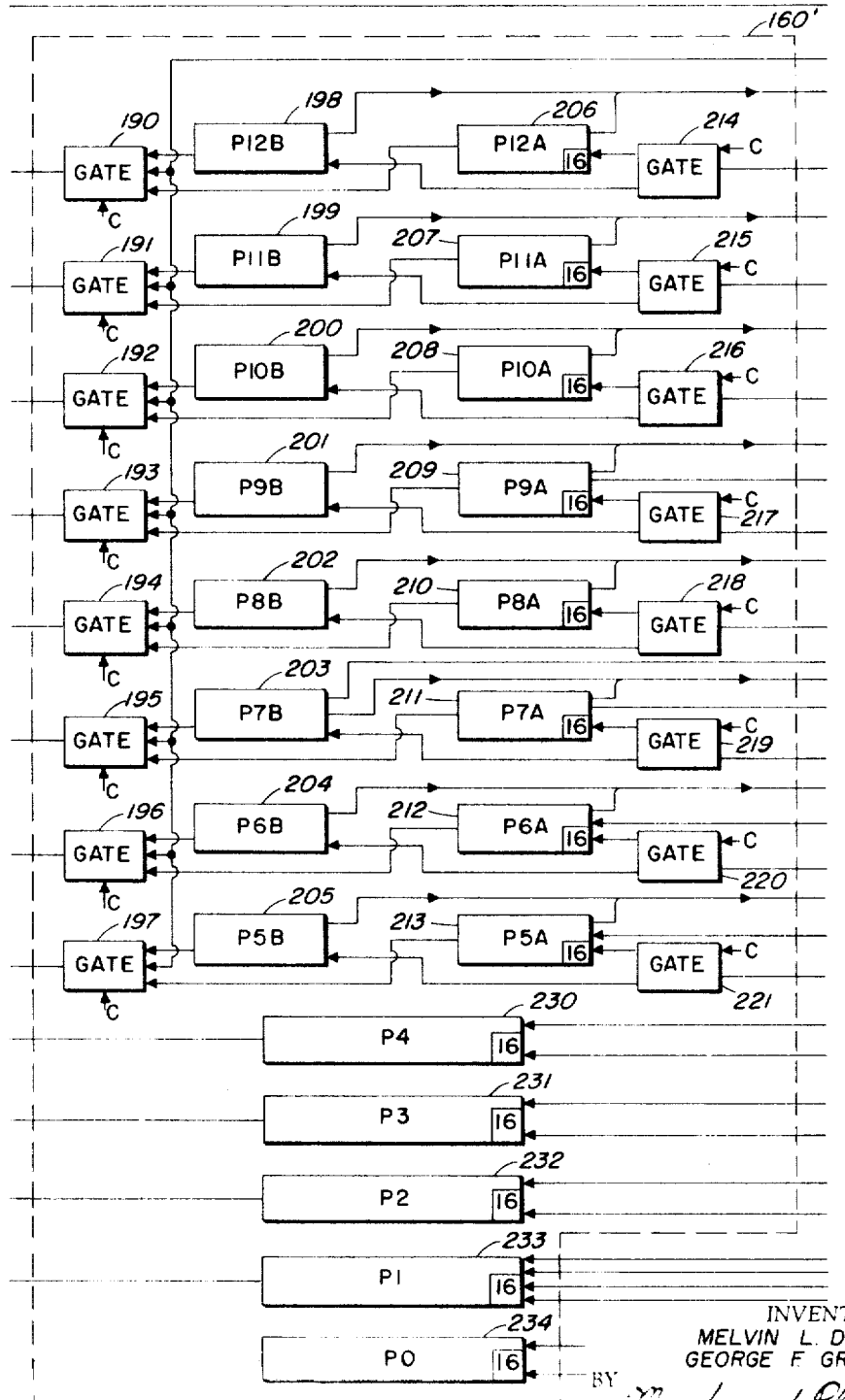
Figure 8:
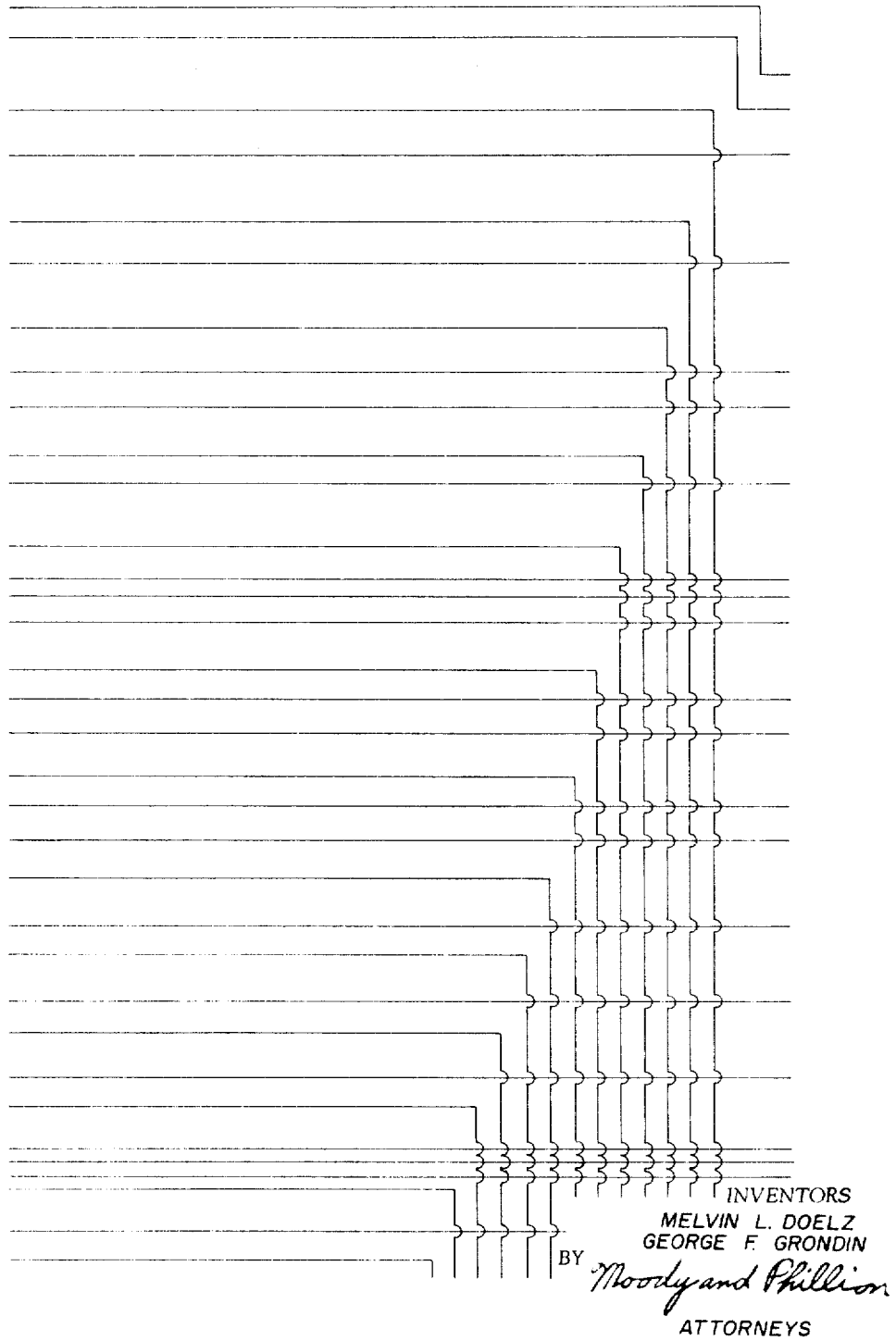

Reference is made to FIG. 7 of the main block diagram which shows the various I/O registers which are identified by reference characters 198 through 213, and 230 through 234. Such I/O registers are also labeled P0 through P4 and P5A, P5B, P6A, P6B . . . P12A, P12B, as shown in FIG. 7. The A and the B designations of the pairs of the I/O registers denote a pair of commutatable input registers. Each of the I/O registers in the system contain 16 bit positions comprised of 16 flip-flop storage registers in parallel. Altogether there are 21 such standard I/O registers in the particular processor being described herein. The term "standard" refers to the internal wiring of the I/O register. Such wiring does not change regardless of the use or of the I/O register. Choice of the input/output function is dependent only upon the use to which it is put. More specifically, for different peripheral devices the specific design of the I/O register must be varied somewhat to accommodate for the somewhat different characteristics of the peripheral device. However, the implementation of an I/O register for different peripheral devices does not involve a change of wiring in the I/O register. Rather, it involves a change in the input circuitry to the I/O register from the peripheral device and also that output circuitry of the I/O register as it delivers information to a peripheral device. For example, if the peripheral device is a Teletype machine, a relay filter may be used as the input circuit to the I/O register, whereas a line terminator circuit may be employed in the case where the peripheral device is a magnetic tape system. Thus, in some of the block diagrams to be described herein later, a single block can represent two types of input or output circuits to and from the I/O register. A chart will be provided to further identify the type of input and output circuits which may be employed, or which may be represented by a specific block in some of the figures in this section.

In the particular form of the data processor described herein, the I/O registers, P0-P4, are employed specifically for peripheral devices other than a teletypewriter, although all the I/O registers in the present device are wired the same. It is only the control and the use thereof which varies.

The standard wiring of the I/O registers allows the use of a pair of registers, such as P5A, and P5B, for one of four available options. Registers A and B of each pair of registers are assigned to the same matrix address. By means of a control toggle (bit C–23) in the C control unit, either the A and the B register can be alternately selected as a source or a destination, i.e., the A and the B registers of a pair are commutatable. The following sections define the four options available to all pairs of commutatable A and B input/output registers.

*Option I*
(1)
A. Assigned to peripheral unit
B. Assigned to peripheral unit

*Option II*
(2)
A. Assigned to TTY lines
B. Assigned to TTY lines

*Option III*

(3)

A. Assigned to peripheral unit
B. Assigned to TTY lines

*Option IV*

(4)

A. Assigned to peripheral unit
B. Is not used

At the sacrifice of one register, option IV enables register A, of the pair of ordinarily commutatable registers, to become a noncommutatable register that can be addressed independently of the control toggle (bit 23) of the C register.

Each of the 16 toggles of each I/O register has associated therewith the necessary clear and set decoders as has been discussed in connection with other registers. The processor has access to both the set and reset side of each toggle independently of the assigned option of the I/O register.

Once the I/O register has been selected as a destination during any of the programmed cycles, an automatic resetting of all I/O toggles will occur. This automatic resetting condition may be overridden by initiating a clear inhibit during B and C cycles. During the second part of the above programmed cycles, the sixteen bit positions of the transfer link output will have access to the set input side of all I/O flip-flops. Bit position 1 of the transfer link will affect the first bit of the I/O, etc. Similarly, the true output of the first bit on the I/O will be routed to bit position 1 of the input transfer link and so on for the remaining transfer link connections.

In addition to the stored matrix address required to select an I/O register as a source or destination, it will be necessary to use the C–23 control toggle of the C register in addressing a single register assigned to a commutated I/O register address. When C–23 is true, the A register of any commutated I/O address can be programmed. Similarly, when C–23 is false, the corresponding B register of that address may be programmed. Thus, it is impossible to transfer from A register to B register. Reference is made to FIGS. 65 and 66 for a listing of the source and destination matrix addresses assigned to all standard I/O registers.

Because of the delay in the decoding circuits, it will be necessary to wait at least one program cycle following a transfer which affects the C–23 control before generating a transfer involving a commutated I/O register.

Any I/O register assigned to a peripheral control unit will be fully implemented as a 16 flip-flop register, even though sime peripheral devices require less than 16 I/O bit positions for valid operation. The status of any unused I/O bit position will be under program control only. Unused bit positions are those flip-flops of the I/O which are not required for valid processor peripheral operation.

I/O registers which are not assigned to any of the four (4) available options will generate a logic ONE to all 16 bits of the input transfer link, whenever such an address is programmed as a source.

Each of the standard I/O registers which is assigned to a peripheral control unit will contain two control flip-flops, designated as E/I, ($E=1, I=0$) and S/D ($S=1, D=0$), in bit positions 1 and 2, respectively. Data toggles will be in bit positions 3–16 of the I/O register. The E/I toggle is put into the E state by the programmer at the same time or after transferring data to the remaining 15 toggles. When the E side is true, the implication is that action is to be taken by the peripheral device on the contents of the I/O register toggle. The peripheral device may take such action on the output of the I/O register 150 nanoseconds or more following the transition of I to E. The internal action condition (I) will be established by the peripheral device not earlier than 150 nanoseconds after addressing the remaining flip-flops in the I/O register. Specifically, the I true condition indicates that the peripheral device has performed some function and action should be taken next by the processor.

The condition D in bit 2 of the I/O register indicates that said register contains data. When the S condition exists, the implication is that the I/O register contains supervisory information.

Each commutable I/O register can handle as many as 16 Teletype sources; one Teletype machine being handled, or received, by one bit position of the I/O register and, consequently, by one bit position of the transfer link. Hence, in the maximum configuration of 16 commutatable I/O registers, a total of 256 full duplex Teletype lines can be received. Referring now to FIGS. 92 and 93, there is shown the wiring implementation for the I/O registers. More specifically, FIG. 92 shows the wiring implementation for an A register of a pair of commutatable registers, and FIG. 93 is a somewhat more comprehensive drawing showing the implementation for both the A and B registers of a pair of I/O registers.

Referring now to FIG. 7, the output signal of the peripheral device, such as a teletypewriter (TTY) or a different type of peripheral device (P) as set forth hereinbefore, is suplied to the circuit indicated by block 1031. Depending on the type of peripheral device, that is whether it is a Teletype or other type device, the block 1031 will represent a relay filter (RF12), or a line terminator (LT23). If a Teletype constitutes the peripheral device, the output of the circuit 1031 bypasses the I/O register, of which bits 1 and 2 are represented by blocks 1032 and 1933, as shown in FIG. 92. More specifically, the output of the relay filter 1031 will be supplied via leads 1036 and 1037 to the input matrix through AND gates 1038 and 1039. The other inputs to the AND gates are from the second stage source decoders and associated with the I/O register A and designated by block 1034.

The foregoing description is shown more clearly in FIG. 93 wherein the block 1031', which is a relay filter, feeds directly to the input matrix 1042, bypassing the I/O register 1040 which corresponds to the blocks 1032 and 1033 of FIG. 92. Input signals received internally from the data processor pass through the output matrix 1043 into the I/O register 1040 and then to the Teletype input circuit 1041, which may be a relay amplifier circuit. In FIG. 92, when a peripheral device, other than a teletypewriter, is being employed the block 1031 is a line terminator circuit having outputs to bits of the I/O register as represented by blocks 1032 and 1033. Such leads are identified by reference characters 1043 and 1044.

Other input leads to the I/O register are the bits from the transfer link, the set decoders and the clear decoders. For example, in bit 1 of the I/O register, represented by block 1032, the input leads are bit 1 of the transfer link (M–01) ANDED with the set decoder of the A register (SD$_A$), bit 1 of the transfer link ANDED with the set decoder o fthe A and B registers (SD$_{AB}$), and leads from the clear decoder of the A register (CD$_A$), and the clear decoder of the A and B register (CD$_{AB}$). Each of the bits of the I/O A register has three output leads 1045, 1046, and 1047, which go, respectively, to the output circuit 1035, the input matrix bit 01 associated with the A register, and bit 1 of the input matrix associated with the B register of the pair of I/O registers.

The output circuit 1035 may be either a relay amplifier or a line driver circuit, depending on whether the peripheral device is a Teletype system or some other type unit.

In FIG. 94, there is shown a more comprehensive block diagram of the I/O registers and the associated circuitry. The blocks 1048, 1050, 1051 and 1052 show the set decoders and the clear decoders for the A register and for the A and B registers. The block of 1049 corresponds to the block 1031 of FIG. 92. Similarly, the block 1053 corresponds to the block 1032 of FIG. 92, the block 1054 corresponds to the block 1035 of FIG. 92, and the block 1055 corresponds to the block 1034 of FIG. 92. On the right-hand side of the dotted line 1062 is shown the block diagram for the B register. The blocks 1056, 1067, and 1061 correspond to the blocks 1049, 1048, and 1051 of the A register half of FIG. 94. Simlarly, block 1058 represents bit 1 of I/O register B, block 1059 represents the output circuit of the I/O register B and 1060 represents the second stage source decoder associated with the B register.

To facilitate an understanding of the circuits of FIGS. 92 and 94, there is provided the table of 95 which shows the type circuits employed therein. The numbers in the row immediately under the heading "Decode," "Input," "Storage," "Decode," and "Output" represent the circled numbers of FIG. 94.

In FIG. 94 it can be seen that two lines connect the first stage of set decoder to each of the two second stage set decoders, and two lines from the first stage clear decoders are connected to each of the two second stage clear decoders.

The first stages of the set decoder and the clear decoder are gated by the C–23 commutate control toggle of the C control register. Because of the timing, which is shown in FIG. 96, it is not good programming practice to transfer to a commutatable I/O register on the cycle immediately following a change of state transfer to C–23. FIG. 96 shows the timing of a change of state transfer to bit C–23 on the A cycle and an undesirable transfer to a commutatable I/O register on the immediately following B cycle. It will be observed in FIG. 140 that the overlap of signals 2 and 3 will allow a possible clearing of the I/O register B before C–23 output is true (lower level).

FIGS. 97 and 98 illustrate the implementation of a 16 bit commutated I/O register for each of the four possible options. The four possible options are noted in FIGS. 97 and 98.

Since the processor has been wired for a maximum configuration of 16 flip-flops per I/O register, it is necessary to generate a ground potential from the associated peripheral adaptor, as an input to all bit positions which are not otherwise being addressed by the adaptor. Failure to observe such requirement will result in an open input to the flip-flop for any unused bit position.

Any true logic signals to be transmitted from the peripheral control unit must be of sufficient time duration to insure the presence of any such signal at the input to the related input/output toggle for a minimum of 80 nanoseconds, after being transmitted to the required length of cable. The maximum allowable time duration of a true level input signal to the I/O register is one microsecond. This duration of input signal avoids the possibility of both processor and peripheral adaptor attempting to set the input/output register simultaneously.

E. E registers

The E1 and E2 registers are represented generally by blocks 175 and 176, respectively, of FIG. 12. Both of the E registers may be employed as utility registers, or as special purpose registers, depending on the setting of certain control bits in the control register. Each of the two E registers contain 16 parallel data bit positions.

The E1 register is, in essence, a buffer register for the AC Data Bus which is discussed in detail under the section heading "AC DATA BUS," even though it also has the capability of functioning as a utility register. The bits C–24 and C–25 of the C Control register dictate the function of the E1 register, as will be described below.

The E2 register, in essence, is an input interface between the Data Processor and the TSS loading equipment, even though it (the E2 register) has the capability of functioning also as a utility register. Bit 26 of the control register dictates the function of the E2 register in a manner which also will be described hereinafter.

Octal address 31 is both the source and the destination address for the E1 register. The input to the E1 register is always from octal address 31 of the transfer link. Since the octal address 31 is associated with both the E1 register and the AC Data Bus, the control bits 24 and 25 of the control register play important roles.

The four possible combinations of bits 24 and 25 of the control register and the resultant effects are as follows:

(1) With C–24=0 and C–25=0; the E1 register functions as a utility register. The data in the E1 register will not be gated to the AC Data Bus by bit C–25 of the control register.

(2) With C–24=0 and C–25=1; the contents of the E1 register appears on the AC Data Bus. The data in the E1 register appears continuously on the AC Data Bus until C–25 is reset, or the E1 register is cleared. The E1 register contents are also available at the transfer link input matrix, while the AC Data Bus information is not.

(3) With C–24=1 and C–25=0; the demodulated output information of the AC Data Bus is gated to the transfer link input matrix. The E1 register can be used for utility data storage; however its contents are not gated to the AC Data Bus and are not available at the transfer link until bit C–24 of the control register is reset.

(4) With C–24=1 and C–25=1; the contents of the E1 register are gated to the AC Data Bus while the information on the AC Data Bus is demodulated and gated as DC levels to the transfer link. The data in E1 register appears continuously on the Data Bus until bit C–25 is reset. The register contents, however, are not available at the transfer link directly. E1 does appear on the AC Data Bus and will be sampled whenever octal address of the input matrix is selected as a source.

It will be noted that the various controls exerted on the E1 register by bits 24 and 25 of the control register control only the *outputs* of the E1 register. No special control restrictions are imposed on incoming data.

Reference is made to FIG. 99 wherein there is shown basic block diagrams of both the E1 and E2 registers. Referring to the upper half of the drawing of FIG. 99, the output transfer link 910 supplies information directly to the E1 register 911. Of course, such information is supplied thereto through the proper first and second stage clear and set decoders (not specifically shown). The AND gates 912, 913, and 914 provide the necessary logic circuit to provide input to the input transfer link line 15 and/or the AC Data Bus 916 in accordance with the conditions as set forth hereinabove.

In the upper half of FIG. 107, data flows from the E1 register to the AC Data Bus whenever bit C–25 is a logic one. However, it flows to the transfer link when C–24 is a logic ZERO and octal address 31 is employed to select a source. If octal address 31 selects a source when C–24 is a ONE, the AC Data Bus will provide data to the transfer link input.

More specifically, the first bit of the E2 register is employed as a TSS load control with the remaining bits 02–16 being employed as data load information, when C–26 is in a true state. E2–01N inhibits the TSS load equipment by inhibiting the AND gate 919 of FIG. 107.

Reference is made to the section herein entitled AC DATA BUS for additional description of the AC Data Bus and its relation with the E1 register.

Referring now to FIG. 100, the E1 register is cleared by the second stage clear decoders (E1CD31) when octal address 31 is the destination address. The 16 bits of the E1 register are set by the 16 respective transfer link bit positions ANDED with the second stage set decoders (E1SD31).

The E2 register employs the source and destination address octal 27 under control of bit 26 of the control register. When C–26 is false, i.e., is reset, the E2 register serves as a utility register and the TSS load equipment will not take action on the contents of the E2 register. During the TSS load operation bit C-26 is true, i.e., is set, and the register E2 functions as the input interface between the data processor and the TSS load equipment. During the TSS loading operation mode only 15 toggles of the E2 register will be available for transmission of data to the TSS load equipment, since bit 1 of the E2 register will function as the external/internal (E/I) control bit.

Bit 1 of the E2 register can be set to either a logic ONE or ZERO by program control through the transfer link. When C-26 is set the condition E2-01=1 enables the TSS load equipment to load information into the TSS memory. On the other hand, when E2-01=0 the TSS load equipment is in condition to receive additional data. It is to be noted that when the contents of E2 are loaded into the TSS, the loading equipment will automatically reset ET-01 by lead 917 of FIG. 99, thereby inhibiting further inputs from the E2 register. Thus program resetting of E2-01 through the first bit of the transfer link is required for additional loading into the TSS memory unit.

In FIG. 99 the contents of register E2, designated as block 918, may be sampled by the transfer link 920 when bit C-26 is set and the equipment is in the TSS load mode; thus, E2-01 may be tested to control the incoming data to the E2 register. Bit E2-01 is subject to change, however, since an automatic reset, as indicated above, is provided from the TSS load equipment.

As shown in FIG. 101, the E2 register is cleared by the second stage clear decoders (E2CD27) when octal address 27 is used as a destination address. The 16 bits of the E2 register then set by the 16 respective transfer link bit positions ANDED with the second stage set decoders (E2SD27). Through AND gates, such as AND gates 920, 921, and 922 of FIG. 101, the blocks 923, 924, and 925 represent the bit stages 1, 2-8, and 9-16, respectively.

It should be noted that the loading of the bits of the E2 register are divided into groups of 8, 7, and 1, in order to satisfy two conditions. The first condition is that the bit 1 of the E2 register serves a special purpose, as has been described hereinbefore. The second condition is that both the E1 and the E2 registers may be clear inhibited by T register bits T-31 and T-32 on the B and C cycles, respectively, as discussed in connection with other registers herein. As will be recalled, bits T-31 and T-32, each clear inhibit groups of 8 bits.

In the E2 register data flows from the E2 register to the TSS load equipment whenever C-26 is the logic ONE. Data, however, is gated to the transfer link from the E2 register regardless of C-26 when octal address 27 is employed to select a source.

F. S and Z registers

The S and Z registers are communication registers which interconnect the main memory (MCS) 161' of FIG. 10 and the basic switching frame of the data processor. The S register functions to select an MCS address from a maximum of 65,536 memory locations, on a B cycle transfer to the S register. Each of the memory addresses of the MCS consists of a 16 bit data or instruction word. This 16 bit data or instruction word selected by the S register is read from the MCS into the Z register, where it remains until data is again transferred to the Z register from the transfer link or a newly selected MCS address. The S and the Z registers are identified as blocks 178 and 177 of FIG. 12.

Reference is made to FIGS. 102 and 103 which show the generalized block diagrams of the main memory access means, which includes the S and Z registers. More specifically, FIG. 102 shows the output of the transfer link 930 which supplies the MCS address to the S register 931. The main core memory (MCS) 932 consists of input logic circuitry, the main core storage, and data line drivers and terminator circuits. The Z register 933 functions to read information from, and to write information into, the particular address location of the main memory selected by the S register. Information can be read to and from the Z register from the transfer link 934.

The circuit of FIG. 103 is much the same as that of FIG. 102, although in more detail. The S register 935 of FIG. 103 is broken down into its 17 bits with the function of each bit being shown, with respect to the accessing of main memory 937. Line drivers 936 are in a position between the S register and the main memory to provide the necessary power. Line drivers 940 are provided between the Z register 939, individual bits of which are shown in FIG. 103, and the main memory storage 937 to provide the necessary driving current, during the write cycle.

To access the MCS requires 5 microseconds. Thus, the MCS may be accessed by the stored program in the TSS at a 200 kilocycle rate. During the 5 microsecond memory cycle, which *must* begin on B cycle transfer to the S register, a given core location is addressed, and information is read from the given core location into the Z register, leaving the said core location cleared, i.e., in a zero state. Then, later during the 5 microsecond cycle, the contents of the Z register are read back into the addressed core location of the MCS. It is to be noted that the contents of the Z register may be modified before the memory write portion of the 5 microsecond cycle, thereby providing the option of leaving the given core information as it was before access, or of storing modified information during an access period.

Both the S and the Z registers are multipurpose registers and can be used in connection with the MCS as outlined generally above, or as general utility registers in which information may be received from, and delivered to, the transfer link directly. In addition to being employed as a storage or utility register, the S register may also be used for display purposes on the front of the control panel.

The use made of the S and Z registers is under control of the particular bits of the control register and also under control of the particular time at which the registers are employed, as will be made clear from the following discussion.

The S register can receive data from the transfer link on the A, B, or C cycle transfers with octal address 06. Bit positions 01-15 of the 17 bits of S are controlled by bits 01-15 of the transfer link. The 16th bit of the transfer link is under control of and commutated by bit C-02 of the control register to control the data entries into bits S-00 and S-16 of the S register. More specifically, when C-02=1, the 16th bit of the transfer link controls S-00 and when C-02=0, the 16th bit of the transfer link controls S-16.

At this point a brief discussion of the make-up of the MCS is desirable in order to understand the various controls exercised on the S register and, subsequently, on the Z register.

The main memory is composed of a variable number of basic core stacks of word locations, with each stack containing 4,096 word locations; each word being 16 bits in length. A memory system may have any number of stacks from 1 to 16 with a maximum capacity of 65,536 words of storage, which maximum capacity is determined by the 16 bit length. The maximum capacity cannot exceed $2^n$ where $n$=number of bits in a word location. Four stacks comprise a rack and two racks comprise a bank. Thus each bank has eight stacks of word locations therein for a total of 32,768 word locations. In the particular system described in this invention, two banks of memories are employed, having a total of 65,536 words.

The first 16 bits of the S register control the MCS address. When $S$–00=0, the upper bank of 32,768 word locations is selected and when $S$–00=0 the lower bank of 32,768 word locations is selected. Bit 16 of the S register controls the character selection, i.e., the right or left half of the Z register transfers when octal address 12 is selected as a source or a destination. See FIG. 104, which will be discussed later.

FIG. 103 shows in some detail the function of each of the bits of the S register in selecting a word location of the main memory. For example, bit S–00, as discussed above, selects the bank. In essence, this amounts to a selection of two of the four racks, each bank consisting of two racks. Bit S–01 selects the particular rack of the two racks in the selected bank of two racks. Bits S–02 and S–03 select the particular stack of the four stacks in each rack. Bits 04–15 of the S register select one of the 4,096 word locations in the selected stack. The following charts show the functional assignments of various combinations of the S register bits.

MAIN MEMORY ACCESS CONTROL

| S Register Bits: | Functional Assignments |
|---|---|
| S–00, S–01 | MCS Rack Selection. |
| S–02, S–03 | MCS Stack Selection. |
| S–04, S–05, S–06, S–07 | MCS Y-Axis Line Selectors. |
| S–08, S–09 | MCS Y-Axis Read/Write Drivers. |
| S–10, S–11, S–12, S–13 | MCS X-Axis Line Selectors. |
| S–14, S–15 | MCS X-Axis Read/Write Drivers. |

The 4,096 word locations in a given stack are arranged in what might be called a three dimensional rectangular coordinate system. The bits 4, 5, 6, and 7 of the S register function to divide the 4,096 locations into 16 groups of locations, each group having 256 locations therein. These groups are defined as lying along the Y-axis coordinate and each group has associated therewith a Y-axis line selector. Bits 08 and 09 of the S register function to separate the 256 word locations into four separate groups of 64 word locations. Bits 10, 11, 12 and 13 function to divide the 64 word locations into 16 groups each of four word locations, and S–14 and S–15 determine which of the selected four word locations is to be accessed.

Bit 16 of the S register is employed for character control of transfers to and from the Z register when octal address 12 is selected as a source or a destination. When $S$–16=0, the left half of the Z register, i.e., bits 00–08 of the Z register, are enabled to or from the transfer link bit positions 09–16. When $S$–16=1, the right character, i.e., bits 09–16 of the Z register, are enabled to or from bits 09–16 of the transfer link. Reference is made to FIG. 104 which shows in block diagram form the effect of the bit 16 of the S register on the left and right characters of the Z register. For example, block 942 shows that when the transfer link (T.L.) bits 09–16 are supplied to the Z register through octal address 12 with $S$–16=0, such bits will enter bits 01–08 of the Z register. Similarly, bits 01–08 of the Z register are supplied to bits 09–16 of the transfer link when $S$–16=0, again with the octal address 12 as the destination address, as shown in block 943.

When $S$–16=1, with octal address 12, transfer link bits 09–16 will be supplied to the right character, that is bits 09–16 of the Z register, and if the destination address is also octal 12, the bits 09–16 of the Z register will appear in bits 09–16 of the transfer link, as indicated in block 945.

It has now been established that bit 00 of the S register controls the bank of the MCS to be accessed and that bit 16 of the S register controls the right and left character of the Z register. Both bits 00 and 16 of the S register are, in turn, controlled by the 16th bit of the transfer link through octal address 06 by fixed wire. In turn, the 16th bit of the transfer link of octal address 06 is controlled by bit 02 of the control register. More specifically, when $C$–02=1 the 16th bit of the transfer link controls $S$–00, and when $C$–02=0 the 16th bit of the transfer link controls $S$–16. Thus, a transfer to the S register will effect only 16 of the 17 bit positions. By changing the control bit $C$–02 and utilizing the clear inhibit function, two data transfers to the S register will operate to control all 17 bit positions. However, all 17 bit positions cannot be changed with a single transfer to the S register.

$S$–16 may be changed from a logic ZERO to a logic ONE during a memory cycle by utilizing the B cycle clear inhibit feature in such a manner that bits 01–15 remain unchanged. It is to be noted that bits 00–15 must not be altered during a five microsecond memory cycle. Reference is made to the chart of FIG. 105 which shows the various modes of operation with the main memory under different settings of S–00, S–16, and C–02. In summary, the modes of operation of access to the main memory by means of the S register are as follows:

(1) When $C$–02 is a logic ONE, $S$–00 may be altered with any transfer to the S register. Therefore, when octal address 10 is utilized to select the MS contents read into Z register during a memory cycle, any one of a possible 65,536 words may be obtained by the transfer link. This condition is referred to as the Word Mode with full access to 65,536 word locations.

(2) If $C$–02 is a logic ZERO, however, $S$–00 will not be altered with transfer to the S register. Therefore, the information available at the Z register, after a memory cycle, is restricted by the setting of $S$–00 before the memory cycle was initiated. Such a situation is referred to as a Word Mode for either the upper 32,768 word locations ($S$–00=1), or for the lower 32,768 word locations ($S$–00=0).

(3) Character modes for all 65,536 word locations of memory are obtained when octal address 12 is employed to read the MCS information from the Z register, if $C$–02=1 during the B cycle transfer to S. The right half of all the words of memory are available to bits 09–16 of the transfer link in this mode of operation is $S$–16=1. The left half of all words of memory are available to bits 09–16 of the transfer link if $S$–16=0.

(4) Character modes for the upper or lower 32,768 words of memory are obtained when octal address 12 is utilized to read the MCS information from the Z register. If $C$–02=0 during the B cycle transfer to S, the right half of all the words in the upper or lower 32,768 words of memory are available to bits 09–16 of the transfer link ($S$–16=1) depending upon the state of $S$–00 before the memory cycle was initiated. Also, the left half of all the words in the upper or lower 32,768 words of memory are available to bits 09–16 of the transfer link when $S$–16=0, depending on the state of $S$–00 before the memory cycle was initiated.

The theorem of reciprocity holds true for transfer from the transfer link of the processor to the main core storage. That is, information may be written in the MCS on the character and word mode basis as described above and as shown in FIG. 105. For block diagrams showing the implementation of the control bit implementation of the S register reference is made to FIG. 106 wherein block 950 shows the implementation of bit S–00, block 957 shows the implementation of bit S–16, and the blocks 952 and 953 show the implementation bits S–01 through S–15.

The logic of the implementation of the 16th bit of the transfer link is shown by the following expressions.

Set: $S$–$00 = MOC$–$16 \cdot S$–$SD06 \cdot C$–$02$
Reset: $S$–$00 = S$–$CD06 \cdot C$–$02$ Whereas, Set: $S$–$16 = MOD$–$16 \cdot S$–$SD06 \cdot C$–$02N$
Reset: $S$–$16 = S$–$CD06 \cdot C$–$02N$ Thus, when $C-02=1$ the transfer link controls S–00, and when $C-02=0$, the transfer link controls S–16.

Data transferred to the S register in the A, B, or C cycle will be stored and displayed on the control panel until the S register is cleared by the second stage clear decoders (S–CD06) of FIG. 106 on the following transfer. Bit C–02 also controls the reset inputs to S–00 and S–16, as well as the set inputs; thus, a transfer to the S register will effect only 16 of the 17 data bit positions.

Data transfers to the S register on the B cycle will initiate the five microsecond memory cycle since one output from the second state set decoder (S–SD06) is ANDED into the 200 kilocycle counter (see FIG. 39) with the B cycle timing pulse TP–5. Reference is made to the timing diagram of FIG. 107 wherein the output from the set decoder is represented by the waveform marked "SETS" which, as can be seen, coincides with the TP–5 timing pulse of period ONE to initiate the main memory access enabling circuit (MMAE).

The logic equation for initiation of the signal 5USA of FIG. 107 is shown below:

Primary set for $5USA = STCPN \cdot S-SD06 \cdot TP-5$

Thus, the set input for 5USA is a logic ONE for a B cycle transfer to the S register when the manually controlled "not stop 200 kc. counter pulse" (STCPN) is a logic ONE. The primary set input activates the 200 kilocycle counter from its quiescent state for 4.66 microseconds as shown in the timing curve labeled MMAE of FIG. 107. Reference is made to the section herein entitled "CONTROL UNIT C."

The enable circuit that prevents MCS address selection, unless a main memory cycle is in progress, is shown in block 955 of FIG. 108, and has the following set and reset inputs.

Set: $MMAE = 5USA$
Reset: $MMAE = 5USBN \cdot 5USDN \cdot TP-3$

Thus, the main memory enable flip-flop is set as the five microsecond memory cycle begins and is reset after the cycle has been completed, thereby enabling line selector operation during the five microsecond period.

Consequently, in the timing diagram of FIG. 107 the main memory access enable circuit 955 of FIG. 108 is set at time TP–5 period ONE in response to the setting of waveform 5USA at the same time. During the 4.66 microsecond time interval read-out from and write-in to, from the main memory must occur. Readout must occur during the time interval TP–4 of period 2 to TP–4 of period 3 as indicated by the waveform "READ." During the time during TP–6 of period 2, the Z register is cleared as indicated by waveform "Z CLEAR." Immediately following and during time period TP–1 of period 2, the Z register is still permitting the information contained in the accessed word location of the MCS to be entered into the Z register. Later, beginning at TP–4 in period 4 and ending at the beginning of TP–2 of period 6 write-in of the MCS occurs from the Z register as shown in the curve "Z REGISTER." It will be observed that except for the read-out and write-in periods, the Z register can be employed as a utility register.

At TP–3 of period 6, the main memory access enable circuitry 955 of FIG. 108 is reset, as shown in the curve MMAE of FIG. 107. At this time the conditions of reset of MMAE are met. That is, the waveforms 5USBN, 5USDN, and TP–3 coincide.

Figure 109A:
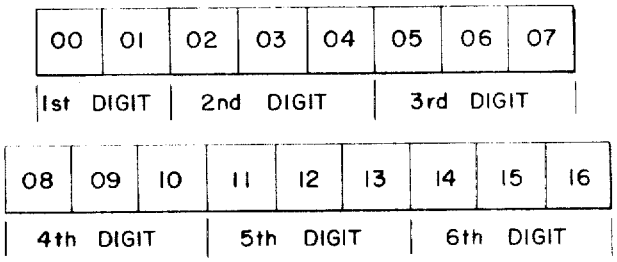
Figure 109B:
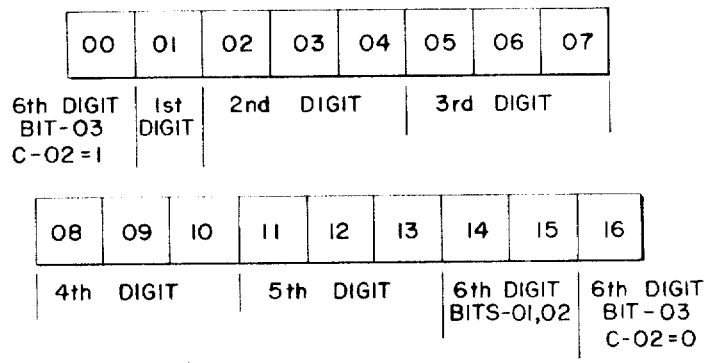

The curves 5USB, 5USC, 5USD, read, inhibit, write, Z clear, and Z strobe are all derived from the same timing circuit which generates the waveform 5USA. See FIG. 39 for the timing signal generating circuit. As indicated hereinbefore, the S register has an indicator bank which displays the contents of the 17 bit positions, and which is shown in FIGS. 109a and 109b. If the number in the S register is an MCS location, the octal groupings are shown in FIG. 109a. The MCS address read in this manner is twice the actual MCS location because bit S–16 is the character selection control bit and not a part of the word address. If the number in the S register has been transferred therein for display, the state of C–02 must be known. If $C-02=0$, the number is displayed in S–01 through S–16, and may be read as shown in FIG. 109b. However, if $C-02=1$, the number is displayed in S–01 through S–15, and the bit S–00 as shown in FIG. 109b.

As indicated hereinbefore, the Z register is a multiple input storage register whose prime functions are (1) data transfers to and from the transfer link, and (2) data exchange between the main core storage and the switching frame of the data processor.

The full 16 parallel data bits of the Z register flow to and from the transfer link under control of octal address 10. When using octal address 12, however, either as a source or destination, the left character of the Z register, i.e., bits 01–08, is enabled to and from the bits 09–16 of the transfer link when $S-16=0$, and the second character of the Z register, i.e., bits 09–16, is enabled to or from bit positions 09–16 of the transfer link when $S-16=1$. Reference is again made to FIGS. 102, 103, and 104 which show the function of the Z register, already described at some length in connection with the operation of the S register.

Data may be transferred to the Z register from the transfer link on any cycle with the exception of the read and write portions of the five microsecond memory cycle, as discussed in connection with the timing diagram of FIG. 107. Data may be transferred from the Z register to the transfer link on any cycle with the exception of the read portion of the five microsecond of memory cycle. It is to be noted that the Z register functions as a main memory input/output buffer only during the five microsecond memory cycle. Such memory cycle is initiated by a B cycle transfer to the S register with the data exchange between MCS and the Z register occurring as dictated by the MCS address held in the S register. The control of the S register over such transfers has been discussed above.

Once the main memory cycle has been initiated, the Z register may be employed as a utility register until the read period begins at the time 2C of FIG. 107. The MCS read occurs during time 2C with the core contents available in the Z register at time 3A. The Z register may be utilized as a source for the remainder of the memory cycle. Further, the Z register may be entered from the transfer link between the read and the write portions of the memory cycle, thereby allowing data modifications in MCS, that is, the contents of Z may be changed at times 3A, 3B, 3C, or 4A prior to the writing of the contents of Z into MCS. During the write portion of the cycle which occurs from time TP–6 of period 5 to TP–2 of period 6, the Z register must not be changed.

As the memory cycle begins, the X and Y axis line selectors, as shown in FIG. 108, are enabled, thereby selecting the desired core locations. The READ, INHIBIT and WRITE pulses, as shown in the timing diagram of FIG. 107 are generated in the control register Z and transmitted to control logis to provide automatic read and write operations once the memory cycle has been initiated.

Register Z is cleared by the output of the clearing circuit 962 of FIG. 110, which feeds into a typical bit 961 of the Z register. The clearing of the Z register occurs on a TP–6 time during the second period shown in FIG. 115. Up to the time of clearing, the Z register acts as a utility function register.

Referring now more specifically to the circuit of FIG. 110, there is shown a block diagram of the implementation of a typical bit of the Z register. The discussion of the diagram of FIG. 110 will be conducted with the aid of the timing diagram of FIG. 107. In FIG. 107 the accessing of the main memory does not automatically reoccur every five microseconds, but reoccurs only each time it is desired to access the main memory. For this reason, the last period is designated not only as the 6th period, but also period 1, in the event that the main memory is to be accessed immediately again.

At time TP–1 in the 5th period the block 963 of FIG. 110, designated as the main memory readin (MMRI) is reset since the conditions for reset are met. The output of the reset half of block 963 is supplied to the Z control block 964 through AND gate 965 to which is also supplied signals 5USA and 5USB. Thus, at the time TP–2 in period 2 of FIG. 107, the Z control circuit 964 (ZCONT) produces an output to the blocks 960 and 962 which are, respectively, the main memory read block and the Z clear circuit. With the occurence of pulse EI–1 and a CLE pulse, the READ pulse of FIG. 107 is generated. At the occurrence of the CP–6 pulse applied to clearing circuit 962, the Z register bit 961 (bit Z–01) is cleared. Strobing of the Z register bit 01 then occurs and the information contained in the corresponding bit locations of the main memory is read into the Z register via lead 966 and labeled mnemonically MMZ–01. Thus, at the beginning of time 3A of FIG. 107, the information from the main memory has been read into the Z register which may now be used as a source until the next transfer therein from a transfer link or at time 2B of the next memory cycle, whichever occurs first.

Data may be transferred to or from the Z register, by the transfer link during times 3A, 3B, 3C, or 4A of FIG. 107. The contents of the Z register at the end of time 4A will automatically be written into the memory core selected by the contents of the S register. The contents of the Z register must not be changed between times beginning at time 4B and ending at the end of time 5C because of the automatic write process.

As indicated above, transfers to the S register at time TP–5 in the 6th period will initiate new memory cycles, thereby repeating the above process at a maximum rate of 200 kc. The logic equations for clearing the Z registers during a five microsecond memory cycle are as follows:

$$ZCLRN = CP–6 + ZCONT$$

where $$ZCONTN = MMRIN \cdot 5USA \cdot 5USB$$

so $$ZCLR = MMRIN \cdot 5USA \cdot 5USB \cdot TP–6$$

When used as a utility register, the full 16 bits of the Z register are employed with octal address 10. However, the utility function associated with octal address 12 has a character control through bit 16 of the S register, as discussed in detail above. The Z register is cleared by the second stage clear decoders (Z–CD10) when octal address 10 is used as a destination address (see FIG. 110). Sixteen bits are then set by the 16 respective transfer link bit positions ANDED with the second stage set decoders (Z–SD10).

When octal address 12 is selected as a destination, the right and left character feature of the C register is employed.

As discussed above in connection with the S register, bit 16 of said S register fans out and is an input to the left character set and clear decoders and S–16N is an input to the right character set and clear decoders. The control bit C–02 selects the left character when $S–16=0$, and the right character when $S–16=1$, with octal address 12 as the destination. Reference is made to FIG. 104, and also FIG. 110 which shows the clearing and setting for a typical bit in the left character.

V. CONTROL UNIT C

The CONTROL UNIT C includes the C control register shown in FIG. 12 as block 156, manual controls for the control register, free-running one- and three-megacycle timing systems, plus special timing systems of 200 kilocycles and 5.34 kilocycles.

Much of the control unit has already been described in connection with other registers. For example, in the discussion of the D registers, the R registers, the A registers, the S and Z registers, and the E registers, considerable discussion has been set forth regarding the control thereof by various bits of the control register. Similarly, under the section entitled "GENERATION OF TIMING SIGNALS," the circuits for generating the basic three- and one-megacycle timing circuits and also the 200 kilocycle and 5.34 kilocycle signals have been set forth in considerable detail. The piecemeal discussion of the control circuit up to this point has been necessitated by the nature of its function. An intelligent and reasonably complete discussion of the various registers would have been impossible without discussing the effect of the bits of the control register thereon. On the other hand, if a comprehensive discussion of the control register had been undertaken prior to a discussion of the other registers in the processor, such discussion would have been almost unintelligible.

Consequently, in view of the fact that so much of the C register has already been discussed, the present discussion will not be complete within itself, but will refer frequently to discussions of the other registers to avoid unnecessary repetition of the discussion of the control unit.

The timing associated with the control register is representative of all the timing circuits in the processor, some of such circuits being distributed in various parts of the processor and other of such circuits being localized. Specifically, the basic three-megacycle timing and the derivatives of the one-megacycle timing are distributed throughout the processor, whereas the one-megacycle counter and the main timing chain of FIGS. 30 and 31 are located within the control register. Also, the 200 kilocycle counter and the 5.34 kilocycle timing circuit are located within the C register.

The control unit has two main types of control systems associated with the data flow. They are as follows:

(1) Program control circuits
(2) Manual control circuits

The 27 bit positions of the C register are employed for the program controlled functions. An array of switches provide manual control of the processor during initialization and maintenance periods. For a detailed description of the various timing circuits, including the one- and three-megacycle timing circuits, the main timing chain with the 200 kilocycle counter and the 5.34 kilocycle timing circuit, reference is made to the section entitled "GENERATION OF TIMING SIGNALS."

As mentioned above, the functions of the various 27 bits of the C register, have been discussed hereinbefore in connection with the discussion of various other registers of the data processor. In the following several paragraphs there is listed all of the 27 bits of the control register with a brief discussion of the function of each, and with references to other sections herein for a more detailed description of these functions.

Bit position C–01 is controlled by bit 04 of the transfer link on A cycle transfers. Octal address 14 is utilized for the set input and octal address 16 is utilized for the reset input. At the present, bit position C–01 is employed for effecting a decimal add function.

Control bit C–02 is utilized to commutate the transfer link on data transfers to the S register with octal address 06 as a destination. Bit positions 01–15 of S register are controlled by bits 01–15 of the transfer link, whereas the 16th bit of the transfer link is commutated by C–02 to control data entries into S–00 and S–16. When $C–02=1$, the 16th bit of the transfer link controls S–00, and when $C–02=0$, the 16th bit controls S–16.

Bit position C–02 is controlled by bit 03 of the transfer bit on A cycle transfers. Octal address 14 is utilized for the set input and octal address 16 is utilized for the reset input. The contents of bit position C–02 will be sampled by bit 04 of the transfer link when octal address 14 is selected as a source. For a detailed discussion of the operation of bit C–02 reference is made to the section entitled "S and Z REGISTERS."

Bit position C–03 functions to initiate the D3 register to U register fixed wire transfer. C–03 can be set on B cycle only, because octal address 14 (C–SD14) and transfer link bit 03 are gated by a TP–5 (B cycle timing signal). C–03 is automatically reset on the following B cycle in the RUN mode (by a TP–4), or the first B cycle of a following STEP operation. The D3 to U operation transfers D3 (07) to U (01) and D3 (08–16) to both U1 and U2 (02–10).

The aforementioned D3-U transfer occurs on the A cycle (TP–3) following the setting of C–03. If the address of a TSS word is set into D3 (either manually, or under program control), the transfers designated by this word are executed on the second TSS period following the setting of C–03. Refer to the section herein entitled "D REGISTERS" for a detailed discussion of the D3-U fixed wire transfer.

Bit position C–04 controls the Teletype shift function. Such rotate function is performed by first entering R1 register with the data to be rotated and then setting C–04 on a B cycle. The control bit C–04 can be set only on a B cycle, and by using transfer link bit 03 of octal address 16. The actual fixed wire transfer occurs on the following C cycle, with the data available in R2 register on the following A cycle. R2 register will be in a transient condition on C cycle; thus, R2 should not be selected as a source if valid information is required.

The R1 and R2 registers function conjunctively as the rotate unit with R1 register bits 02–11 transferred to R2 register bits 07–16, under control of C–04. R2 register bits 01–06 remain unchanged during this rotate operation (TTYR). The data in R1 register remains unchanged during this rotate, but the R2 register bits 07–16 are automatically cleared and the rotated 5 right data is inserted into these cleared bit positions by fixed wires from R1. For additional description relating to bit C–04 reference is made to the sections herein entitled "R REGISTERS" and "INPUT/OUTPUT REGISTERS."

Bit positions C–05 through C–12 function as the eight program indicators. They are designated: Indicators K, L, M, N, O, P, Q, and R, respectively. Such indicator bits are set on octal address 14 and cleared on octal address 16 by their respective transfer link bit positions. They may be selected as sources for their respective transfer link bit positions with octal address 14. The indicator bit positions are individually utilized to store information at the programmer's discretion.

Bit positions C–13 (CHLI) and C–14 (CHRI) are used to inhibit transfers to either the left of the right half of registers D1, D2, D3, D4, R1, and R2. The complement input to R1 register and the fixed wire inputs to the above registers are not affected by C–13 and C–14. The transfer link bit positions thus controlled are as follows:

CHARACTER INHIBIT FUNCTION

| C–13 | C–14 | Function |
|---|---|---|
| 0 | 0 | Enables transfer link 01–16 to entire register. |
| 0 | 1 | CHRI inhibits transfer link bits 09–16 to register bits 09–16. |
| 1 | 0 | CHLI inhibits transfer link bits 01–08 to register bits 01–08. |
| 1 | 1 | Inhibits all transfers from the transfer link to the registers controlled by C–13 and C–14. |

Bits C–13 and C–14 also control the conditional jump logic associated with octal address 37. This conditional jump implementation consists of a L–1 to U$_m$ (octal address 37 to octal address 04), A cycle transfer. The source L–1 has three distinct zero test states for A1 register, and a fourth state that is completely independent of the contents of A1 register. These four states are controlled by C–13 and C–14 as follows:

L–1 CONDITIONAL JUMP FUNCTION

| C–13 | C–14 | A1 Register Zero Test | L–1 |
|---|---|---|---|
| 0 | 0 | A1 bits 01–16=0 | 1 |
| 0 | 1 | A1 bits 01–08=0 | 1 |
| 1 | 0 | A1 bits 09–16=0 | 1 |
| 1 | 1 | Independent of A1 | 1 |

Bits C–13 and C–14 are controlled by transfer link bits 13 and 14, respectively. The selection of octal address 14 clears both bit positions through clear decoder C–CD14. A logic ONE is then required from the transfer link along with set decoder C–SD14, to set either C–13 or C–14.

If C–13 and C–14 are both in the logic ONE state, L–1 may be selected to provide a logic ONE on the 17th bit of the transfer link whether an arithmetic process is in progress or not. If an A1 register zero test is to be made, it must not be done when C–13 and C–14 are both logic ONES, or when an arithmetic process is in progress.

Bit positions C–15, C–16, and C–17 control the rotate left functions. R1 and R2 registers function conjunctively as a rotate unit with three distinct rotate left operations. These are (1) rotate one left, RO1L; (2) rotate four left, RO4L; and (3) rotate eight left, RO8L. Such rotate operations are controlled by C–16, C–17, and C–15, respectively, as shown in FIG. 86.

Rotate functions are performed by first entering R1 register with the data to be rotated, and then by setting the respective control bit in C register. Such control bits may be set on any cycle with the actual transfer occurring on the following cycle. Due to transients, the rotated data in R2 register is *not* available until the second cycle following the setting of the control bit.

C–15 and C–16 are set by transfer link bits 15 and 16, respectively, when octal address 14 is selected as a destination. C–17 is set by transfer link bit position 13 when octal address 16 is selected as a destination. These control bits are automatically reset by the rotate logic during the cycle following the transfer which sets the control bits.

It is possible to set both C–15 and C–16 on the same transfer, or it is possible to set both C–04 and C–17 on a B cycle transfer, thereby resulting in combined logic functions. These rotate functions are not additive; i.e., R8L and RO1L do *not* result in a rotate 9 left. For a more detailed discussion of the effect of bits C–15, C–16, and C–17, reference is made to the section herein entitled "R REGISTERS."

Bit position C–18 controls the D3 to V transfer which occurs on B cycle (TP–4). This is a program controlled transfer to the C cycle transfer code position of the V register. The bit positions involved are D3 (07–16) to V (21–30).

The transfer is initiated by setting C–18 on either the C or the following A transfer cycle, with the actual transfer occurring on the following B cycle. There is no design feature to prevent setting C–18 on a B cycle, and caution must be exercised to prevent programmed setting on B cycle because C–18 is automatically reset on the first portion of C cycle (TP–6). Therefore, C–18 would be reset before reaching the transfer time.

If C–18 is set during a C or the following A cycle, the transfer operation designated by the new V register transfer code will be executed during the next C cycle. When C–18 is set on C cycle in the STEP mode, a second initiate will be required to complete the transfer.

Because the D3 to V transfer occurs on B cycle, the address 00 (which is the 16 bit constant in the V register) cannot be designated as a source on the B cycle of a TSS period in which the D3 to V transfer is to be executed. For additional discussion of the operation of bit C–18.

reference is made to the section herein entitled "D REGISTERS."

Bit position C–19 controls the T register to D1, D2, and R2 fixed wire transfers which occur on an A cycle. On the T to D1, D2, and R2 operation bit C–19 must be set by bit 04 of the transfer link with octal address 14 selected as a B cycle destination. The transfer link is inhibited for one microsecond on this operation, starting with the next A cycle. Data transferred to the D1, D2, and R2 registers on this A cycle consist of the TSS word following the one that contains the C–19 B cycle transfer. The transfers to the destination registers are as follows:

(a) T (01–12) to R2 (03–08) (11–16)
(b) T (13–24) to D2 (03–08) (11–16)
(c) T (25–36) to D1 (03–08) (11–16)

The TSS instruction word read into T register during the one microsecond transfer inhibit period will control data transfers on the following TSS period. The TSS word transferred to D1, D2, and R2 will *not* be utilized as an instruction word.

The T to D1, D2, and R2 transfer operation is used in the TSS verify program, which program also employs a D3 to U transfer to control the next TSS instruction rather than utilizing the normal TSS address sequencing feature of the U register. For additional information regarding bit C–19, reference is made to the section here entitled "D REGISTERS."

Bit C–20 is set by the 5.34 kilocycle oscillator circuitry at 187 microsecond intervals. Transfer link bit 16 provides the reset input on octal address 16. The bit C–20 is available as a source to bit 17 of the transfer link with octal address 14. C–20 will be a constant ONE unless it is periodically reset under program control. When C–20 is periodically reset it will provide a logic ZERO to a logic ONE transition once every 187 microseconds. See FIG. 40 and the sections entitled "GENERATION OF TIMING SIGNALS" and "INPUT/OUTPUT REGISTERS" for additional information re bit C–20.

Bit position C–21 is employed to hold the result of the parity check. D1 utility register has the special capability of performing an even parity check. Information entering the computer from peripheral equipment may be parity checked on a character basis by transferring the information into bit positions 09–16 of register D1. The result of the parity checked is stored in bit C–21.

When data is transferred to D1, C–21 is normalized (set to ONE) by clear decoder D1CD02. The parity check circuitry will check D1 (09–16) and reset C–21 when even parity fails; i.e., for odd parity conditions. Since the parity check circuit contains three levels of logic, the data in C–21 will not be valid until the second cycle following the D1 register destination command.

If valid parity indications are required, the transfer to D1 (09–16) must not be clear inhibited, i.e., V–31 must be a logic ZERO on B cycle transfers and V–32 must be a logic ZERO on C cycle transfers. C–21 is available as a source to bit 02 of the transfer link with octal address 14, and it is available to bit 17 of the transfer link with octal address 06. Reference is made to the section entitled "D REGISTERS" for additional discussion of bit C–21.

Bit position C–22 is employed to indicate an overflow condition in the addition unit. The overflow indicator will be set during an arithmetic addition when the following conditions are met:

Set $C{-}22 = A2{-}01N \cdot A3{-}01N \cdot CA{-}01 \cdot T2$
$+ A2{-}01 \cdot A3{-}01 \cdot ICA01N \cdot T2$ Thus, when bit 01 of both the addend (A2) and the augend (A3) are logic ZEROES and a CARRY into bit 01 exists during a full add, the overflow indicator will be set. This indicator will also be set when bit 01 of both A2 and A3 are logic ONES and no CARRY exists during a full add operation. Whenever the overflow condition occurs, the result in the accumulator (A1) is not a correct indication of the arithmetic sum.

The overflow indicator becomes valid at the same time as the contents of A1 become valid; i.e., on the second cycle after the data transfer to A3 during the arithmetic condition. C–22 is available as a source to bit 03 of the transfer link with octal address 14.

It should be noted that a transfer to A3 may set C–22 even though the purpose of this transfer may not be to perform a full add operation. This setting could occur if the prior entry to the arithmetic unit was into A2 register. An A3 entry following an A2 entry will initiate the full add operation, even though the A2 entry was part of a previous operation. An A2 entry following the A3 entry will initiate a Modulo–2 addition which nullifies the intermediate sum. Thus, the accumulator (A1) will contain the correct Modulo–2 sum even though the overflow indicator may be erroneously set to a logic ONE.

In order to assure proper overflow indication, C–22 must be in the logic ZERO state prior to a transfer to A3 which initiates a full add operation. C–22 can be reset by bit 14 of the transfer link with octal address 16 selected as a destination. For a detailed description of the effect of bit C–22, reference is made to the section entitled "A REGISTERS."

Bit position C–23 is controlled by transfer link bit 03. It may be set with octal address 14 or reset with octal address 16 on C cycle only. C–23 is available as a source to bit 01 of the transfer link with octal address 14.

The control bit C–23 commutates the dual input/output (I/O) registers (P5 through P12). When $C{-}23 = 1$, I/O registers P12A are enabled for data transfers to and from the transfer link. When $C{-}23 = 0$, I/O registers P5B through P12B are enabled for data transfers to and from the transfer link. Data transfers involving an I/O register, which is commutated by C–23 must not be made on the cycle immediately following a cycle which changes C–23. See the section entitled "INPUT/OUTPUT REGISTERS" for additional information re bit C–23.

Bit positions C–24 and C–25 control the AC Data Bus operation. Since octal address 31 is associated with both the AC Data Bus and E1 register, C–24 and C–25 play important roles. The four possible combinations of C–24 and C–25 control bits, and the resultant effects are listed below. (Also see FIG. 99.)

With $C{-}24 = 0$ and $C{-}25 = 0$, E1 register functions as a utility register. The data in E1 will not appear on the AC Data Bus and the data on the bus will not apepar at the transfer link matrix input.

With $C{-}24 = 0$ and $C{-}25 = 1$, the contents of E1 register appears on the AC Data Bus. The data in register E1 appears continuously on the data bus until C–25 is reset or the register E1 is cleared. The E1 register contents are also available at the transfer link input matrix, but the AC Data Bus information is not available.

$C{-}24 = 1$ and $C{-}25 = 0$ gates the demodulated AC Data Bus information to the transfer link. The register E1 may be used for utility data storage, but its contents are not gated to the AC bus, and they are not available at the transfer link until C–24 is reset.

$C{-}24 = 1$ and $C{-}25 = 1$ gates the register contents to the AC bus while the information on the AC Data Bus is demodulated and gated as DC levels to the transfer link. The data in E1 register appears continuously on the data bus until C–25 is reset. The register contents, however, are not available at the transfer link directly. E1 data does appear on the AC bus and will be sampled whenever octal address 31 is selected as a source. For a more detailed discussion of the effect of bits C–24 and C–25, reference is made to the section herein entitled "E REGISTERS."

Bit position C–26 controls the TSS loading and the E2 register functions. Register E2 utilizes source and destination address 27 under C–26 control. When C–26=0 the E2 register serves as a utility register and the TSS load equipment will not take action on the contents of E2. During TSS load operation, C–26=1 and register E2 functions as the input interface between the processor and the TSS load equipment. During this mode of operation only 15 bit positions of E2 will be available for transmission of data to the load equipment, since E2–01 functions as the E/I (External/Internal) control bit.

Bit E2–01 may be set to either a logic ONE or ZERO by program control through the transfer link. If C–26 is set, E2–01=1 enables the TSS load equipment for sampling purposes. Specific combinations of data in the remaining positions of E2 registers are required before the TSS load equipment will actually load new information in TSS storage. Refer to section entitled "E REGISTERS" for discussion of such specific combinations. When C–26 is set and E2–01=0, the TSS load equipment is ready for additional information. When the contents of E2 are loaded into the TSS loader, the loader automatically resets E2–01.

The contents of E2 register may be sampled by the transfer link while C–26 is set and the equipment is in the TSS load mode; thus, E2–01 may be tested to control the incoming data to E2 register. E2–01 is subject to change, however, since an automatic reset is provided from the TSS load equipment. For a detailed discussion of the operation of bit C–26, reference is made to the section entitled "E REGISTERS."

Bit position C–27 is controlled by transfer link bit 04. It may be set with octal address 14 or reset with octal address 16 on C cycle only. At present, C–27 has unused outputs.

In FIG. 111 there is shown a tabulated form of the implementation for the C register, including the set inputs and the reset inputs. Such tabulation will show the precise timing for the operation of each of the C registers, both for set and reset functions.

Through fixed wiring in the basic Control Unit C, certain manual controls may be effected by switches located on the operator's control panel. Referring to FIG. 29, there is shown a layout of the control panel. The master clear or general clear switch 1000 allows a manual clear of the following:

(1) 36 bits of the T register
(2) The U1 register (excluding bit 01)
(3) The U2 register
(4) The U counter
(5) The main memory read inhibit flip-flop
(6) The TSS loader CLR1 (clear ONE) flip-flop
(7) TSS loader CLR0 (clear ZERO) flip-flop
(8) TSS loader Partial data word C
(9) TSS loader Sync chain, and
(10) TSS loader Read/Write flip-flop, which is changed to the Read State The master clear switch is effected only in the STEP mode.

The STEP mode is obtained by the RUN/STEP switch 1001 shown in FIG. 29. The RUN/STEP switch known mnemonically as the SPDT switch, determines whether the processor will run continuously when started (RUN mode), or whether it will accomplish transfers for one microsecond; that is, three sub-cycles, and idle thereafter (STEP mode).

When in the STEP mode the following are inhibited until the INITIATE button 1002 is depressed:
(1) All transfers through the transfer link.
(2) The TSS read command.
(3) The TSS controlled clearing of the T register, and
(4) The resetting of C–03, C–18, and C–19.

When the initiate button 1002 is depressed during the STEP mode, the A, B, and C cycle transfers are made in accordance with the transfer codes contained in the T register. Operation is stopped after the three data transfers (IDLE mode), i.e., after one microsecond when the processor begins to idle. The idle mode is defined as that part of the STEP mode which follows the one microsecond data transfer period.

When the switch 1001 is in the RUN position, operation is continuous after the initial depression of the INITIATE switch. Transfers will continue until the machine is stopped by the RUN/STEP switch being placed in the STEP position or by the U stop circuitry. If the RUN/STEP switch 1001 is placed in the STEP position during a main memory cycle, the cycle is completed. The INITIATE switch 1002 initiates data transfers in either the RUN or STEP mode.

When the INITIATE button is depressed in the RUN mode, transfers will be initiated and the processor will function by continuing data transfers until it is switched to STEP mode or a U STOP condition arises.

The TSS READ switch 1003 of FIG. 29 is utilized to inhibit instruction word transfers from the TSS into T register. When the switch is in the TSS READ INHIBIT position, T register will not be cleared and new data will not be received from the TSS.

This TSS READ switch functions in either the RUN or STEP mode. If the TSS READ switch is in the READ INHIBIT position in RUN mode, however, the sequence of data transfers dictated by the T register will be made repetitively. This condition is known as the SCOPE mode, and is utilized for maintenance purposes.

In the STEP mode with TSS READ INHIBIT, the transfers dictated by the contents of T register will occur during the first microsecond period following the initiate command. If new transfer codes are not entered into T register via the T register manual switches, the same transfers will be accomplished on following INITIATES.

With the TSS READ switch in the TSS READ position, the first A, B, and C cycle transfers are made utilizing the transfer codes contained in T register at the time INITIATE occurs. All subsequent transfers are controlled by the command words read from the TSS, whether the processor is in the RUN or STEP mode. An indicator is provided to display when the TSS READ switch is in the TSS READ INHIBIT position.

The switches to T control switch 1004 is a pushbutton which allows a data transfer from the manual T register input switches into the T register during STEP mode.

The U stop switch 1005 is utilized to place the processor in the IDLE mode upon reaching a desired TSS address. With the switch 1005 in the U STOP position, logic will analyze the TSS address, the U register contents, and stop the data transfers when the TSS address coincides with the preset data on the D3 manual switches (positions 07–16).

The TSS word, contained in the address corresponding to the U STOP address, will be read into T register, but the transfers associated with this address will not be accomplished until the INITIATE button is depressed. After a programmed stop the computer is returned to either the RUN or STEP mode by setting the RUN/STEP switch before the initiate switch is depressed.

There is no hardware provided to prevent a U STOP from occurring during a main memory cycle. Thus, the operator must select the address, which will be set into the D3 switches, to insure against the interruption of the main memory cycle.

The W to D3 switch 1006 is a pushbutton which controls a fixed wire transfer from the W register (01–15) to the D3 register (01–15). When the pushbutton is depressed, in the STEP mode, the C cycle transfer instructions are transferred into D3 register, as follows:

| Cycle: | Transfer |
| --- | --- |
| C (TP–5) | W (06–10) to D3 (06–10). |
| A (TP–6) | W (01–05) to D3 (01–05). |
| A (TP–6) | W (11–15) to D3 (11–15). |

The processor must be in STEP mode for this manual operation. Because the machine is in the IDLE mode after one microsecond, the C cycle contents of the unprocessed TSS instruction are periodically being transferred to W register. This TSS instruction will be completed after processor Initiation.

The D3 register indicators may be utilized in conjunction with the W to D3 transfer to verify the next C cycle transfer instructions.

The main memory READ INHIBIT controls provide the capability of writing new information into the main core (MCS) manually. The processor may be placed in the main memory READ INHIBIT condition during STEP mode only.

In NORMAL STEP mode operation (main memory READ state), a B cycle data transfer into the S register will initiate a five microsecond memory cycle. Because the processor will be in the IDLE mode before the READ portion of this memory cycle, the contents of Z register *cannot* be changed between the read and write functions. Thus, the contents of the selected core location will not be changed with a memory access.

When the main memory READ INHIBIT feature is utilized, a B cycle data transfer into the S register will initiate a five microsecond memory cycle in STEP mode only. Because the read portion of the memory cycle is inhibited, the contents of Z register, at the end of the one microsecond transfer period of STEP mode, will be written into the selected main core location. Thus, using the READ INHIBIT feature, new words may be written into main core storage (MCS) by manual control. The Z register may be set on the A or the C cycle transfers during the STEP mode transfer period in which the memory cycle is initiated, or it may be set prior to this transfer period.

The main memory READ INHIBIT flip-flop will be set when the upper pushbutton 1007 of FIG. 29 on the main memory READ INHIBIT control, is depressed in the STEP mode. This flip-flop will be automatically reset on late C cycle (TP-1) if a main memory cycle is not selected by the STEP mode transfers following the depression of the INITIATE button 1002. If a memory cycle is selected, however, the main memory read inhibit flip-flop will be reset immediately following the completion of the read portion of the memory cycle. Therefore, the main memory READ INHIBIT button must be depressed before each new word is written into MCS by the manual feature.

The lower pushbutton 1008 (FIG. 29) on the main memory READ INHIBIT control will reset the main memory read inhibit flip-flop; thereby nullifying a depression of the upper pushbutton prior to an INITIATE. Depressing the general clear pushbutton 1000, or placing the processor in the RUN mode, also resets the main memory read inhibit flip-flop.

An indicator is provided to display when the main memory read inhibit flip-flop is set.

VI

A. C–8087 (including AC data bus)

The C–8087 is an optional equipment which, in conjunction with the C–8097 Timing Synchronizer, provides high-speed communication between individual data processors in a complex of several processors, known as a C–8501 complex. The communication is digital in form, with half duplex transmission for 16 parallel bits. The C–8097 timing synchronizer is common to all of the individual data processors identified in this section as a C–8401, and is discussed in detail in the section herein entitled "C–8097 TIMING SYNCHRONIZER." The C–8087 includes an AC Data Bus, a three megacycle synchronization system, and a one megacycle synchronization enable system.

The AC Data Bus allows data sharing, data transfer, or communication in general, between all processors in a C–8501 complex. A block diagram of an eight processor C–8501 is shown in FIG. 112.

The inter-computer data transfer is accomplished under control of bits C–24 and C–25 of the control register of each C–8401 processor. The received data is gated from the AC Data Bus to the matrix input by bit C–24 and gated from the E1 register to the AC bus by bits C–25, as shown in FIG. 113. Octal address 31 can select either the AC bus or the E1 register, depending on the C bit control. Address 31 is both the source and destination address.

A pair of manual switches may be utilized to disenable either the left or right eight bit positions from the AC Data Bus. Reference is made to FIG. 114 wherein there is shown a typical bit input/output configuration for the C–8087 inter-computer data transfer link. Specifically, bit 02 of processor B is shown. Switch No. 1 controls bits 1–8 and a similar switch No. 2 (not shown) controls bits 9–16.

For effective communications, however, the respective processor clock times and operation cycles must be in synchronization.

Since octal address 31 is associated with both the AC data bus and the E1 register, bits C–24 and C–25 of the control register play important roles. The four possible combinations of C–24 and C–25 control bits and the resultant effects are set forth in the section entitled "CONTROL UNIT C." Reference is made to the data flow diagram of FIG. 113 for a better understanding of the four combinations. Data from one processor should be left on the AC bus until it is sampled by all processors programmed to receive the data.

The availability of data at a receiver processor is restricted by the propagation delay associated with the interconnecting coaxial cable. The resultant program restrictions are as follows, and will hold if data is transmitted either by setting C–25 or by entering data into E1 register:

MINIMUM SENSING DELAY

| Transmission Time | Sensing Time | Transmission Length (Feet) |
|---|---|---|
| A1-cycle | C1-cycle | 0 to 134. |
| A1-cycle | A2-cycle | 134 to 327. |
| A1-cycle | B2-cycle | 327 to 520. |

FIG. 115 shows the "Inter-Computer Path Length" versus "Propagation Delay." The fixed delay ($d_o$) is associated with circuitry, while the variable delay ($d_p$=1.73 ns./ft.) is derived from the propagation velocity associated with the coaxial cable.

As indicated above, the C–8087 contains an AC data bus, a 3 mc. synchronization system, and a 1 mc. Synchronization Enable System. The logic of the C–8087 is shown in FIGS. 116, 117, and 118, respectively.

One main function of the AC data bus in the simulation of logic levels with a gated 70 megacycle carrier. A second function of the AC bus is the demodulation of received information into the DC logic levels required at the transfer link matrix input. It performs these functions with the capacity of handling 16 parallel data bit transfers.

Referring now to the typical bit diagram in FIG. 116, the R-F buffer circuit 1011 buffers the 70 mc. signal generated by R-F oscillator 1012. The buffered signal is then the main supply for the R-F gate circuits 1013 and 1014. When both inputs to the gating circuit 1015 are ZERO, i.e., $E1-XXN=0$ and $C-25N=0$, the 70 mc. signal is passed through the gate 1014. Modulated RF signals are, in turn, supplied to the demodulator circuits 1016 in all processors, including the transmitting processor. Then the demodulators, such as demodulator 1016, demodulates either the incoming or outgoing information. Even though the demodulator 1016 provides the desired voltage levels, a standard inverter must be employed before the data is suitable for use by the transfer link. Data may then be transferred into any matrix input in the C–8501 complex. Thus, the AC data bus equipment provides its transmitted information, as well as all received data, to the matrix input for program sampling under C bit control.

Referring now, generally, to FIG. 117, the phase-lock loop including error detecting circuit 1024 receives a 3 mc. master synchronization signal (3SYC) from the C-8097 timing synchronizer, compares this signal with feedback from the CP-12 oscillator circuits, such as CP-12 circuits 1040 and 1041, and adjusts the frequency of the CP-12 clock oscillator system. Frequency adjustment is continual until the clock system reaches the desired phase relationship.

The desired phase differential (C-8401 slave signal leading the received 3SYC signal by 87°) is obtained by the circuitry of FIG. 117 with the various circuits therein performing the following functions:

(1) The phane detector 1020 functions as the phase error detector and a loop filter;
(2) The differential amplifier 1021 provides the drive current for varying the inductance 1022 (VL–12) in parallel with the clock oscillator system;
(3) The block 1022 is the actual reactance modulator;
(4) The lock-on-generator 1023 supplies pulses to the differential amplifier 1021 to secure initial loop frequency lockup;
(5) The error detecting circuit 1024 indicates loop malfunction under any of the following conditions:
 (a) Lamp test,
 (b) A reference signal, from the C-8097, less than 3.5 VRMS,
 (c) The phase lock loop not locked up to the 1SYC signal from the C-8097,
 (d) Greater than ±12 degrees phase error from the nominal 87°.

Since all 3 mc. phase-lock loop circuits in C-8401 processors obtain inputs from a common source, with equal delays, all 3 mc. systems in a given complex are synchronized.

Referring to FIG. 118 in order to synchronize the local 1 mc. counter into the desired 110 state, the 1 mc. enable system utilizes the coincidence of:

(1) A reference signal from the C-8097 (ISYC)
(2) A logic output from a synchronization sample circuit (DSYNB), and
(3) A raw clock pulse (CLO).

The synchronization sample circuit in FIG. 118 comprises the reference signal (delayed master CE-6) with the local CE-1 on a CLO time. This sampling occurs thrice a miscrosecond for 167 nanosecond durations. Reference signals may be received on any of the three CLO times, depending on the processor-synchronizer relationship.

If the reference signal is received on a CLO-1 time, the sampling circuitry will be disenabled as shown in FIG. 119. This is the synchronized mode or Mode A. A synchronized pulse resulting from this mode of operation will have no affect on timing, as shown in FIG. 120, which shows, in chart form, the three different modes (A, B, and C) of synchronizing operation.

For Modes −B and −C, however, the desynchronization flip-flops (DYSNA and DYSNB) will be set, thereby enabling the synchronization pulse on the 1 mc. counter. Reference is made to FIGS. 121 and 122 which show the timing diagrams for obtaining synchronization on Modes −B and −C.

Several design features will now be described: If the C-8097 fails, the individual processors in a complex will function with independent timing. Since the synchronization drivers 468, 469, 472, and 473 of the 8097 (see FIG. 38) and the signal terminators 1026 and 1027 of FIG. 126 employ transformer coupling, a steady state failure of the reference signal will result in a logic ZERO output from the ST33, i.e., $$1SYC=0$$
$$1SYCI=1$$

The 1 mc. counters will function asynchronously with the synchronization pulses disenabled by $1SYC=0$.

All of the processors in a complex system sense the master signal independently. Thus, failure of synchronization circuitry in one processor will have no affect on timing in other processors. Further, all clock systems in a C-8501 complex operate at the same frequency, within five degrees phase, as determined by the master synchronization signals derived from within the C-8097.

Any processor is capable of automatic timing lockup when it is energized into the system. A maximum of three microseconds is required for complete synchronization of the 1 mc. systems. Reference is made to FIG. 123 for the general timing diagram. The first pulse in the 1SYC signal will initialize the synchronization enable circuitry, and the second will reset the 1 mc. counter for timing Modes −B and −C. The maximum time required for this operation is two microseconds and the minimum is one and one-third (1.33) microseconds. There is an additional four clock time delay, as shown in FIG. 120 before the main timing chain obtains synchronized operation.

Indicators are provided to display:

(1) Failure of the master synchronization timing, and;
(2) The generation of a Synchronization Change pulse.

If a sync change pulse is generated, both the Sync Failure and Sync Change lamps will function. There is no indicator reciprocity during a sync failure, i.e., only the Sync Failure Indicator lights during a sync failure. In this usage, sync failure has the following connotation: the reference signal from the C-8097 is a steady state signal.

Manual reset provides simultaneous clearing of the Sync Failure and Sync Change Lamps. The Sync Display Reset Control (SYDR) resets the sync failure flip-flop, thereby extinguishing the Sync Failure Lamp (SYFLP). The Sync Display Reset Control (SYDR) controls the Sync Change Lamp (SYCLP) in the same manner. Refer to FIG. 118 for the switch and indicator block diagram.

When a pulse train is being received from the C-8097 and the delayed master CE-6 signal does not coincide with the processor CE-1 signals, a 167 nanosecond pulse will occur on a CLO time, thereby resetting the 1 mc. counter to the 110 state. The equation for the sync pulse applied to the 1 mc. counter is:

$$\text{Sync pulse} = 1SYC \cdot DSYNB \cdot CLO$$

The 1 mc. counter is resynchronized to the 110 state, which corresponds to a CLO-1 time; or $$1 \text{ mc. counter} = 1MCA \cdot 1MCB \cdot 1MCNC$$

With the 3 mc. system synchronized, the 1 mc. system has three possible modes of operation. Two of these modes occur when the system is not synchronized. These two modes of operation will generate the sync pulse, thereby resetting the 1 mc. counter.

FIGS. 120 and 123 show the effect of the sync pulse on timing in general. The sync pulse sets the 1 mc. counter to a CLO-1 state immediately. The signal in the main timing chain, during synchronization, has sufficient time to propagate through, thus completing a sequence of program operations. When the resynchronized 1 mc. counter reaches the CLE-6 clock time the main timing chain is re-energized since $$CE-1 = CLE-6 \cdot 1MCNB \cdot 1MCNC$$

As synchronization occurs, the 1 mc. counter shifts to the 110 state (CLO-1 time). The main timing chain will continue normally until the original signal propagates through the chain. CE-N outputs from the main timing chain will then be zero until the 1 mc. counter reaches the 100 state (the state that initializes the main timing chain). Thus, when the sync pulse occurs on CLO-3 time, $CE-N=0$ for one clock time, i.e., the 1 mc. counter is delayed 333 nanoseconds; but, when it occurs on CLO-5 time, $CE-N=0$ for three clock times, i.e., the 1 mc. counter is delayed 666 nanoseconds. If however, a random sync pulse occurs during synchronized operation, there will be no change in timing (refer to FIG. 120).

As shown in FIG. 114, a pair of manual switches may be utilized to disenable either the left or right eight bit positions from the AC data bus. The switches do more than remove the associated C-8087 from the communication system; they also provide the proper termination for the AC data bus circuitry.

B. C-8097 central timing system

The C-8097 timing synchronizing system is an optional feature which is utilized in conjunction with the C-8087 AC data bus circuitry, and only when two or more processors are operated in parallel, as is done in the C-8501 complex.

The C-8097 provides the basic time reference for the individual C-8401 data central processors employing the C-8087 AC data bus circuitry in a C-8501 complex. The referencing is provided by circuitry that transmits both one- and three-megacycle signals derived from clock oscillators and a standard one megacycle. Reference is made to FIG. 38 for a block diagram of the C-8097 timing synchronizer.

As shown in FIG. 38, there is included a three-megacycle oscillator 470, a clock driver 471, a one-megacycle counter 1030, one-megacycle signal drivers, such as drivers 468 and 469, and three-megacycle buffer amplifiers such as buffer amplifiers 472 and 473.

The one-megacycle counter 1030 of FIG. 38 is substantially the same circuit as the one-megacycle counter of FIG. 30, which was discussed in connection with a section entitled "Generation of Timing Signals." Consequently, the operation of the one-megacycle counter 1030 of FIG. 38 will not be discussed in detail again. It should be noted, however, that a prime function is a provision of the one-megacycle master sync signal CE-6 which must be supplied by the C-8097 and received by the C-8087 of each of the individual processors to match the CE-1 pulses of each of the individual processors.

The counter 1030 of FIG. 38 is gated with the three-megacycle raw clock source generated by blocks 470 and 471 of FIG. 57. The count sequence is as shown below:

| Clock Time | Counter State | | |
|---|---|---|---|
| | C | B | A |
| CLO 5 | 0 | 0 | 0 |
| CLE 6 | 0 | 0 | 1 |
| CLO 1 | 0 | 1 | 1 |
| CLE 2 | 1 | 1 | 1 |
| CLO 3 | 1 | 1 | 0 |
| CLE 4 | 1 | 0 | 0 |

Reference is also made to the timing diagram of FIG. 124, which shows the output signals of the circuits of FIG. 38. The one-megacycle sync timing pulse CE-6 is derived from the one-megacycle counter 1030 and transmitted to the C-8087 circuits of the various processors, where it is utilized to synchronize the local one-megacycle counter in the 110 state i.e., synch state 1 mc. counter $= 1MCA \cdot 1MCB \cdot 1MCNC$ As shown in FIG. 124, the one-megacycle synchronizing signal CE-6 is derived from the one-megacycle counter in accordance with the following expression:

$$CE-6_m = 1MCNB \cdot 1MCNC$$

The three-megacycle sync timing circuit is derived from a master oscillator 470, shaped and amplified by clock driver 471, then buffered by buffer amplifiers 472, and 473. The output from the buffer amplifiers is transmitted via coaxial cable to the AC data busses of the various processors.

With the zero cable length between the C-8097 and the AC data busses of the various processors, the three-megacycle slave signals in the various processors lead the three-megacycle master signal by 90° or 83.5 nanoseconds. This controlled phase differential is employed to allow a time match between the delayed master CE-6 and the slave CE-1 timing signals in the AC data bus one-megacycle synchronization circuitry. Reference is made to FIG. 115 which shows the aforementioned fixed delay time, designated by $d_0$.

It is required that all out cables from C-8097 be of identical length. With identical lengths for the one megacycle and the three-megacycle signal lines, the proper relationship between the one megacycle and the three megacycles is maintained, since equal delay times are provided in all coaxial linkages.

We claim:
1. Data processor means comprising:
   a plurality of registers, each having input terminals and output terminals, and constructed to perform predefined functions upon data transferred thereto,
   transfer link switching means constructed to be controllable to connect the output terminals of a selected register of said plurality of registers as a source register to the input terminals of any oher selected one of said plurality of registers as a destination register,
   transfer sequence control means comprising microprogramming means having a plurality of microprograms for controlling said transfer link switching means to cause data transfers between selected specific source registers and selected specific destination registers,
   and main memory means having a plurality of instruction and data word memory locations therein with each word location having an address,
   said main memory further comprising access means and constructed to supply main program instructions to said transfer link switching means in response to instruction words from said microprogramming means to select one of the microprograms contained in said transfer sequence control means,
   said main memory means further constructed to supply data stored therein through said transfer link switching means and to a selected one of said registers in response to instruction words from said microprogramming means.
2. Data processor means in accordance with claim 1 in which said transfer link switching means comprises:
   transfer bus means consisting of a plurality of individual conductors of a number not less than the bit length of a word of said main memory means,
   a plurality of decoder means,
   first gating means,
   said plurality of decoder means comprising source decoder means responsive to input signals thereto including an instruction from said microprogramming means for enabling said first gating means to connect predetermined output terminals of the selected source register individually to predetermined conductors of said transfer bus means,
   second gating means,
   and said plurality of decoder means further comprising set decoder means responsive to input signals therto including an instruction from said microprogramming means for enabling said second gating means to connect predetermined conductors of said transfer bus means to predetermined input terminals of the selected destination register.

3. Data processor means in accordance with claim 2 comprising:
third gating means,
in which said plurality of decoding means further comprises clear decoder means responsive to input signals including an instruction word from said microprogramming means for causing clearing of the bit positions of a selected destination register,
inhibiting means responsive to an instruction from said microprogramming means for inhibiting clearing of said selected destination register,
and timing means constructed to cause the clearing of the destination register when clearing is not inhibited, the connection of the output terminals of the source register to the transfer bus means, and the connecting of the transfer bus means to the destination register in a predetermined chronological order.

4. Data processor means in accordance with claim 3 comprising:
control unit means including control register means comprising a plurality of control stages and constructed to provide direct control over predetermined functions of said data processor means,
means including said set decoder means for individually setting selectable stages of said control register means,
and means including said clear decoder means for individually resetting individual stages of said control register means.

5. Data processor means in accordance with claim 4 in which said main memory means comprises,
main memory address register means for accessing a particular word location of said main memory means,
main memory storage register means for storing a word to be written into said main memory means and for storing words read from said main memory means,
said main memory means constructed to respond to an instruction from said main memory address register means to cause write-in or read-out of a word into or from the accessed address of said main memory means.

6. Data processor means in accordance with claim 5 in which said plurality of registers includes:
logic register means comprising a plurality of bit stages with each bit stage being connectable to a predetermined conductor of said transfer bus means in response to the selection of various source registers by said source decoder means,
in which said transfer sequence control means further comprises transfer sequence access register means for effecting, in a chronological order, selectable readout from said microprogramming means of groups of words stored therein,
said transfer sequence access register means constructed, when selected as a destination register by said decoder means, to respond to a signal on said predetermined conductor to jump from the normal chronological order in which the words of said microprogramming means are normally accessed and to access a word located in a different predetermined word location.

7. Data processor means in accordance with claim 6 in which said plurality of registers comprises:
operational registers constructed to perform predetermined arithmetic functions, parity functions, rotate functions, complement functions, insertion functions, and storage functions on data transferred thereto,
said operational registers being constructed to respond to a control signal from a predetermined bit stage of said control register and to the concurrent selection thereof as a destination register to perform its predetermined function on data transferred thereto.

8. Data processor means in accordance with claim 7 in which said plurality of registers comprises:
a plurality of input/output registers constructed to buffer the reception of data from suitably adapted peripheral devices to the data processor means and the transmission of data from the data processor means to said peripheral devices,
a portion of said plurality of input/output registers being arranged in pairs of commutatable registers,
and fourth gating means constructed to respond to control signals from said control register means to alternately connect the two registers of each pair of input/output registers to the transfer link switching means, thus providing a plurality of pairs of commutatable input/output registers.

9. Data processor means in accordance with claim 2 in which said microprogramming means comprises:
transfer sequence storage means capable of storing a large number of words with each word having a unique address,
timing means,
and in which said transfer sequence control means comprises buffer register means constructed to receive accessed instruction words from said transfer sequence storage means and in response to timing signals from said timing means to supply said accessed instruction words to said clear decoder means, said source decoder means, and said set decoder means to cause data transfers from source registers to destination registers in accordance with said accessed instruction words.

10. Data processor means in accordance with claim 9 comprising:
third gating means,
in which said plurality of decoding means further comprises clear decoder means responsive to input signals including an instruction word from said microprogramming means for causing clearing of the bit positions of a selected destination register,
inhibiting means responsive to an instruction from said microprogramming means for inhibiting clearing of said selected destination register,
and in which said timing means is constructed to provide signals causing the clearing of the selected destination register, when clearing is not inhibted, the connection of the output terminals of the source register to the transfer bus means, and the connecting of the transfer bus means to the destination register in a predetermined chronological order.

11. Data processor means in accordance with claim 10 in which said transfer sequence control means further comprises:
addressing means for reading the word stored in any given word location of said storage means into said buffer register means,
said addressing means comprising transfer sequence access register means and counter means,
said access register means and said counter means constructed to automatically increase the count in said counter means by one and the word location address stored in said access register means by one each time a word is read from said storage means, in the absence of any overriding commands.

12. Data processor means in accordance with claim 11 in which:
each word stored in said storage means contains a plurality of instructions with each instruction containing a plurality of separate transfer instructions for effecting a plurality of transfers of data from selected source registers to selected data registers,
and in which said buffer register means is constructed to respond to output signals from said timing means to separate each of said plurality of instructions into its several separate transfer instructions to said clear, source, and set decoder means to effectuate data transfer in said predetermined chronological order.

13. Data processor means in accordance with claim 12 in which a portion of each word in said storage device is a constant value,
and comprising means for supplying said constant value directly through said transfer link switching means to a selected destination register.

14. Data processor means in accordance with claim 13 comprising:
control unit means including control register means comprising a plurality of control stages and constructed to provide direct control over predetermined functions of said data processor means,
means including said set decoder means for individually and selectively setting the control stages of said control register,
and means including said clear decoder means for individually and selectively resetting the control stages of said control register means.

15. Data processor means in accordance with claim 14 in which said main memory means comprises:
main memory address register means for accessing a particular word location of said main memory means,
main memory storage register means for storing a word to be written into said main memory means and for storing words read from said main memory means,
said main memory means constructed to respond to an instruction from said main memory address register to cause write-in or read-out of a word into or from the accessed address of said main memory means.

16. Data processor means in accordance with claim 11 in which said set decoder means is constructed to respond to predetermined instructions from said microprogramming means to connect predetermined input terminals of said addressing means to predetermined conductors of said transfer bus means to cause the next accessed word location to be removed from the immediately preceding word location by a predetermined count greater than one.

17. Data processor means in accordance with claim 16 comprising:
control register means having a plurality of control stages,
in which said plurality of registers comprises a register means D3 which is constructed to receive an instruction directly from said buffer register means under control of a predetermined control stage of said control register means and to store said instruction in said register means D3,
said register means D3 further constructed to respond to a second control signal from a predetermined control stage of said control register means to supply the instruction stored therein back to said addressing means of said transfer sequence control means to change the word location stored in said addressing means in accordance with the instruction supplied thereto.

18. Data processor means in accordance with claim 11 comprising:
control unit means including control register means having a plurality of control stages and constructed to provide direct control over predetermined functions of said data processor means,
means including said set decoder means for individually setting selectable stages of said control register means,
and means including said clear decoder means for individually resetting individual stages of said control register means.

19. Data processor means in accordance with claim 18 in which said main memory system comprises:
main memory address register means for accessing a particular word location of said main memory means,
and main memory storage register means for storing a word to be written into said main memory means and for storing words read from said main memory means,
said main memory means constructed to respond to an instruction from said main memory address register means to cause write-in or read-out of a word into or from the accessed address of said main memory means.

20. Data processor means in accordance with claim 19 in which said plurality of registers comprise:
a plurality of input/output registers constructed to buffer the reception of data from suitably adapted peripheral devices to said data processor means and the transmission of data from the data processor means to said peripheral devices,
a portion of said plurality of input/output registers being arranged in pairs of commutatable registers,
and fourth gating means constructed to respond to control signals from said control register means to alternately connect the two registers of each pair of input/output registers to said transfer link switching means, thus providing a plurality of pairs of commutatable input/output registers.

21. Data processor means in accordance with claim 20 in which said plurality of registers comprises:
logic register means comprising a plurality of bit stages with each bit stage being connectable to a predetermined conductor of said transfer bus means in response to the selection of various source registers by said source decoder means,
said transfer sequence access register means constructed, when selected as a destination register by said set decoder means, to respond to a signal on said predetermined conductor to jump from the normal chronological order in which the words contained in said transfer sequence storage device are normally accessed and to access a word located in a different, predetermined word location.

22. Data processor means in accordance with claim 21 in which said plurality of registers comprises:
operational registers constructed to perform predetermined arithmetic functions, parity functions, rotate functions, complement functions, inserting functions, and storage functions on data transferred thereto,
said operational registers being constructed to respond to a control signal from a predetermined bit stage of said control register and to the concurrent selection thereof as a destination register to perform its predetermined function on data transferred thereto.

23. Data processor means comprising:
a plurality of register means with each register having a plurality of stages, a plurality of input terminals, and a plurality of output terminals and constructed to perform predetermined functions upon data supplied thereto,
input matrix means having a plurality of input address locations, with each address location comprising a plurality of bit positions and connected to predetermined bit positions of predetermined register means as source register means,
output matrix means having a plurality of output address locations with each address location comprising a plurality of bit positions connected to predetermined bit positions of predetermined register means as destination register means,
transfer bus means constructed to connect predetermined bit positions of each of said input address locations to predetermined bit positions of each of said output address locations,
transfer sequence control means comprising microprogramming means and constructed to supply micro instructions for controlling the connection of said input and output address locations to said transfer bus means, decoding means including gating means and constructed to respond to said micro instructions to connect the bit positions of a particular input address location to said transfer bus means and the bit positions of a particular output address location to said transfer bus means.

24. Data processor means in accordance with claim 23 in which said transfer bus means comprises a plurality of individual conductors of a number not less than the bit length of a word of said main memory, in which said decoding means comprises clear decoder means, source decoder means, and set decoder means, said clear decoding means responsive to input signals including an instruction from said microprogramming means for enabling said gating means to cause clearing of predetermined stages of the selected destination register means, in which said decoding means further comprises source decoder means responsive to input signals including an instruction from said microprogramming means for connecting predetermined output terminals of the selected source register means individually to predetermined conductors of said transfer bus means, and in which said decoding means further comprises set decoder means responsive to input signals including an instruction from said microprogramming means for connecting predetermined conductors of said transfer bus means to predetermined input terminals of the selected destination register means.

25. Data processor means in accordance with claim 24 in which said microprogramming means comprises:

transfer sequence storage means capable of storing a large number of words with each word having a unique address, timing means, and in which said transfer sequence control means comprises buffer register means constructed to receive accessed words from said transfer sequence storage means and in response to timing signals from said timing means to supply portions of said accessed words to said clear decoder means, said source decoder means and said set decoder means to cause a transfer of data from a source register means to destination register means.

26. Data processor means in accordance with claim 25 in which said transfer sequence control means further comprises:

transfer sequence addressing means for reading the word stored in any given word location in said storage means into said buffer register means, said addressing means comprising transfer sequence access register means and counter means, said access register means and said counter means constructed to automatically increase the count in said counter means by one and the word location address stored in said access register means by one each time a word is read from said storage means, in the absence of any overriding commands.

27. Data processor means in accordance with claim 26 comprising:

control unit means including control register means having a plurality of control stages and constructed to provide direct control over predetermined functions of said data processor means, means including said set decoder means for individually and selectively setting the control stages of said control register, and means including said clear decoder means for individually and selectively resetting the control stages of said control register means.

28. Data processor means in accordance with claim 27 comprising:

main memory means including access means therefor and constructed to supply main program instructions to said transfer bus means in response to instruction words from said transfer sequence storage means to select one of the microprograms contained in said transfer sequence storage means, said main memory means further constructed to supply data stored therein to said transfer bus means in response to instruction words from said transfer sequence storage means.

29. Data processor means in accordance with claim 28 in which said main memory system comprises:

main memory address register means for accessing a partciular word location of said main memory means, main memory storage register means for storing a word to be written into said main memory means and for storing words read from said main memory means, said main memory means further constructed to respond to an instruction from said main memory address register means to cause write-in or read-out of a word into or from the accessed address of said main memory means.

30. Data processor means in accordance with claim 29 in which said plurality of register comprises:

logic register means having a plurality of bit stages with each bit stage being connectable to a predetermined conductor of said transfer bus means in response to the selection of various source registers by said source decoder means, said transfer sequence access register means constructed, when selected as a destination register by said set decoder means, to respond to a signal on said predetermined conductor of said transfer bus to jump from the normal chronological order in which the words contained in said transfer sequence storage device are normally accessed and to access the word location in a different, predetermined order.

31. Data processor means in accordance with claim 30 in which said plurality of registers comprises:

operational registers constructed to perform arthimetic functions, parity functions, rotate functions, complement functions, inserting functions and storage functions on data transferred thereto, said operational registers being constructed to respond to a control signal from a predetermined bit stage of said control register means and to the concurrent selection thereof as a destination register to perform its predetermined function on data transferred thereto.

32. Data processor means in accordance with claim 23 in which said microprogramming means comprises:

transfer sequence storage means capable of storing a large number of words with each word having a unique address, timing means, and in which said transfer sequence control means comprises buffer register means constructed to receive accessed words from said transfer sequence storage means and in response to timing signals from said timing means to supply portions of said accessed words to said clear decoder means, said source decoder means, and said set decoder means to cause a transfer of data from a selected source register means to a selected destination register means.

33. Data processor means in accordance with claim 32 in which said transfer sequence control means further comprises:

transfer sequence addressing means for reading the word stored in any given word location in said storage means into said buffer register means, said addressing means comprising transfer sequence access register means and counter means, said access register means and said counter means constructed to automatically increase the count in said counter means by one and the word location address stored in said access register means by one each time a word is read from said storage means, in the absence of any overriding commands.

34. Data processor means in accordance with claim 33 in which a portion of each word in said transfer sequence storage means is a constant value, and comprising means for supplying said constant value directly through said transfer bus to a selected destination register.

35. Data processor means in accordance with claim 33 comprising:
control unit means including control register means having a plurality of control stages and constructed to provide direct control over predetermined functions of said data processor,
and means including said decoder means for individually and selectively setting the control stages of said control register and for individually and selectively resetting the control stages of said control register means.

36. Data processor means in accordance with claim 35 comprising:
main memory means including access means therefor and constructed to supply main program instructions to said transfer bus means in response to instruction words from said transfer sequence storage means to select one of the microprograms contained in said transfer sequence storage means,
said main memory means further constructed to supply data stored therein to said transfer bus means in response to instruction words from said transfer sequence storage means.

37. Data processor means in accordance with claim 36 in which said main memory system comprises:
main memory address register means for accessing a particular word location of said main memory means,
main memory storage register means for storing a word to be written into said main memory means and for storing words to be read from said main memory means,
said main memory means constructed to respond to an instruction from said main memory address register means to cause write-in or read-out of a word into or from the accessed address of said main memory means.

38. Data processor means in accordance with claim 37 in which said plurality of registers comprises:
logic register means having a plurality of bit stages with each bit stage being connectable to a predetermined conductor of said transfer bus means in response to the selection of various source registers by said source decoder means,
said transfer sequence access register means constructed, when selected as a destination register by said set decoder means, to respond to a signal on said predetermined conductor of said transfer bus means to jump from the normal chronological order in which the words contained in said transfer sequence storage means are normally accessed and to access the next word location in a different predetermined order.

39. Data processor means in accordance with claim 38 in which said plurality of registers comprises:
operational registers constructed to perform arithmetic functions, parity functions, rotate functions, complement functions, inserting functions and storage functions on data transferred thereto,
said operational registers being constructed to respond to a control signal from a predetermined bit stage of said control register means, and to the concurrent selection thereof as a destination register to perform its predetermined function on data transferred thereto.

40. Data processor means in accordance with claim 39 in which said plurality of registers comprise:
a plurality of input/output registers constructed to buffer the reception of data from suitably adapted peripheral devices to said data processor means and the transmission of data from the data processor means to said peripheral devices,
a portion of said plurality of input/output registers being arranged in pairs of registers, commutating gating means constructed to respond to control signals from said control register means to alternately connect the two registers of each pair of input/output registers to said transfer bus means, thus providing a plurality of pairs of commutatable input/output registers.

41. Data processor means in accordance with claim 33 in which said decoder means is constructed to respond to predetermined instructions from said microprogramming means to cause a jump in the normal chronological order in which the words contained in said transfer sequence storage means are normally accessed and to access the next word location in a different, predetermined order.

42. Data processor means in accordance with claim 41 comprising:
control register means,
in which said plurality of registers comprises register D3 constructed to receive an instruction directly from said buffer register means under control of said control register means and to store said instruction in said register D3,
said register D3 further constructed to respond to a second control signal from said control register means to supply the instruction stored therein back to said transfer sequence addressing means,
said buffer register means constructed to store said instruction therein as the next word location of said transfer sequence storage means to be accessed.

43. Data processor means in accordance with claim 33 in which each word of said storage means contains a plurality of instructions for effecting a plurality of transfers of data from selected source registers to selected data registers,
and in which said buffer register means is constructed to respond to output signals from said timing means to separate each of said plurality of instructions into a plurality of data transfer instructions and to supply said separated data transfer instructions to said decoder means to effectuate data transfers in a predetermined chronological order.

44. In a plurality of data processor means with each data processor means comprising:
a plurality of register means with each register means having a plurality of bit stages, a plurality of input terminals, and a plurality of output terminals and constructed to perform predetermined functions upon data supplied thereto,
input matrix means having a plurality of input address locations, with each address location comprising a plurality of bit positions and connected to predetermined bit stages of predetermined register means as source register means,
output matrix means having a plurality of output address locations with each address location comprising a plurality of bit positions connected to predetermined bit stages of predetermined register means,
transfer bus means constructed to connect predetermined bit positions of each of said input address locations to predetermined bit positions of each of said output address locations,
transfer sequence control means comprising microprogramming means and constructed to supply micro instructions for controlling the connection of said input and output address locations to said transfer bus means, and
decoding means including gating means and constructed to respond to said micro instructions to connect the bit positions of a particular input address location to said transfer bus means and the bit positions of a particular output address location to said transfer bus means, data bus means common to all of said plurality of data processor means, timing source means comprising central timing means and separate timing means individual to each of said data processor means, said individual timing means constructed to respond to said central timing means to maintain predetermined synchronization with each other, selected register means of said plurality of register means constructed to receive and store information to be transferred over said data bus to other of said data processor means, each data processor means comprising first data bus gating means constructed to respond to a signal from said timing means to supply the data stored in said selected register means to said data bus means, and each data processor means comprising second data bus gating means constructed to respond to a signal from said timing means to supply data present on said data bus to the said input matrix of said each data processor means.

References Cited by the Examiner
UNITED STATES PATENTS 2,945,211    7/1960    Gibson et al. -------- 340—147

ROBERT C. BAILEY, *Primary Examiner.*

R. B. ZACHE, *Assistant Examiner.*